(12) United States Patent
Kaetzel

(10) Patent No.: US 9,737,854 B2
(45) Date of Patent: Aug. 22, 2017

(54) PROCESS FOR THE PURIFICATION OF A LIQUID-CRYSTAL MIXTURE

(71) Applicant: Merck Patent GmbH, Darmstadt (DE)

(72) Inventor: Uwe Kaetzel, Mainz (DE)

(73) Assignee: MERCK PATENT GMBH, Dermstadt (DE)

( * ) Notice: Subject to any disclaimer, the term of this patent is extended or adjusted under 35 U.S.C. 154(b) by 0 days.

(21) Appl. No.: 14/760,273

(22) PCT Filed: Dec. 16, 2014

(86) PCT No.: PCT/EP2014/003376
§ 371 (c)(1),
(2) Date: Jul. 10, 2015

(87) PCT Pub. No.: WO2015/090565
PCT Pub. Date: Jun. 25, 2015

(65) Prior Publication Data
US 2016/0325231 A1 Nov. 10, 2016

(30) Foreign Application Priority Data
Dec. 18, 2013 (DE) .................. 10 2013 021 279

(51) Int. Cl.
*B01D 61/44* (2006.01)
*C09K 19/00* (2006.01)
(Continued)

(52) U.S. Cl.
CPC .............. *B01D 61/44* (2013.01); *C09K 19/00* (2013.01); *C09K 19/02* (2013.01); *C09K 19/062* (2013.01);
(Continued)

(58) Field of Classification Search
CPC ....................................................... B01D 61/44
See application file for complete search history.

(56) References Cited

U.S. PATENT DOCUMENTS 3,990,984 A * 11/1976 Barret .................. G02F 1/1375
252/299.2

FOREIGN PATENT DOCUMENTS

| CN | 101760203 A | 6/2010 |
| CN | 101760204 A | 6/2010 |
| DE | 10125708 A1 | 3/2002 |

OTHER PUBLICATIONS

International Search Report dated Mar. 10, 2015 issued in corresponding PCT/EP2014/003376 application (pp. 1-2).
(Continued)

*Primary Examiner* — Arun S Phasge
(74) *Attorney, Agent, or Firm* — Millen White Zelano and Branigan, PC; John Sopp; Anthony Zelano

(57) ABSTRACT

In a process for the purification of a liquid-crystal mixture (7), the liquid-crystal mixture (7) is passed through a first electrodialysis cell (2) and a concentrate solution (14) is passed through a second electrodialysis cell (8) which is adjacent to the first electrodialysis cell (2) and is separated by an ion-exchanger membrane (9), and an electric field transverse to a direction of passage of the liquid-crystal mixture (7) through the first electrodialysis cell (2) is generated with the aid of an anode/cathode arrangement (15, 16) arranged outside the electrodialysis cells (2, 8) so that ionized constituents of the liquid-crystal mixture (7) are discharged at the ion-exchanger membrane (9) and removed from the liquid-crystal mixture (7).

13 Claims, 2 Drawing Sheets

(51) Int. Cl.
*C09K 19/02* (2006.01)
*C09K 19/06* (2006.01)
*C09K 19/54* (2006.01)
C09K 19/04 (2006.01)
C09K 19/30 (2006.01)

(52) U.S. Cl.
CPC ...... *C09K 19/3003* (2013.01); *C09K 19/3066* (2013.01); *C09K 19/54* (2013.01); *C09K 2019/0448* (2013.01); *C09K 2019/0466* (2013.01); *C09K 2019/301* (2013.01); *C09K 2019/3004* (2013.01); *C09K 2019/3006* (2013.01); *C09K 2019/3009* (2013.01); *C09K 2019/3027* (2013.01); *C09K 2219/00* (2013.01)

(56) References Cited

OTHER PUBLICATIONS

English Translation Abstract of DE 10125708 A1 published Mar. 28, 2002.
English Translation Abstract of CN 101760203 A1 published Jun. 30, 2010.
English Translation Abstract of CN 101760204 A published Jun. 30, 2010.

* cited by examiner

PROCESS FOR THE PURIFICATION OF A LIQUID-CRYSTAL MIXTURE

The invention relates to a process for the purification of a liquid-crystal mixture.

Liquid-crystal mixtures are fluid substances having crystal-like direction-dependent physical properties which are used, for example, in liquid-crystal displays. Commercially available liquid-crystal mixtures which can advantageously be employed in displays have various components which are mixed with one another in a pre-specified ratio to one another. The properties and advantages of the liquid-crystal mixture that are necessary for the respective application can be achieved specifically by suitable specification of individual components and mixing proportions.

It has been found that even slight contamination of a liquid-crystal mixture can result in the properties of the liquid-crystal mixture that are necessary or desired for the intended application being impaired and economically viable use of a pre-specified liquid-crystal mixture for a particular application being made more difficult or even impossible.

Various purification processes by means of which a liquid-crystal mixture can be purified have therefore been disclosed in practice. The various purification processes are based on different methods. In industrial production and processing processes, mechanical filter processes or the addition and subsequent separation of a sorbent represent purification processes which are frequently employed.

The purification processes known from practice often have only low efficiency for the purification of liquid-crystal mixtures and are nevertheless comparatively expensive.

It is therefore regarded as an object of the present invention to design a process for the purification of a liquid-crystal mixture in such a way that the most efficient purification possible of the liquid-crystal mixture can be carried out as inexpensively and reliably as possible.

This object is achieved in accordance with the invention by a purification process in which the liquid-crystal mixture is passed through a first electrodialysis cell, a concentrate solution is passed through a second electrodialysis cell which is adjacent to the first electrodialysis cell and is separated by an ion-exchanger membrane, and, with the aid of an anode/cathode arrangement arranged outside the electrodialysis cells, an electric field transverse to a direction of passage of the liquid-crystal mixture through the first electrodialysis cell is generated so that ionised constituents of the liquid-crystal mixture are discharged from the first electrodialysis cell and are removed from the liquid-crystal mixture. The process according to the invention consequently essentially corresponds to the performance of electrodialysis on the liquid-crystal mixture. It has been found that many impurities relevant in practice can be separated and removed from the liquid-crystal mixture using electrodialysis. Ionised impurities can be removed reliably and with high effectiveness from the liquid-crystal mixture by suitable pre-specification of the concentrate solution and the ion-exchanger membrane delimiting the first electrodialysis cell.

The process according to the invention can be carried out in continuous operation and enables continuous sampling and control of the purification process, so that, depending on the respective liquid-crystal mixture, the contamination thereof and a target degree of purity of the liquid-crystal mixture to be purified, a suitable process duration can be determined and the purification already achieved can be monitored and if necessary regulated while the purification process is being carried out.

According to an advantageous embodiment of the inventive idea, it is provided that the liquid-crystal mixture is passed through the first electrodialysis cell a number of times. It is likewise possible for the liquid-crystal mixture to be passed successively through a plurality of electrodialysis cells having an arrangement, comparable to the first electrodialysis cell, of an ion-exchanger membrane and an adjacent second electrodialysis cell and a comparable electric field. In both cases, it is thereby possible to achieve the situation where a rate of passage of the liquid-crystal mixture and a total purification duration or a total residence time of the liquid-crystal mixture in the first electrodialysis cell or in a comparable electrodialysis cell arrangement can be pre-specified independently of one another. Thus, for example, it is possible, in the case of an impurity which can be removed highly efficiently, for the process duration to be adapted and kept short. If, by contrast, it is observed that the impurity in the liquid-crystal mixture can only be separated and removed from the liquid-crystal mixture comparatively slowly, the purification process can be carried out for a sufficiently long time in order to achieve and reliably guarantee a pre-specified purification effect. Sampling at time intervals or continuously enables the purification effect that has already been achieved to be determined and controlled. Accordingly, the purification process according to the invention also enables regulated purification of a liquid-crystal mixture, so that it can be ensured that a target or necessarily pre-specified degree of purity is also achieved with the purification according to the invention.

According to an embodiment of the inventive idea, it is provided that the liquid-crystal mixture is passed through the first electrodialysis cell over a period of more than one hour, preferably more than 4 hours. If the liquid-crystal mixture is passed successively through a plurality of comparable electrodialysis cells, it may likewise be provided that the total residence time of the liquid-crystal mixture in these electrodialysis cells is more than one hour and preferably more than four hours. It has been found that the specific resistance, which can be regarded as an expedient criterion for the purity of the liquid-crystal mixture, can be increased by more than a factor of 20, depending on the process duration over a period of about 4 hours to 8 hours.

It has proven advantageous for the concentrate solution used to be deionised water. In addition to comparatively effective charge transport in deionised water, the concentration gradient favours osmosis through the ion-exchanger membrane, which results in an additional purifying effect.

However, it is likewise possible and possibly advantageous, depending on the composition of the liquid-crystal mixture, for the concentrate solution used also to be other suitable solutions, such as, for example, transformer oil, dodecane or another organic solvent.

Investigations have shown that a large potential difference and consequently a large electric field transverse to a flow direction of the liquid-crystal mixture through the first electrodialysis cell is particularly advantageous for an effective purification effect. According to an embodiment of the inventive idea, it is therefore provided that the ion-exchanger membrane used is a membrane having a breakdown voltage of greater than 10 volts, preferably greater than 80 volts and particularly preferably 400 volts or more, and an electric potential difference which effects the greatest possible drop in voltage at the ion-exchanger membrane, but which is below the breakdown voltage, is pre-specified with the aid of the anode/cathode arrangement. The breakdown voltage denotes the voltage from which the membrane no longer reliably acts as insulator and current flow through the membrane could impair the electrodialysis. A drop in voltage between 10 and 1000 volts within the first electrodialysis cell is regarded as suitable for carrying out the purification process. The drop in voltage in the first electrodialysis cell should preferably be in a range between 80 volts and 120 volts, which has proven particularly advantageous for the purification process.

In order to prevent water or other mixture components being destroyed at the electrodes, it is, in accordance with an advantageous embodiment of the inventive idea, provided that the anode and cathode are flushed with transformer oil while the process is being carried out. The accessible active surfaces of the anode and cathode can be flushed with the transformer oil continuously or at time intervals. The electrode material used for the anode and for the cathode can preferably be stainless steel, but also graphite, mixed oxides or other suitable electrode materials.

In order to prevent residues of the purified liquid-crystal mixture remaining adhering and being retained in the first electrodialysis cell after a purification operation, it is provided that if possible all surfaces coming into contact with the liquid-crystal mixture to be purified are made, for example, from perfluoroalkoxy polymers (PFA) or are coated therewith. It is likewise possible for the components which come into contact with product, such as, for example, the electrodialysis cell, but also tubes, ion-exchanger membranes or spacer elements in an electrodialysis cell to be made from an inert polymer, such as, for example, polytetrafluoroethylene (PTFE). The components which come into contact with product are advantageously cleaned with organic solvents, such as, for example, acetone or toluene, before beginning a new purification process.

In order to prevent undesired pressure variations in the first electrodialysis cell while the purification process is being carried out, which may favour or cause leakage between adjacent electrodialysis cells, low-pulsation pumps are used to convey the liquid-crystal mixture and the concentrate solution. It has been found that, for example, the use of gear pumps enables the liquid-crystal mixture to be conveyed with very constant pressure and considerably reduces or entirely prevents undesired effects, such as, for example, leakage or a reduced purification effect.

In order to achieve the most effective purification possible of the liquid-crystal mixture within the shortest possible time, it is provided that the liquid-crystal mixture is thoroughly mixed and homogenised before introduction into the first electrodialysis cell.

A device by means of which the process according to the invention can be carried out has a first electrodialysis cell having a supply line and a discharge line, enabling a liquid-crystal mixture to be passed through the first electrodialysis cell in a direction of passage, and a second electrodialysis cell having a supply line and a discharge line, which is adjacent to the first electrodialysis cell and is separated by a suitable ion-exchanger membrane, enabling a concentrate solution to be passed through the second electrodialysis cell. The first electrodialysis cell and the second electrodialysis cell are arranged between an anode/cathode arrangement in such a way that an electric field transverse to the direction of passage of the liquid-crystal mixture in the first electrodialysis cell can be generated by means of the anode/cathode arrangement.

The anode and the cathode are separated from the first electrodialysis cell and from the second electrodialysis cell in each case by an ion-exchanger membrane, which exchanges dissolved ions having a charge which has an opposite charge sign to the dissolved ions exchanged by the ion-exchanger membrane between the first electrodialysis cell and the second electrodialysis cell. For example, if a cation-exchanger membrane is located between the first electrodialysis cell and the second electrodialysis cell, the anode and the cathode are separated from the first and second electrodialysis cells by anion-exchanger membranes.

The ion-exchanger membranes can preferably have a heterogeneous design and contain ion-exchanger particles embedded in a base polymer, or alternatively can have a homogeneous design and consist of an ionic polymer. The electrode material used is preferably stainless steel, but also graphite or a suitable mixed oxide.

Spacing devices, which are known as spacers and also serve for effective fluid distribution within the electrodialysis cells, are arranged between the respectively adjacent ion-exchanger membranes. The spacers are made from an inert plastic material or plastic-material mixture, such as, for example, polyethylene, polyethylene and polyamide, or from polyvinyl chloride and polyethylene terephthalate. A typical thickness of suitable spacers is between 0.3 mm and 1.5 mm, preferably about 0.5 mm.

Low-pulsation and as far as possible constant-pressure pumps, such as, for example, gear pumps, are advantageously used for conveying the liquid-crystal mixture and the concentrate solution.

All components which come into contact with the liquid-crystal mixture, such as, for example, the electrodialysis cells, the ion-exchanger membranes, the spacers and the tubes used for the supply lines and discharge lines, are preferably made from an inert polymer or provided with a corresponding coating. A suitable inert polymer is, for example, PFA or PTFE.

Illustrative embodiments of the inventive idea are explained in greater detail below and are depicted in the drawing, in which:

Figure 1:
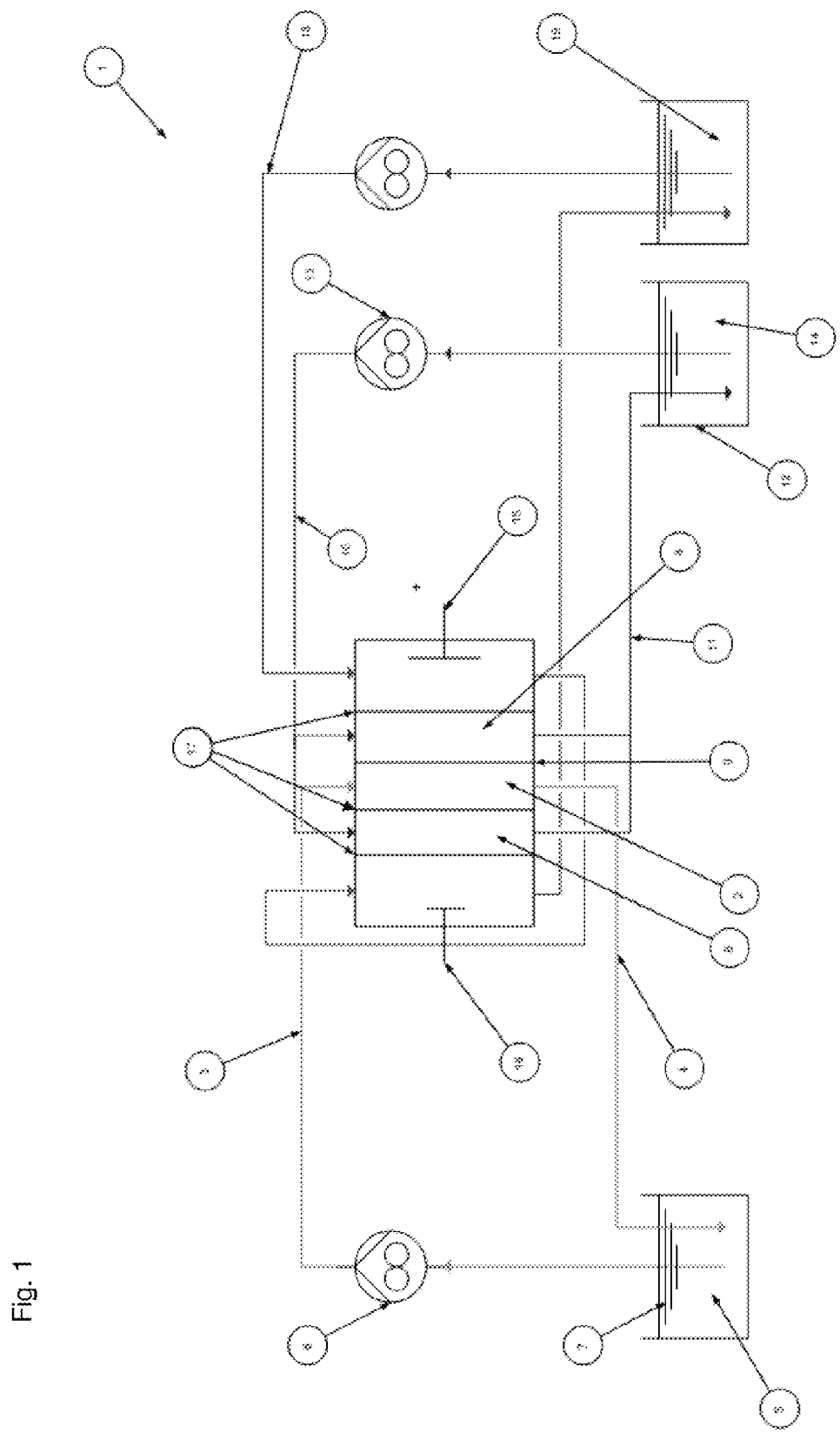
FIG. 1 shows a diagrammatic representation of a purification process according to the invention which is carried out with the aid of a suitable electrodialysis device.

A purification device 1, depicted by way of example in FIG. 1, by means of which the process according to the invention for the purification of a liquid-crystal mixture can be carried out has a first electrodialysis cell 2 having a supply line 3 and a discharge line 4, which are connected to a liquid-crystal mixture reservoir 5. With the aid of a gear pump 6, an amount of fluid of a liquid-crystal mixture 7 can be conveyed out of the liquid-crystal mixture reservoir 5, through the first electrodialysis cell 2 and back into the liquid-crystal mixture reservoir 5, so that a circuit is produced and the liquid-crystal mixture 7 is passed continuously through the first electrodialysis cell 2. In the representation in accordance with FIG. 1, the liquid-crystal mixture 7 flows through the first electrodialysis cell 2 in a direction of passage running from top to bottom.

A second electrodialysis cell 8, which is adjacent to the first electrodialysis cell 2, is separated from the first electrodialysis cell 2 by a suitable anion-exchanger membrane 9. The second electrodialysis cell 8 likewise has a supply line 10 and a discharge line 11, which are connected to a concentrate-solution reservoir 12, so that a concentrate solution 14 can be passed through the second electrodialysis cell 8 with the aid of a gear pump 13. The concentrate solution 14 used is deionised water.

The first electrodialysis cell 2 and the second electrodialysis cell 8 are arranged between an anode 15 and a cathode 16 in such a way that an electric field transverse to the direction of passage of the liquid-crystal mixture 7 in the first electrodialysis cell 2 can be generated by means of this anode/cathode arrangement.

The anode 15 and the cathode 16 are separated from the first electrodialysis cell 2 and from the second electrodialysis cell 8 in each case by a cation-exchanger membrane 17 and can be flushed continuously or on demand with transformer oil 19 with the aid of a transformer-oil circuit 18.

All components which come into contact with the liquid-crystal mixture 7, such as, for example, the electrodialysis cells 2 and 8, the ion-exchanger membranes 9 and 17, the spacers and the tubes used for the supply lines 3 and 10 and the discharge lines 4 and 11, are made from an inert polymer or provided with a corresponding coating. A suitable inert polymer is, for example, PFA or PTFE.

In order to carry out the purification process, a potential difference of, for example, 80 volts or 120 volts is generated between the anode 15 and the cathode 16 with the aid of a direct-voltage source. The gear pumps 6 and 13 are started and effect uniform passage of the liquid-crystal mixture 7 through the first electrodialysis cell 2 and of the concentrate solution 14 through the second electrodialysis cell 8. While the liquid-crystal mixture 7 flows through the first electrodialysis cell 2, ionised impurities are diverted by the electric field either in the direction of the second electrodialysis cell 8 at the anion-exchanger membrane 9, or, in the case of an opposite charge sign of the ionised impurity, in the direction of the cathode 16 at the cation-exchanger membrane 17 and are thereby removed from the liquid-crystal mixture 7 flowing through.

The liquid-crystal mixture can be passed through the first electrodialysis cell 2 over a sufficiently long period. While the purification process is being carried out, samples can be taken continuously or at time intervals in order to determine and monitor the purification of the liquid-crystal mixture 7 that has already been achieved.

Figure 2:
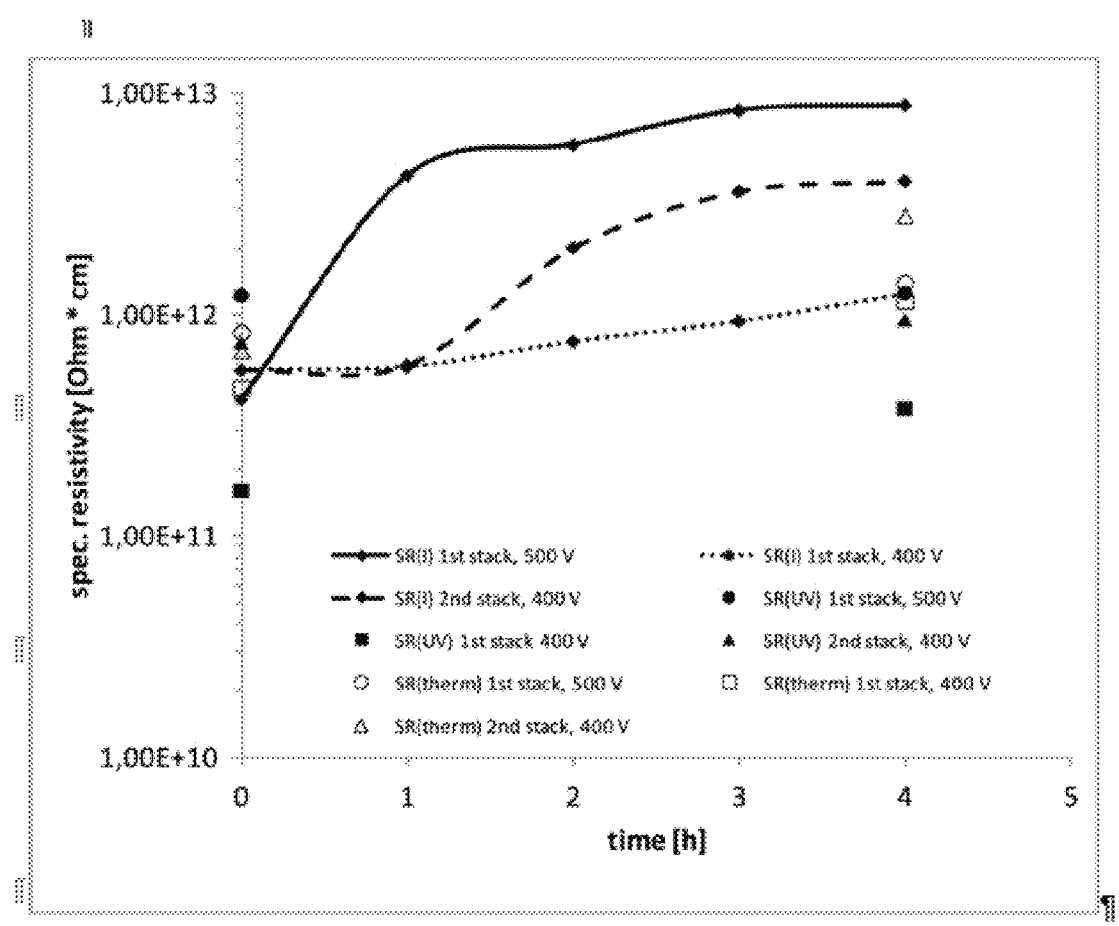
FIG. 2 shows a diagrammatic representation of a change in a specific resistance of a liquid-crystal mixture over time over the duration of performance of the purification process.

FIG. 2 depicts diagrammatically a specific resistance ρ in the unit ohm×cm determined while the purification process for a liquid-crystal mixture 7 is being carried out, as a function of the purification duration t in the unit hours. The specific resistance ρ is a measure of the proportion of dissolved ions in the liquid-crystal mixture 7 and thus at least indirectly a measure of the proportion of ionised impurities present in the liquid-crystal mixture 7. The greater the specific resistance ρ, the smaller the proportion of ionised impurities and the higher the purity of the liquid-crystal mixture 7. It has been found that the specific resistance ρ of a typical liquid-crystal mixture 7 increases by about a factor of 10 after only one hour and by about a factor of 40 after about four hours.

The purification process according to the invention can be carried out using standard laboratory electrodialysis devices and merely requires continuous operation of the gear pumps. Correspondingly, the purification process can be carried out using simple equipment and inexpensively and facilitates very efficient purification of the liquid-crystal mixture 7. The efficiency can be increased further by additionally carrying out further purification processes based on other methods beforehand.

The purification process described above is particularly suitable for liquid-crystal mixtures comprising at least two organic substances, preferably mesogenic, in particular liquid-crystalline substances, where the organic substances are preferably selected from the compounds of the general formula I,

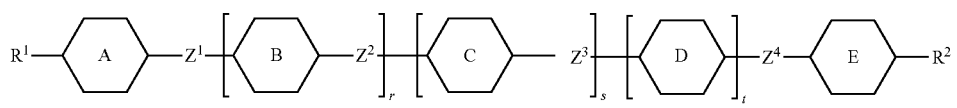

in which

R$^1$ and R$^2$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

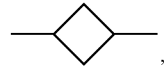

—C≡C—,

—CH=CH—, —CF$_2$O—, —OCF$_2$—, —OC—O— or —O—CO— in such a way that O atoms are not linked directly to one another, and one of the radicals R$^1$ and R$^2$ also denotes F, Cl, CN, SF$_5$, NCS, SCN, OCN, rings A, B, C, D and E each, independently of one another, denote

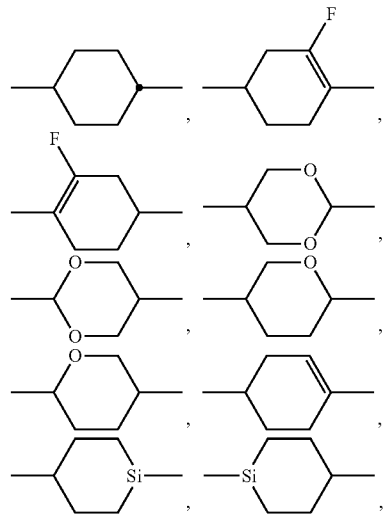

-continued
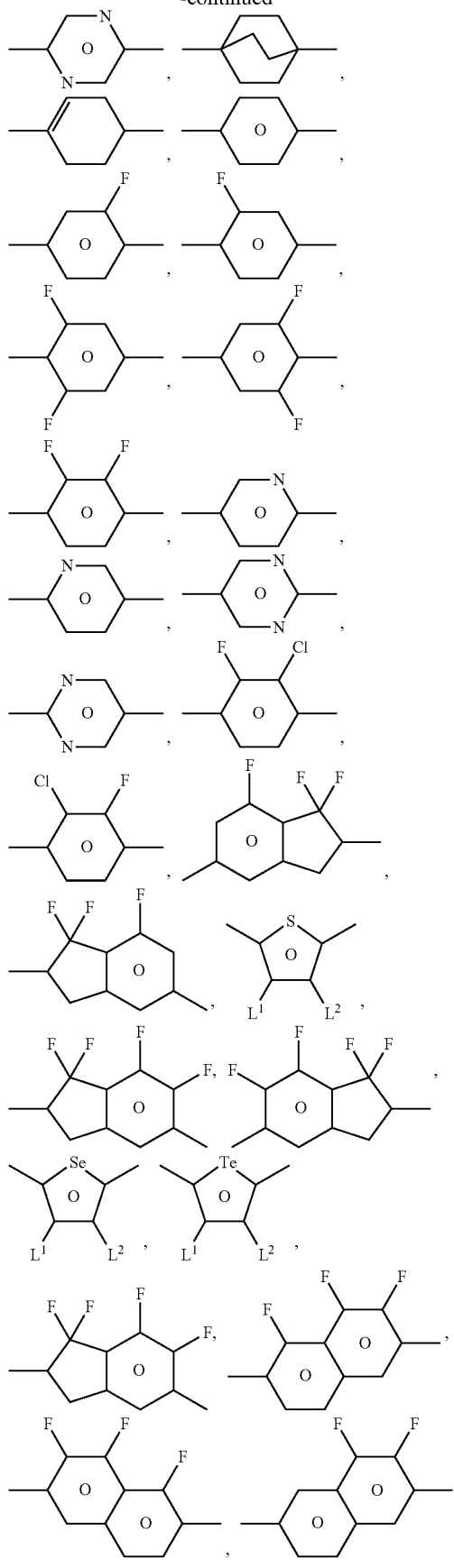
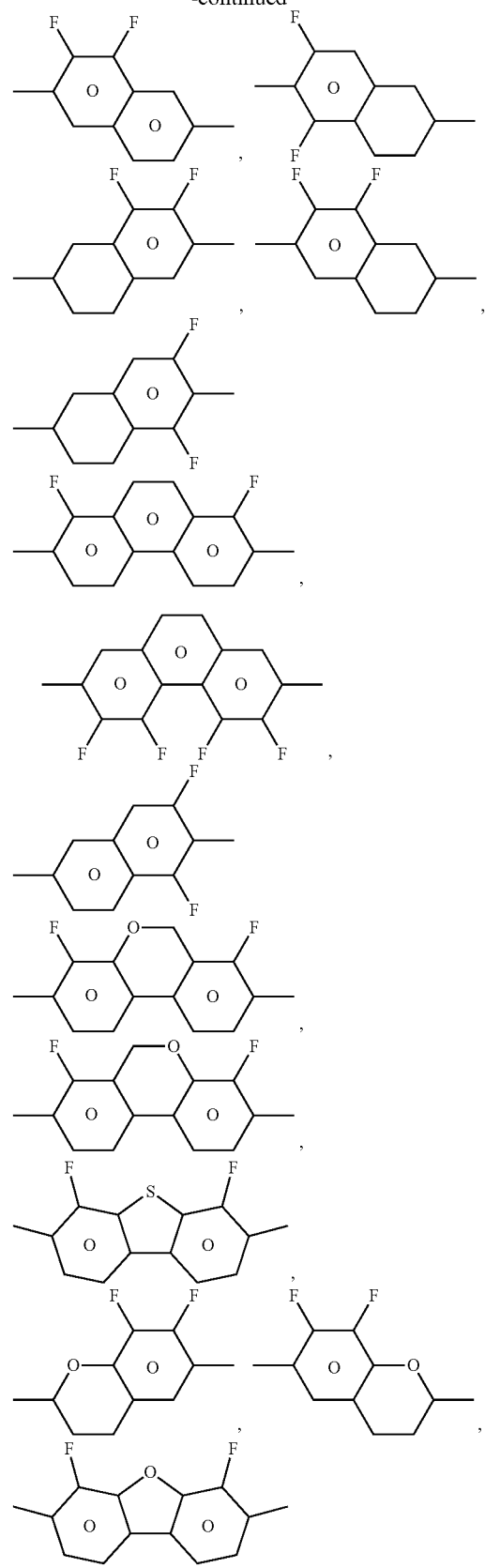
r, s and t each, independently of one another, denote 0, 1, 2 or 3, where r+s+t≤3, $Z^{1-4}$ each, independently of one another, denote —CO—O—, —O—CO—, —CF$_2$O—, —OCF$_2$—, —CH$_2$O—, —OCH$_2$—, —CH$_2$CH$_2$—, —(CH$_2$)$_4$—, —CH=CH—CH$_2$O, —C$_2$F$_4$—, —CH$_2$CF$_2$—, —CF$_2$CH$_2$—, —CF=CF—, —CH=CF—, —CF=CH—, —CH=CH—, —C≡C— or a single bond, and L$^1$ and L$^2$ each, independently of one another, denote H or F.

In the case where r+s+t=0, $Z^1$ and $Z^4$ are preferably selected in such a way that, if they do not denote a single bond, they are not linked to one another via two O atoms.

The liquid-crystal mixtures employed comprising the individual mesogenic substances may additionally also comprise one or more polymerisable compounds, so-called reactive mesogens (RMs), for example as disclosed in U.S. Pat. No. 6,861,107, in concentrations of, preferably, 0.1-5% by weight, particularly preferably 0.2-2% by weight, based on the mixture. Mixtures of this type can be used for so-called polymer stabilised VA (PS-VA) modes, negative IPS (PS-IPS) or negative FFS (PS-FFS) modes, in which polymerisation of the reactive mesogens is intended to take place in the liquid-crystalline mixture. The prerequisite for this is that the liquid-crystal mixture does not itself comprise any individual polymerisable substances.

The prerequisite for this is that the liquid-crystal mixture itself does not comprise any polymerisable components which likewise polymerise under the conditions where the compounds of the formula M polymerise.

The polymerisation is preferably carried out under the following conditions:

The polymerisable components are polymerised in a cell using a UV-A lamp of defined intensity for a defined period and applied voltage (typically 10 V to 30 V alternating voltage, frequencies in the range from 60 Hz-1 kHz). The UV-A light source employed is typically a metal-halide vapour lamp or high-pressure mercury lamp having an intensity of 50 mW/cm$^2$. These are conditions where, for example, liquid-crystalline compounds containing an alkenyl or alkenyloxy side chain, such as, for example, the compound of the formula

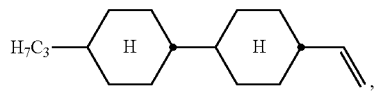

do not polymerise.

The polymerisable mesogenic or liquid-crystalline compounds, also known as "reactive mesogens" (RMs), are preferably selected from the compounds of the formula II

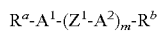    II in which the individual radicals have the following meanings:

A$^1$ and A$^2$ each, independently of one another, denote an aromatic, heteroaromatic, alicyclic or heterocyclic group, preferably having 4 to 25 C atoms, which may also contain fused rings and which is optionally mono- or polysubstituted by L, $Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —C≡C—, —CH=CH—COO—, —OCO—CH=CH—, CR$^0$R$^{00}$ or a single bond, L, R$^a$ and R$^b$ each, independently of one another, denote H, halogen, SF$_5$, NO$_2$, a carbon group or hydrocarbon group, where the compounds contain at least one radical L, R$^a$ and R$^b$ which denotes or contains a P-Sp-group, R$^0$ and R$^{00}$ each, independently of one another, denote H or alkyl having 1 to 12 C atoms, P denotes a polymerisable group, Sp denotes a spacer group or a single bond, m denotes 0, 1, 2, 3 or 4, n denotes 1, 2, 3 or 4.

The polymerisable compounds may contain one polymerisable group (monoreactive) or two or more (di- or multireactive), preferably two, polymerisable groups.

Above and below, the following meanings apply:

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) in a polymerisable mesogenic compound ("RM") to one another. Sp preferably denotes a single bond or a 1-16 C alkylene, in which one or more CH$_2$ groups may be replaced by —O—, —CO—, —COO— or —OCO— in such a way that two O atoms are not connected directly to one another.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

The terms "alkyl", "aryl", "heteroaryl", etc., also encompass polyvalent groups, for example alkylene, arylene, heteroarylene, etc.

The term "alkyl" in this application encompasses straight-chain and branched alkyl groups having 1 to 9 carbon atoms, preferably the straight-chain groups methyl, ethyl, propyl, butyl, pentyl, hexyl, heptyl, octyl and nonyl. Groups having 1 to 5 carbon atoms are particularly preferred.

The term "alkenyl" in this application encompasses straight-chain and branched alkenyl groups having 2 to 9 carbon atoms, preferably the straight-chain groups having 2 to 7 carbon atoms. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hex-enyl, 1E-hept-enyl, 3-butenyl, 3E-pentenyl, 3E-hexenyl, 3E-heptenyl, 4-pentenyl, 4Z-hexenyl, 4E-hexenyl, 4Z-hep-tenyl, 5-hexenyl, 6-heptenyl and the like. Groups having up to 5 carbon atoms are particularly preferred.

The term "fluoroalkyl" in this application encompasses straight-chain groups having a terminal fluorine, i.e. fluoromethyl, 2-fluoroethyl, 3-fluoropropyl, 4-fluoro-butyl, 5-fluoro-pentyl, 6-fluorohexyl and 7-fluoroheptyl. However, other positions of the fluorine are not excluded.

The term "oxaalkyl" or "alkoxy" in this application encompasses straight-chain radicals of the formula $C_nH_{2n+1}$-O—$(CH_2)_m$, in which n and m each, independently of one another, denote 1 to 6. Preferably, n=1 and m=1 to 6.

The term "aryl" denotes an aromatic carbon group or a group derived therefrom. The term "heteroaryl" denotes "aryl" in accordance with the above definition containing one or more heteroatoms.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or a —C≡C— triple bond, and groups which are suitable for polymerisation with ring opening, such as, for example, oxetane or epoxide groups.

The polymerisable compounds are prepared analogously to processes which are known to the person skilled in the art and are described in standard works of organic chemistry, such as, for example, in Houben-Weyl, Methoden der organischen Chemie [Methods of Organic Chemistry], Thieme-Verlag, Stuttgart.

Typical and preferred reactive mesogens (RMs) are described, for example, in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Very particularly referred reactive mesogens are shown on Table E.

The process is used for the preparation of a mixture consisting of organic compounds, one or more of which are preferably mesogenic, preferably liquid-crystalline, per se. The mesogenic compounds preferably include one or more liquid-crystalline compounds. The process product is preferably a homogeneous, liquid-crystalline mixture. In the broader sense, the process also encompasses the preparation of mixtures which consist of organic substances in the homogeneous liquid phase and comprise additives which are insoluble therein (for example small particles). The process can thus also be used for the preparation of suspension-like or emulsion-like mixtures based on a continuous homogeneous organic phase. However, process variants of this type are generally less preferred.

By means of suitable additives, the liquid-crystal mixtures comprising at least two compounds of the formula I can be modified in such a way that they can be employed in any type of LCD display that has been disclosed to date, for example, ECB, VAN, IPS, FFS, TN, TN-TFT, STN, OCB, GH, PS-IPS, PS-FFS, PM-VA, PVA, PSA, PS-VA or ASM-VA displays.

The liquid-crystal mixtures may also comprise further additives known to the person skilled in the art and described in the literature, such as, for example, UV stabilisers, such as, for example, Tinuvin®, for example Tinuvin® 770, from BASF, antioxidants, such as, for example, Irganox®, for example Irganox® 1076 (octadecyl 3-(3,5-di-tert.butyl-4-hydroxyphenyl)propionate), from BASF, free-radical scavengers, nanoparticles, microparticles, one or more dopants, etc. For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)) in order to improve the conductivity, or substances can be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Suitable stabilisers and dopants which can be combined with the compounds of the formula I in the electrodialysis cell during the preparation of the liquid-crystal mixtures are indicated below in Tables C and D.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

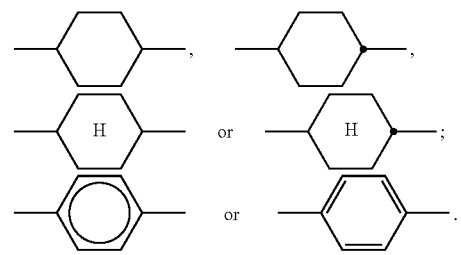

The cyclohexylene rings are trans-1,4-cyclohexylene rings.

In the present application and in the following examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, k and z are integers and preferably denote 0, 1, 2, 3, 4, 5, 6, 7, 8, 9, 10, 11 or 12. The term "(O)$C_mH_{2m-1}$" means O$C_mH_{2m+1}$ or $C_mH_{2m+1}$. The coding in Table B is self-evident.

In Table A, only the acronym for the parent structure is indicated. In individual cases, this is followed, separated from the acronym for the parent structure by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mesogenic or liquid-crystalline substances which are suitable for the preparation of liquid-crystal mixtures and can be used in the purification process according to the invention are listed, in particular, in Tables A and B:

TABLE A

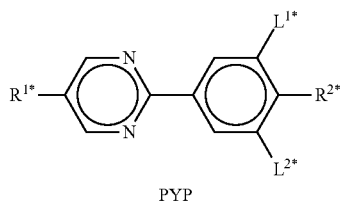

PYP

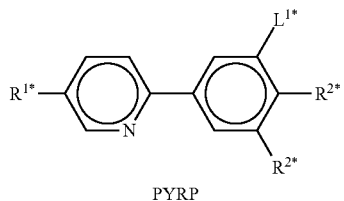

PYRP

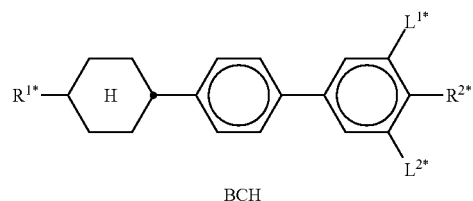

BCH

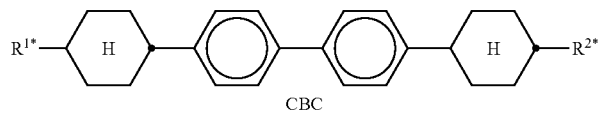

CBC

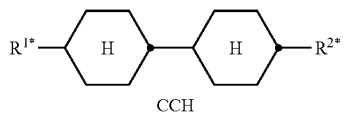

CCH

TABLE A-continued
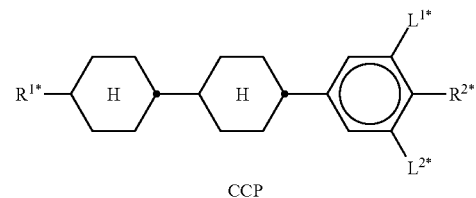
CCP
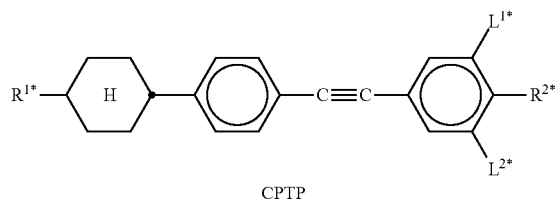
CPTP
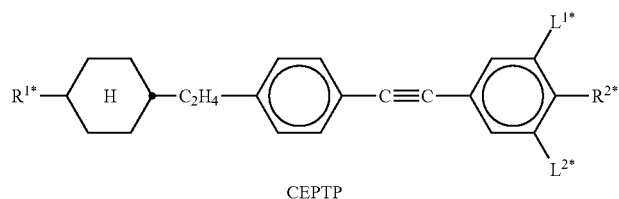
CEPTP
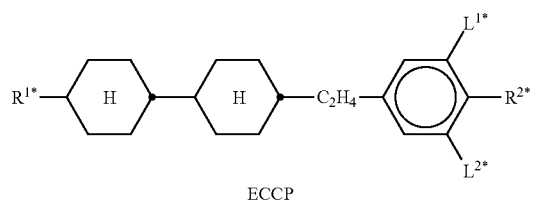
ECCP
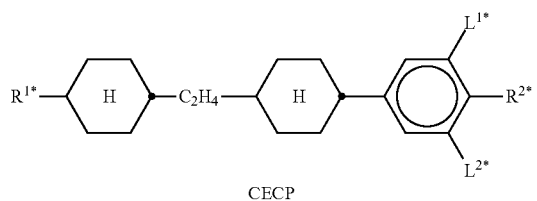
CECP
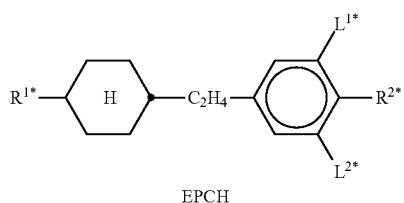
EPCH
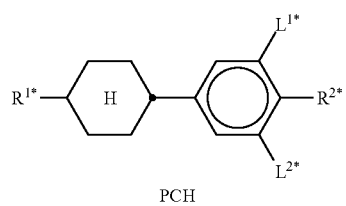
PCH
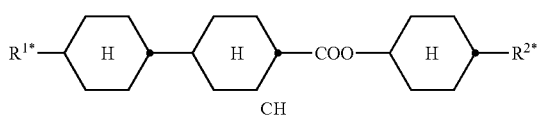
CH TABLE A-continued
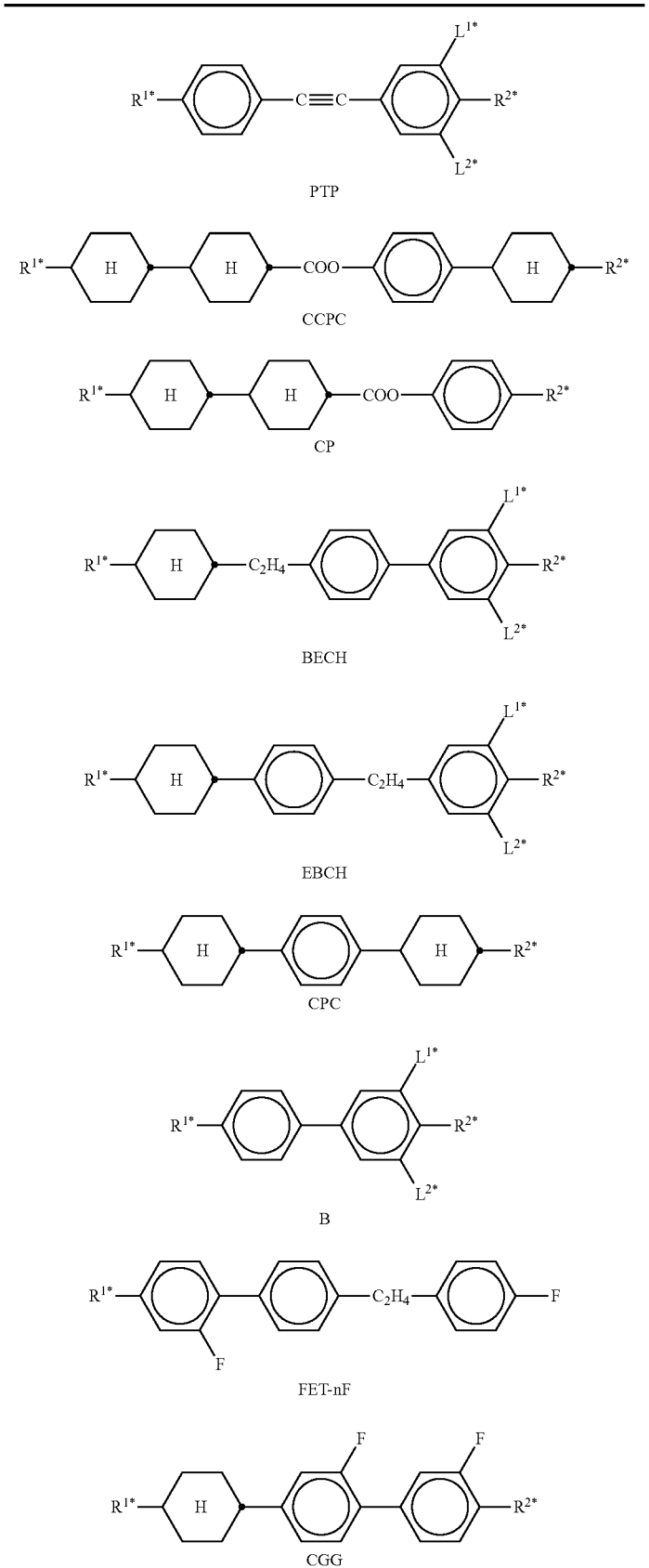

TABLE A-continued
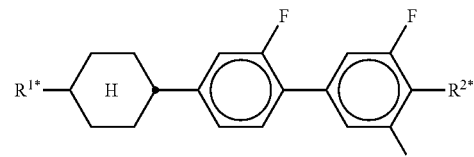
CGU
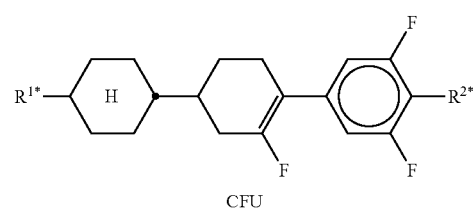
CFU
TABLE B
(n = 1-15; $(O)C_nH_{2n+1}$ means $C_nH_{2n+1}$ or $OC_nH_{2n+1}$)
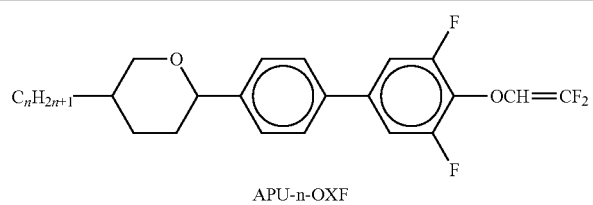
APU-n-OXF
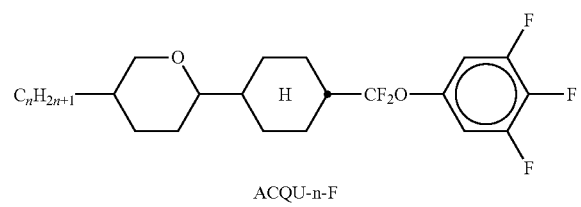
ACQU-n-F
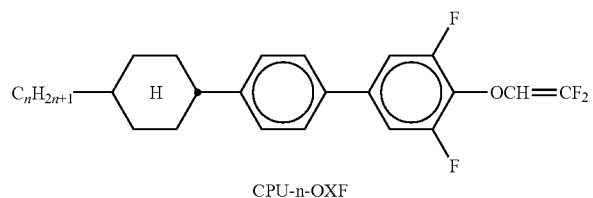
CPU-n-OXF
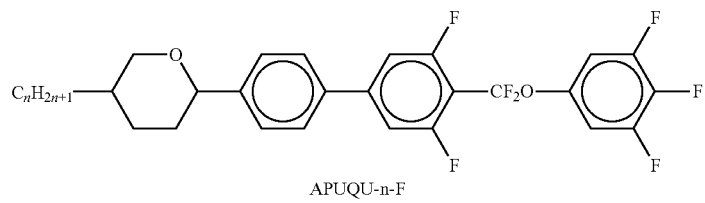
APUQU-n-F
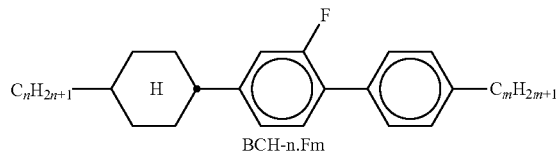
BCH-n.Fm TABLE B-continued
(n = 1-15; (O)$C_nH_{2n+1}$ means $C_nH_{2n+1}$ or $OC_nH_{2n+1}$)
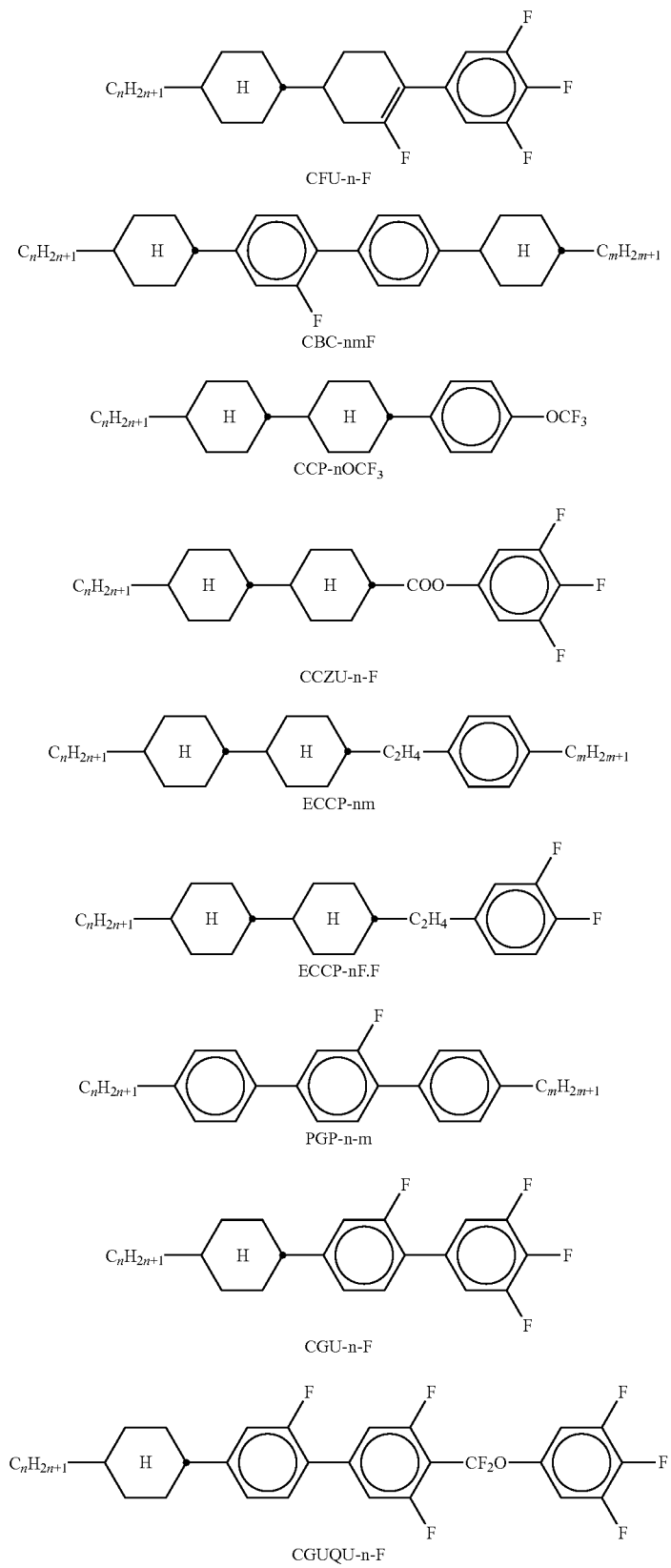

TABLE B-continued
(n = 1-15; (O)$C_nH_{2n+1}$ means $C_nH_{2n+1}$ or $OC_nH_{2n+1}$)
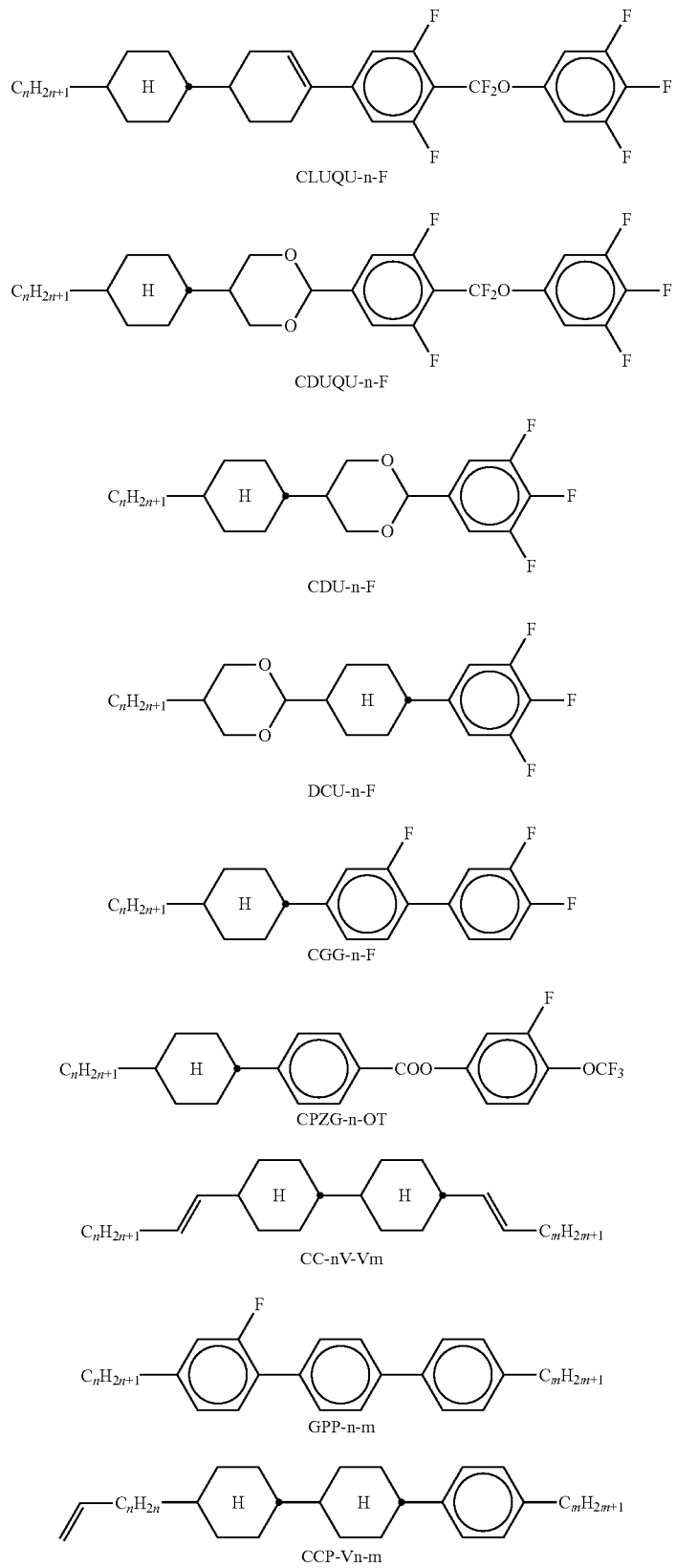

TABLE B-continued
(n = 1-15; $(O)C_nH_{2n+1}$ means $C_nH_{2n+1}$ or $OC_nH_{2n+1}$)
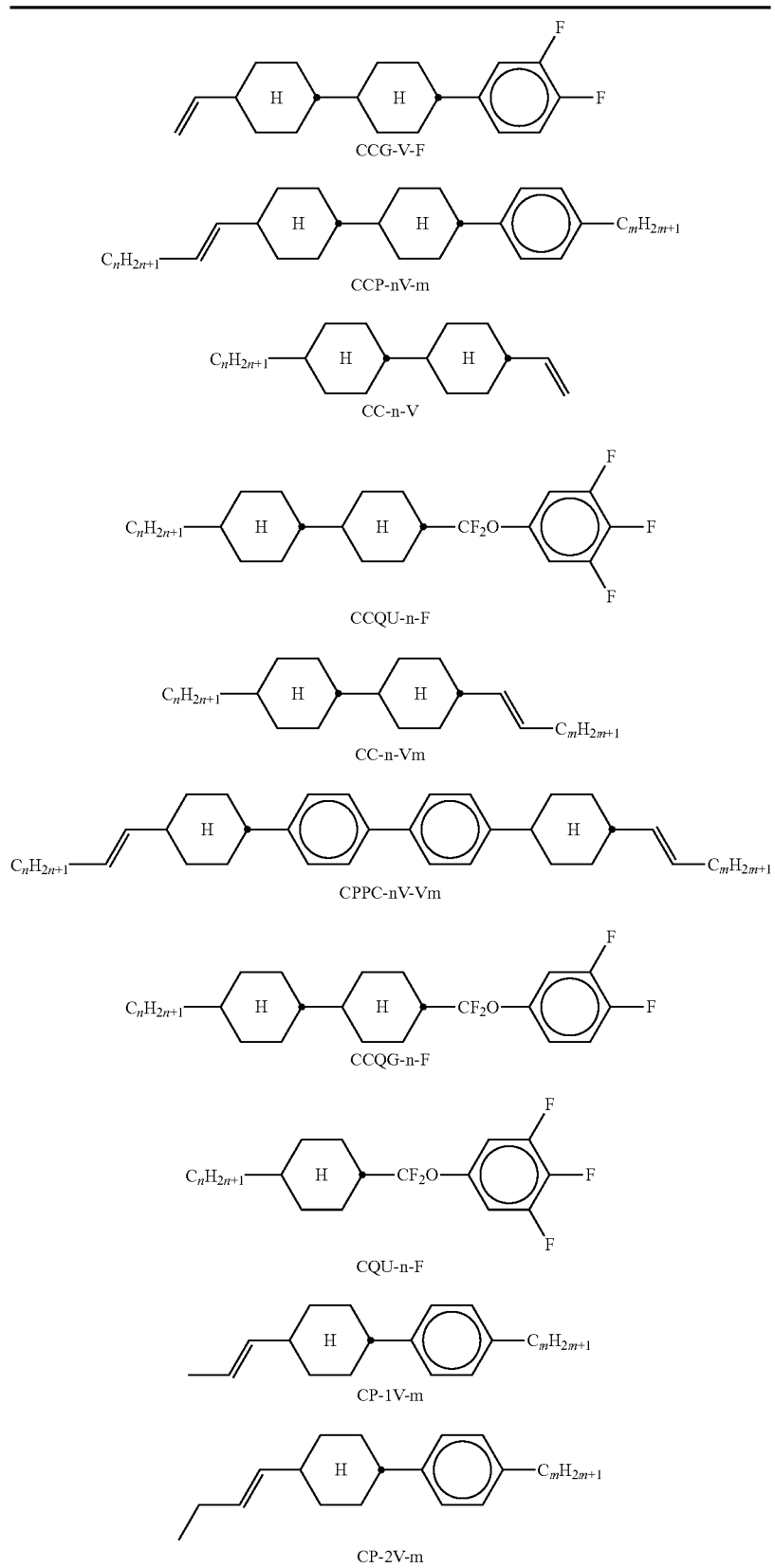

TABLE B-continued
(n = 1-15; (O)$C_nH_{2n+1}$ means $C_nH_{2n+1}$ or $OC_nH_{2n+1}$)
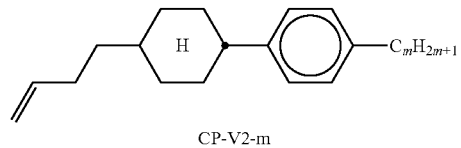
CP-V2-m
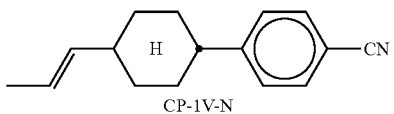
CP-1V-N
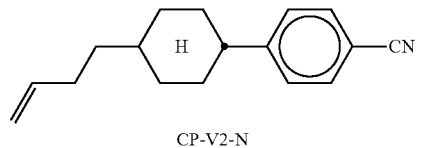
CP-V2-N
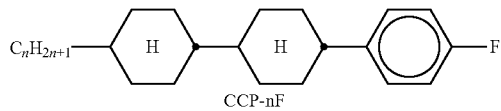
CCP-nF
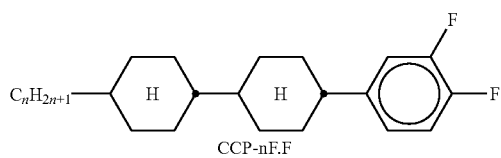
CCP-nF.F
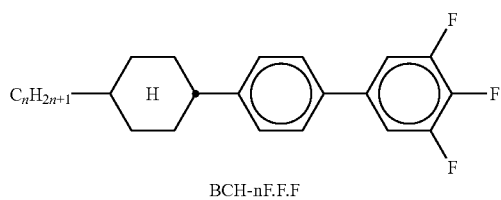
BCH-nF.F.F
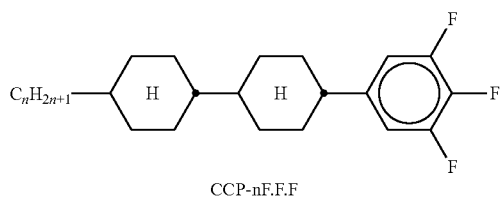
CCP-nF.F.F
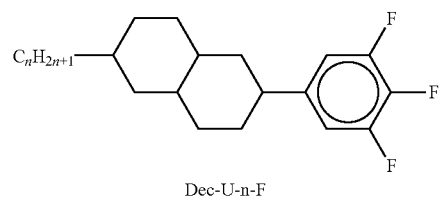
Dec-U-n-F
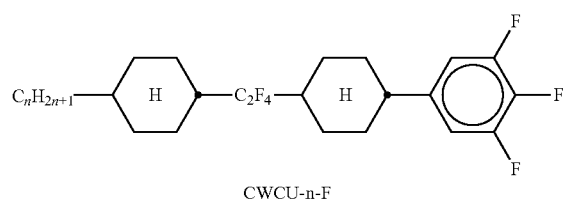
CWCU-n-F TABLE B-continued
(n = 1-15; (O)C$_n$H$_{2n+1}$ means C$_n$H$_{2n+1}$ or OC$_n$H$_{2n+1}$)
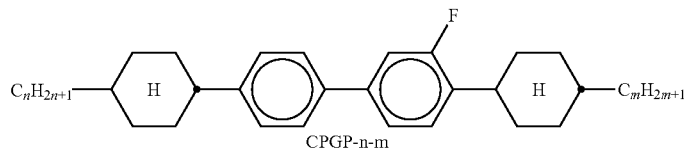
CPGP-n-m
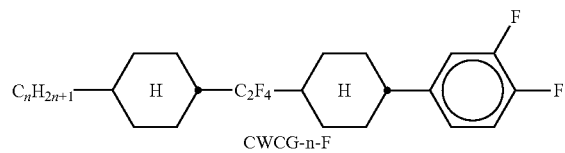
CWCG-n-F
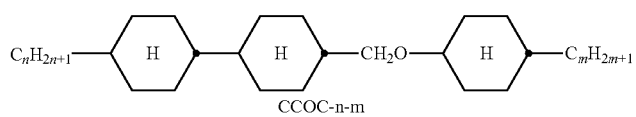
CCOC-n-m
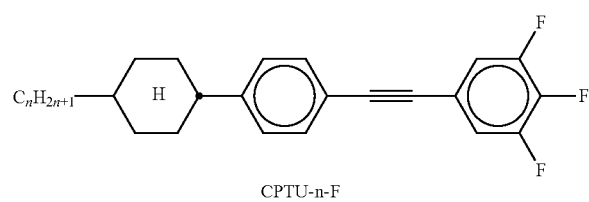
CPTU-n-F
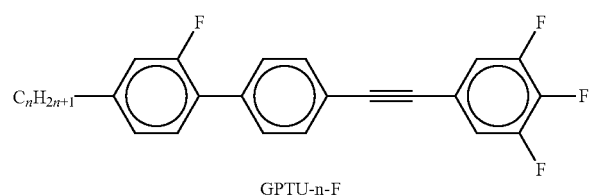
GPTU-n-F
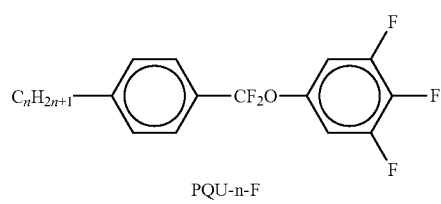
PQU-n-F
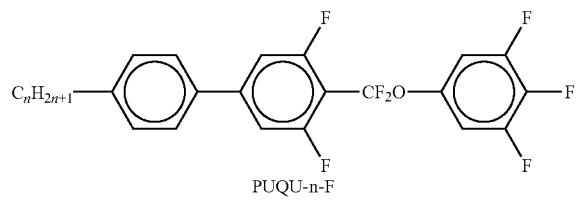
PUQU-n-F
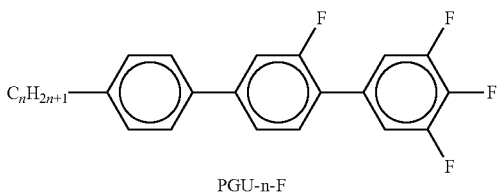
PGU-n-F
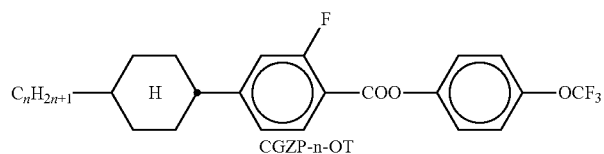
CGZP-n-OT TABLE B-continued
(n = 1-15; (O)C$_n$H$_{2n+1}$ means C$_n$H$_{2n+1}$ or OC$_n$H$_{2n+1}$)
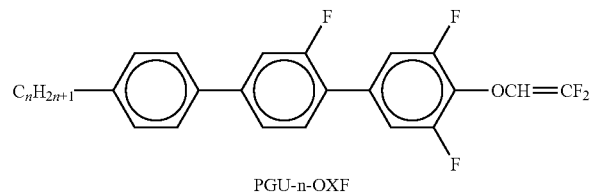
PGU-n-OXF
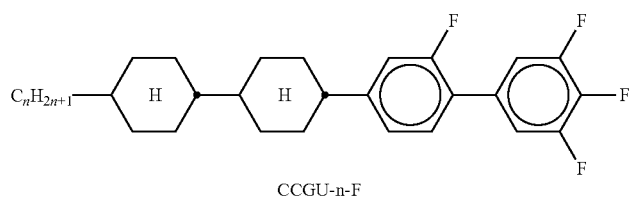
CCGU-n-F
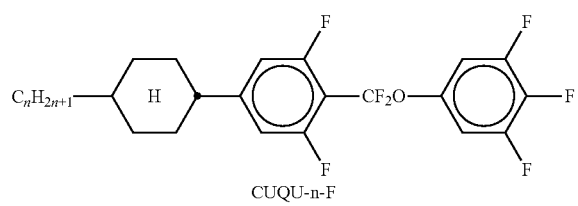
CUQU-n-F
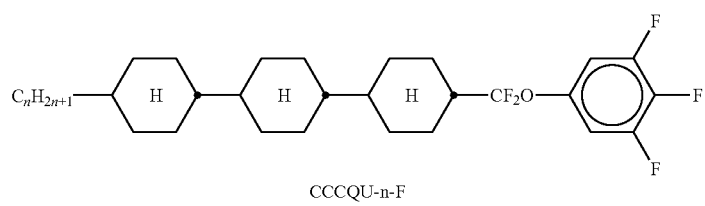
CCCQU-n-F
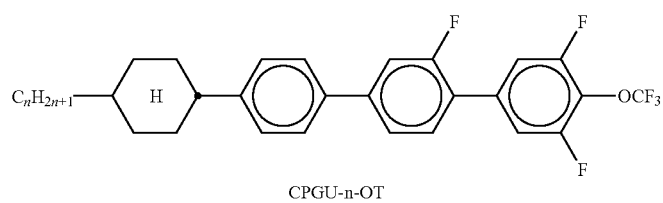
CPGU-n-OT
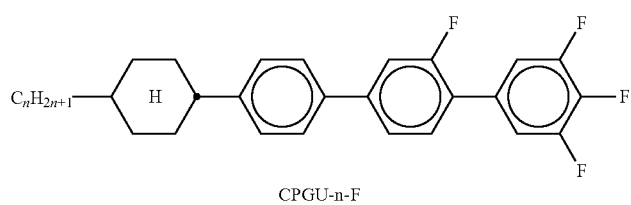
CPGU-n-F
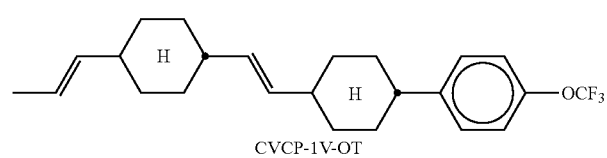
CVCP-1V-OT
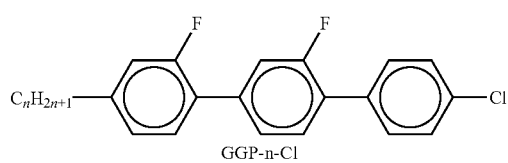
GGP-n-Cl TABLE B-continued
(n = 1-15; (O)$C_nH_{2n+1}$ means $C_nH_{2n+1}$ or $OC_nH_{2n+1}$)
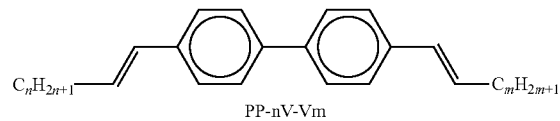
PP-nV-Vm
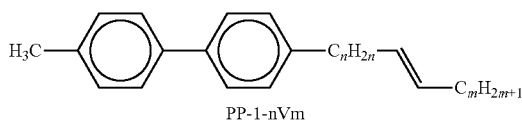
PP-1-nVm
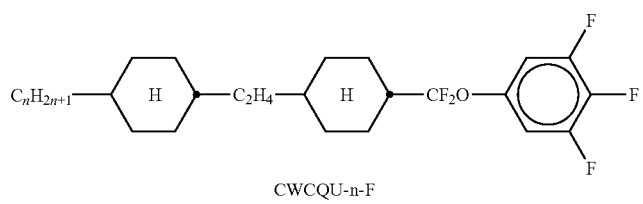
CWCQU-n-F
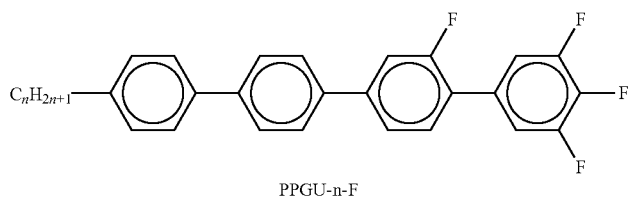
PPGU-n-F
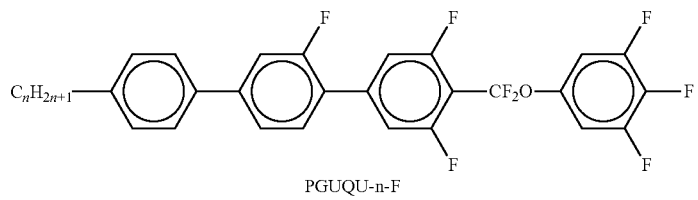
PGUQU-n-F
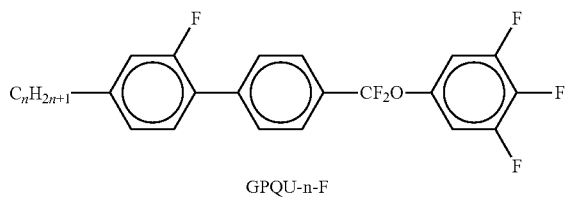
GPQU-n-F
MPP-n-F
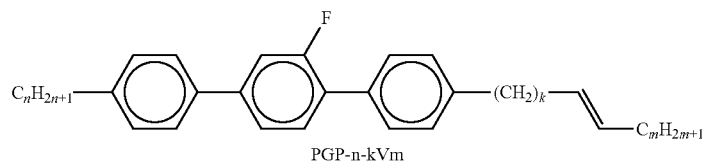
PGP-n-kVm
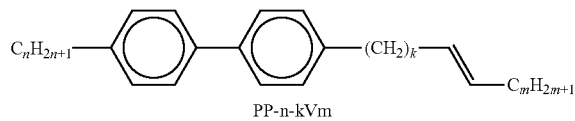
PP-n-kVm TABLE B-continued
(n = 1-15; (O)$C_nH_{2n+1}$ means $C_nH_{2n+1}$ or $OC_nH_{2n+1}$)
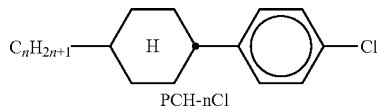
PCH-nCl
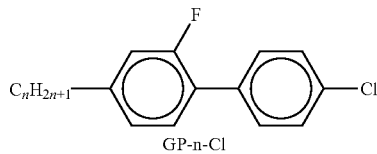
GP-n-Cl
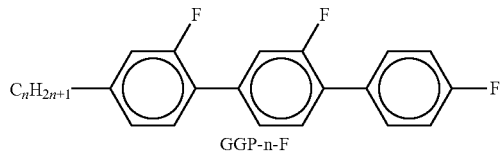
GGP-n-F
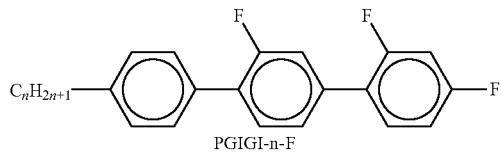
PGIGI-n-F
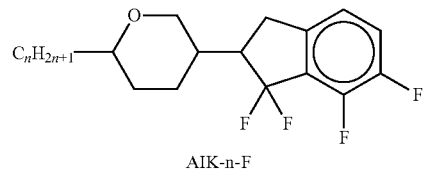
AIK-n-F
BCH-nm
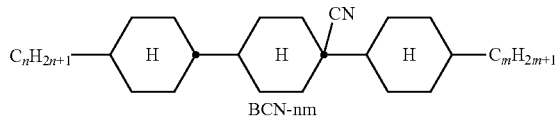
BCN-nm
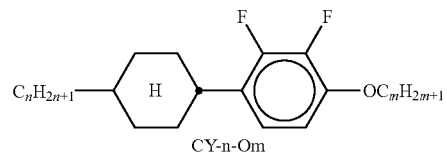
CY-n-Om
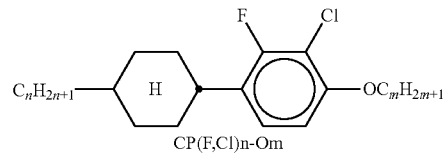
CP(F,Cl)n-Om
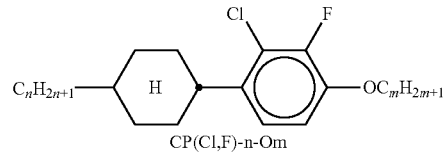
CP(Cl,F)-n-Om TABLE B-continued
(n = 1-15; (O)$C_nH_{2n+1}$ means $C_nH_{2n+1}$ or $OC_nH_{2n+1}$)
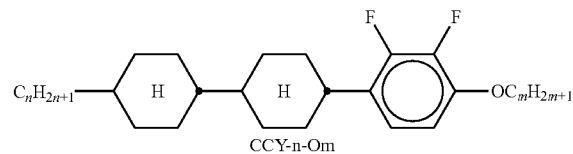
CCY-n-Om
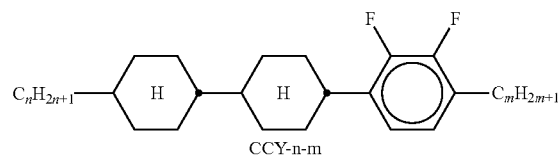
CCY-n-m
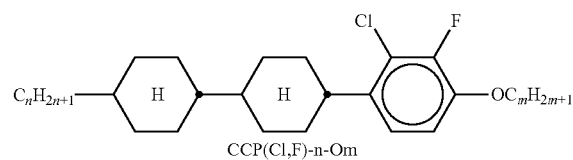
CCP(Cl,F)-n-Om
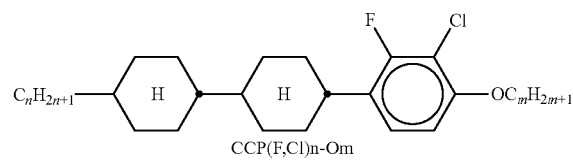
CCP(F,Cl)n-Om
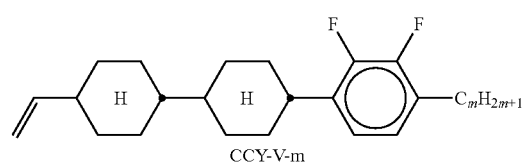
CCY-V-m
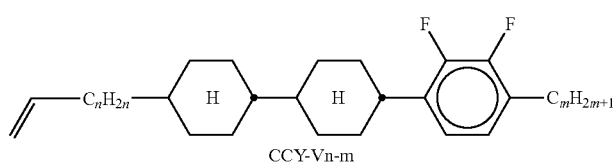
CCY-Vn-m
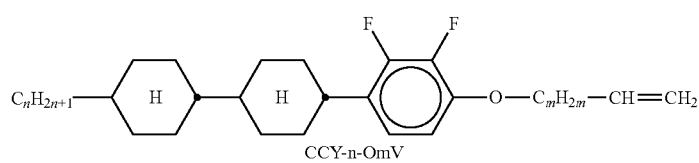
CCY-n-OmV
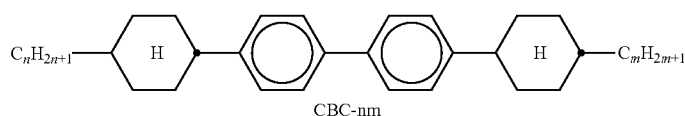
CBC-nm
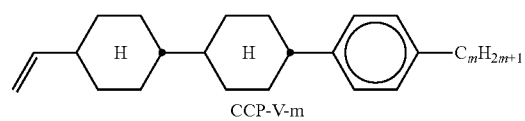
CCP-V-m
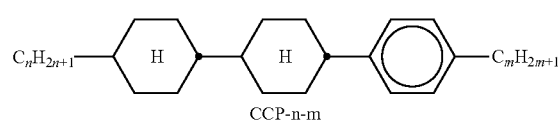
CCP-n-m TABLE B-continued
(n = 1-15; (O)$C_nH_{2n+1}$ means $C_nH_{2n+1}$ or $OC_nH_{2n+1}$)
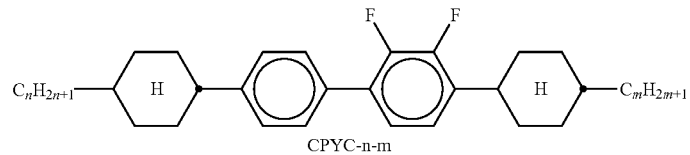
CPYC-n-m
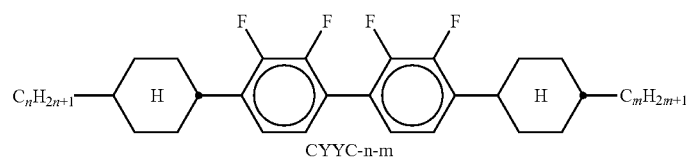
CYYC-n-m
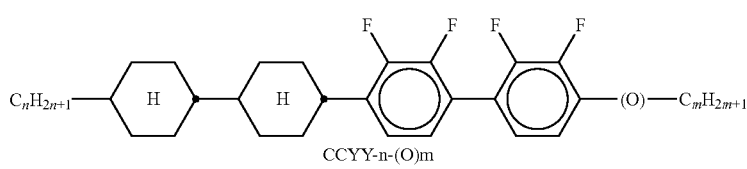
CCYY-n-(O)m
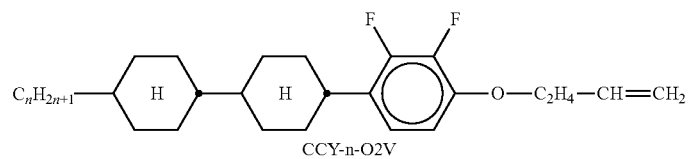
CCY-n-O2V
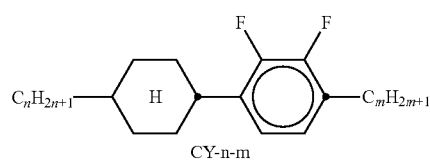
CY-n-m
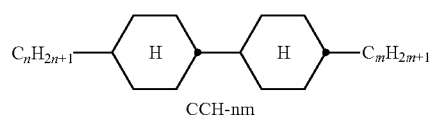
CCH-nm
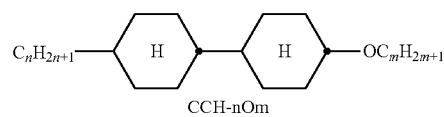
CCH-nOm
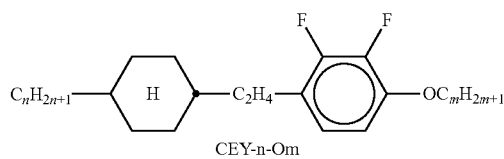
CEY-n-Om
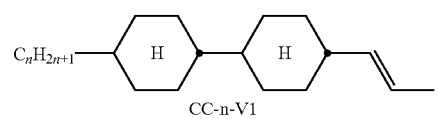
CC-n-V1
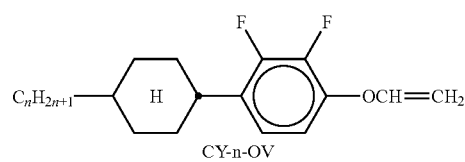
CY-n-OV TABLE B-continued
(n = 1-15; (O)$C_nH_{2n+1}$ means $C_nH_{2n+1}$ or $OC_nH_{2n+1}$)
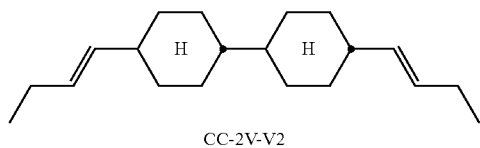
CC-2V-V2
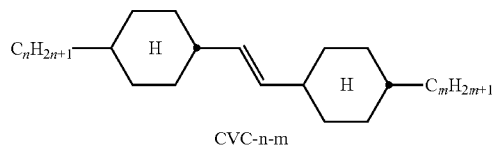
CVC-n-m
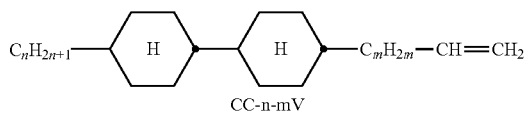
CC-n-mV
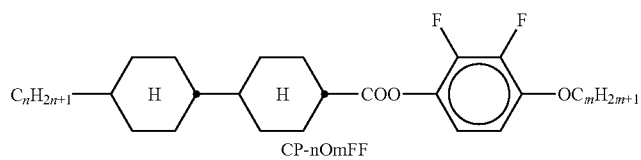
CP-nOmFF
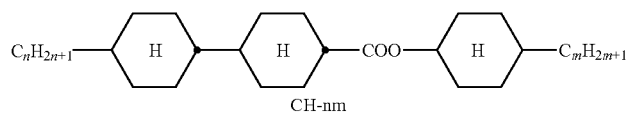
CH-nm
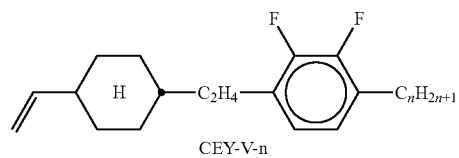
CEY-V-n
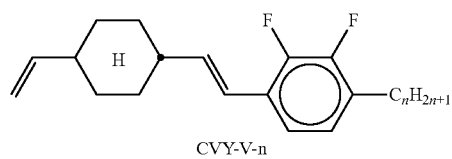
CVY-V-n
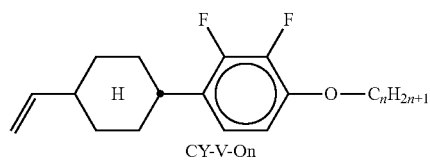
CY-V-On
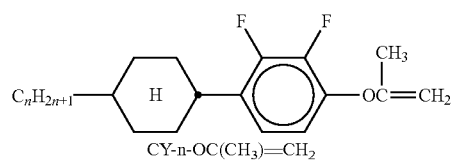
CY-n-OC(CH$_3$)=CH$_2$
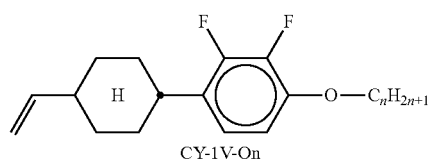
CY-1V-On TABLE B-continued
(n = 1-15; (O)$C_nH_{2n+1}$ means $C_nH_{2n+1}$ or $OC_nH_{2n+1}$)
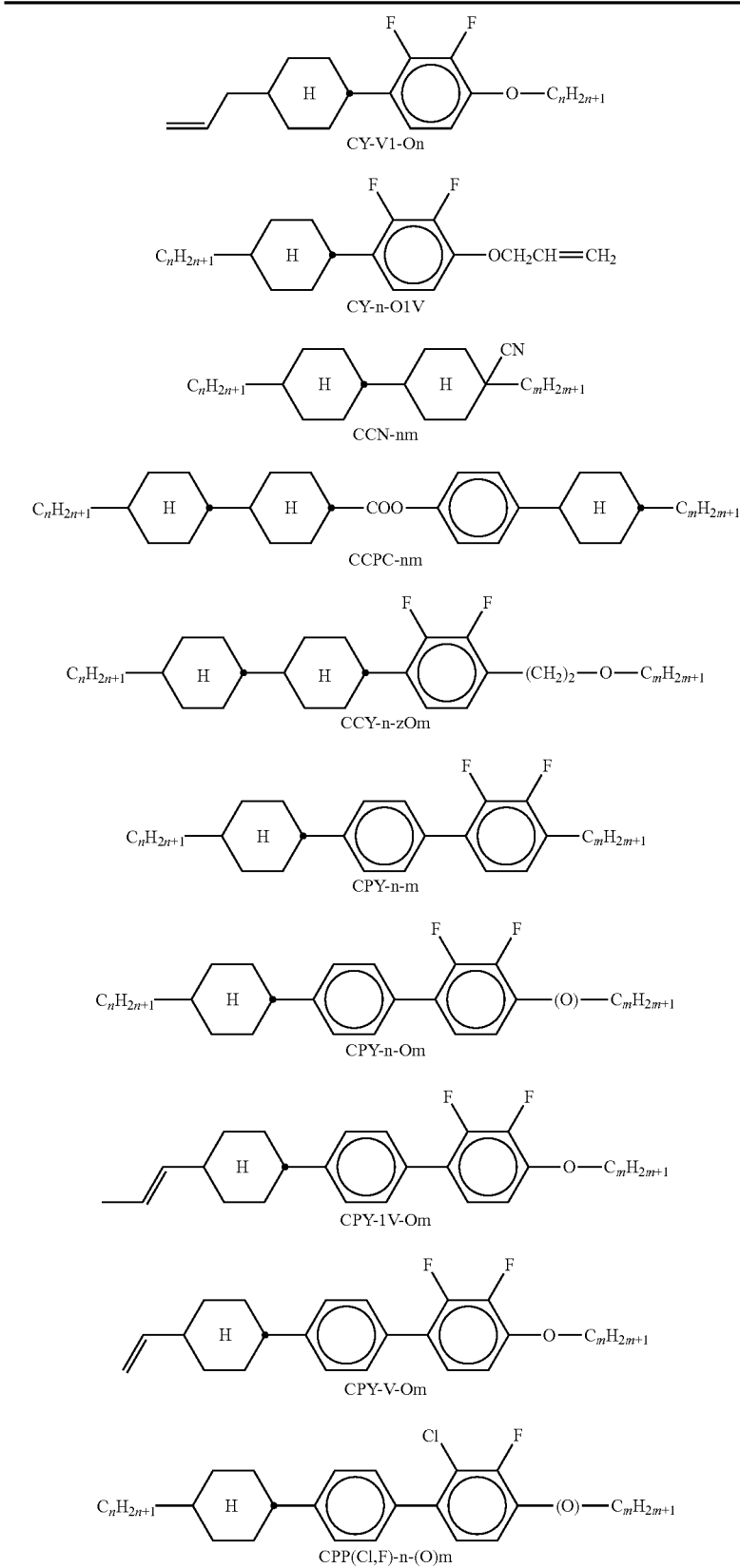

TABLE B-continued
(n = 1-15; (O)$C_nH_{2n+1}$ means $C_nH_{2n+1}$ or $OC_nH_{2n+1}$)
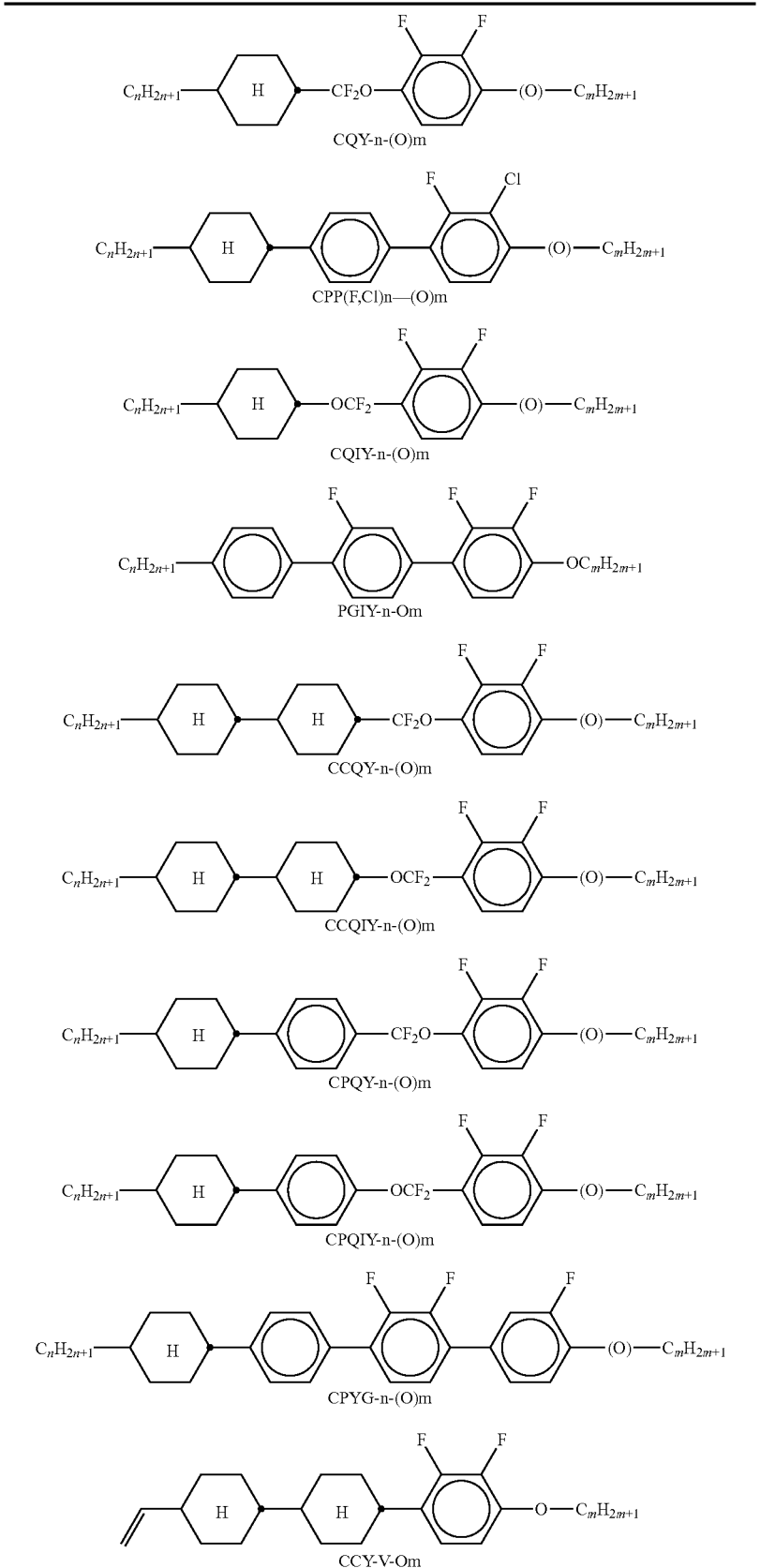

TABLE B-continued
(n = 1-15; (O)$C_nH_{2n+1}$ means $C_nH_{2n+1}$ or $OC_nH_{2n+1}$)
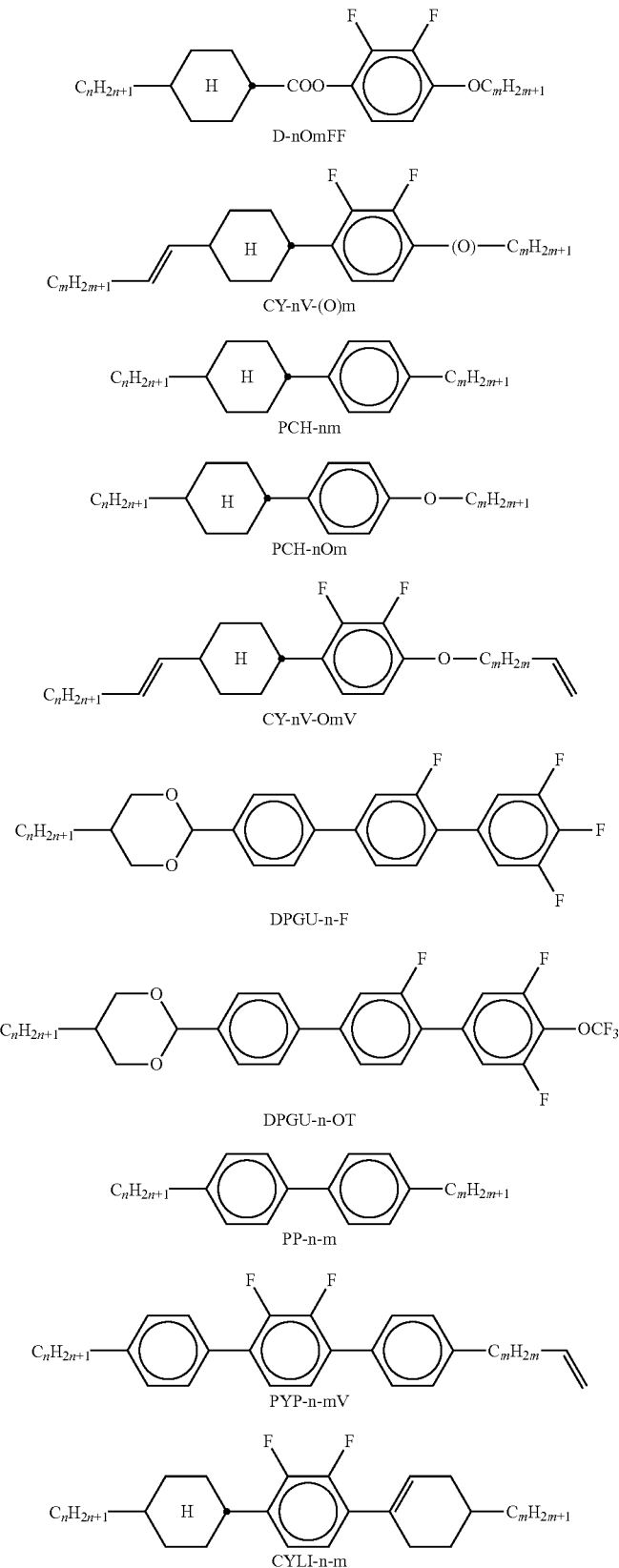

TABLE B-continued
(n = 1-15; (O)$C_nH_{2n+1}$ means $C_nH_{2n+1}$ or $OC_nH_{2n+1}$)
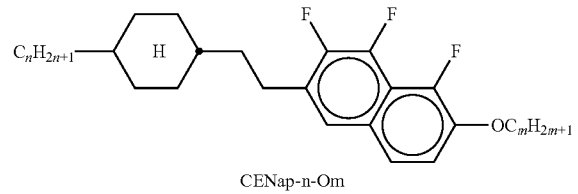
CENap-n-Om
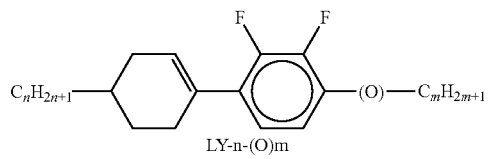
LY-n-(O)m
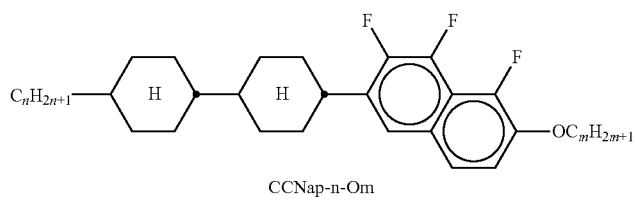
CCNap-n-Om
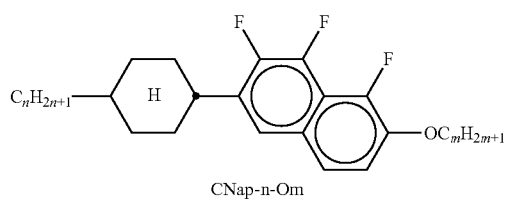
CNap-n-Om
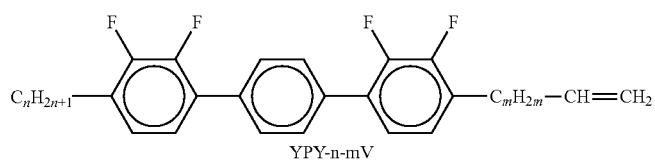
YPY-n-mV
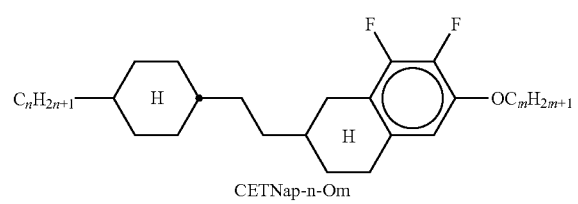
CETNap-n-Om
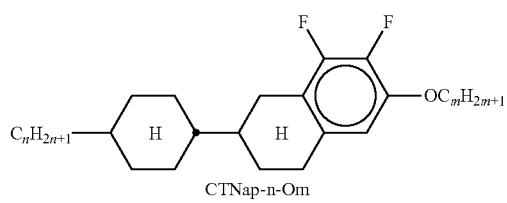
CTNap-n-Om
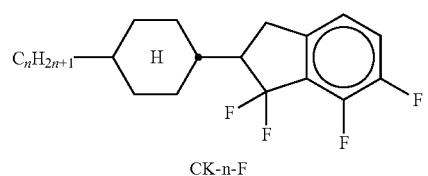
CK-n-F TABLE B-continued
(n = 1-15; $(O)C_nH_{2n+1}$ means $C_nH_{2n+1}$ or $OC_nH_{2n+1}$)
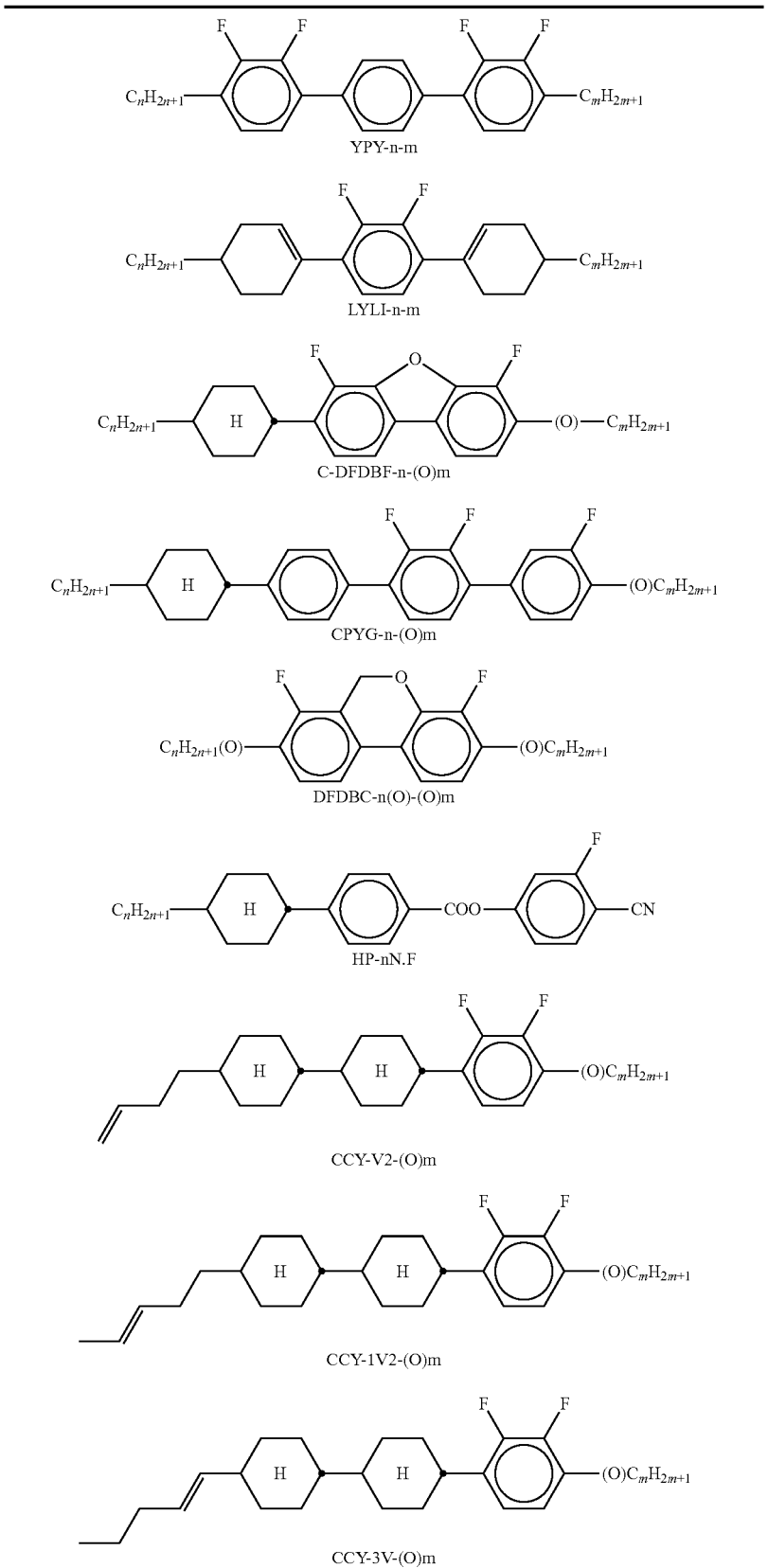

TABLE B-continued
(n = 1-15; (O)$C_nH_{2n+1}$ means $C_nH_{2n+1}$ or $OC_nH_{2n+1}$)
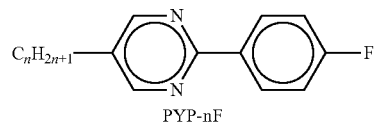
PYP-nF
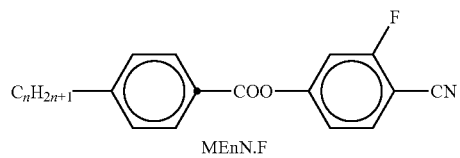
MEnN.F
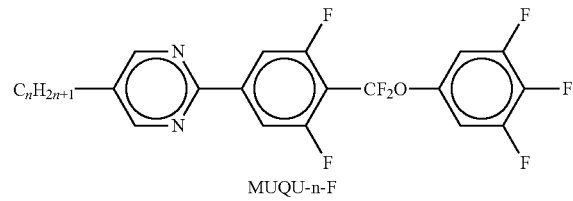
MUQU-n-F
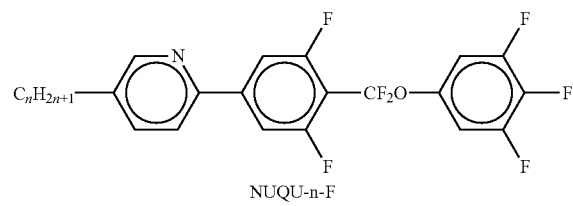
NUQU-n-F
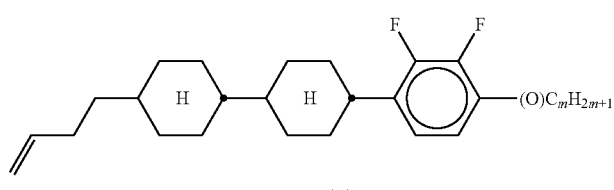
CCY-V2-(O)m
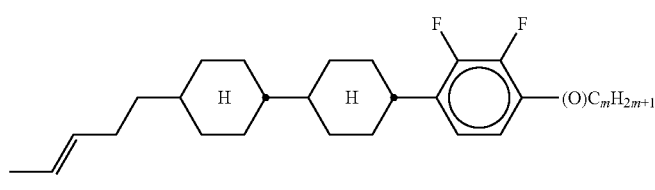
CCY-1V2-(O)m
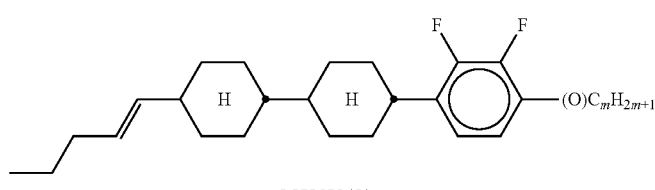
CCY-3V-(O)m
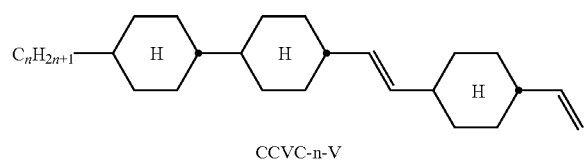
CCVC-n-V TABLE B-continued
(n = 1-15; (O)$C_nH_{2n+1}$ means $C_nH_{2n+1}$ or $OC_nH_{2n+1}$)
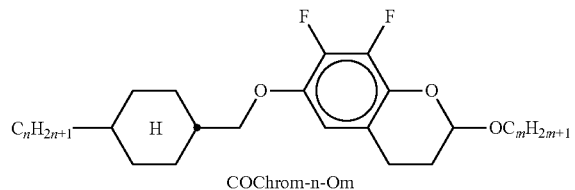
COChrom-n-Om
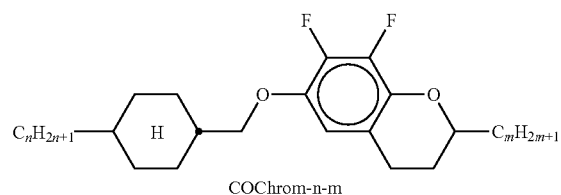
COChrom-n-m
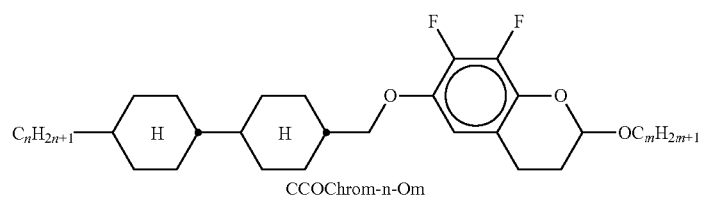
CCOChrom-n-Om
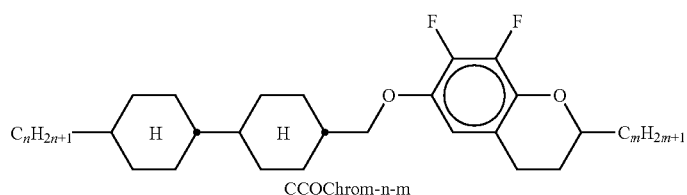
CCOChrom-n-m
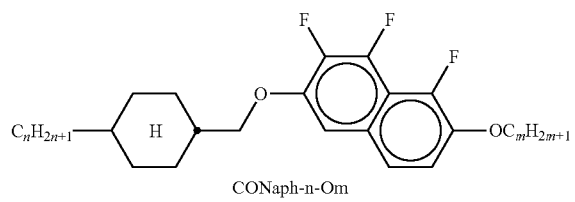
CONaph-n-Om
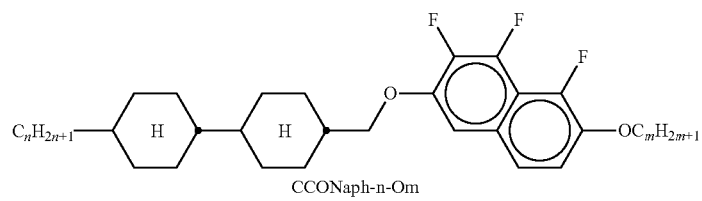
CCONaph-n-Om
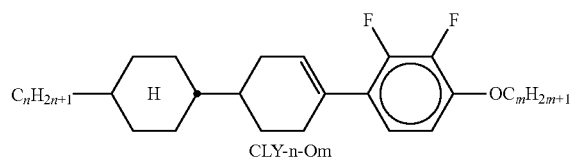
CLY-n-Om
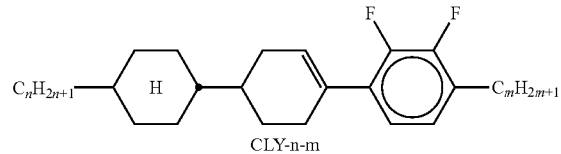
CLY-n-m TABLE B-continued
(n = 1-15; $(O)C_nH_{2n+1}$ means $C_nH_{2n+1}$ or $OC_nH_{2n+1}$)
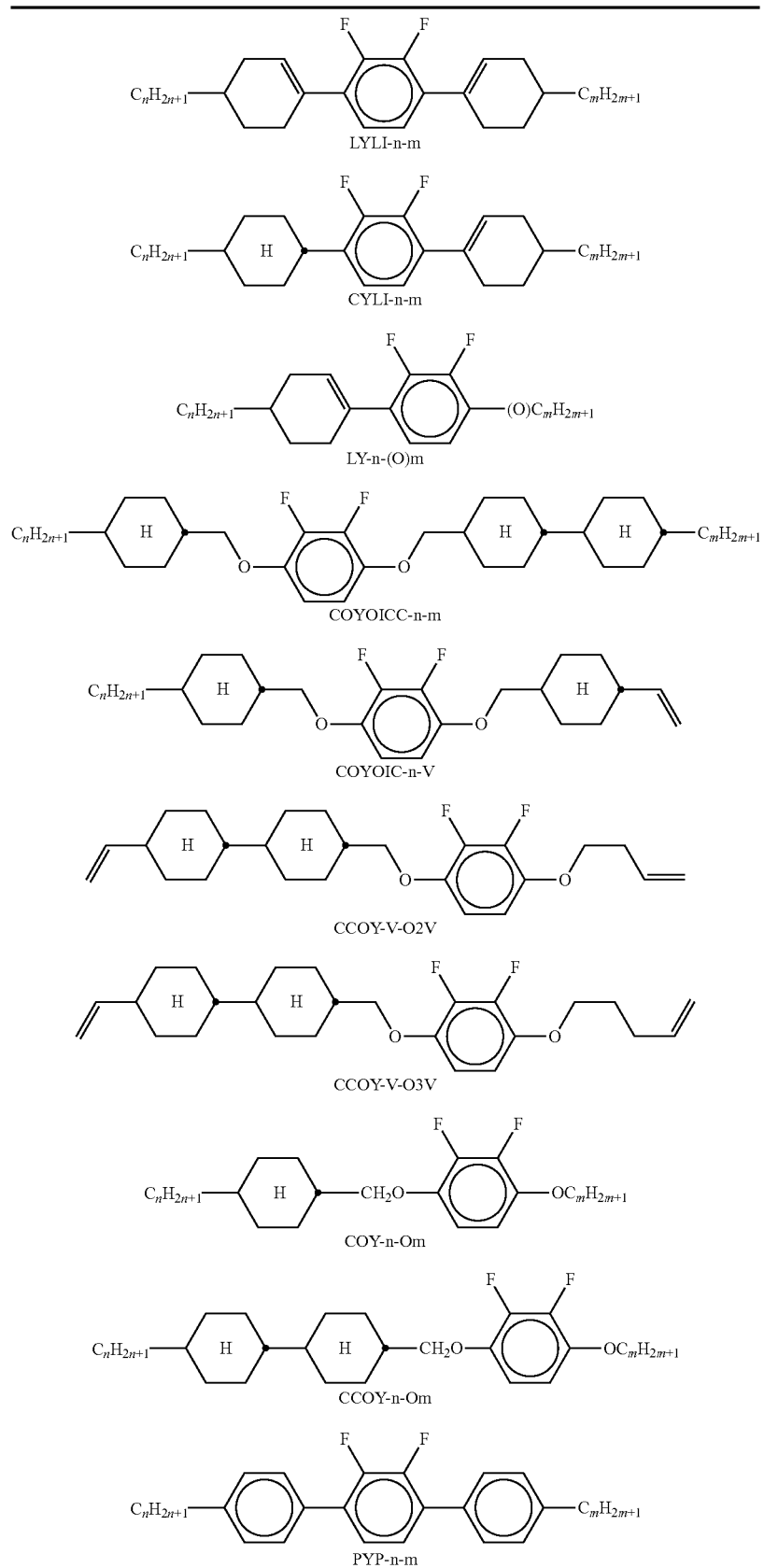

TABLE B-continued
(n = 1-15; (O)$C_nH_{2n+1}$ means $C_nH_{2n+1}$ or $OC_nH_{2n+1}$)
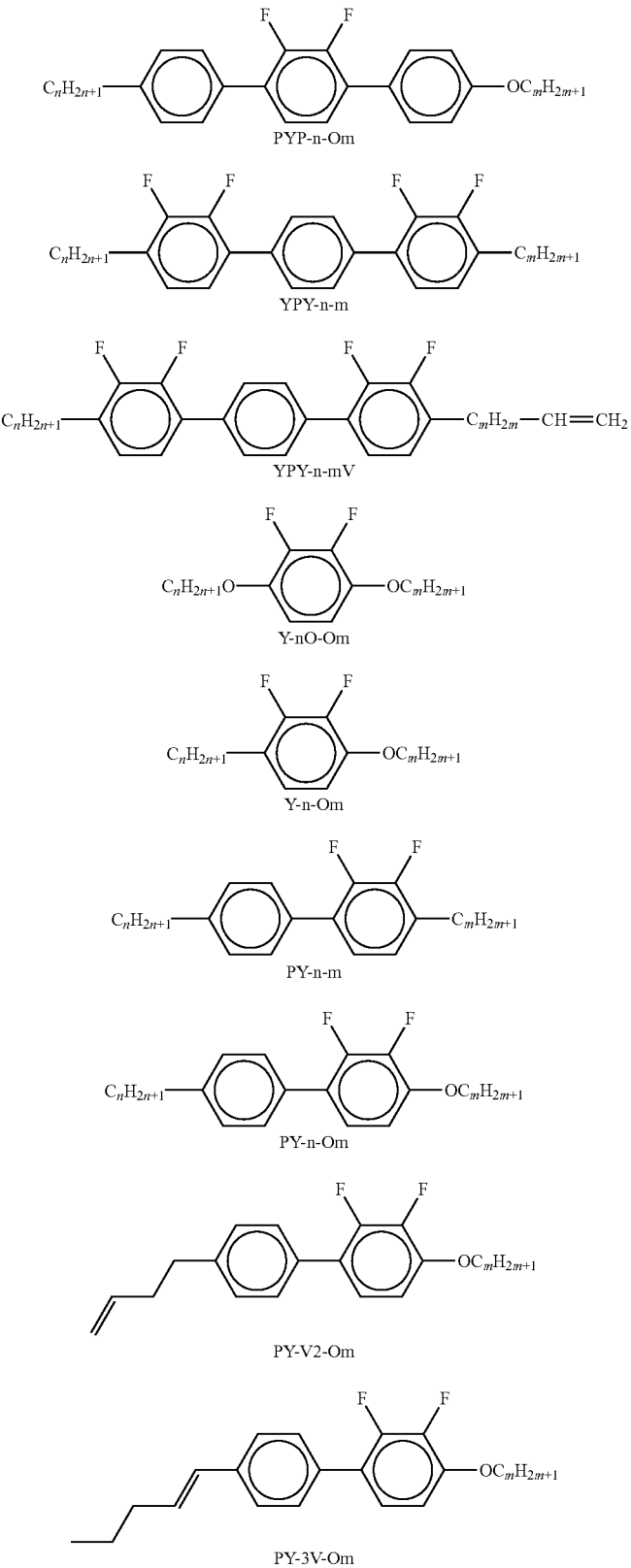

TABLE B-continued
(n = 1-15; (O)C$_n$H$_{2n+1}$ means C$_n$H$_{2n+1}$ or OC$_n$H$_{2n+1}$)
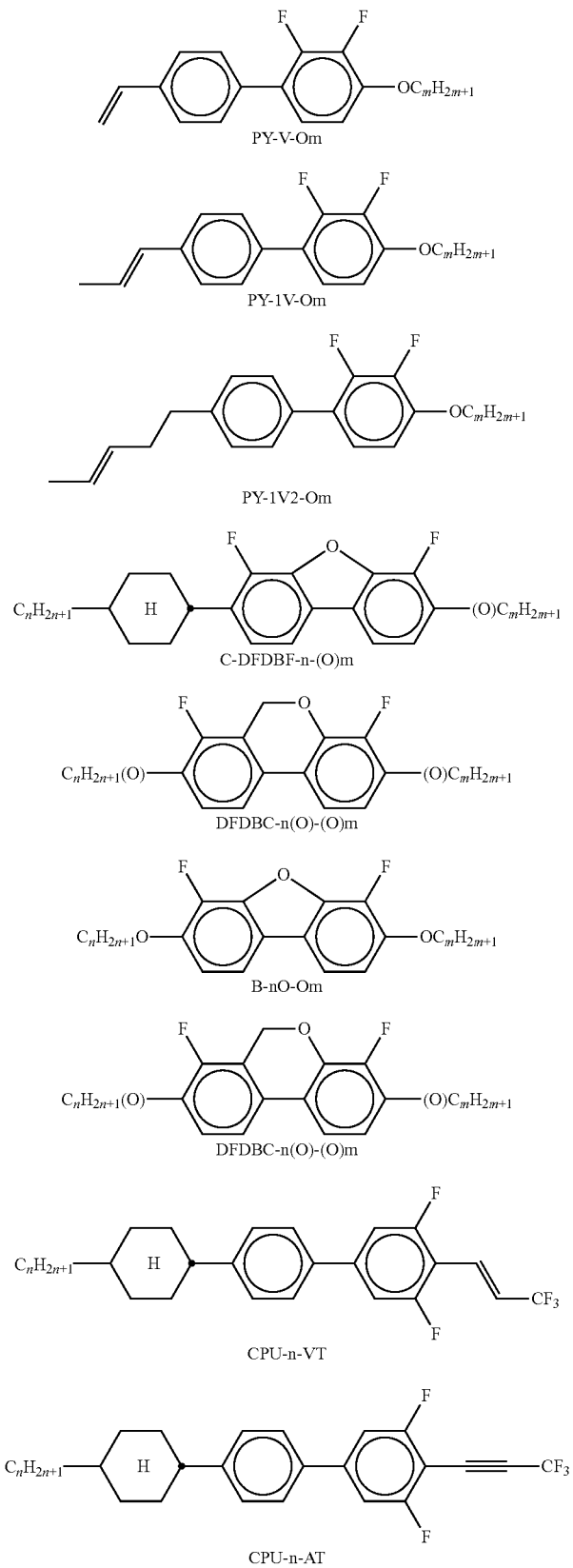

TABLE B-continued
(n = 1-15; (O)$C_nH_{2n+1}$ means $C_nH_{2n+1}$ or $OC_nH_{2n+1}$)
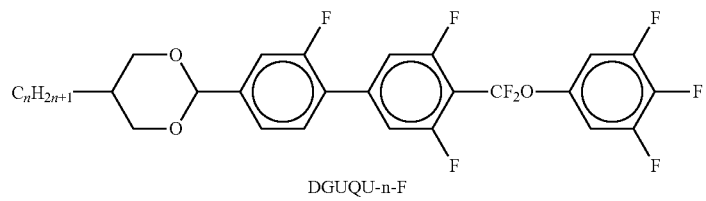
DGUQU-n-F
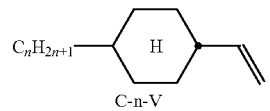
C-n-V
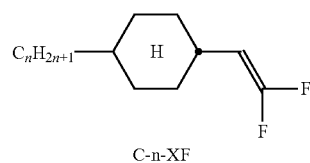
C-n-XF
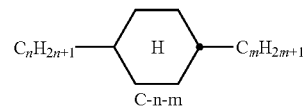
C-n-m
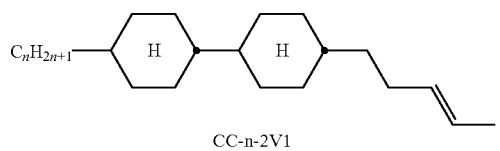
CC-n-2V1
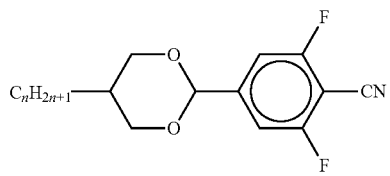
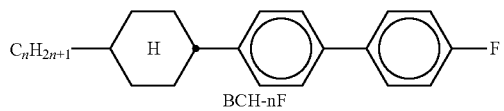
BCH-nF
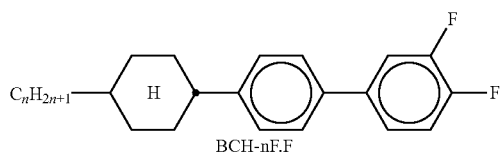
BCH-nF.F
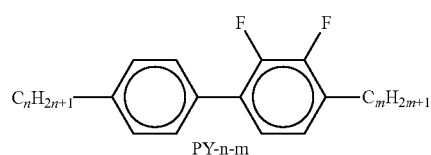
PY-n-m
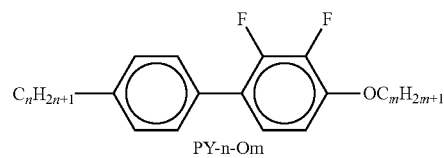
PY-n-Om TABLE B-continued
(n = 1-15; $(O)C_nH_{2n+1}$ means $C_nH_{2n+1}$ or $OC_nH_{2n+1}$)
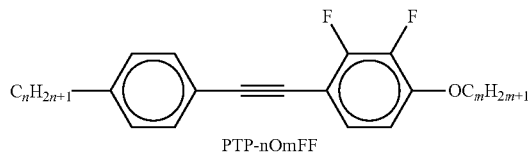
PTP-nOmFF
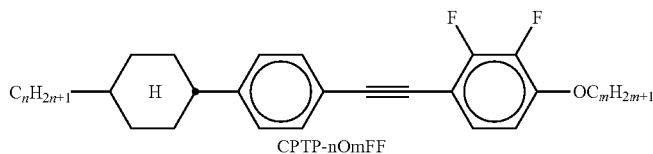
CPTP-nOmFF
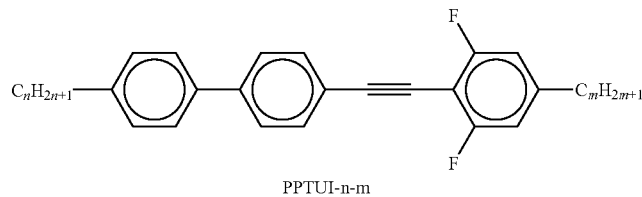
PPTUI-n-m
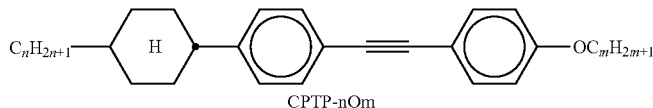
CPTP-nOm
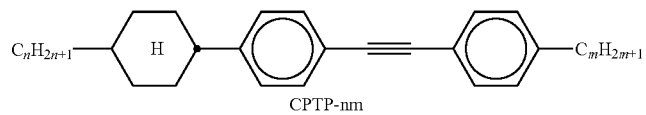
CPTP-nm
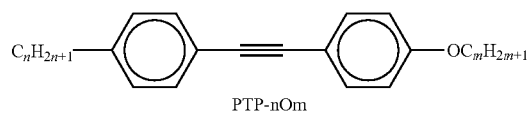
PTP-nOm
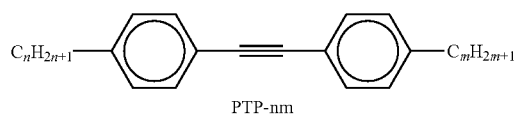
PTP-nm
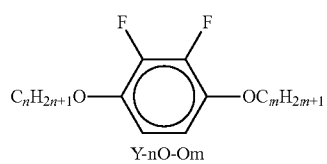
Y-nO-Om
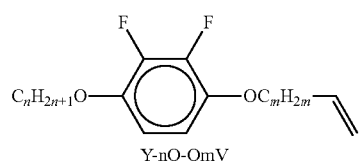
Y-nO-OmV TABLE B-continued
(n = 1-15; (O)$C_nH_{2n+1}$ means $C_nH_{2n+1}$ or $OC_nH_{2n+1}$)
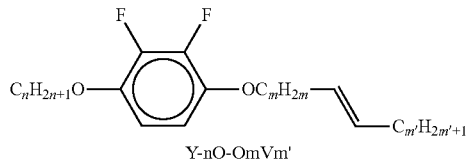
Y-nO-OmVm'
Particular preference is given to liquid-crystalline mixtures which comprise at least one, two, three, four or more compounds from Table B besides one or more compounds of the formula I.
TABLE C
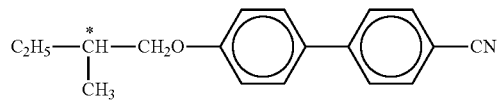
C 15
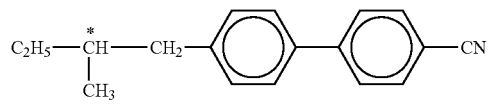
CB 15
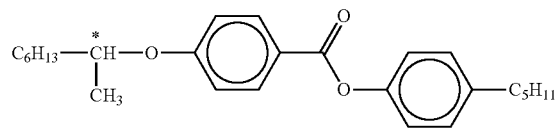
CM 21
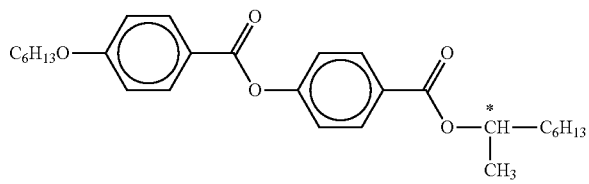
R/S-811
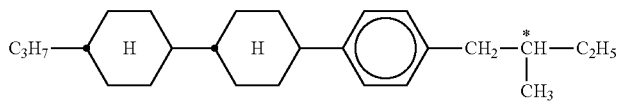
CM 44
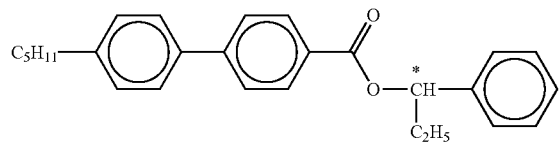
CM 45

TABLE C-continued
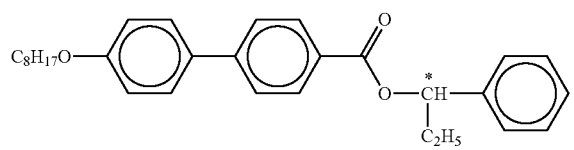
CM 47
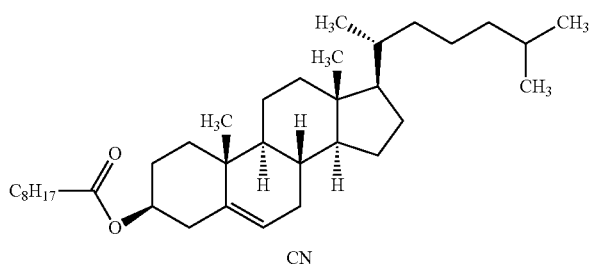
CN
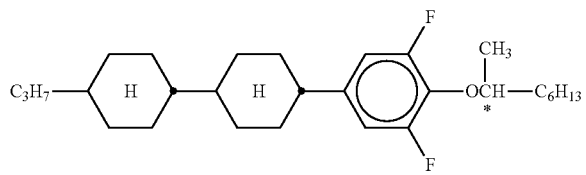
R/S-2011
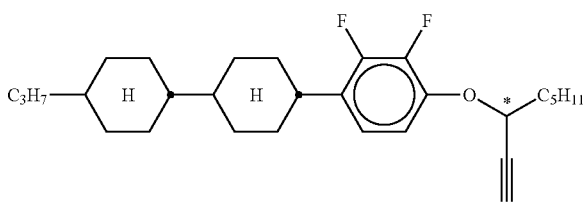
R/S-3011
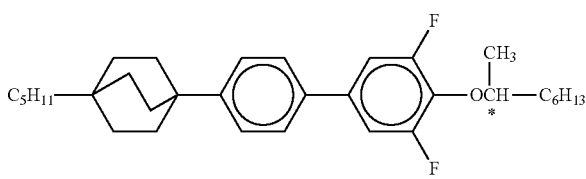
R/S-4011
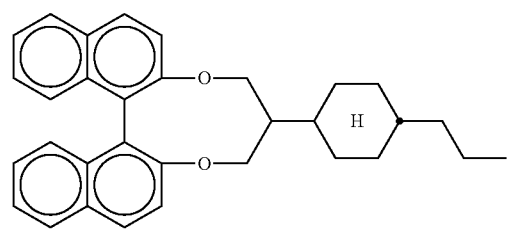
R/S-5011

TABLE C-continued
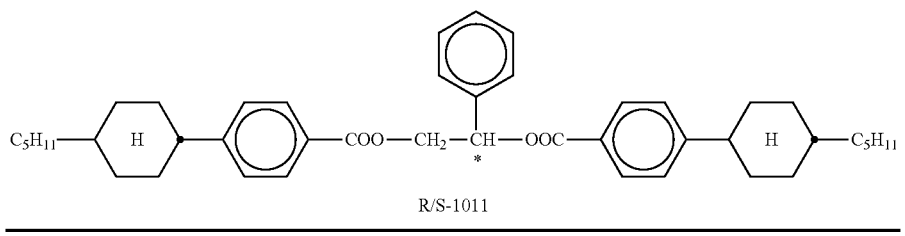
R/S-1011
Table C indicates possible dopants, which are generally added to the liquid-crystalline mixtures. The mixtures preferably comprise 0-10% by weight, in particular 0.01-5% by weight and particularly preferably 0.01-3% by weight, of dopants.
TABLE D
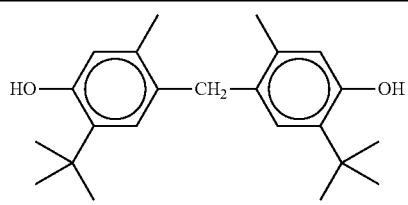
STAB-1
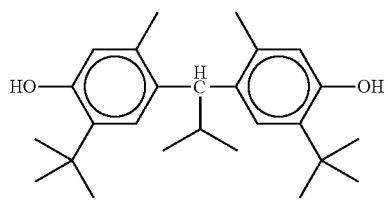
STAB-2
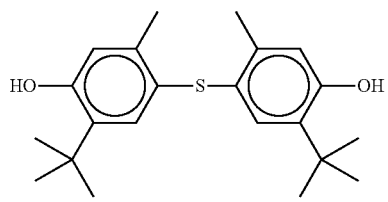
STAB-3
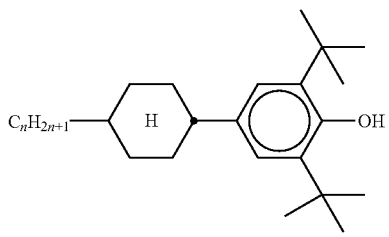
STAB-4
n = 1, 2, 3, 4, 5, 6 or 7
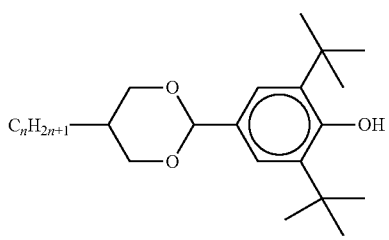
STAB-5
n = 1, 2, 3, 4, 5, 6 or 7

TABLE D-continued
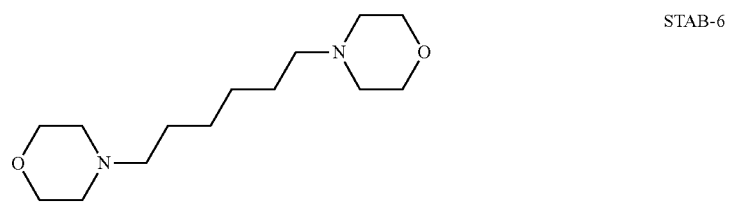
STAB-6
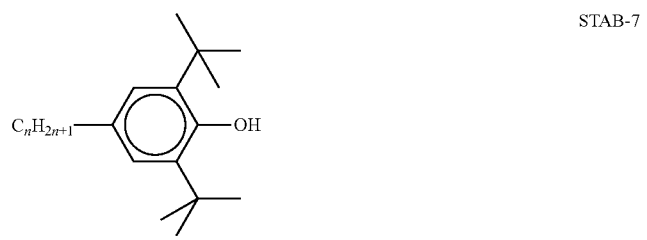
STAB-7
n = 1, 2, 3, 4, 5, 6 or 7
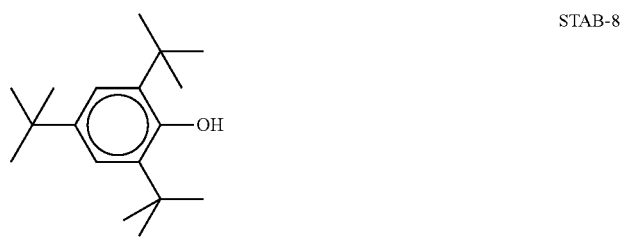
STAB-8
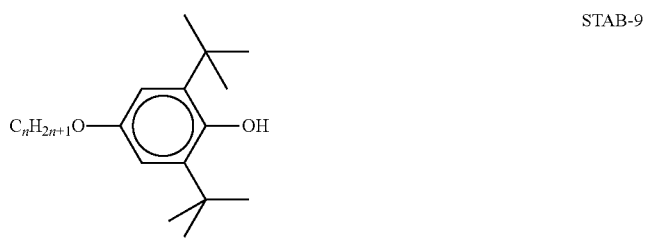
STAB-9
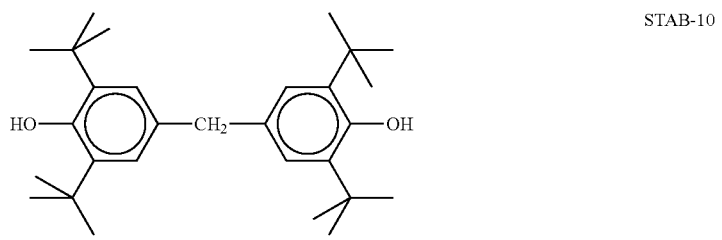
STAB-10
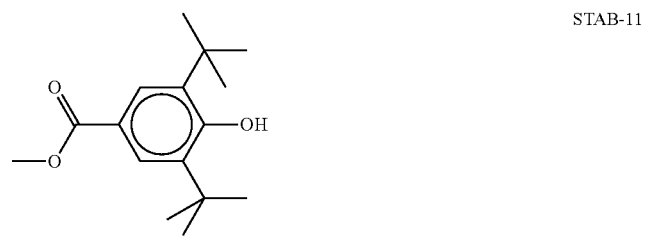
STAB-11

TABLE D-continued
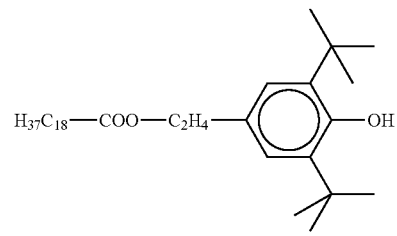
STAB-12
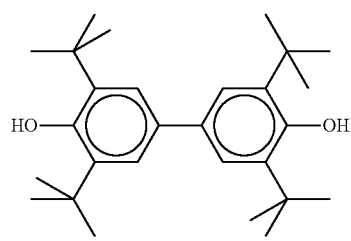
STAB-13
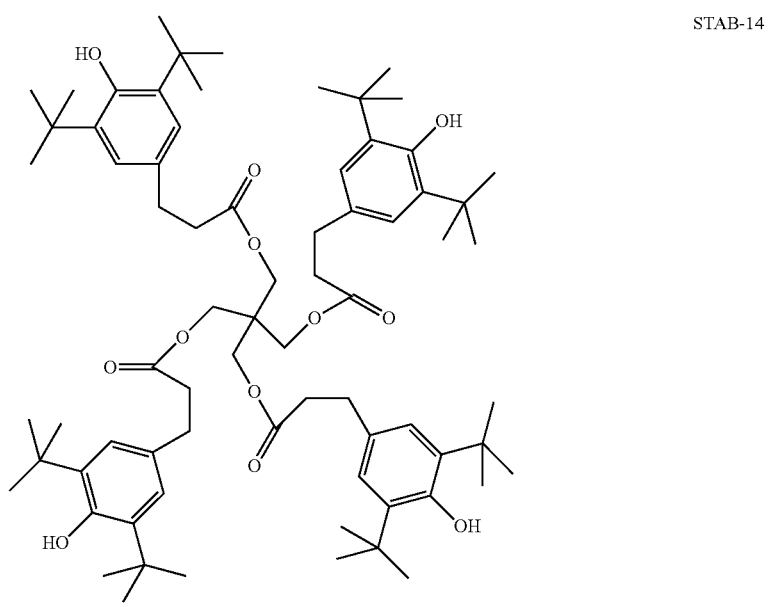
STAB-14
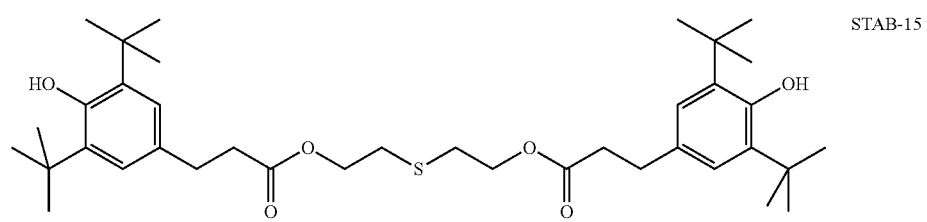
STAB-15

TABLE D-continued
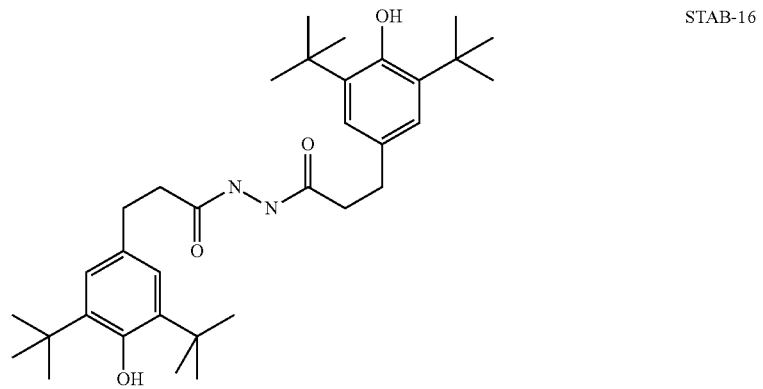
STAB-16
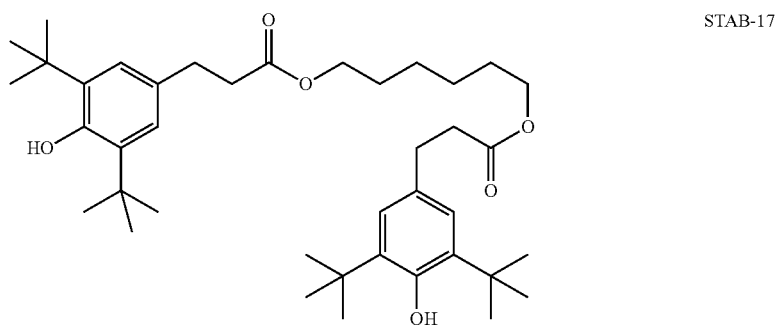
STAB-17
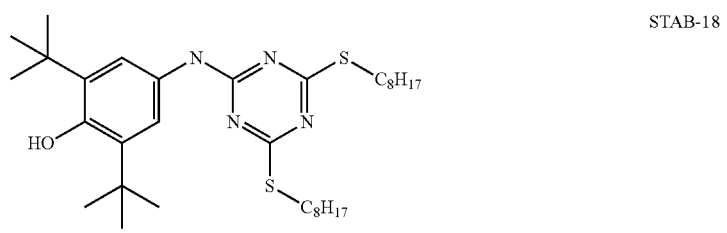
STAB-18
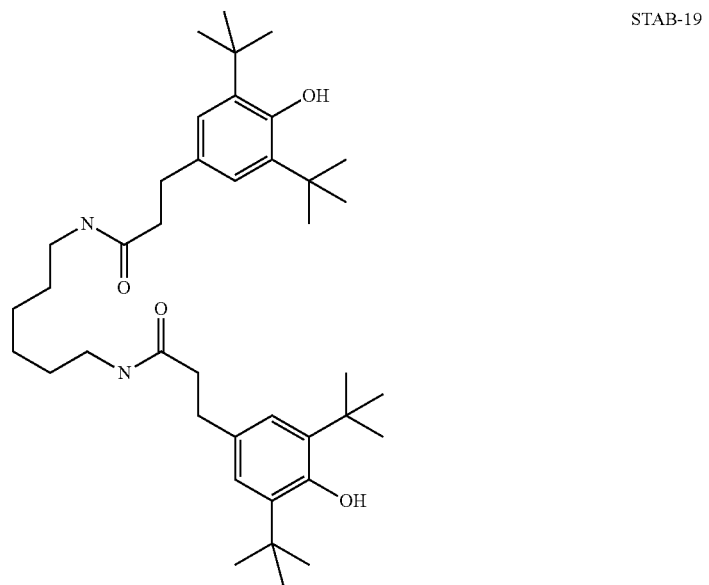
STAB-19

TABLE D-continued
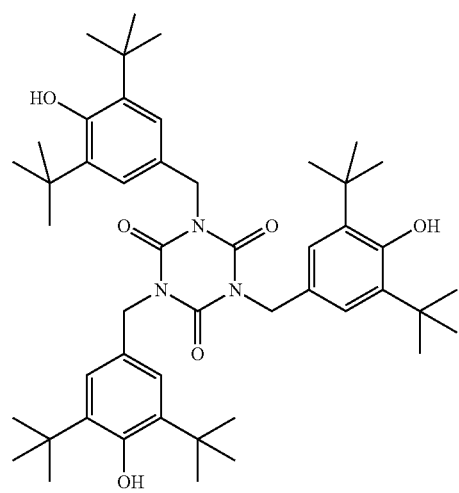 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
STAB-20
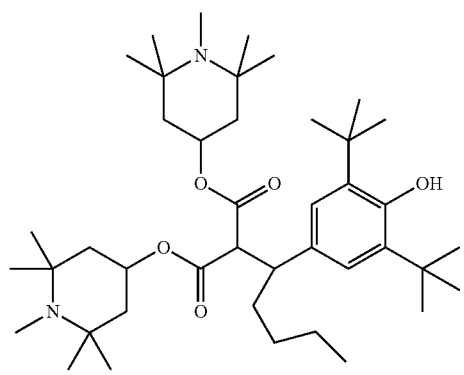 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
STAB-21
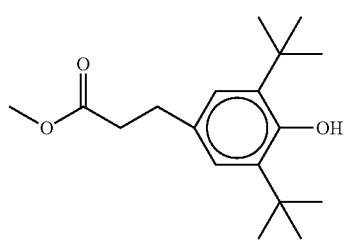
STAB-22
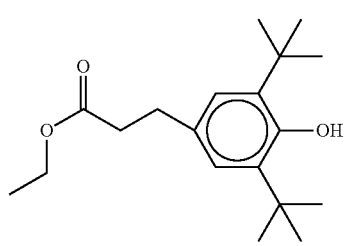
STAB-23
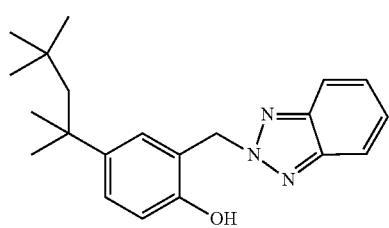 [SMILES: CC(C)(C)CC(C)(C)c1ccc(O)c(Cn2nc3ccccc3n2)c1]
STAB-24

TABLE D-continued
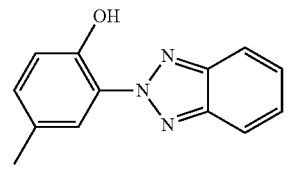 [SMILES: Cc1ccc(O)c(-n2nc3ccccc3n2)c1]   STAB-25
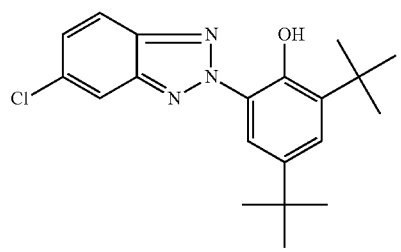 [SMILES: CC(C)(C)c1cc(-n2nc3ccc(Cl)cc3n2)c(O)c(C(C)(C)C)c1]   STAB-26
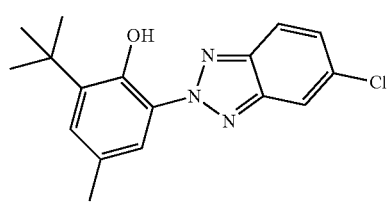 [SMILES: Cc1cc(-n2nc3ccc(Cl)cc3n2)c(O)c(C(C)(C)C)c1]   STAB-27
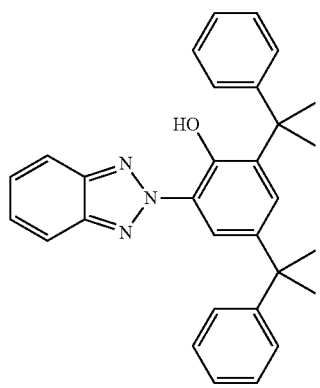 [SMILES: CC(C)(c1ccccc1)c1cc(-n2nc3ccccc3n2)c(O)c(C(C)(C)c2ccccc2)c1]   STAB-28
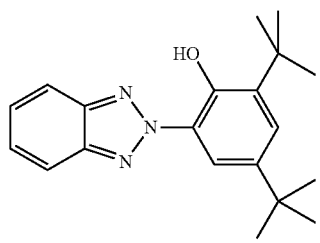 [SMILES: CC(C)(C)c1cc(-n2nc3ccccc3n2)c(O)c(C(C)(C)C)c1]   STAB-29
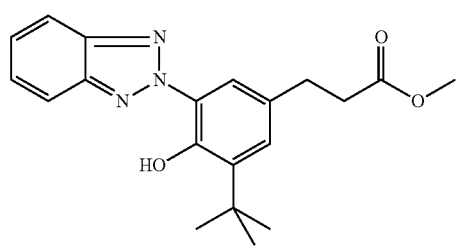 [SMILES: COC(=O)CCc1cc(-n2nc3ccccc3n2)c(O)c(C(C)(C)C)c1]   STAB-30

TABLE D-continued
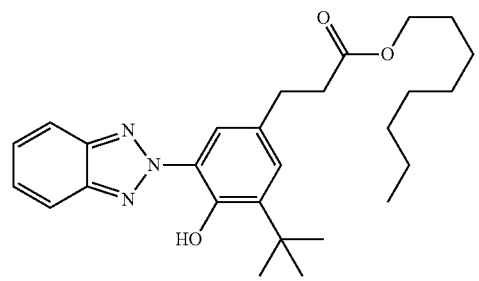 [SMILES: CCCCCCCCOC(=O)CCc1cc(-n2nc3ccccc3n2)c(O)c(C(C)(C)C)c1]
STAB-31
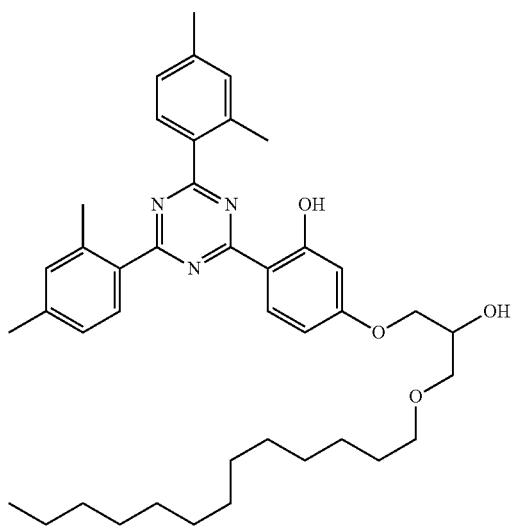 [SMILES: CCCCCCCCCCCCCOCC(O)COc1ccc(-c2nc(-c3ccc(C)cc3C)nc(-c3ccc(C)cc3C)n2)c(O)c1]
STAB-32
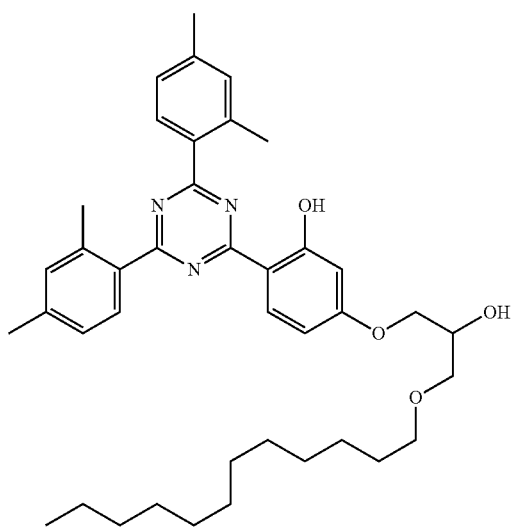 [SMILES: CCCCCCCCCCCCOCC(O)COc1ccc(-c2nc(-c3ccc(C)cc3C)nc(-c3ccc(C)cc3C)n2)c(O)c1]
STAB-33

TABLE D-continued
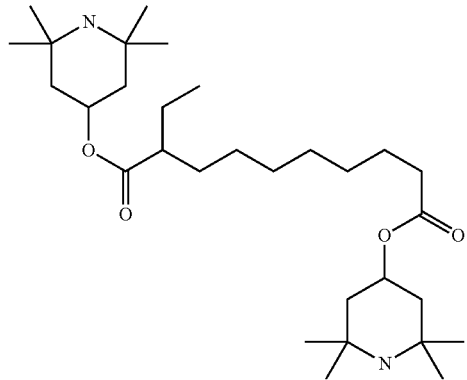
STAB-34
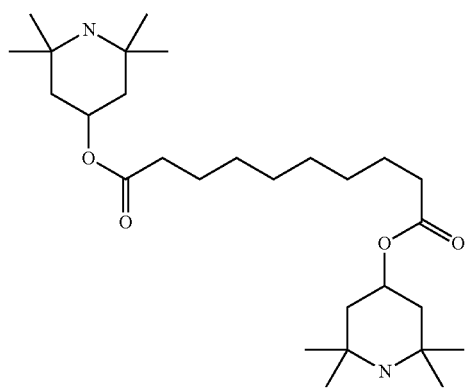
STAB-35
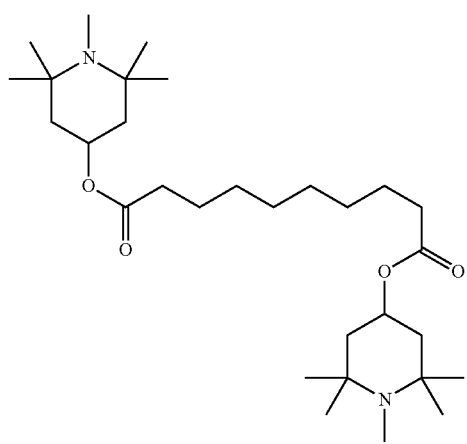
STAB-36

TABLE D-continued
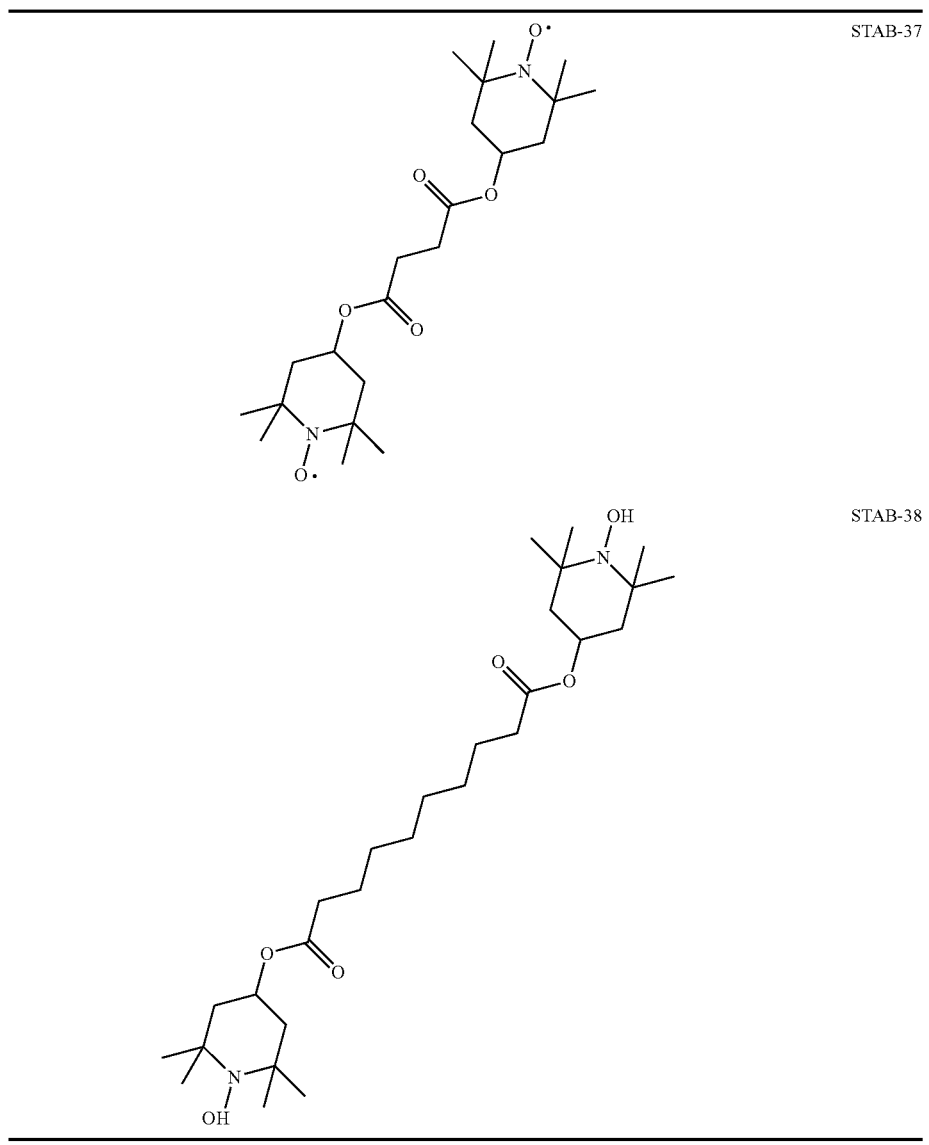
Stabilisers, which can be added, for example, to the liquid-crystalline mixtures in amounts of 0-10% by weight, are shown below.
(n=1-12)
Suitable polymerisable compounds (reactive mesogens) for use in the mixtures according to the invention, preferably in PSA and PS-VA applications or PS-IPS/FFS applications, are shown below in Table E:
TABLE E
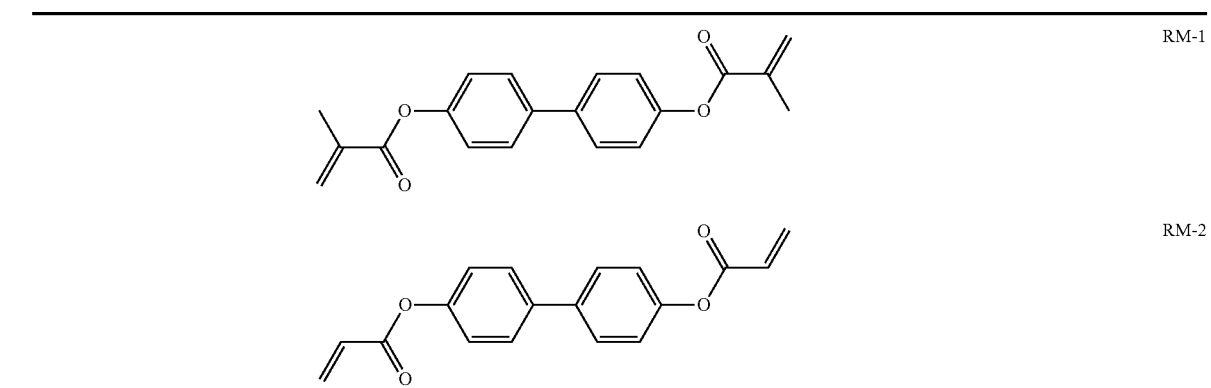

TABLE E-continued
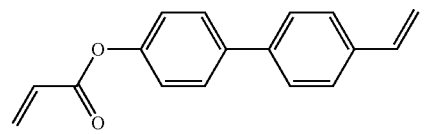 [SMILES: C=CC(=O)Oc1ccc(-c2ccc(C=C)cc2)cc1] RM-3
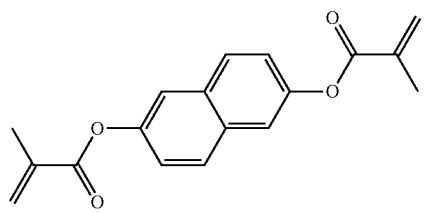 [SMILES: C=C(C)C(=O)Oc1ccc2cc(OC(=O)C(=C)C)ccc2c1] RM-4
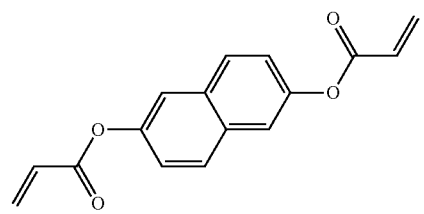 [SMILES: C=CC(=O)Oc1ccc2cc(OC(=O)C=C)ccc2c1] RM-5
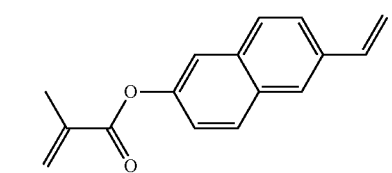 [SMILES: C=Cc1ccc2cc(OC(=O)C(=C)C)ccc2c1] RM-6
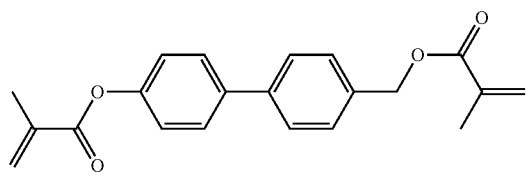 [SMILES: C=C(C)C(=O)OCc1ccc(-c2ccc(OC(=O)C(=C)C)cc2)cc1] RM-7
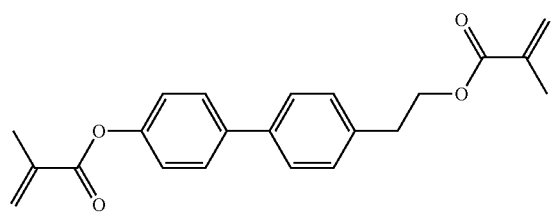 [SMILES: C=C(C)C(=O)OCCc1ccc(-c2ccc(OC(=O)C(=C)C)cc2)cc1] RM-8
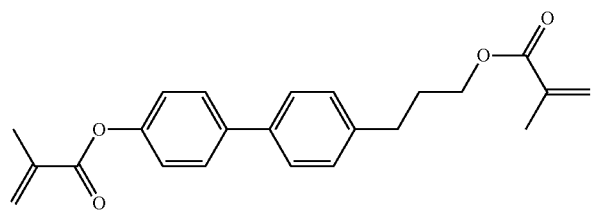 [SMILES: C=C(C)C(=O)OCCCc1ccc(-c2ccc(OC(=O)C(=C)C)cc2)cc1] RM-9
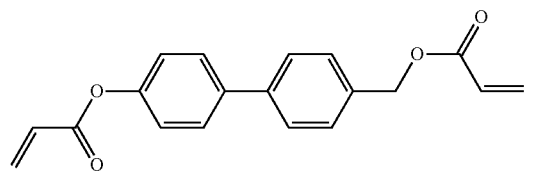 [SMILES: C=CC(=O)OCc1ccc(-c2ccc(OC(=O)C=C)cc2)cc1] RM-10

TABLE E-continued
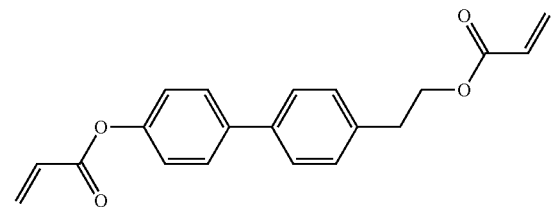 [SMILES: C=CC(=O)OCCc1ccc(-c2ccc(OC(=O)C=C)cc2)cc1] RM-11
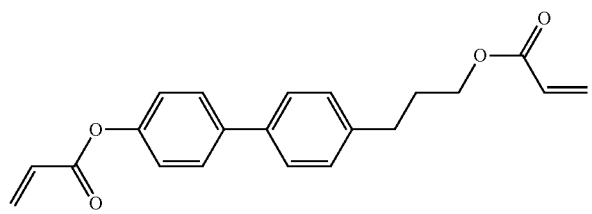 [SMILES: C=CC(=O)OCCCc1ccc(-c2ccc(OC(=O)C=C)cc2)cc1] RM-12
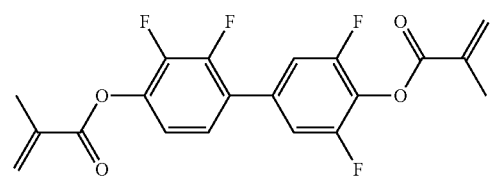 [SMILES: C=C(C)C(=O)Oc1ccc(-c2cc(F)c(OC(=O)C(=C)C)c(F)c2)c(F)c1F] RM-13
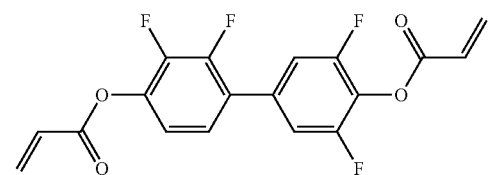 RM-14
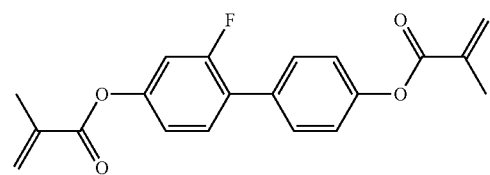 RM-15
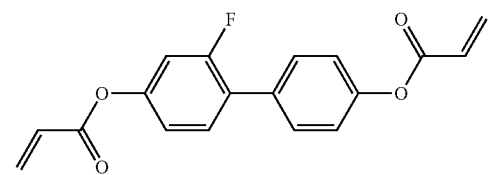 [SMILES: C=CC(=O)Oc1ccc(-c2ccc(OC(=O)C=C)cc2F)cc1] RM-16
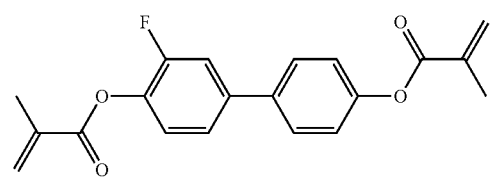 [SMILES: C=C(C)C(=O)Oc1ccc(-c2ccc(OC(=O)C(=C)C)c(F)c2)cc1] RM-17
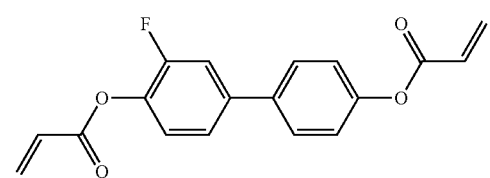 RM-18

TABLE E-continued
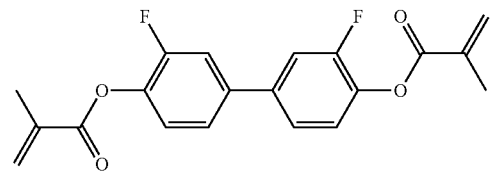 [SMILES: C=C(C)C(=O)Oc1ccc(-c2ccc(OC(=O)C(=C)C)c(F)c2)cc1F] RM-19
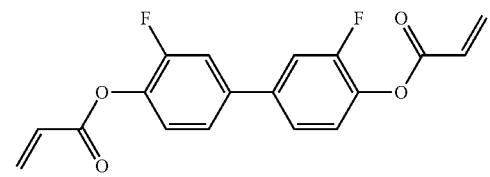 RM-20
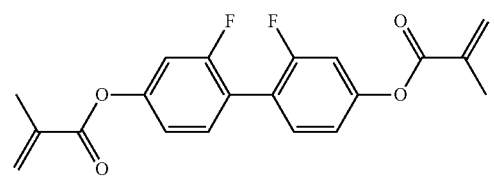 RM-21
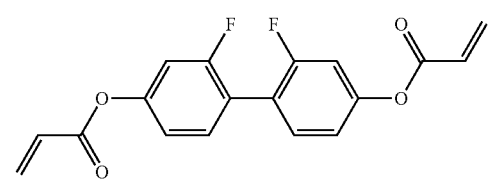 RM-22
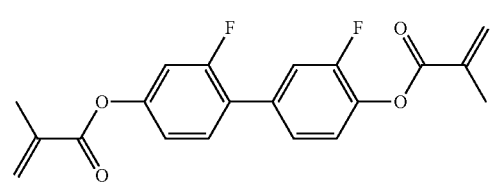 RM-23
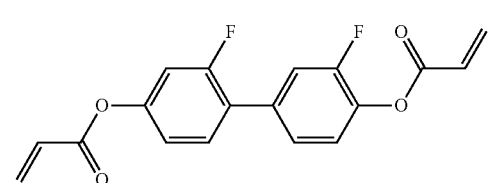 RM-24
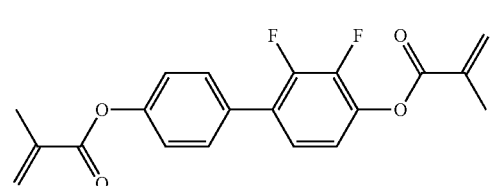 RM-25
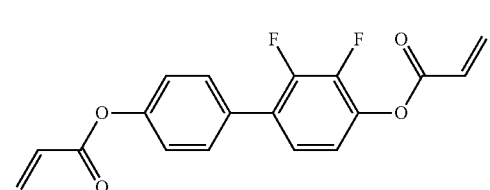 RM-26
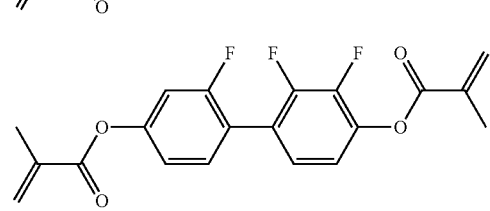 RM-27

TABLE E-continued
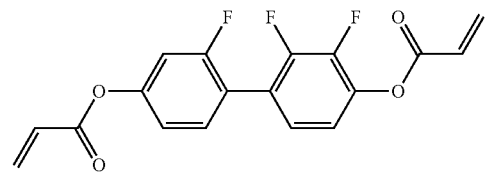 [SMILES: C=CC(=O)Oc1ccc(-c2ccc(OC(=O)C=C)c(F)c2F)c(F)c1] RM-28
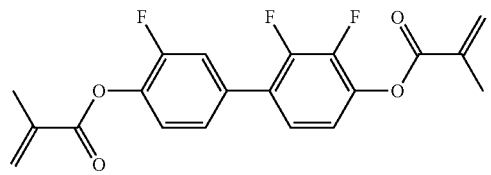 [SMILES: C=C(C)C(=O)Oc1ccc(-c2ccc(OC(=O)C(=C)C)c(F)c2F)cc1F] RM-29
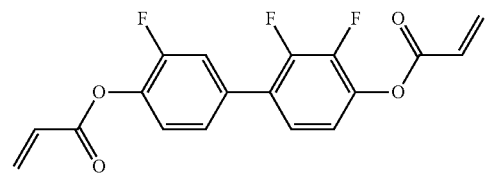 RM-30
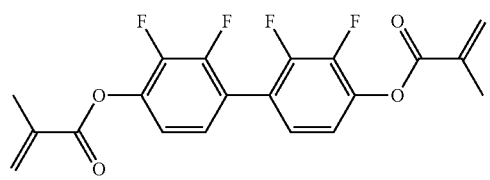 [SMILES: C=C(C)C(=O)Oc1ccc(-c2ccc(OC(=O)C(=C)C)c(F)c2F)c(F)c1F] RM-31
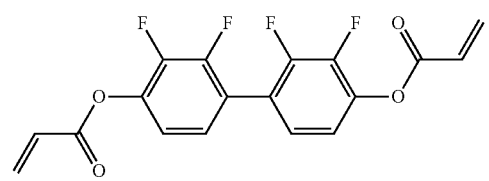 [SMILES: C=CC(=O)Oc1ccc(-c2ccc(OC(=O)C=C)c(F)c2F)c(F)c1F] RM-32
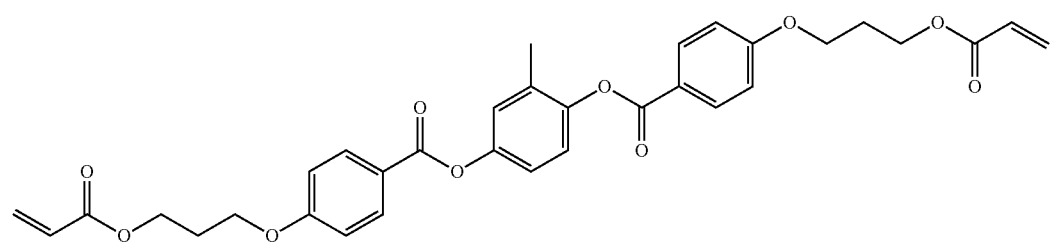 [SMILES: C=CC(=O)OCCCOc1ccc(C(=O)Oc2ccc(OC(=O)c3ccc(OCCCOC(=O)C=C)cc3)c(C)c2)cc1] RM-33
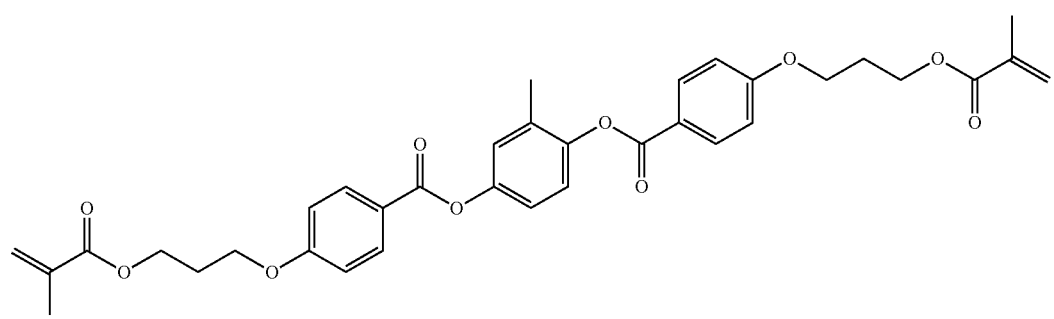 [SMILES: C=C(C)C(=O)OCCCOc1ccc(C(=O)Oc2ccc(OC(=O)c3ccc(OCCCOC(=O)C(=C)C)cc3)c(C)c2)cc1] RM-34

TABLE E-continued
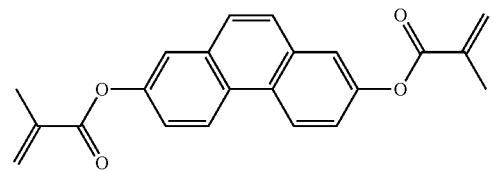 [SMILES: C=C(C)C(=O)Oc1ccc2c(ccc3cc(OC(=O)C(=C)C)ccc32)c1] RM-35
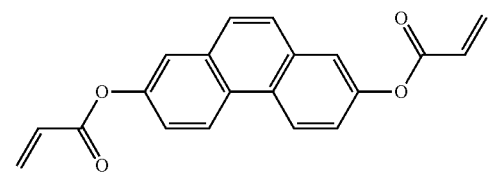 [SMILES: C=CC(=O)Oc1ccc2c(ccc3cc(OC(=O)C=C)ccc32)c1] RM-36
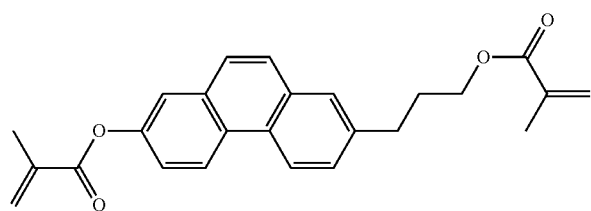 [SMILES: C=C(C)C(=O)OCCCc1ccc2c(ccc3cc(OC(=O)C(=C)C)ccc32)c1] RM-37
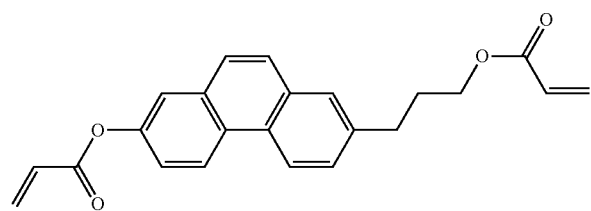 [SMILES: C=CC(=O)OCCCc1ccc2c(ccc3cc(OC(=O)C=C)ccc32)c1] RM-38
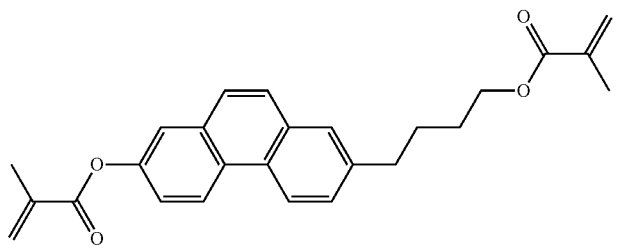 [SMILES: C=C(C)C(=O)OCCCCc1ccc2c(ccc3cc(OC(=O)C(=C)C)ccc32)c1] RM-39
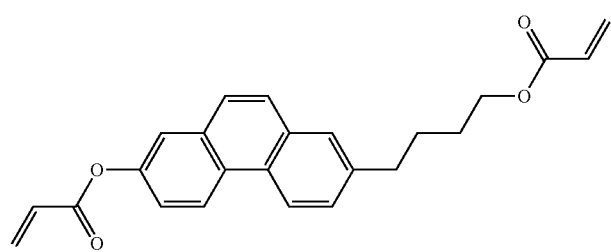 [SMILES: C=CC(=O)OCCCCc1ccc2c(ccc3cc(OC(=O)C=C)ccc32)c1] RM-40
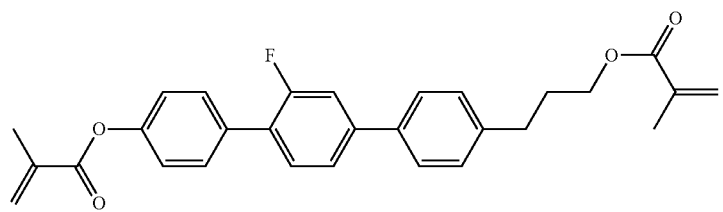 [SMILES: C=C(C)C(=O)OCCCc1ccc(-c2ccc(-c3ccc(OC(=O)C(=C)C)cc3)c(F)c2)cc1] RM-41

TABLE E-continued
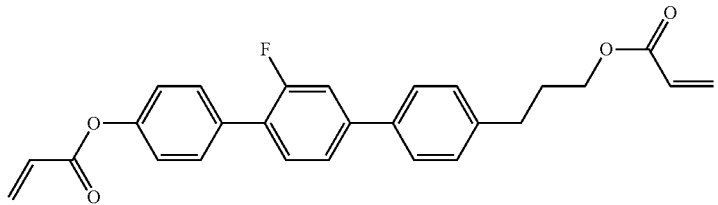 [SMILES: C=CC(=O)OCCCc1ccc(-c2ccc(-c3ccc(OC(=O)C=C)cc3)c(F)c2)cc1]
RM-42
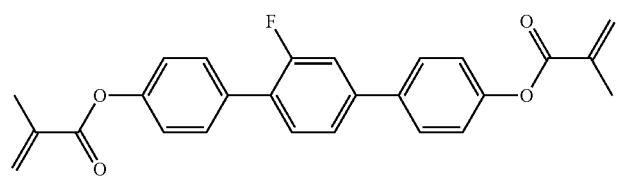 [SMILES: C=C(C)C(=O)Oc1ccc(-c2ccc(-c3ccc(OC(=O)C(=C)C)cc3)c(F)c2)cc1]
RM-43
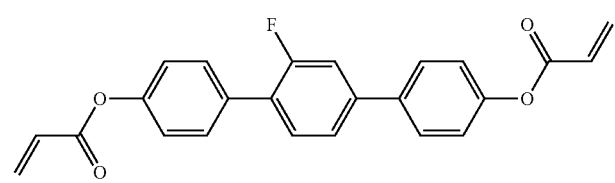 [SMILES: C=CC(=O)Oc1ccc(-c2ccc(-c3ccc(OC(=O)C=C)cc3)c(F)c2)cc1]
RM-44
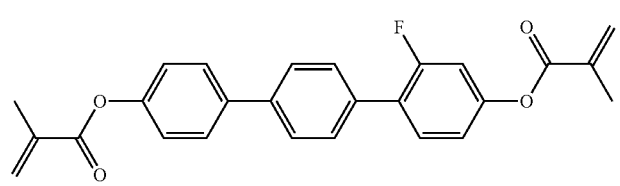 [SMILES: C=C(C)C(=O)Oc1ccc(-c2ccc(-c3ccc(OC(=O)C(=C)C)cc3F)cc2)cc1]
RM-45
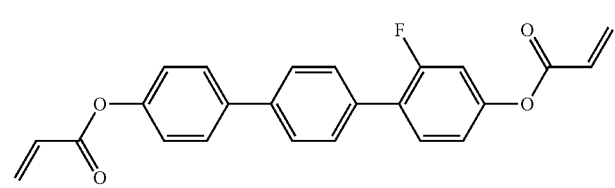 [SMILES: C=CC(=O)Oc1ccc(-c2ccc(-c3ccc(OC(=O)C=C)cc3F)cc2)cc1]
RM-46
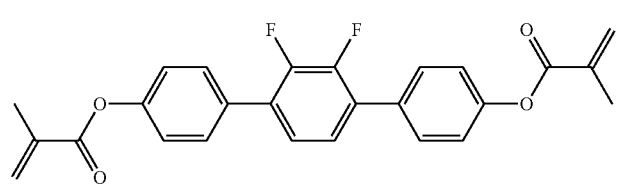 [SMILES: C=C(C)C(=O)Oc1ccc(-c2ccc(-c3ccc(OC(=O)C(=C)C)cc3)c(F)c2F)cc1]
RM-47
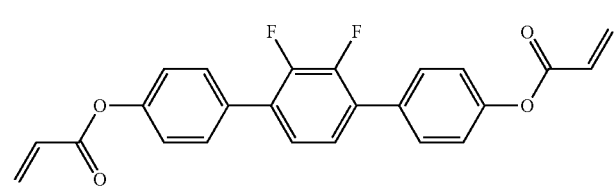
RM-48
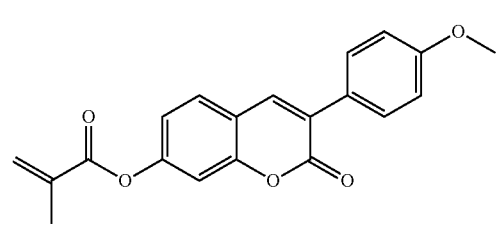 [SMILES: C=C(C)C(=O)Oc1ccc2cc(-c3ccc(OC)cc3)c(=O)oc2c1]
RM-49

TABLE E-continued
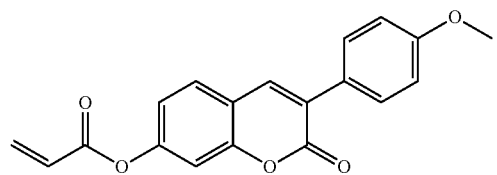 [SMILES: C=CC(=O)Oc1ccc2cc(-c3ccc(OC)cc3)c(=O)oc2c1] RM-50
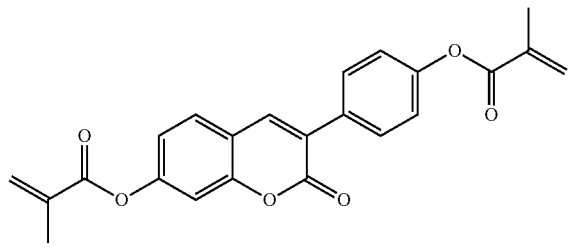 [SMILES: C=C(C)C(=O)Oc1ccc(-c2cc3ccc(OC(=O)C(=C)C)cc3oc2=O)cc1] RM-51
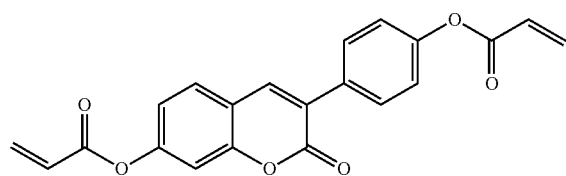 [SMILES: C=CC(=O)Oc1ccc(-c2cc3ccc(OC(=O)C=C)cc3oc2=O)cc1] RM-52
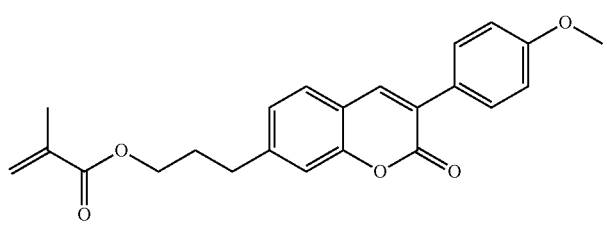 [SMILES: C=C(C)C(=O)OCCCc1ccc2cc(-c3ccc(OC)cc3)c(=O)oc2c1] RM-53
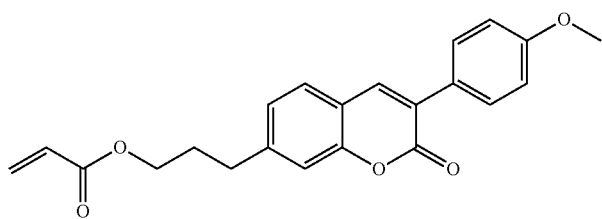 [SMILES: C=CC(=O)OCCCc1ccc2cc(-c3ccc(OC)cc3)c(=O)oc2c1] RM-54
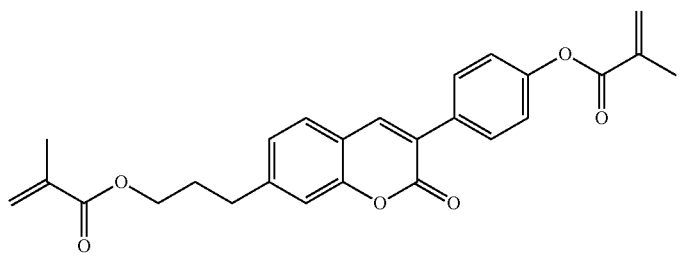 [SMILES: C=C(C)C(=O)OCCCc1ccc2cc(-c3ccc(OC(=O)C(=C)C)cc3)c(=O)oc2c1] RM-55
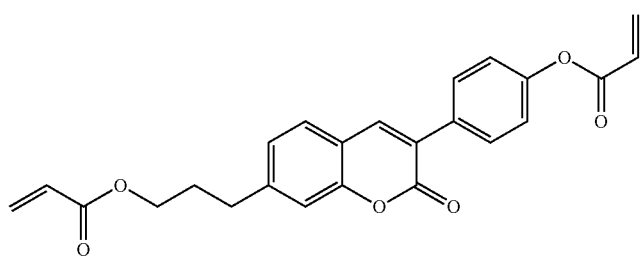 [SMILES: C=CC(=O)OCCCc1ccc2cc(-c3ccc(OC(=O)C=C)cc3)c(=O)oc2c1] RM-56

TABLE E-continued
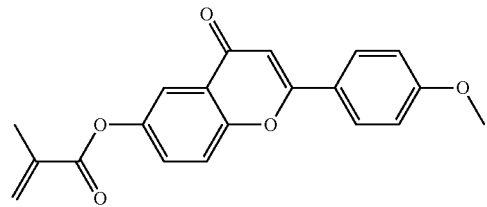 [SMILES: C=C(C)C(=O)Oc1ccc2oc(-c3ccc(OC)cc3)cc(=O)c2c1] RM-57
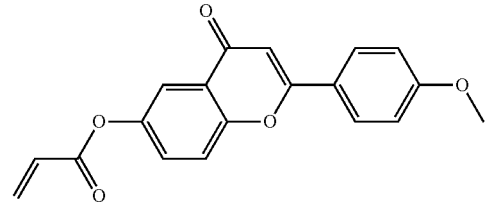 [SMILES: C=CC(=O)Oc1ccc2oc(-c3ccc(OC)cc3)cc(=O)c2c1] RM-58
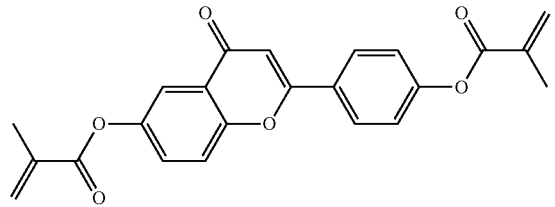 [SMILES: C=C(C)C(=O)Oc1ccc(-c2cc(=O)c3cc(OC(=O)C(=C)C)ccc3o2)cc1] RM-59
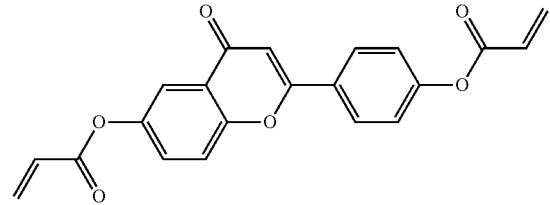 [SMILES: C=CC(=O)Oc1ccc(-c2cc(=O)c3cc(OC(=O)C=C)ccc3o2)cc1] RM-60
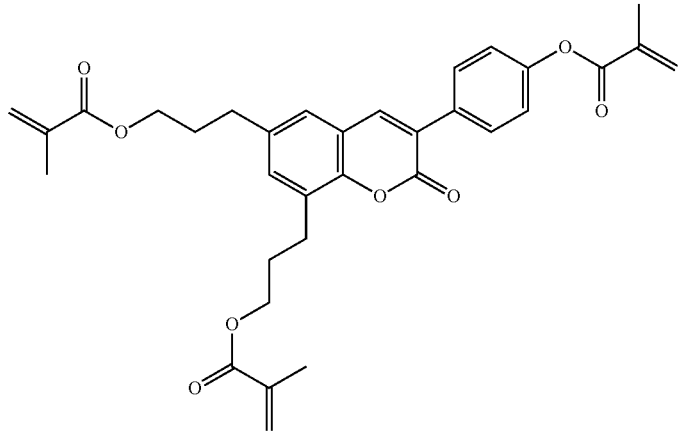 [SMILES: C=C(C)C(=O)OCCCc1cc(CCCOC(=O)C(=C)C)c2oc(=O)c(-c3ccc(OC(=O)C(=C)C)cc3)cc2c1] RM-61
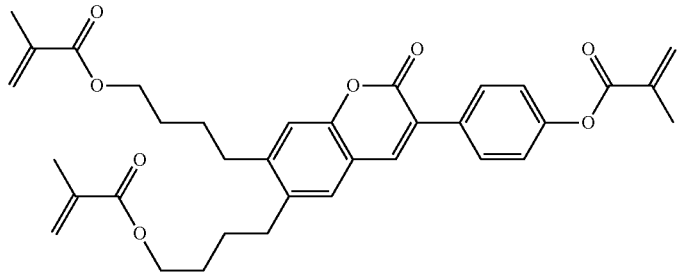 [SMILES: C=C(C)C(=O)OCCCCc1cc2cc(-c3ccc(OC(=O)C(=C)C)cc3)c(=O)oc2cc1CCCCOC(=O)C(=C)C] RM-62

TABLE E-continued
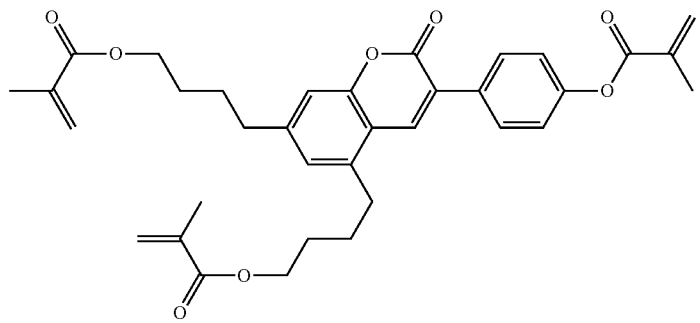 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
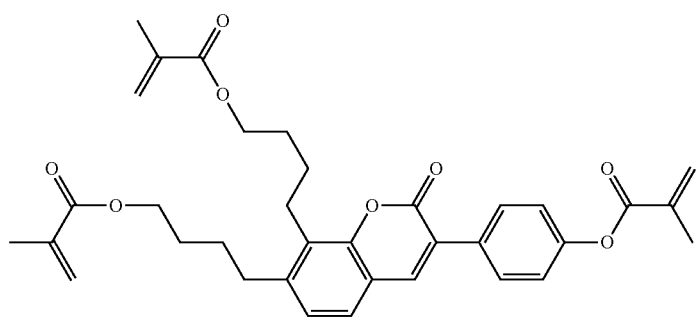 [SMILES: C=C(C)C(=O)OCCCCc1ccc2cc(-c3ccc(OC(=O)C(=C)C)cc3)c(=O)oc2c1CCCCOC(=O)C(=C)C]
RM-64
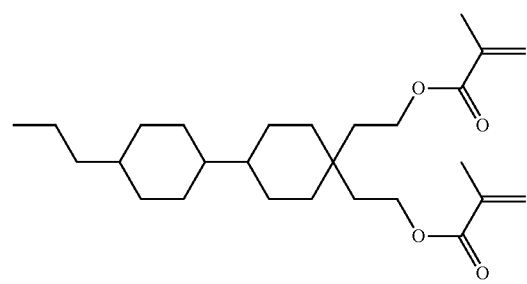 [SMILES: C=C(C)C(=O)OCCC1(CCOC(=O)C(=C)C)CCC(C2CCC(CCC)CC2)CC1]
RM-65
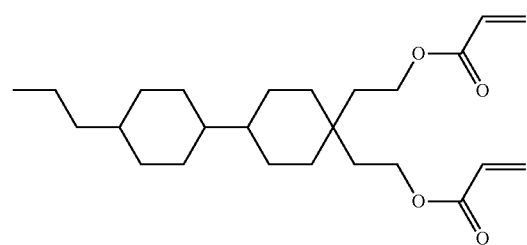 [SMILES: C=CC(=O)OCCC1(CCOC(=O)C=C)CCC(C2CCC(CCC)CC2)CC1]
RM-66
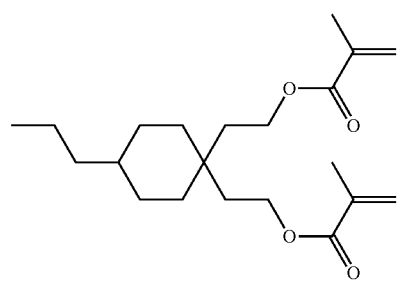 [SMILES: C=C(C)C(=O)OCCC1(CCOC(=O)C(=C)C)CCC(CCC)CC1]
RM-67

TABLE E-continued
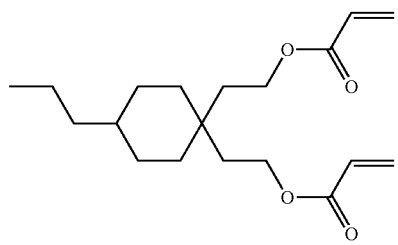 [SMILES: C=CC(=O)OCCC1(CCOC(=O)C=C)CCC(CCC)CC1]
RM-68
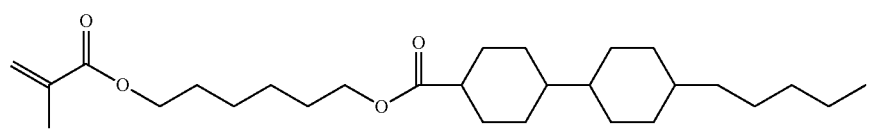 [SMILES: C=C(C)C(=O)OCCCCCCOC(=O)C1CCC(C2CCC(CCCCC)CC2)CC1]
RM-69
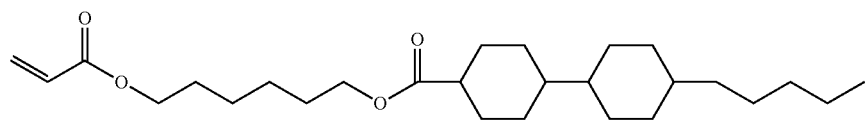 [SMILES: C=CC(=O)OCCCCCCOC(=O)C1CCC(C2CCC(CCCCC)CC2)CC1]
RM-70
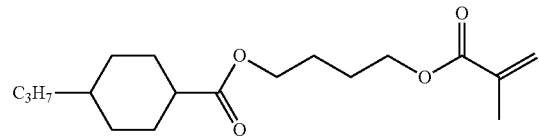
RM-71
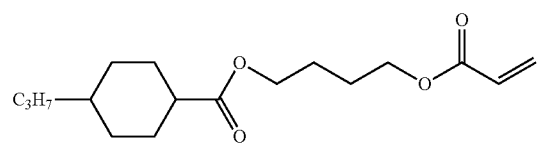
RM-72
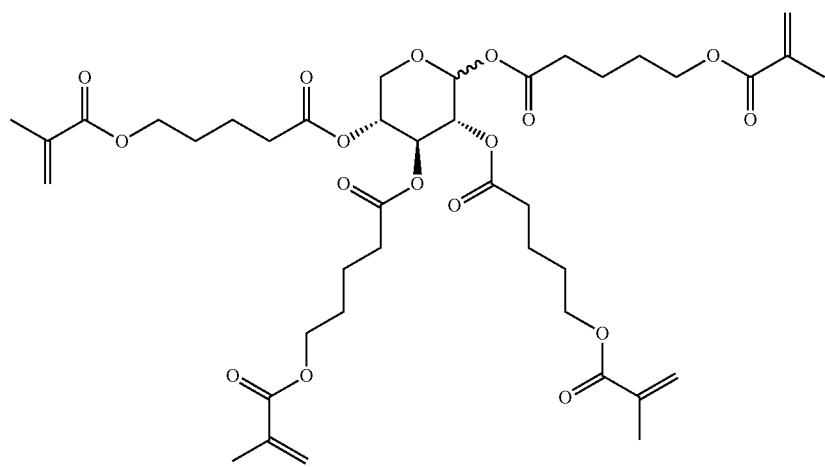 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-73

TABLE E-continued
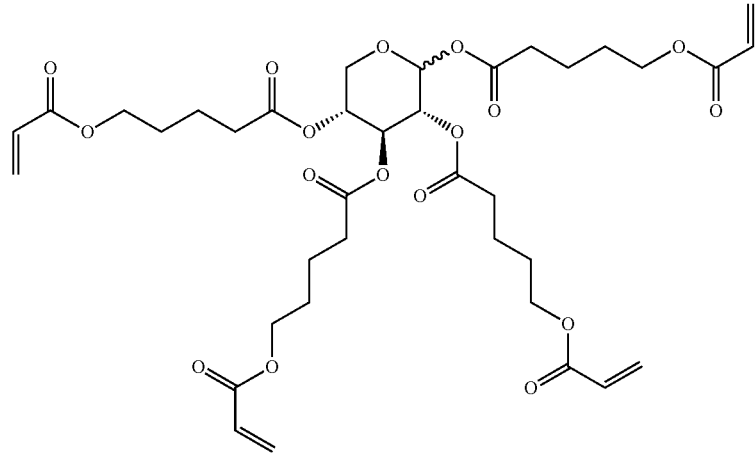 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-74
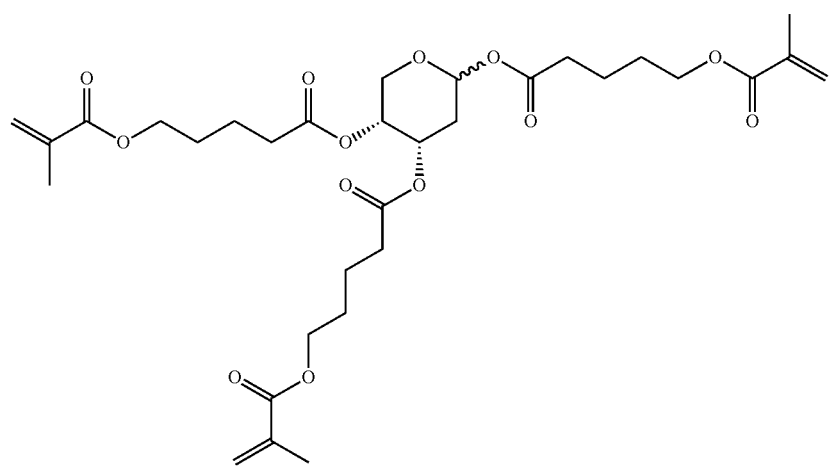 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-75
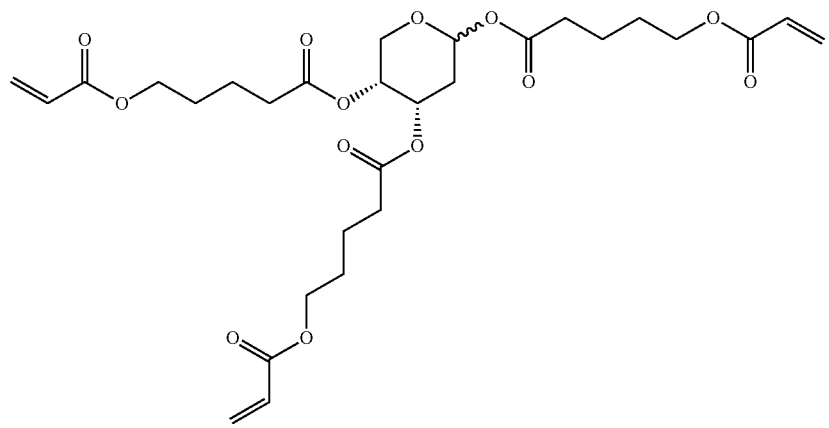 [SMILES: C=CC(=O)OCCCCC(=O)OC1C[C@H](OC(=O)CCCCOC(=O)C=C)[C@H](OC(=O)CCCCOC(=O)C=C)CO1]
RM-76
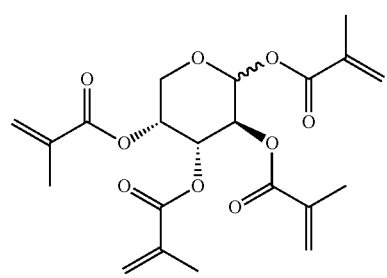 [SMILES: C=C(C)C(=O)OC1OC[C@@H](OC(=O)C(=C)C)[C@@H](OC(=O)C(=C)C)[C@@H]1OC(=O)C(=C)C]
RM-77

TABLE E-continued
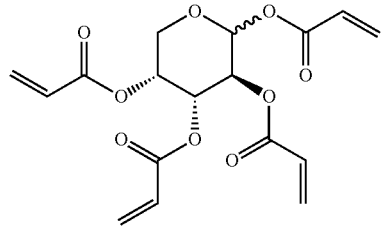 [SMILES: C=CC(=O)OC1OC[C@@H](OC(=O)C=C)[C@@H](OC(=O)C=C)[C@@H]1OC(=O)C=C]
RM-78
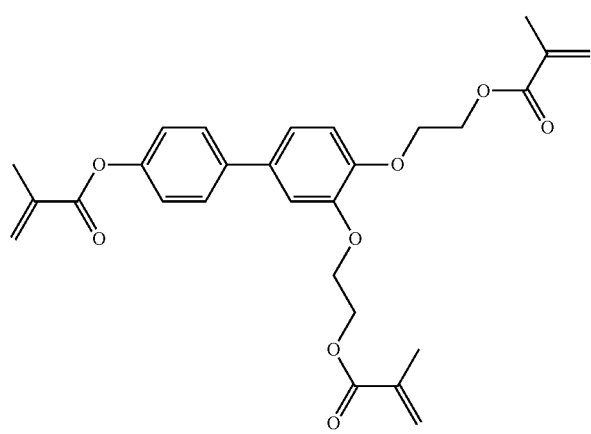 [SMILES: C=C(C)C(=O)OCCOc1ccc(-c2ccc(OC(=O)C(=C)C)cc2)cc1OCCOC(=O)C(=C)C]
RM-79
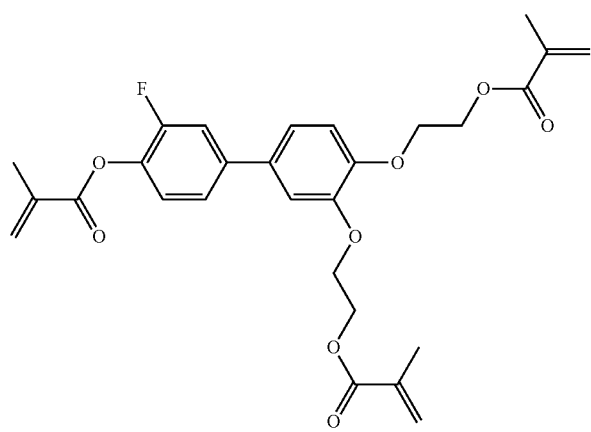 [SMILES: C=C(C)C(=O)OCCOc1ccc(-c2ccc(OC(=O)C(=C)C)c(F)c2)cc1OCCOC(=O)C(=C)C]
RM-80
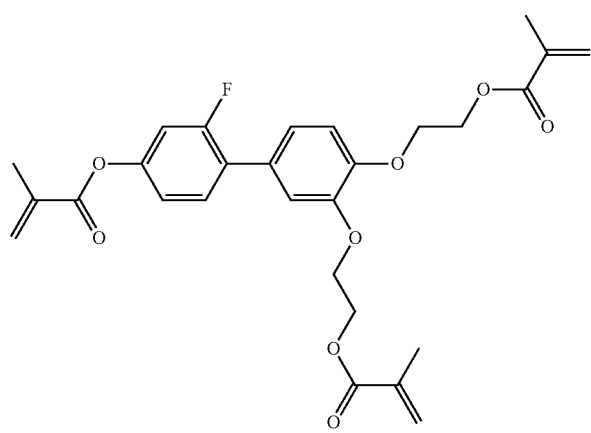 [SMILES: C=C(C)C(=O)OCCOc1ccc(-c2ccc(OC(=O)C(=C)C)cc2F)cc1OCCOC(=O)C(=C)C]
RM-81

TABLE E-continued
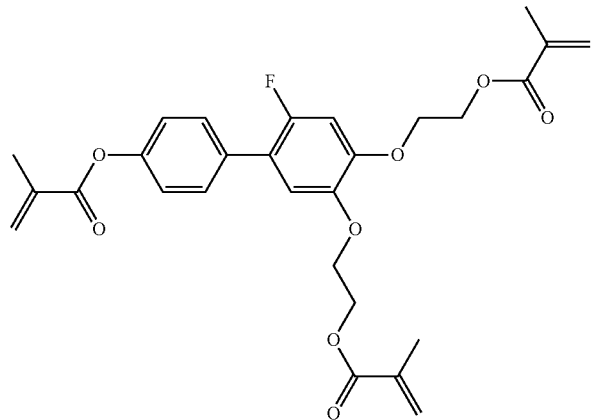 [SMILES: C=C(C)C(=O)OCCOc1cc(F)c(-c2ccc(OC(=O)C(=C)C)cc2)cc1OCCOC(=O)C(=C)C] RM-82
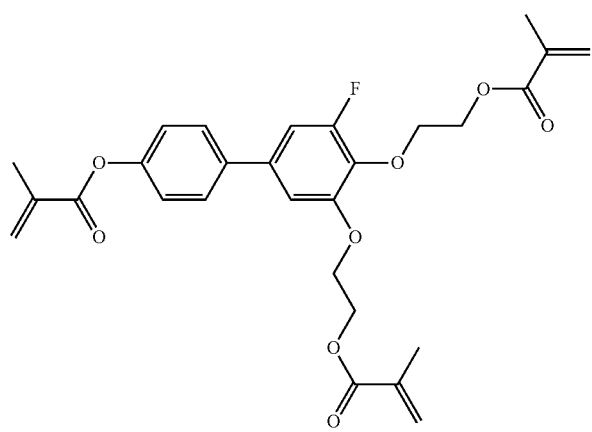 [SMILES: C=C(C)C(=O)OCCOc1cc(-c2ccc(OC(=O)C(=C)C)cc2)cc(F)c1OCCOC(=O)C(=C)C] RM-83
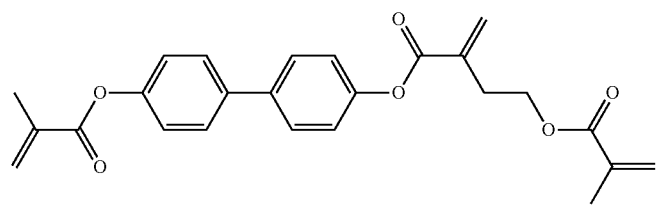 [SMILES: C=C(C)C(=O)OCCC(=C)C(=O)Oc1ccc(-c2ccc(OC(=O)C(=C)C)cc2)cc1] RM-84
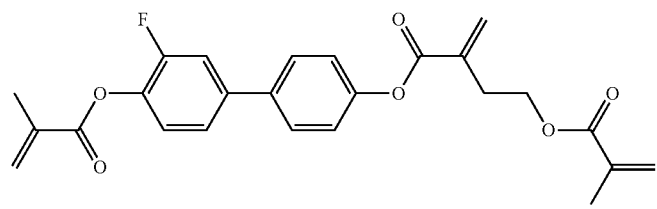 [SMILES: C=C(C)C(=O)OCCC(=C)C(=O)Oc1ccc(-c2ccc(OC(=O)C(=C)C)c(F)c2)cc1] RM-85
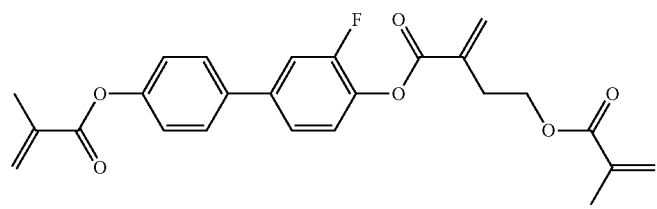 [SMILES: C=C(C)C(=O)OCCC(=C)C(=O)Oc1ccc(-c2ccc(OC(=O)C(=C)C)cc2)cc1F] RM-86

TABLE E-continued
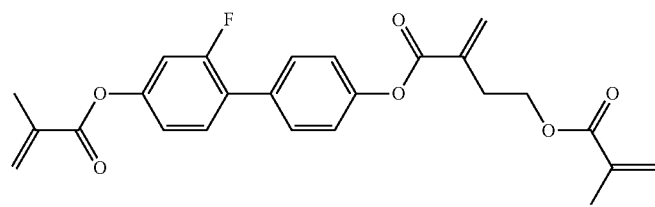 [SMILES: C=C(C)C(=O)OCCC(=C)C(=O)Oc1ccc(-c2ccc(OC(=O)C(=C)C)cc2F)cc1]
RM-87
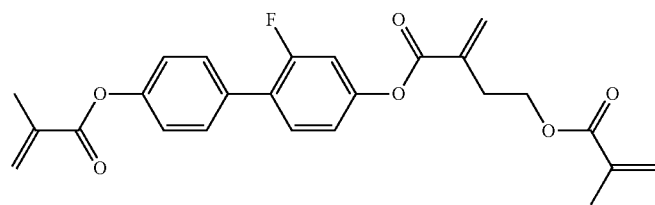 [SMILES: C=C(C)C(=O)OCCC(=C)C(=O)Oc1ccc(-c2ccc(OC(=O)C(=C)C)cc2)c(F)c1]
RM-88
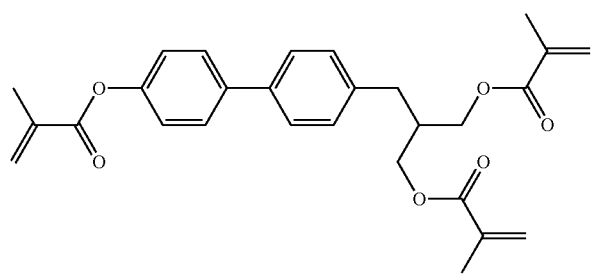 [SMILES: C=C(C)C(=O)OCC(COC(=O)C(=C)C)Cc1ccc(-c2ccc(OC(=O)C(=C)C)cc2)cc1]
RM-89
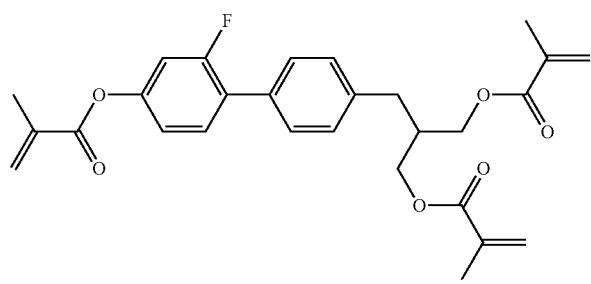 [SMILES: C=C(C)C(=O)OCC(COC(=O)C(=C)C)Cc1ccc(-c2ccc(OC(=O)C(=C)C)cc2F)cc1]
RM-90
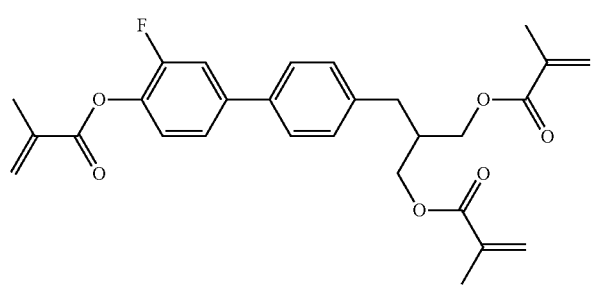 [SMILES: C=C(C)C(=O)OCC(COC(=O)C(=C)C)Cc1ccc(-c2ccc(OC(=O)C(=C)C)c(F)c2)cc1]
RM-91
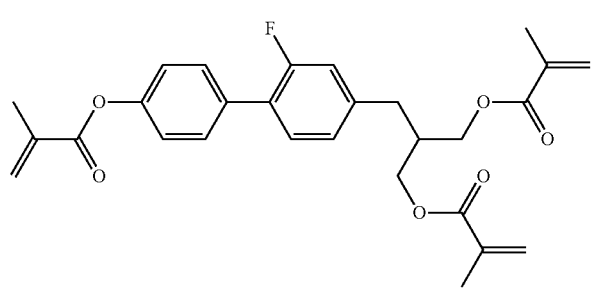 [SMILES: C=C(C)C(=O)OCC(COC(=O)C(=C)C)Cc1ccc(-c2ccc(OC(=O)C(=C)C)cc2)c(F)c1]
RM-92

TABLE E-continued

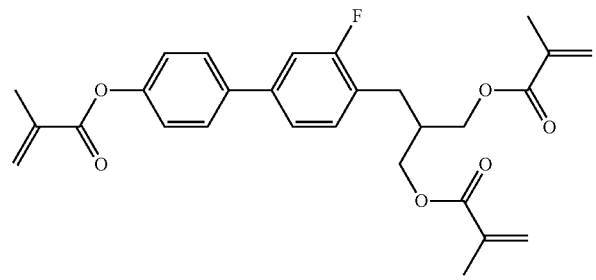 [SMILES: C=C(C)C(=O)OCC(COC(=O)C(=C)C)Cc1ccc(-c2ccc(OC(=O)C(=C)C)cc2)cc1F]
RM-93

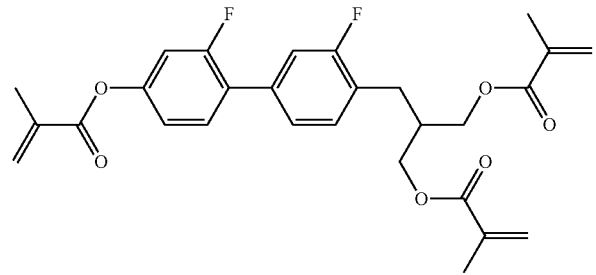 [SMILES: C=C(C)C(=O)OCC(COC(=O)C(=C)C)Cc1ccc(-c2ccc(OC(=O)C(=C)C)cc2F)cc1F]
RM-94

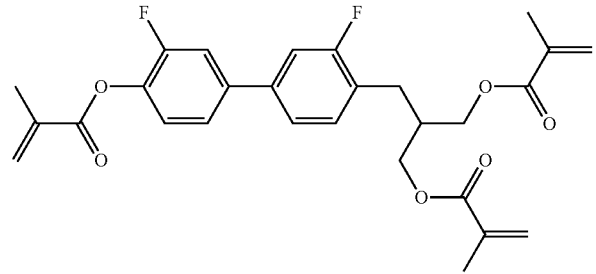 [SMILES: C=C(C)C(=O)OCC(COC(=O)C(=C)C)Cc1ccc(-c2ccc(OC(=O)C(=C)C)c(F)c2)cc1F]
RM-95

Table E shows example compounds which can preferably be used as reactive mesogenic compounds in the liquid-crystalline mixtures according to the invention. If the liquid-crystalline mixtures comprise one or more reactive compounds, they are preferably employed in amounts of 0.01-5% by weight. It may be necessary also to add an initiator or a mixture of two or more initiators for the polymerisation. The initiator or the initiator mixture is preferably added in amounts of 0.001-2% by weight, based on the mixture. A suitable initiator is, for example, Irgacure (BASF) or Irganox (BASF).

Suitable polymerisable compounds (reactive mesogens) for use in the mixtures according to the invention, preferably in PSA and PS-VA applications or PS-IPS/FFS applications, are shown below in Table E:

In a preferred embodiment, the liquid-crystalline mixtures comprise one or more compounds selected from the group of the compounds from Table E.

EXAMPLES

The following working examples are intended to explain the invention without restricting it.

Above and below, percent data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, $V_o$ denotes threshold voltage, capacitive [V] at 20° C.

$\Delta n$ denotes the optical anisotropy measured at 20° C. and 589 nm $\Delta \epsilon$ denotes the dielectric anisotropy at 20° C. and 1 kHz cl.p. denotes clearing point [° C.]

$K_1$ denotes elastic constant, "splay" deformation at 20° C., [pN]

$K_3$ denotes elastic constant, "bend" deformation at 20° C., [pN]

$\gamma_1$ denotes rotational viscosity measured at 20° C. [mPa·s], determined by the rotation method in a magnetic field LTS denotes low-temperature stability (nematic phase), determined in test cells.

The following examples are intended to explain the invention without limiting it.

Above and below, percentages denote percent by weight. All temperatures are indicated in degrees Celsius.

WORKING EXAMPLES

Example 1

A liquid-crystalline mixture, for example for PS-VA applications, of the composition

| | |
|---|---|
| CCH-35 | 9.47% |
| CCH-501 | 4.99% |
| CCY-2-1 | 9.47% |
| CCY-3-1 | 10.47% |
| CCY-3-O2 | 10.47% |

-continued

| | |
|---|---|
| CCY-5-O2 | 9.47% |
| CPY-2-O2 | 11.96% |
| CY-3-O4 | 8.97% |
| CY-5-O4 | 10.97% |
| RM-1 | 0.30% |
| PCH-53 | 13.46% | is purified using the process according to the invention.

Example 2

A liquid-crystalline mixture, for example for PS-VA applications, of the composition

| | |
|---|---|
| BCH-32 | 7.48% |
| CCH-23 | 21.93% |
| CCH-34 | 3.49% |
| CCY-3-O3 | 6.98% |
| CCY-4-O2 | 7.98% |
| CPY-2-O2 | 10.97% |
| CPY-3-O2 | 10.97% |
| CY-3-O2 | 15.45% |
| RM-1 | 0.30% |
| PCH-301 | 12.46% |
| PCH-302 | 1.99% | is purified using the process according to the invention.

Example 3

A liquid-crystalline mixture, for example for PS-VA applications, of the composition

| | |
|---|---|
| CC-3-V1 | 7.98% |
| CCH-23 | 17.95% |
| CCH-34 | 3.99% |
| CCH-35 | 6.98% |
| CCP-3-1 | 4.99% |
| CCY-3-O2 | 12.46% |
| CPY-2-O2 | 7.98% |
| CPY-3-O2 | 10.97% |
| CY-3-O2 | 15.45% |
| RM-1 | 0.30% |
| PY-3-O2 | 10.97% | is purified using the process according to the invention.

Example 4

A liquid-crystalline mixture, for example for PS-VA applications, of the composition

| | |
|---|---|
| CC-3-V1 | 8.97% |
| CCH-23 | 12.96% |
| CCH-34 | 6.23% |
| CCH-35 | 7.73% |
| CCP-3-1 | 3.49% |
| CCY-3-O2 | 12.21% |
| CPY-2-O2 | 6.73% |
| CPY-3-O2 | 11.96% |
| CY-3-O2 | 11.47% |
| RM-1 | 0.30% |
| PP-1-2V1 | 4.24% |
| PY-3-O2 | 13.71% | is purified using the process according to the invention.

Example 5

A liquid-crystalline mixture, for example for TN-TFT applications, of the composition

| | |
|---|---|
| CBC-33 | 3.50% |
| CC-3-V | 38.00% |
| CC-3-V1 | 10.00% |
| CCP-V-1 | 3.00% |
| CCP-V2-1 | 9.00% |
| PGP-2-3 | 5.00% |
| PGP-2-4 | 5.00% |
| PGU-2-F | 8.00% |
| PGU-3-F | 9.00% |
| PUQU-3-F | 9.50% | is purified using the process according to the invention.

Example 6

A liquid-crystalline mixture, for example for IPS or FFS applications, of the composition

| | |
|---|---|
| APUQU-3-F | 4.50% |
| CC-3-V | 44.00% |
| CC-3-V1 | 12.00% |
| CCP-V-1 | 11.00% |
| CCP-V2-1 | 9.00% |
| PGP-2-3 | 6.00% |
| PGUQU-3-F | 6.00% |
| PP-1-2V1 | 7.00% |
| PPGU-3-F | 0.50% | is purified using the process according to the invention.

Example 7

A liquid-crystalline mixture, for example for IPS or FFS applications, of the composition

| | |
|---|---|
| APUQU-3-F | 8.00% |
| CBC-33 | 3.00% |
| CC-3-V | 34.00% |
| CC-3-V1 | 2.50% |
| CCGU-3-F | 4.00% |
| CCP-30CF$_3$ | 4.00% |
| CCP-3F.F.F | 4.50% |
| CCP-50CF$_3$ | 3.00% |
| CCP-V-1 | 10.00% |
| CCQU-3-F | 10.00% |
| CPGU-3-OT | 6.00% |
| PGUQU-3-F | 4.00% |
| PUQU-3-F | 7.00% | is purified using the process according to the invention.

Example 8

A liquid-crystalline mixture, for example for IPS or FFS applications, of the composition

| | |
|---|---|
| APUQU-2-F | 5.00% |
| APUQU-3-F | 7.50% |
| BCH-3F.F.F | 7.00% |
| CC-3-V | 40.50% |
| CC-3-V1 | 6.00% |

-continued

| | |
|---|---|
| CCP-V-1 | 9.50% |
| CPGU-3-OT | 5.00% |
| PGP-2-3 | 6.00% |
| PGP-2-4 | 6.00% |
| PPGU-3-F | 0.50% |
| PUQU-3-F | 7.00% | is purified using the process according to the invention.

Example 9

A liquid-crystalline mixture, for example for TN-TFT applications, of the composition

| | |
|---|---|
| APUQU-2-F | 8.00% |
| APUQU-3-F | 8.00% |
| BCH-32 | 7.00% |
| CC-3-V | 43.00% |
| CCP-V-1 | 9.00% |
| PGP-2-3 | 7.00% |
| PGP-2-4 | 6.00% |
| PUQU-2-F | 5.00% |
| PUQU-3-F | 7.00% | is purified using the process according to the invention.

Example 10

A liquid-crystalline mixture, for example for TN-TFT applications, of the composition

| | |
|---|---|
| BCH-5F.F | 8.00% |
| CBC-33F | 3.00% |
| CC-3-V | 22.00% |
| CCGU-3-F | 6.00% |
| CCP-3F.F.F | 8.00% |
| CCP-5F.F.F | 4.00% |
| CCP-V-1 | 13.00% |
| CCP-V2-1 | 11.00% |
| CCQU-3-F | 5.00% |
| CCQU-5-F | 4.00% |
| PUQU-3-F | 16.00% | is purified using the process according to the invention.

Example 11

A liquid-crystalline mixture, for example for TN-TFT applications, of the composition

| | |
|---|---|
| CBC-33F | 3.00% |
| CBC-53F | 3.00% |
| CC-3-V | 17.00% |
| CC-3-V1 | 4.00% |
| CCP-3F.F.F | 8.00% |
| CCPC-33 | 3.00% |
| CCPC-34 | 3.00% |
| CCP-V-1 | 5.00% |
| CCP-V2-1 | 2.00% |
| CCQU-2-F | 1.50% |
| CCQU-3-F | 10.00% |
| CCQU-5-F | 10.00% |
| CGU-3-F | 6.00% |
| PGP-2-3 | 7.50% |
| PP-1-2V1 | 7.00% |
| PUQU-3-F | 10.00% | is purified using the process according to the invention.

Example 12

A liquid-crystalline mixture, for example for TN-TFT applications, of the composition

| | |
|---|---|
| APUQU-2-F | 1.00% |
| BCH-3F.F.F | 15.00% |
| CC-3-V | 33.50% |
| CC-3-V1 | 2.00% |
| CCGU-3-F | 1.00% |
| CCPC-33 | 2.00% |
| CCP-V-1 | 4.50% |
| BCH-2F | 5.00% |
| BCH-3F | 5.00% |
| PGP-2-3 | 8.50% |
| PGUQU-3-F | 7.80% |
| PP-1-2V1 | 11.00% |
| PPGU-3-F | 0.20% |
| PUQU-3-F | 3.50% | is purified using the process according to the invention.

Example 13

A liquid-crystalline mixture, for example for IPS or FFS applications, of the composition

| | |
|---|---|
| APUQU-2-F | 2.00% |
| APUQU-3-F | 6.00% |
| CC-3-V | 42.00% |
| CCP-3-1 | 3.00% |
| CCP-3-3 | 3.00% |
| CCP-3F.F.F | 8.00% |
| CCP-V-1 | 1.50% |
| CCQU-3-F | 7.00% |
| CCQU-5-F | 3.00% |
| CPGU-3-OT | 6.50% |
| PGUQU-3-F | 5.00% |
| PGUQU-4-F | 4.00% |
| PGUQU-5-F | 4.00% |
| PPGU-3-F | 0.50% |
| PUQU-3-F | 4.50% | is purified using the process according to the invention.

Example 14

A liquid-crystalline mixture, for example for TN-TFT applications, of the composition

| | |
|---|---|
| CC-3-V | 49.50% |
| CCP-3-1 | 1.50% |
| CCP-V-1 | 6.00% |
| CPGU-3-OT | 7.00% |
| PGP-2-3 | 8.50% |
| PGP-2-4 | 5.50% |
| PGUQU-3-F | 7.00% |
| PGUQU-4-F | 4.00% |
| PP-1-2V1 | 2.50% |
| PPGU-3-F | 0.50% |
| PUQU-3-F | 8.00% | is purified using the process according to the invention.

Example 15

A liquid-crystalline mixture, for example for VA applications, of the composition

| | |
|---|---|
| BCH-32 | 6.00% |
| CCH-23 | 18.00% |
| CCH-34 | 8.00% |
| CCP-3-1 | 12.00% |
| CCP-3-3 | 3.00% |
| CCY-3-O2 | 6.00% |
| CPY-2-O2 | 6.00% |
| CPY-3-O2 | 7.00% |
| CY-3-O2 | 14.00% |
| CY-3-O4 | 8.00% |
| CY-5-O2 | 9.00% |
| PYP-2-3 | 3.00% | is purified using the process according to the invention.

Example 16

A liquid-crystalline mixture, for example for PS-VA applications, of the composition

| | |
|---|---|
| CC-3-V1 | 7.98% |
| CCH-23 | 17.95% |
| CCH-34 | 3.99% |
| CCH-35 | 6.98% |
| CCP-3-1 | 4.99% |
| CCY-3-O2 | 12.46% |
| CPY-2-O2 | 7.98% |
| CPY-3-O2 | 10.97% |
| CY-3-O2 | 15.45% |
| RM-17 | 0.30% |
| PY-3-O2 | 10.97% | is purified using the process according to the invention.

Example 17

A liquid-crystalline mixture, for example for VA applications, of the composition

| | |
|---|---|
| CC-3-V | 29.50% |
| PP-1-3 | 11.00% |
| PY-3-O2 | 12.00% |
| CCP-3-1 | 9.50% |
| CCOY-2-O2 | 18.00% |
| CCOY-3-O2 | 13.00% |
| GPP-5-2 | 7.00% | is purified using the process according to the invention.

Mixture Examples 1 to 17 may additionally also comprise one or more, for example one or two, stabiliser(s) and/or a dopant from Tables C and D.

Example 18

A liquid-crystalline mixture, for example for TN applications, of the composition

| | |
|---|---|
| BCH-3F.F | 7.50% |
| BCH-5F.F | 7.50% |
| CC-3-V | 35.00% |
| CCGU-3-F | 4.00% |
| CCP-3F.F.F | 12.00% |
| CCPC-33 | 3.00% |
| CCP-V-1 | 10.00% |
| PGP-2-4 | 4.00% |
| PPGU-3-F | 1.00% |
| PUQU-3-F | 16.00% | is purified using the process according to the invention.

Example 19

A liquid-crystalline mixture, for example for TN applications, of the composition

| | |
|---|---|
| BCH-2F.F | 4.00% |
| BCH-3F.F.F | 8.50% |
| CC-3-V1 | 8.00% |
| CC-4-V | 10.00% |
| CCG-V-F | 8.00% |
| CCP-2OCF$_3$ | 7.00% |
| CCP-2F.F.F | 8.00% |
| CCP-3OCF$_3$ | 5.00% |
| CCP-3-1 | 3.00% |
| CCPC-33 | 2.50% |
| CCP-V-1 | 11.50% |
| CCQU-3-F | 5.00% |
| CDU-2-F | 7.00% |
| CDU-3-F | 7.00% |
| PUQU-3-F | 5.50% | is purified using the process according to the invention.

Example 20

A liquid-crystalline mixture, for example for PS-VA applications, of the composition

| | |
|---|---|
| BCH-32 | 7.48% |
| CCH-23 | 21.93% |
| CCH-34 | 3.49% |
| CCY-3-O3 | 6.98% |
| CCY-4-O2 | 7.98% |
| CPY-2-O2 | 10.97% |
| CPY-3-O2 | 10.97% |
| CY-3-O2 | 15.45% |
| RM-1 | 0.30% |
| PCH-301 | 12.46% |
| PCH-302 | 1.99% | is purified using the process according to the invention.

Example 21

A liquid-crystalline mixture, for example for VA applications, of the composition

| | |
|---|---|
| BCH-32 | 8.50% |
| CC-3-V | 24.00% |
| CC-3-V1 | 5.00% |
| CCP-V-1 | 2.00% |
| CCY-3-1 | 2.50% |
| CCY-3-O1 | 7.00% |
| CCY-3-O2 | 6.50% |
| CCY-3-O3 | 4.00% |
| CCY-4-O2 | 4.00% |
| CPY-2-O2 | 7.50% |
| CPY-3-O2 | 10.00% |
| CY-3-O2 | 3.50% |
| PY-3-O2 | 8.50% |

| | |
|---|---|
| PYP-2-3 | 4.00% |
| PYP-2-4 | 3.00% | is purified using the process according to the invention.

Example 22

A liquid-crystalline mixture, for example for FFS applications, of the composition

| | |
|---|---|
| APUQU-2-F | 4.00% |
| CC-3-V | 26.50% |
| CC-3-V1 | 7.00% |
| CCGU-3-F | 1.50% |
| CCP-2F.F.F | 1.50% |
| CCP-3OCF$_3$ | 8.00% |
| CCP-3-1 | 2.00% |
| CCP-V-1 | 10.00% |
| CCP-V2-1 | 7.00% |
| CDU-2-F | 5.00% |
| CPGU-3-OT | 4.50% |
| PGU-3-F | 3.00% |
| PGUQU-3-F | 3.00% |
| PGUQU-4-F | 3.00% |
| PPGU-3-F | 1.50% |
| PUQU-3-F | 12.50% | is purified using the process according to the invention.

Example 23

A liquid-crystalline mixture, for example for FFS applications, of the composition

| | |
|---|---|
| BCH-3F.F | 7.00% |
| CBC-33 | 3.00% |
| CC-3-V | 25.00% |
| CCGU-3-F | 6.00% |
| CCP-3OCF$_3$ | 8.00% |
| CCP-3-1 | 4.50% |
| CCP-V-1 | 13.50% |
| CCP-V2-1 | 6.00% |
| CCQU-3-F | 8.00% |
| CPGP-5-2 | 3.00% |
| DPGU-4-F | 2.50% |
| PPGU-3-F | 1.00% |
| PUQU-3-F | 4.50% |
| Y-4O-O4 | 8.00% | is purified using the process according to the invention.

Example 24

A liquid-crystalline mixture, for example for PS-VA applications, of the composition

| | |
|---|---|
| CC-3-V1 | 10.22% |
| CCH-23 | 18.44% |
| Irganox ® 1076 | 0.01% |
| RM-1 | 0.30% |
| PY-3-O2 | 12.96% |
| PP-1-2V1 | 3.74% |
| CY-3-O2 | 11.47% |
| CPY-3-O2 | 9.72% |
| CPY-2-O2 | 5.98% |
| CCY-3-O2 | 11.96% |
| CCY-3-1 | 2.49% |
| CCP-3-1 | 5.98% |
| CCH-35 | 6.73% | is purified using the process according to the invention.

Example 25

A liquid-crystalline mixture, for example for TN applications, of the composition

| | |
|---|---|
| APUQU-2-F | 2.00% |
| BCH-3F.F | 9.00% |
| BCH-3F.F.F | 9.00% |
| CC-3-V1 | 5.00% |
| CC-4-V | 6.00% |
| CCGU-3-F | 7.50% |
| CCG-V-F | 15.50% |
| CCP-2F.F.F | 8.50% |
| CCP-3OCF$_3$ | 6.00% |
| CCP-3-1 | 2.00% |
| CCP-3F.F.F | 10.00% |
| CCQU-3-F | 9.50% |
| CCQU-5-F | 9.00% |
| PPGU-3-F | 1.00% | is purified using the process according to the invention.

Example 26

A liquid-crystalline mixture, for example for PS-VA applications, of the composition

| | |
|---|---|
| RM-1 | 0.199% |
| Irganox ® 1076 | 0.001% |
| PYP-2-4 | 8.98% |
| PYP-2-3 | 8.98% |
| PCH-53 | 2.99% |
| PCH-301 | 5.99% |
| CY-3-O4 | 20.46% |
| CPY-3-O2 | 4.49% |
| CPY-2-O2 | 9.98% |
| CCY-4-O2 | 6.99% |
| CCY-3-O3 | 7.98% |
| CCY-3-O2 | 6.99% |
| CCH-35 | 5.99% |
| BCH-52 | 3.99% |
| CCH-34 | 5.99% | is purified using the process according to the invention.

Example 27

A liquid-crystalline mixture, for example for FFS applications, of the composition

| | |
|---|---|
| CDUQU-3-F | 3.00% |
| CCP-V-1 | 13.50% |
| CCP-3-3 | 2.50% |
| CC-3-V | 44.00% |
| APUQU-2-F | 4.50% |
| CPGU-3-OT | 4.00% |
| PUQU-2-F | 5.00% |
| PGU-2-F | 6.00% |
| PGU-3-F | 6.00% |
| PGUQU-3-F | 3.50% |
| PGUQU-4-F | 3.50% |
| PPGU-3-F | 0.50% |
| DPGU-4-F | 4.00% | is purified using the process according to the invention.

Example 28

A liquid-crystalline mixture, for example for FFS applications, of the composition

| | |
|---|---|
| BCH-3F.F | 15.00% |
| BCH-3F.F.F | 8.00% |
| CC-3-V | 10.00% |
| CC-3-V1 | 10.50% |
| CC-4-V | 10.50% |
| CCP-30CF$_3$ | 10.00% |
| CCP-V-1 | 15.00% |
| CDUQU-3-F | 6.50% |
| PGP-2-2V | 1.00% |
| PGU-2-F | 8.00% |
| PPGU-3-F | 1.00% |
| PUQU-3-F | 4.50% | is purified using the process according to the invention.

Example 29

A liquid-crystalline mixture, for example for FFS applications, of the composition

| | |
|---|---|
| PUQU-3-F | 14.00% |
| PPGU-3-F | 1.00% |
| PGP-2-2V | 4.50% |
| DPGU-4-F | 3.00% |
| CPGU-3-OT | 3.00% |
| STAB-37 | 0.01% |
| CCP-V-1 | 14.00% |
| CCP-30CF$_3$ | 6.00% |
| CC-3-V1 | 5.50% |
| CC-3-V | 38.99% |
| APUQU-2-F | 4.00% |
| CCY-3-O2 | 6.00% | is purified using the process according to the invention.

Example 30

A liquid-crystalline mixture, for example for VA applications, of the composition

| | |
|---|---|
| CLY-3-O2 | 10.00% |
| CCY-3-O2 | 9.25% |
| CCH-35 | 8.00% |
| CC-3-V1 | 10.00% |
| CC-3-V | 27.50% |
| CPY-3-O2 | 11.75% |
| PYP-2-4 | 0.50% |
| PY-4-O2 | 9.00% |
| PY-3-O2 | 14.00% | is purified using the process according to the invention.

Example 31

A liquid-crystalline mixture, for example for PVA applications, of the composition

| | |
|---|---|
| CCH-23 | 12.00% |
| CCH-34 | 10.00% |
| CCP-3-1 | 7.00% |
| CCY-3-1 | 10.00% |
| CCY-3-O2 | 9.00% |
| CCY-3-O3 | 9.00% |
| CCY-4-O2 | 9.00% |
| CPGP-4-3 | 2.00% |
| CPY-2-O2 | 8.00% |
| CPY-3-O2 | 8.00% |
| CY-3-O4 | 4.50% |
| PCH-301 | 10.00% |
| PYP-2-3 | 1.50% | is purified using the process according to the invention.

Example 32

A liquid-crystalline mixture, for example for FFS applications, of the composition

| | |
|---|---|
| CC-3-V | 33.00% |
| CCY-3-O1 | 5.00% |
| CCY-3-O2 | 6.50% |
| CCY-4-O2 | 8.00% |
| CCY-5-O2 | 3.50% |
| CPY-2-O2 | 9.00% |
| CPY-3-O2 | 9.00% |
| CY-3-O2 | 10.00% |
| CY-5-O2 | 2.00% |
| PY-3-O2 | 9.00% |
| PYP-2-3 | 5.00% | is purified using the process according to the invention.

Example 33

A liquid-crystalline mixture, for example for FFS applications, of the composition

| | |
|---|---|
| CC-3-V | 44.50% |
| CC-3-V1 | 5.50% |
| CCP-30CF$_3$ | 8.00% |
| CCP-V-1 | 8.00% |
| CCQU-3-F | 5.00% |
| PGP-2-3 | 4.00% |
| PGP-2-4 | 5.00% |
| PGUQU-3-F | 3.00% |
| PGUQU-4-F | 9.00% |
| PGUQU-5-F | 5.50% |
| PUQU-3-F | 2.50% | is purified using the process according to the invention.

Example 34

A liquid-crystalline mixture, for example for FFS applications, of the composition

| | |
|---|---|
| APUQU-2-F | 5.00% |
| APUQU-3-F | 5.00% |
| CC-3-V | 40.00% |
| CC-3-V1 | 4.50% |
| CCGU-3-F | 3.50% |
| CCP-30CF$_3$ | 5.50% |
| CCP-V-1 | 10.50% |
| CCQU-3-F | 5.50% |
| CPGU-3-OT | 3.00% |
| PGUQU-4-F | 6.00% |
| PGUQU-5-F | 4.50% |
| PUQU-3-F | 7.00% | is purified using the process according to the invention.

Example 35

A liquid-crystalline mixture, for example for FFS applications, of the composition

| | |
|---|---|
| CC-3-V | 23.50% |
| CC-3-V1 | 9.00% |
| CCGU-3-F | 5.00% |
| CCP-3OCF$_3$ | 8.00% |
| CCP-5OCF$_3$ | 6.00% |
| CCP-V-1 | 12.00% |
| CCP-V2-1 | 5.00% |
| CPGP-4-3 | 3.00% |
| PCH-301 | 5.00% |
| PGP-1-2V | 7.50% |
| PGP-2-2V | 8.00% |
| PUQU-3-F | 8.00% | is purified using the process according to the invention.

Example 36

A liquid-crystalline mixture, for example for IPS applications, of the composition

| | |
|---|---|
| APUQU-2-F | 5.00% |
| APUQU-3-F | 8.00% |
| CC-3-V | 36.00% |
| CC-3-V1 | 5.00% |
| CCP-V-1 | 8.00% |
| CCQU-3-F | 9.50% |
| PGP-2-2V | 3.00% |
| PGUQU-3-F | 4.00% |
| PGUQU-4-F | 8.00% |
| PGUQU-5-F | 5.00% |
| PUQU-3-F | 8.50% | is purified using the process according to the invention.

Example 37

A liquid-crystalline mixture, for example for IPS applications, of the composition

| | |
|---|---|
| APUQU-2-F | 7.00% |
| APUQU-3-F | 7.00% |
| CC-3-2V1 | 4.50% |
| CC-3-V | 32.00% |
| CC-3-V1 | 11.00% |
| CCP-3OCF$_3$ | 7.50% |
| CCP-5OCF$_3$ | 1.50% |
| DGUQU-4-F | 8.00% |
| DPGU-4-F | 5.00% |
| PGUQU-3-F | 3.00% |
| PGUQU-4-F | 8.00% |
| PGUQU-5-F | 2.00% |
| PP-1-2V1 | 2.00% |
| PUQU-3-F | 1.50% | is purified using the process according to the invention.

Example 38

A liquid-crystalline mixture, for example for PS-VA applications, of the composition

| | |
|---|---|
| CCH-23 | 13.97% |
| CCH-34 | 11.98% |
| CCP-3-1 | 2.99% |
| CCY-3-1 | 7.98% |
| CCY-3-O2 | 11.98% |
| CCY-3-O3 | 11.98% |
| CCY-4-O2 | 9.98% |
| CPY-2-O2 | 2.99% |
| CPY-3-O2 | 9.98% |
| PCH-301 | 9.98% |
| PYP-2-3 | 5.99% |
| RM-1 | 0.20% | is purified using the process according to the invention.

Example 39

A liquid-crystalline mixture, for example for FFS applications, of the composition

| | |
|---|---|
| CC-3-V | 29.00% |
| CCY-3-O1 | 3.50% |
| CCY-3-O2 | 9.00% |
| CCY-4-O2 | 9.00% |
| CCY-5-O2 | 3.00% |
| CPY-3-O2 | 9.50% |
| CY-3-O2 | 13.00% |
| CY-5-O2 | 2.00% |
| PY-3-O2 | 10.00% |
| PYP-2-3 | 2.50% |
| CPY-2-O2 | 9.50% | is purified using the process according to the invention and 0.005% of STAB-35 is subsequently added.

Example 40

A liquid-crystalline mixture, for example for PS-IPS applications, of the composition

| | |
|---|---|
| APUQU-2-F | 2.99% |
| APUQU-3-F | 5.99% |
| BCH-2F.F | 2.00% |
| BCH-3F.F | 7.48% |
| CC-3-V | 25.44% |
| CC-3-V1 | 5.98% |
| CCP-V-1 | 12.97% |
| CCP-V2-1 | 5.98% |
| CCQU-3-F | 7.98% |
| CCQU-5-F | 3.98% |
| PGUQU-3-F | 4.99% |
| PPGU-3-F | 0.50% |
| PUQU-3-F | 13.47% |
| RM-35 | 0.25% | is purified using the process according to the invention.

Example 41

A liquid-crystalline mixture, for example for PS-IPS applications, of the composition

| | |
|---|---|
| APUQU-2-F | 2.99% |
| APUQU-3-F | 5.99% |
| BCH-2F.F | 2.00% |
| BCH-3F.F | 7.48% |
| CC-3-V | 25.44% |
| CC-3-V1 | 5.98% |
| CCP-V-1 | 12.97% |
| CCP-V2-1 | 5.99% |
| CCQU-3-F | 7.98% |

-continued

| | |
|---|---|
| CCQU-5-F | 3.98% |
| PGUQU-3-F | 4.98% |
| PPGU-3-F | 0.50% |
| PUQU-3-F | 13.47% |
| RM-41 | 0.25% | is purified using the process according to the invention.

Example 42

A liquid-crystalline mixture, for example for TN applications, of the composition

| | |
|---|---|
| PPGU-3-F | 0.50% |
| PP-1-2V1 | 1.50% |
| PGUQU-4-F | 4.00% |
| PGUQU-3-F | 5.00% |
| PGP-2-5 | 2.00% |
| PGP-2-4 | 5.00% |
| PUQU-3-F | 6.00% |
| PCH-302 | 6.00% |
| CPGP-5-3 | 6.00% |
| CPGP-5-2 | 6.00% |
| CC-3-V | 30.00% |
| BCH-3F.F.F | 12.00% |
| BCH-3F.F | 10.00% |
| PGP-2-3 | 6.00% | is purified using the process according to the invention.

Example 43

A liquid-crystalline mixture, for example for TN-TFT applications, of the composition

| | |
|---|---|
| CC-3-V | 29.00% |
| CCGU-3-F | 4.00% |
| CCG-V-F | 5.00% |
| CCP-2F.F.F | 5.00% |
| CCP-3F.F.F | 8.00% |
| CCPC-33 | 3.00% |
| CCPC-34 | 3.00% |
| CCPC-35 | 1.50% |
| CCP-V-1 | 10.00% |
| CCP-V2-1 | 11.00% |
| CCQU-2-F | 1.50% |
| CCQU-3-F | 8.00% |
| PUQU-3-F | 11.00% | is purified using the process according to the invention.

Example 44

A liquid-crystalline mixture, for example for FFS applications, of the composition

| | |
|---|---|
| BCH-32 | 4.50% |
| CC-3-V | 23.50% |
| CCH-301 | 4.00% |
| CCY-3-O2 | 4.00% |
| CCY-3-O3 | 7.00% |
| CCY-4-O2 | 8.00% |
| CLY-3-O2 | 8.00% |
| CPY-2-O2 | 7.00% |
| CPY-3-O2 | 11.00% |
| CY-3-O2 | 11.00% |
| PY-3-O2 | 12.00% | is purified using the process according to the invention.

Example 45

A liquid-crystalline mixture, for example for IPS applications, of the composition

| | |
|---|---|
| APUQU-2-F | 2.50% |
| APUQU-3-F | 4.50% |
| CC-3-V | 42.00% |
| CCGU-3-F | 4.00% |
| CCP-3OCF$_3$ | 5.00% |
| CCP-3-1 | 3.00% |
| CCP-V-1 | 10.00% |
| CCP-V2-1 | 2.50% |
| CCQU-3-F | 6.00% |
| CPGU-3-OT | 5.00% |
| PGUQU-3-F | 4.50% |
| PGUQU-4-F | 3.50% |
| PPGU-3-F | 0.50% |
| PUQU-3-F | 7.00% | is purified using the process according to the invention.

Example 46

A liquid-crystalline mixture, for example for IPS applications, of the composition

| | |
|---|---|
| BCH-32 | 2.99% |
| CCH-303 | 1.49% |
| CCH-34 | 12.93% |
| CCH-501 | 5.97% |
| CCY-2-1 | 5.97% |
| CCY-3-1 | 5.97% |
| CCY-3-O2 | 5.97% |
| CCY-3-O3 | 5.97% |
| CCY-4-O2 | 5.97% |
| CCY-5-O2 | 2.99% |
| CPY-2-O2 | 6.97% |
| CPY-3-O2 | 6.97% |
| CY-3-O2 | 14.93% |
| CY-5-O2 | 9.46% |
| PCH-302 | 4.98% |
| RM-41 | 0.30% |
| S-4011 | 0.17% | is purified using the process according to the invention.

Example 47

A liquid-crystalline mixture, for example for PM-VA applications, of the composition

| | |
|---|---|
| CPY-3-O2 | 8.00% |
| CPY-2-O2 | 8.00% |
| CH-43 | 3.00% |
| CH-35 | 3.00% |
| CH-33 | 3.00% |
| CCY-5-O2 | 5.50% |
| CCY-4-O2 | 6.50% |
| CCY-3-O3 | 6.50% |
| CCY-3-O2 | 6.50% |
| CCPC-35 | 5.00% |
| CCPC-34 | 5.00% |
| CCPC-33 | 5.00% |
| CC-4-V | 4.50% |
| CY-3-O4 | 15.50% |
| Y-4O-O4 | 15.00% | is purified using the process according to the invention.

Example 48

A liquid-crystalline mixture, for example for PS-FFS applications, of the composition

| | |
|---|---|
| APUQU-2-F | 2.49% |
| APUQU-3-F | 6.98% |
| CC-3-V | 24.94% |
| CC-3-V1 | 7.98% |
| CCGU-3-F | 3.49% |
| CCP-30CF$_3$ | 4.99% |
| CCP-V-1 | 5.99% |
| CCP-V2-1 | 13.97% |
| CCQU-3-F | 9.98% |
| PCH-302 | 6.48% |
| PGUQU-3-F | 3.99% |
| PGUQU-4-F | 3.99% |
| PPGU-3-F | 0.49% |
| PUQU-3-F | 3.99% |
| RM-41 | 0.25% | is purified using the process according to the invention.

Example 49

A liquid-crystalline mixture, for example for FFS applications, of the composition

| | |
|---|---|
| APUQU-2-F | 3.50% |
| APUQU-3-F | 6.00% |
| CC-3-V | 45.50% |
| CCP-30CF$_3$ | 5.00% |
| CCP-3-1 | 3.00% |
| CCP-V2-1 | 8.50% |
| CPGU-3-OT | 6.00% |
| PGUQU-3-F | 5.00% |
| PGUQU-4-F | 5.00% |
| PPGU-3-F | 0.50% |
| PUQU-3-F | 12.00% | is purified using the process according to the invention.

Example 50

A liquid-crystalline mixture, for example for FFS applications, of the composition

| | |
|---|---|
| APUQU-2-F | 4.00% |
| APUQU-3-F | 6.00% |
| CC-3-V | 45.00% |
| CCP-20CF$_3$ | 4.00% |
| CCP-30CF$_3$ | 4.00% |
| CCP-40CF$_3$ | 2.50% |
| CPGP-5-2 | 7.00% |
| CPGP-5-3 | 7.00% |
| PGP-2-3 | 5.50% |
| PGP-2-4 | 5.00% |
| PPGU-3-F | 0.50% |
| PUQU-3-F | 9.50% | is purified using the process according to the invention.

Example 51

A liquid-crystalline mixture, for example for TN applications, of the composition

| | |
|---|---|
| CC-3-V | 49.50% |
| CCP-3-1 | 1.50% |
| CCP-V-1 | 6.00% |
| CPGU-3-OT | 7.00% |
| PGP-2-3 | 8.50% |
| PGP-2-4 | 5.50% |
| PGUQU-3-F | 7.00% |
| PGUQU-4-F | 4.00% |
| PP-1-2V1 | 2.50% |
| PPGU-3-F | 0.50% |
| PUQU-3-F | 8.00% | is purified using the process according to the invention.

Example 52

A liquid-crystalline mixture, for example for PA-VA applications, of the composition

| | |
|---|---|
| BCH-32 | 6.00% |
| CCH-23 | 18.00% |
| CCH-34 | 8.00% |
| CCP-3-1 | 12.00% |
| CCP-3-3 | 3.00% |
| CCY-3-O2 | 6.00% |
| CPY-2-O2 | 6.00% |
| CPY-3-O2 | 7.00% |
| CY-3-O2 | 14.00% |
| CY-3-O4 | 8.00% |
| CY-5-O2 | 9.00% |
| PYP-2-3 | 3.00% | is purified using the process according to the invention.

Example 53

A liquid-crystalline mixture, for example for FFS applications, of the composition

| | |
|---|---|
| CCQU-3-F | 8.00% |
| CCP-V2-1 | 7.00% |
| CCP-V-1 | 10.00% |
| CC-3-V | 32.50% |
| PGP-2-2V | 10.00% |
| PUQU-3-F | 12.50% |
| PGUQU-5-F | 4.00% |
| PGUQU-4-F | 5.00% |
| PGUQU-3-F | 5.00% |
| APUQU-3-F | 6.00% | is purified using the process according to the invention.

Example 54

A liquid-crystalline mixture, for example for FFS applications, of the composition

| | |
|---|---|
| APUQU-3-F | 1.00% |
| BCH-3F.F.F | 17.00% |
| CC-3-V | 35.00% |
| CC-3-V1 | 6.00% |
| CCP-3F.F.F | 2.50% |
| CCP-V-1 | 12.00% |
| CCP-V2-1 | 8.50% |
| CPGP-5-2 | 3.00% |
| CPGP-5-3 | 2.50% |
| DPGU-4-F | 4.00% |
| PGUQU-3-F | 4.00% |
| PGUQU-4-F | 2.00% |

-continued

| | |
|---|---|
| PGUQU-5-F | 2.00% |
| PPGU-3-F | 0.50% | is purified using the process according to the invention.

Example 55

A liquid-crystalline mixture, for example for PM-VA applications, of the composition

| | |
|---|---|
| CH-35 | 3.00% |
| CH-43 | 3.00% |
| CLY-3-O2 | 3.25% |
| CPY-2-O2 | 10.00% |
| CY-3-O2 | 15.00% |
| CH-33 | 3.00% |
| CCY-5-O2 | 4.00% |
| CCY-4-O2 | 6.00% |
| CCY-3-O3 | 6.00% |
| CCY-3-O2 | 6.00% |
| CCY-3-1 | 2.00% |
| CCY-2-1 | 8.75% |
| CY-3-O4 | 20.00% |
| CCPC-33 | 3.75% |
| CCH-34 | 4.75% |
| CCPC-34 | 1.50% | is purified using the process according to the invention.

Example 56

A liquid-crystalline mixture, for example for PS-FFS applications, of the composition

| | |
|---|---|
| APUQU-3-F | 5.99% |
| BCH-3F.F | 5.49% |
| CC-3-V | 24.94% |
| CC-3-V1 | 7.98% |
| CCGU-3-F | 5.98% |
| CCP-30CF$_3$ | 2.99% |
| CCP-V-1 | 16.96% |
| CCP-V2-1 | 13.96% |
| CCQU-3-F | 2.49% |
| CCQU-5-F | 4.99% |
| PGUQU-4-F | 4.49% |
| PPGU-3-F | 0.50% |
| PUQU-3-F | 2.99% |
| RM-41 | 0.25% | is purified using the process according to the invention.

The following mixtures are likewise purified using the process according to the invention:

Example 57

| | | | |
|---|---|---|---|
| CY-3-O4 | 14.00% | Clearing point [° C.]: | 106.0 |
| CCY-3-O2 | 8.00% | Δn [589 nm, 20° C.]: | 0.1597 |
| CCY-4-O2 | 7.00% | $\epsilon_\parallel$ [1 kHz, 20° C.]: | 3.9 |
| CCY-3-O3 | 6.00% | $\epsilon_\perp$ [1 kHz, 20° C.]: | 8.5 |
| CCY-5-O2 | 5.00% | Δε [1 kHz, 20° C.]: | −4.6 |
| CPY-2-O2 | 10.00% | $K_1$ [pN, 20° C.]: | 16.6 |
| CPY-3-O2 | 8.00% | $K_3$ [pN, 20° C.]: | 17.6 |
| PYP-2-3 | 14.00% | $V_0$ [20° C., V]: | 2.08 |
| PYP-2-4 | 14.00% | $\gamma_1$ [mPa · s, 20° C.]: | 316 |
| CCH-301 | 8.00% | | |
| PGP-2-3 | 6.00% | | |

Example 57a

The mixture according to Example 57 additionally comprises 0.025% of STAB-35.

Example 58

| | | | |
|---|---|---|---|
| CY-3-O2 | 13.00% | Clearing point [° C.]: | 111 |
| CY-5-O2 | 9.00% | | |
| CY-5-O4 | 8.00% | | |
| CCY-3-O2 | 6.00% | | |
| CCY-3-O3 | 5.00% | | |
| CCY-4-O2 | 5.00% | | |
| CCY-5-O2 | 3.50% | | |
| CPY-2-O2 | 7.00% | | |
| CPY-3-O2 | 3.00% | | |
| CCH-34 | 17.50% | | |
| CCP-3-1 | 4.50% | | |
| CH-35 | 3.00% | | |
| CH-43 | 3.00% | | |
| CH-45 | 0.50% | | |
| CCPC-33 | 3.00% | | |
| CCPC-34 | 3.00% | | |
| CCPC-35 | 3.00% | | |

Example 59

| | | | |
|---|---|---|---|
| CC-3-V | 37.00% | Clearing point [° C.]: | 75.2 |
| CCY-3-O1 | 5.00% | Δn [589 nm, 20° C.]: | 0.1014 |
| CCY-3-O2 | 5.00% | Δε [1 kHz, 20° C.]: | −3.7 |
| CCY-4-O2 | 4.00% | $\epsilon_\parallel$ [1 kHz, 20° C.]: | 3.7 |
| CLY-3-O2 | 7.00% | $\epsilon_\perp$ [1 kHz, 20° C.]: | 7.4 |
| CPY-2-O2 | 9.00% | $K_1$ [pN, 20° C.]: | 13.2 |
| CPY-3-O2 | 10.00% | $K_3$ [pN, 20° C.]: | 15.2 |
| CY-3-O2 | 11.50% | $V_0$ [20° C., V]: | 2.13 |
| PY-3-O2 | 11.50% | | |

Example 60

| | | | |
|---|---|---|---|
| CC-3-V | 40.00% | Clearing point [° C.]: | 100.3 |
| CC-3-V1 | 5.00% | Δn [589 nm, 20° C.]: | 0.1059 |
| CCP-30CF3 | 4.00% | Δε [1 kHz, 20° C.]: | 3.9 |
| CCP-V-1 | 13.00% | $\epsilon_\parallel$ [1 kHz, 20° C.]: | 6.7 |
| CCP-V2-1 | 4.00% | $\epsilon_\perp$ [1 kHz, 20° C.]: | 2.8 |
| CCVC-3-V | 4.00% | $K_1$ [pN, 20° C.]: | 14.9 |
| CDUQU-3-F | 2.00% | $K_3$ [pN, 20° C.]: | 17.0 |
| CPGP-5-2 | 5.00% | $V_0$ [20° C., V]: | 2.07 |
| CPGP-5-3 | 1.50% | $\gamma_1$ [mPa · s, 20° C.]: | 74 |
| DGUQU-4-F | 2.00% | | |
| DPGU-4-F | 3.00% | | |
| PGP-2-3 | 4.00% | | |
| PGP-2-4 | 4.00% | | |
| PPGU-3-F | 0.50% | | |
| PUQU-3-F | 8.00% | | |

Example 61

| | | | |
|---|---|---|---|
| CY-3-O4 | 23.00% | Clearing point [° C.]: | 71.3 |
| CCY-3-O1 | 6.00% | Δn [589 nm, 20° C.]: | 0.1197 |
| CCY-3-O2 | 6.00% | Δε [1 kHz, 20° C.]: | −7.0 |
| CCY-3-O3 | 7.00% | $\epsilon_\parallel$ [1 kHz, 20° C.]: | 5.0 |
| CCY-4-O2 | 7.00% | $\epsilon_\perp$ [1 kHz, 20° C.]: | 12.0 |
| CCY-5-O2 | 5.00% | $K_1$ [pN, 20° C.]: | 11.7 |
| CPY-2-O2 | 8.00% | $K_3$ [pN, 20° C.]: | 13.2 |

-continued

| | | | |
|---|---|---|---|
| CPY-3-O2 | 10.00% | $V_0$ [20° C., V]: | 1.44 |
| CCY-2-1 | 3.50% | $\gamma_1$ [mPa·s, 20° C.]: | 246 |
| PYP-2-4 | 8.50% | | |
| PY-1-O4 | 8.00% | | |
| Y-4O-O4 | 8.00% | | |

Example 62

| | | | |
|---|---|---|---|
| PUQU-3-F | 9.00% | Clearing point [° C.]: | 75.9 |
| PGUQU-3-F | 7.00% | $\Delta n$ [589 nm, 20° C.]: | 0.1131 |
| PGUQU-4-F | 5.00% | $\Delta\epsilon$ [1 kHz, 20° C.]: | 6.1 |
| CPGU-3-OT | 4.50% | $K_1$ [pN, 20° C.]: | 11.9 |
| PPGU-3-F | 0.50% | $K_3$ [pN, 20° C.]: | 13.6 |
| CDUQU-3-F | 0.05% | $V_0$ [20° C.]: | 1.14 |
| CC-3-V | 49.95% | $\gamma_1$ [mPa·s, 20° C.]: | 57 |
| CCP-V-1 | 12.00% | | |
| PGP-2-3 | 8.00% | | |
| PGP-2-4 | 4.00% | | |

Example 63

| | | | |
|---|---|---|---|
| PUQU-3-F | 8.00% | Clearing point [° C.]: | 75.4 |
| PGUQU-3-F | 7.00% | $\Delta n$ [589 nm, 20° C.]: | 0.1191 |
| PGUQU-4-F | 4.00% | $\Delta\epsilon$ [1 kHz, 20° C.]: | 6.1 |
| PPGU-3-F | 0.50% | $K_1$ [pN, 20° C.]: | 12.6 |
| CPGU-3-OT | 7.00% | $K_3$ [pN, 20° C.]: | 12.5 |
| CC-3-V | 49.50% | $V_0$ [20° C., V]: | 1.52 |
| CCP-3-1 | 1.50% | $\gamma_1$ [mPa·s, 20° C.]: | 57 |
| CCP-V-1 | 6.00% | | |
| PP-1-2V1 | 2.50% | | |
| PGP-2-3 | 8.50% | | |
| PGP-2-4 | 5.50% | | |

Example 64

| | | | |
|---|---|---|---|
| CY-3-O4 | 12.00% | Clearing point [° C.]: | 102.5 |
| CY-5-O4 | 12.00% | $\Delta n$ [589 nm, 20° C.]: | 0.1605 |
| CCY-3-O2 | 8.00% | $\Delta\epsilon$ [1 kHz, 20° C.]: | −5.6 |
| CCY-4-O2 | 7.00% | $\epsilon_\parallel$ [1 kHz, 20° C.]: | 4.0 |
| CCY-3-O3 | 7.00% | $\epsilon_\perp$ [1 kHz, 20° C.]: | 9.6 |
| CPY-2-O2 | 12.00% | $K_1$ [pN, 20° C.]: | 16.9 |
| CPY-3-O2 | 12.00% | $K_3$ [pN, 20° C.]: | 17.1 |
| PYP-2-3 | 15.00% | $V_0$ [V, 20° C.]: | 1.84 |
| PYP-2-4 | 15.00% | $\gamma_1$ [mPa·s, 20° C.]: | 401 |

Example 65

| | | | |
|---|---|---|---|
| BCH-32 | 8.00% | Clearing point [° C.]: | 80.6 |
| CC-3-V | 28.00% | $\Delta n$ [589 nm, 20° C.]: | 0.1194 |
| CCY-3-O1 | 5.00% | $\Delta\epsilon$ [1 kHz, 20° C.]: | −3.9 |
| CCY-3-O2 | 6.00% | $\epsilon_\parallel$ [1 kHz, 20° C.]: | 4.0 |
| CLY-3-O2 | 8.00% | $\epsilon_\perp$ [1 kHz, 20° C.]: | 7.9 |
| CPY-2-O2 | 10.00% | $K_1$ [pN, 20° C.]: | 13.0 |
| CPY-3-O2 | 10.00% | $K_3$ [pN, 20° C.]: | 14.0 |
| PGIY-2-O4 | 8.00% | $V_0$ [20° C.]: | 2.0 |
| PY-3-O2 | 9.00% | $\gamma_1$ [mPa·s, 20° C.]: | 120 |
| Y-4O-O4 | 8.00% | | |

Example 66

| | | | |
|---|---|---|---|
| CY-3-O2 | 15.00% | Clearing point [° C.]: | 80.1 |
| CY-5-O2 | 7.00% | $\Delta n$ [589 nm, 20° C.]: | 0.1026 |
| CCY-3-O1 | 4.00% | $\Delta\epsilon$ [1 kHz, 20° C.]: | −3.5 |
| CCY-3-O2 | 2.00% | $\epsilon_\parallel$ [1 kHz, 20° C.]: | 3.5 |
| CCY-3-O3 | 6.00% | $\epsilon_\perp$ [1 kHz, 20° C.]: | 7.0 |
| CCY-4-O2 | 6.00% | $K_1$ [pN, 20° C.]: | 13.9 |
| CPY-2-O2 | 8.00% | $K_3$ [pN, 20° C.]: | 13.8 |
| CPY-3-O2 | 8.00% | $V_0$ [20° C.]: | 2.11 |
| PYP-2-4 | 6.50% | $\gamma_1$ [mPa·s, 20° C.]: | 132 |
| CCH-23 | 15.00% | | |
| CCH-34 | 5.00% | | |
| CCH-35 | 4.00% | | |
| CCH-301 | 6.00% | | |
| BCH-32 | 7.50% | | |

Example 67

| | | | |
|---|---|---|---|
| APUQU-2-F | 3.00% | Clearing point [° C.]: | 100.1 |
| APUQU-3-F | 2.50% | $\Delta n$ [589 nm, 20° C.]: | 0.1046 |
| CC-3-2V1 | 3.00% | | |
| CC-3-V | 37.00% | | |
| CC-3-V1 | 5.00% | | |
| CCP-V-1 | 13.00% | | |
| CCP-V2-1 | 7.50% | | |
| CCVC-3-V | 5.00% | | |
| CDUQU-3-F | 2.00% | | |
| CPGP-5-2 | 4.00% | | |
| DGUQU-4-F | 2.00% | | |
| PGP-2-3 | 5.00% | | |
| PGP-2-4 | 4.50% | | |
| PPGU-3-F | 0.50% | | |
| PUQU-3-F | 6.00% | | |

Example 68

| | | | |
|---|---|---|---|
| PCH-3 | 6.00% | Clearing point [° C.]: | 86.0 |
| CC-5-V | 20.00% | $\Delta n$ [589 nm, 20° C.]: | 0.1612 |
| PCH-301 | 14.00% | $\Delta\epsilon$ [1 kHz, 20° C.]: | 1.8 |
| PCH-302 | 15.00% | $\epsilon_\parallel$ [1 kHz, 20° C.]: | 4.7 |
| PPTUI-3-2 | 15.00% | $\epsilon_\perp$ [1 kHz, 20° C.]: | 2.9 |
| PPTUI-3-4 | 15.00% | | |
| CCP-V-1 | 8.00% | | |
| CCP-V2-1 | 7.00% | | |

Example 68a

The mixture according to Example 68 additionally comprises 2% of R-5011.

Example 69

| | | | |
|---|---|---|---|
| CY-3-O4 | 13.00% | Clearing point [° C.]: | 92.0 |
| CC-4-V | 17.00% | $\Delta n$ [589 nm, 20° C.]: | 0.1598 |
| CC-3-V1 | 8.00% | $\Delta\epsilon$ [1 kHz, 20° C.]: | −1.9 |
| CCP-V-1 | 12.00% | $\epsilon_\parallel$ [1 kHz, 20° C.]: | 3.4 |
| CCP-V2-1 | 12.00% | $\epsilon_\perp$ [1 kHz, 20° C.]: | 5.3 |
| PPTUI-3-2 | 10.00% | | |
| PTP-302FF | 10.00% | | |
| PTP-502FF | 10.00% | | |
| CPTP-302FF | 4.00% | | |
| CPTP-502FF | 4.00% | | |

Example 70

| | | | |
|---|---|---|---|
| CY-3-O4 | 12.50% | Clearing point [° C.]: | 75.4 |
| CY-5-O2 | 10.00% | Δn [589 nm, 20° C.]: | 0.1077 |
| CCY-3-O1 | 4.50% | Δε [1 kHz, 20° C.]: | −3.2 |
| CCY-3-O2 | 6.00% | $\epsilon_\parallel$ [1 kHz, 20° C.]: | 3.5 |
| CLY-3-O2 | 7.00% | $\epsilon_\perp$ [1 kHz, 20° C.]: | 6.7 |
| CPY-2-O2 | 10.00% | $V_0$ [20° C.]: | 2.30 |
| CPY-3-O2 | 10.00% | $\gamma_1$ [mPa · s, 20° C.]: | 112.9 |
| CC-3-V | 27.40% | | |
| BCH-32 | 3.50% | | |
| PP-1-2V1 | 9.00% | | |
| CDUQU-3-F | 0.10% | | |

Example 71

| | | | |
|---|---|---|---|
| CY-3-O2 | 15.00% | Clearing point [° C.]: | 75.8 |
| CY-3-O4 | 2.50% | Δn [589 nm, 20° C.]: | 0.1021 |
| CY-5-O2 | 10.00% | Δε [1 kHz, 20° C.]: | −3.2 |
| CCY-3-O1 | 5.00% | $\epsilon_\parallel$ [1 kHz, 20° C.]: | 3.6 |
| CCY-4-O2 | 5.00% | $\epsilon_\perp$ [1 kHz, 20° C.]: | 6.8 |
| CPY-2-O2 | 7.00% | $K_1$ [pN, 20° C.]: | 13.4 |
| CPY-3-O2 | 7.00% | $K_3$ [pN, 20° C.]: | 13.5 |
| CCY-2-1 | 6.00% | $V_0$ [20° C.]: | 2.14 |
| CCY-3-1 | 6.00% | $\gamma_1$ [mPa · s, 20° C.]: | 128 |
| CCH-23 | 15.50% | | |
| CCH-34 | 5.00% | | |
| BCH-32 | 13.00% | | |
| PP-1-4 | 3.00% | | |

Example 72

| | | | |
|---|---|---|---|
| CC-3-V | 33.00% | Clearing point [° C.]: | 80.2 |
| CCY-3-O1 | 6.00% | Δn [589 nm, 20° C.]: | 0.1116 |
| CCY-3-O2 | 8.00% | Δε [1 kHz, 20° C.]: | −4.1 |
| CCY-4-O2 | 2.50% | $\epsilon_\parallel$ [1 kHz, 20° C.]: | 3.7 |
| CPY-2-O2 | 8.00% | $\epsilon_\perp$ [1 kHz, 20° C.]: | 7.8 |
| CPY-3-O2 | 12.00% | $K_1$ [pN, 20° C.]: | 14.5 |
| CLY-3-O2 | 8.00% | $K_3$ [pN, 20° C.]: | 16.1 |
| PY-1-O4 | 1.50% | $V_0$ [20° C.]: | 2.09 |
| PY-3-O2 | 10.00% | $\gamma_1$ [mPa · s, 20° C.]: | 119 |
| PY-4-O2 | 8.00% | | |
| CY-3-O2 | 3.00% | | |

Example 73

| | | | |
|---|---|---|---|
| BCH-32 | 2.00% | Clearing point [° C.]: | 79.7 |
| BCH-52 | 2.50% | Δn [589 nm, 20° C.]: | 0.1036 |
| CCY-2-1 | 9.50% | Δε [1 kHz, 20° C.]: | −3.7 |
| CCY-3-1 | 9.50% | $\epsilon_\parallel$ [1 kHz, 20° C.]: | 4.8 |
| CCY-3-O2 | 10.00% | $\epsilon_\perp$ [1 kHz, 20° C.]: | 8.5 |
| CCY-5-O2 | 10.00% | $K_1$ [pN, 20° C.]: | 13.9 |
| CPY-2-O2 | 12.00% | $K_3$ [pN, 20° C.]: | 14.1 |
| CY-3-O4 | 15.00% | $V_0$ [20° C.]: | 2.06 |
| CY-5-O4 | 15.50% | | |
| PCH-53 | 10.50% | | |
| APUQU-3-F | 3.50% | | |

Example 74

| | | | |
|---|---|---|---|
| BCH-32 | 0.50% | Clearing point [° C.]: | 79.2 |
| BCH-52 | 0.50% | Δn [589 nm, 20° C.]: | 0.1037 |
| CCY-2-1 | 5.00% | Δε [1 kHz, 20° C.]: | −3.8 |
| CCY-3-1 | 5.00% | $\epsilon_\parallel$ [1 kHz, 20° C.]: | 6.2 |
| CCY-3-O2 | 13.00% | $\epsilon_\perp$ [1 kHz, 20° C.]: | 10.0 |
| CCY-5-O2 | 13.00% | $K_1$ [pN, 20° C.]: | 14.8 |
| CPY-2-O2 | 12.00% | $K_3$ [pN, 20° C.]: | 14.5 |
| CY-3-O4 | 19.50% | $V_0$ [20° C.]: | 2.12 |
| CY-5-O4 | 19.50% | | |
| PCH-53 | 5.00% | | |
| APUQU-3-F | 7.00% | | |

Example 75

| | | | |
|---|---|---|---|
| CY-3-O2 | 27.50% | Clearing point [° C.]: | 80.0 |
| CCY-4-O2 | 26.50% | Δn [589 nm, 20° C.]: | 0.0911 |
| CPY-3-O2 | 13.50% | Δε [1 kHz, 20° C.]: | −3.6 |
| CC-3-V | 25.00% | $\epsilon_\parallel$ [1 kHz, 20° C.]: | 4.4 |
| CCH-34 | 5.00% | $\epsilon_\perp$ [1 kHz, 20° C.]: | 8.1 |
| APUQU-3-F | 2.50% | | |

Example 76

| | | | |
|---|---|---|---|
| APUQU-3-F | 7.00% | Clearing point [° C.]: | 88.0 |
| CC-3-V | 35.00% | Δn [589 nm, 20° C.]: | 0.1150 |
| CC-3-V1 | 5.00% | Δε [1 kHz, 20° C.]: | −2.2 |
| CCP-30CF$_3$ | 5.00% | $\epsilon_\parallel$ [1 kHz, 20° C.]: | 1.0 |
| CCP-V-1 | 12.00% | $\epsilon_\perp$ [1 kHz, 20° C.]: | 3.1 |
| CPGP-5-2 | 1.00% | $K_1$ [pN, 20° C.]: | 14.3 |
| DPGU-4-F | 8.00% | $K_3$ [pN, 20° C.]: | 14.7 |
| PGP-2-2V | 12.00% | $V_0$ [20° C.]: | 1.53 |
| PUQU-3-F | 10.00% | $\gamma_1$ [mPa · s, 20° C.]: | 66 |
| CC-2-V1 | 5.00% | | |

Example 77

| | | | |
|---|---|---|---|
| BCH-32 | 6.00% | Clearing point [° C.]: | 101.6 |
| CC-3-V | 39.50% | Δn [589 nm, 20° C.]: | 0.1111 |
| CCP-3-1 | 6.50% | Δε [1 kHz, 20° C.]: | 6.9 |
| CCP-30CF$_3$ | 1.00% | $K_1$ [pN, 20° C.]: | 15.3 |
| CCP-V-1 | 16.00% | $K_3$ [pN, 20° C.]: | 17.3 |
| CDUQU-3-F | 9.50% | $V_0$ [20° C.]: | 1.57 |
| CPGP-5-2 | 3.00% | $\gamma_1$ [mPa · s, 20° C.]: | 89 |
| CPGP-5-3 | 1.00% | LTS [bulk, −30° C.]: | >1000 h |
| PGU-2-F | 7.50% | | |
| PGUQU-3-F | 3.50% | | |
| PGUQU-4-F | 2.00% | | |
| PGUQU-5-F | 3.50% | | |
| PPGU-3-F | 1.00% | | |

Example 78

| | | | |
|---|---|---|---|
| BCH-32 | 5.00% | Clearing point [° C.]: | 102.5 |
| CC-3-V | 35.00% | Δn [589 nm, 20° C.]: | 0.1207 |
| CC-3-V1 | 5.00% | Δε [1 kHz, 20° C.]: | 7.3 |
| CCP-V-1 | 15.00% | $K_1$ [pN, 20° C.]: | 15.2 |
| CDUQU-3-F | 8.00% | $K_3$ [pN, 20° C.]: | 16.6 |
| CPGP-4-3 | 3.00% | $V_0$ [20° C.]: | 1.53 |
| CPGP-5-2 | 3.00% | $\gamma_1$ [mPa · s, 20° C.]: | 96 |
| CPGP-5-3 | 3.00% | LTS [bulk, −30° C.]: | >1000 h |
| CPGU-3-OT | 4.50% | | |

-continued

| | | | | |
|---|---|---|---|---|
| PGU-2-F | 5.50% | | | |
| PGU-3-F | 5.50% | | | |
| PGUQU-3-F | 2.50% | | | |
| PPGU-3-F | 0.50% | | | |
| PUQU-3-F | 4.50% | | | |

Example 79

| | | | | |
|---|---|---|---|---|
| BCH-32 | 6.00% | Clearing point [° C.]: | 101 |
| CC-3-V | 34.50% | Δn [589 nm, 20° C.]: | 0.1210 |
| CC-3-V1 | 6.00% | Δε [1 kHz, 20° C.]: | 7.3 |
| CCP-V-1 | 15.00% | $K_1$ [pN, 20° C.]: | 15.1 |
| CDUQU-3-F | 6.50% | $K_3$ [pN, 20° C.]: | 16.5 |
| CPGP-4-3 | 3.00% | $\gamma_1$ [mPa·s, 20° C.]: | 92 |
| CPGP-5-2 | 3.00% | LTS [bulk, −30° C.]: | >1000 h |
| CPGP-5-3 | 1.50% | | |
| CPGU-3-OT | 5.00% | | |
| PGU-2-F | 5.50% | | |
| PGU-3-F | 4.50% | | |
| PGUQU-3-F | 4.00% | | |
| PPGU-3-F | 0.50% | | |
| PUQU-3-F | 5.00% | | |

Example 80

| | | | | |
|---|---|---|---|---|
| APUQU-3-F | 5.00% | Clearing point [° C.]: | 104.4 |
| BCH-3F.F | 2.50% | Δn [589 nm, 20° C.]: | 0.0947 |
| CC-3-V | 40.00% | Δε [1 kHz, 20° C.]: | 7.2 |
| CCGU-3-F | 6.00% | $K_1$ [pN, 20° C.]: | 15.5 |
| CCP-3-1 | 2.50% | $K_3$ [pN, 20° C.]: | 18.3 |
| CCP-30CF$_3$ | 7.00% | $V_0$ [20° C.]: | 1.55 |
| CCP-V-1 | 12.00% | $\gamma_1$ [mPa·s, 20° C.]: | 93 |
| CCP-V2-1 | 6.00% | | |
| CDUQU-3-F | 10.00% | | |
| CPGP-5-2 | 2.00% | | |
| DPGU-4-F | 2.50% | | |
| PPGU-3-F | 0.50% | | |
| PUQU-3-F | 4.00% | | |

Example 81

| | | | | |
|---|---|---|---|---|
| APUQU-3-F | 5.00% | Clearing point [° C.]: | 104.5 |
| CC-3-V | 39.00% | Δn [589 nm, 20° C.]: | 0.0942 |
| CCGU-3-F | 10.00% | Δε [1 kHz, 20° C.]: | 7.2 |
| CCP-3-1 | 3.00% | $K_1$ [pN, 20° C.]: | 15.3 |
| CCP-30CF$_3$ | 7.50% | $K_3$ [pN, 20° C.]: | 18.5 |
| CCP-V-1 | 13.00% | $V_0$ [20° C.]: | 1.54 |
| CCP-V2-1 | 5.00% | $\gamma_1$ [mPa·s, 20° C.]: | 94 |
| CDUQU-3-F | 8.00% | | |
| CPGP-5-2 | 2.00% | | |
| PPGU-3-F | 0.50% | | |
| PUQU-3-F | 7.00% | | |

Example 82

| | | | | |
|---|---|---|---|---|
| APUQU-3-F | 5.00% | Clearing point [° C.]: | 104.5 |
| CC-3-V | 34.50% | Δn [589 nm, 20° C.]: | 0.0940 |
| CC-3-V1 | 4.50% | Δε [1 kHz, 20° C.]: | 7.3 |
| CCGU-3-F | 10.00% | $K_1$ [pN, 20° C.]: | 15.5 |
| CCP-3-1 | 3.00% | $K_3$ [pN, 20° C.]: | 18.7 |
| CCP-30CF$_3$ | 7.50% | $V_0$ [20° C.]: | 1.54 |
| CCP-V-1 | 11.50% | $\gamma_1$ [mPa·s, 20° C.]: | 97 |
| CCP-V2-1 | 4.00% | | |
| CCQU-3-F | 4.00% | | |
| CDUQU-3-F | 6.50% | | |
| CPGP-5-2 | 2.00% | | |
| PPGU-3-F | 0.50% | | |
| PUQU-3-F | 7.00% | | |

Example 83

| | | | | |
|---|---|---|---|---|
| BCH-3F.F.F | 12.00% | Clearing point [° C.]: | 101.2 |
| CC-3-V | 8.00% | Δn [589 nm, 20° C.]: | 0.1079 |
| CC-3-V1 | 9.00% | Δε [1 kHz, 20° C.]: | 6.8 |
| CC-4-V | 10.00% | $K_1$ [pN, 20° C.]: | 14.2 |
| CCGU-3-F | 4.00% | $K_3$ [pN, 20° C.]: | 17.0 |
| CCP-1F.F.F | 4.50% | $V_0$ [20° C.]: | 1.53 |
| CCP-30CF$_3$ | 8.00% | $\gamma_1$ [mPa·s, 20° C.]: | 100 |
| CCP-3F.F.F | 8.00% | | |
| CCP-V-1 | 13.00% | | |
| CCP-V2-1 | 6.00% | | |
| CPGP-5-2 | 3.00% | | |
| CPGU-3-OT | 1.50% | | |
| PGP-2-2V | 3.00% | | |
| PPGU-3-F | 1.00% | | |
| PUQU-3-F | 9.00% | | |

Example 84

| | | | | |
|---|---|---|---|---|
| APUQU-2-F | 5.50% | Clearing point [° C.]: | 80.5 |
| APUQU-3-F | 3.00% | Δn [589 nm, 20° C.]: | 0.1017 |
| CC-3-V | 36.00% | Δε [1 kHz, 20° C.]: | 9.2 |
| CC-3-V1 | 6.50% | $\epsilon_\parallel$ [1 kHz, 20° C.]: | 12.9 |
| CCP-30CF$_3$ | 8.00% | $\epsilon_\perp$ [1 kHz, 20° C.]: | 3.7 |
| CCP-V-1 | 11.50% | $K_1$ [pN, 20° C.]: | 11.8 |
| CDUQU-3-F | 5.00% | $K_3$ [pN, 20° C.]: | 12.8 |
| DPGU-4-F | 5.50% | $V_0$ [20° C.]: | 1.20 |
| PGP-2-2V | 2.00% | $\gamma_1$ [mPa·s, 20° C.]: | 53 |
| PGU-2-F | 7.50% | | |
| PUQU-3-F | 9.50% | | |

Example 84a

The mixture according to Example 84 additionally comprises 0.4% of RM-1.

Example 85

| | | | | |
|---|---|---|---|---|
| BCH-32 | 3.00% | Clearing point [° C.]: | 109.8 |
| CCH-23 | 15.00% | Δn [589 nm, 20° C.]: | 0.1028 |
| CCH-34 | 3.00% | Δε [1 kHz, 20° C.]: | −3.7 |
| CCH-35 | 7.00% | $\epsilon_\parallel$ [1 kHz, 20° C.]: | 3.3 |
| CCP-3-1 | 7.00% | $\epsilon_\perp$ [1 kHz, 20° C.]: | 7.0 |
| CCY-3-1 | 8.00% | $K_1$ [pN, 20° C.]: | 20.4 |
| CCY-3-O2 | 12.00% | $K_3$ [pN, 20° C.]: | 20.6 |
| CCY-4-O2 | 10.00% | | |
| CCY-5-O2 | 5.50% | | |
| CPY-2-O2 | 5.00% | | |
| CPY-3-O2 | 11.00% | | |
| CY-3-O2 | 8.00% | | |
| PY-3-O2 | 5.50% | | |

Example 86

| | | | |
|---|---|---|---|
| CC-3-V1 | 10.00% | Clearing point [° C.]: | 74.6 |
| CCH-23 | 18.50% | Δn [589 nm, 20° C.]: | 0.1032 |
| CCH-35 | 8.00% | Δε [1 kHz, 20° C.]: | −3.0 |
| CCP-3-1 | 7.00% | $\epsilon_\parallel$ [1 kHz, 20° C.]: | 3.4 |
| CCY-3-O2 | 12.00% | $\epsilon_\perp$ [1 kHz, 20° C.]: | 6.3 |
| CPY-3-O2 | 10.50% | $K_1$ [pN, 20° C.]: | 15.0 |
| CY-3-O2 | 15.50% | $K_3$ [pN, 20° C.]: | 16.1 |
| PY-3-O2 | 10.50% | $V_0$ [20° C.]: | 2.45 |
| PYP-2-3 | 8.00% | $\gamma_1$ [mPa·s, 20° C.]: | 103 |

Example 86a

The mixture from Example 86 additionally comprises 0.001% of Irganox® 1076 (octadecyl 3-(3,5-di-tert-butyl-4-hydroxyphenyl)propionate, BASF) and 0.3% of RM-1.

Example 87

| | | | |
|---|---|---|---|
| CDUQU-3-F | 7.00% | Clearing point [° C.]: | 100 |
| CCP-V-1 | 2.00% | Δn [589 nm, 20° C.]: | 0.0714 |
| CCQU-3-F | 5.00% | Δε [1 kHz, 20° C.]: | 8.3 |
| CCQU-5-F | 5.00% | $\epsilon_\parallel$ [1 kHz, 20° C.]: | 12.0 |
| CCZU-3-F | 13.50% | $\epsilon_\perp$ [1 kHz, 20° C.]: | 3.8 |
| CCZU-5-F | 4.00% | $K_1$ [pN, 20° C.]: | 11.4 |
| PUQU-3-F | 1.00% | $K_3$ [pN, 20° C.]: | 15.8 |
| CC-5-V | 7.00% | $V_0$ [20° C.]: | 1.23 |
| CCG-V-F | 7.50% | $\gamma_1$ [mPa·s, 20° C.]: | 118 |
| CCH-301 | 14.00% | | |
| CCP-2F.F.F | 5.00% | | |
| CCP-3OCF$_3$.F | 7.00% | | |
| CCP-3F.F.F | 7.00% | | |
| CCP-5F.F.F | 7.00% | | |
| CCPC-33 | 1.50% | | |
| CCPC-34 | 2.00% | | |
| CH-33 | 1.50% | | |
| CH-35 | 1.50% | | |
| CH-43 | 1.50% | | |

Example 88

| | | | |
|---|---|---|---|
| APUQU-2-F | 8.00% | Clearing point [° C.]: | 88.9 |
| APUQU-3-F | 8.00% | Δn [589 nm, 20° C.]: | 0.0987 |
| CC-3-V | 30.00% | Δε [1 kHz, 20° C.]: | 5.9 |
| CC-3-V1 | 8.50% | $\epsilon_\parallel$ [1 kHz, 20° C.]: | 8.9 |
| CCP-3-1 | 4.00% | $\epsilon_\perp$ [1 kHz, 20° C.]: | 2.9 |
| CCP-V-1 | 16.00% | $K_1$ [pN, 20° C.]: | 13.4 |
| CCP-V2-1 | 11.00% | $K_3$ [pN, 20° C.]: | 16.1 |
| PP-1-2V1 | 6.00% | $V_0$ [20° C.]: | 1.59 |
| PUQU-3-F | 8.50% | $\gamma_1$ [mPa·s, 20° C.]: | 56 |

Example 89

| | | | |
|---|---|---|---|
| CC-3-V | 28.50% | Clearing point [° C.]: | 74.6 |
| CC-3-V1 | 7.00% | Δn [589 nm, 20° C.]: | 0.1040 |
| CCY-3-O2 | 12.50% | Δε [1 kHz, 20° C.]: | −3.0 |
| CCY-4-O2 | 5.25% | $\epsilon_\parallel$ [1 kHz, 20° C.]: | 3.5 |
| CPY-3-O2 | 9.75% | $\epsilon_\perp$ [1 kHz, 20° C.]: | 6.5 |
| CY-3-O2 | 15.00% | $K_1$ [pN, 20° C.]: | 13.2 |
| CY-3-O4 | 4.75% | $K_3$ [pN, 20° C.]: | 15.5 |
| CY-5-O2 | 1.00% | $V_0$ [20° C.]: | 2.40 |
| PCH-301 | 3.25% | $\gamma_1$ [mPa·s, 20° C.]: | 98 |
| PPGU-3-F | 0.50% | | |
| PYP-2-3 | 12.50% | | |

Example 89a

The mixture from Example 89 additionally comprises 0.001% of Irganox® 1076 (octadecyl 3-(3,5-di-tert-butyl-4-hydroxyphenyl)propionate, BASF) and 0.3% of RM-1.

Example 90

| | | | |
|---|---|---|---|
| CC-3-V | 15.00% | Clearing point [° C.]: | 74.4 |
| CC-3-V1 | 9.00% | Δn [589 nm, 20° C.]: | 0.1086 |
| CCH-23 | 8.00% | Δε [1 kHz, 20° C.]: | −3.2 |
| CCH-34 | 7.50% | $\epsilon_\parallel$ [1 kHz, 20° C.]: | 3.5 |
| CCY-3-O2 | 10.00% | $\epsilon_\perp$ [1 kHz, 20° C.]: | 6.7 |
| CCY-5-O2 | 8.00% | $K_1$ [pN, 20° C.]: | 14.3 |
| CPY-2-O2 | 3.00% | $K_3$ [pN, 20° C.]: | 15.7 |
| CPY-3-O2 | 8.50% | $V_0$ [20° C.]: | 2.33 |
| CY-3-O2 | 7.00% | $\gamma_1$ [mPa·s, 20° C.]: | 102 |
| PY-3-O2 | 16.00% | | |
| PYP-2-3 | 8.00% | | |

Example 90a

The mixture from Example 90 additionally comprises 0.3% of RM-1.

Example 91

| | | | |
|---|---|---|---|
| CC-3-V | 29.00% | Clearing point [° C.]: | 103 |
| CC-3-V1 | 9.00% | Δn [589 nm, 20° C.]: | 0.1176 |
| CC-3-2V1 | 7.00% | Δε [1 kHz, 20° C.]: | 4.8 |
| CCP-V-1 | 7.00% | $\epsilon_\parallel$ [1 kHz, 20° C.]: | 7.6 |
| CCP-V2-1 | 7.50% | $\epsilon_\perp$ [1 kHz, 20° C.]: | 2.9 |
| PP-1-2V1 | 3.00% | $K_1$ [pN, 20° C.]: | 18.0 |
| PGP-1-2V | 4.00% | $K_3$ [pN, 20° C.]: | 19.6 |
| PGP-2-2V | 6.00% | $V_0$ [20° C.]: | 2.04 |
| PGP-3-2V | 4.00% | $\gamma_1$ [mPa·s, 20° C.]: | 82 |
| CCP-3OCF$_3$ | 5.00% | | |
| CCGU-3-F | 4.00% | | |
| PGUQU-4-F | 3.50% | | |
| CDUQU-3-F | 3.00% | | |
| DGUQU-4-F | 4.00% | | |
| CPGU-3-OT | 4.00% | | |

Example 91a

The mixture from Example 91 additionally comprises 0.001% of STAB-35.

Example 92

| | | | |
|---|---|---|---|
| PGUQU-3-F | 8.00% | Clearing point [° C.]: | 82.5 |
| PGUQU-4-F | 9.00% | Δn [589 nm, 20° C.]: | 0.2143 |
| PGUQU-5-F | 9.00% | Δε [1 kHz, 20° C.]: | 65.8 |
| PGU-2-F | 7.00% | $\epsilon_\parallel$ [1 kHz, 20° C.]: | 73.4 |
| PGU-3-F | 8.00% | $\epsilon_\perp$ [1 kHz, 20° C.]: | 7.6 |
| PGP-2-3 | 8.00% | | |
| PGP-2-4 | 8.00% | | |
| ME2N.F | 12.00% | | |
| ME3N.F | 12.00% | | |
| BCH-3F.F | 7.00% | | |
| BCH-5F.F | 7.00% | | |
| DPGU-4-F | 5.00% | | |

Example 93

| | | | |
|---|---|---|---|
| CC-3-V | 10.50% | Clearing point [° C.]: | 100.8 |
| CC-3-V1 | 5.50% | Δn [589 nm, 20° C.]: | 0.0999 |
| CCP-V-1 | 6.50% | Δε [1 kHz, 20° C.]: | 9.1 |
| PUQU-3-F | 7.00% | $\epsilon_\parallel$ [1 kHz, 20° C.]: | 12.6 |
| CCGU-3-F | 6.00% | $\epsilon_\perp$ [1 kHz, 20° C.]: | 3.5 |
| APUQU-3-F | 2.50% | $K_1$ [pN, 20° C.]: | 13.4 |
| CCP-30CF$_3$ | 8.00% | $K_3$ [pN, 20° C.]: | 17.0 |
| CCP-50CF$_3$ | 5.00% | $V_0$ [pN, 20° C.]: | 1.28 |
| CCP-30CF$_3$.F | 12.00% | $\gamma_1$ [mPa · s, 20° C.]: | 126 |
| CCQU-3-F | 10.00% | | |
| CCP-1F.F.F | 9.00% | | |
| CCP-3F.F.F | 11.00% | | |
| PGP-2-2V | 6.00% | | |
| CDU-2-F | 1.00% | | |

Example 94

| | | | |
|---|---|---|---|
| CY-3-O2 | 10.50% | Clearing point [° C.]: | 79.7 |
| PY-1-O4 | 5.00% | Δn [589 nm, 20° C.]: | 0.1113 |
| PY-3-O2 | 7.50% | Δε [1 kHz, 20° C.]: | −4.4 |
| PY-4-O2 | 4.00% | $K_1$ [pN, 20° C.]: | 14.5 |
| CCY-3-O1 | 5.50% | $K_3$ [pN, 20° C.]: | 16.7 |
| CCY-3-O2 | 5.00% | $V_0$ [20° C.]: | 2.05 |
| CCY-4-O2 | 4.00% | | |
| CLY-3-O2 | 9.00% | | |
| CPY-2-O2 | 9.00% | | |
| CPY-3-O2 | 9.00% | | |
| CC-3-V | 23.50% | | |
| CC-3-V1 | 7.00% | | |
| CBC-33F | 1.00% | | |

Example 95

| | | | |
|---|---|---|---|
| DU-2-N | 2.50% | Clearing point [° C.]: | 94.0 |
| ME2N.F | 8.00% | Δn [589 nm, 20° C.]: | 0.2530 |
| ME3N.F | 8.00% | Δε [1 kHz, 20° C.]: | 47.6 |
| ME4N.F | 16.00% | $\epsilon_\parallel$ [1 kHz, 20° C.]: | 55.7 |
| ME5N.F | 8.00% | $\epsilon_\perp$ [1 kHz, 20° C.]: | 8.1 |
| HP-3N.F | 5.00% | $K_1$ [pN, 20° C.]: | 11.3 |
| HP-4N.F | 5.00% | $K_3$ [pN, 20° C.]: | 13.8 |
| HP-5N.F | 2.50% | $V_0$ [20° C.]: | 0.51 |
| PTP-102 | 5.00% | $\gamma_1$ [mPa · s, 20° C.]: | 464 |
| PPTUI-3-2 | 20.00% | | |
| PPTUI-3-4 | 20.00% | | |

Example 95a

The mixture according to Example 95 additionally comprises 5% of RM-41.

Example 96

| | | | |
|---|---|---|---|
| CCY-3-O1 | 7.50% | Clearing point [° C.]: | 81.5 |
| CCY-4-O2 | 3.50% | Δn [589 nm, 20° C.]: | 0.1082 |
| CLY-3-O2 | 7.00% | Δε [1 kHz, 20° C.]: | −2.7 |
| CPY-2-O2 | 10.00% | $\epsilon_\parallel$ [1 kHz, 20° C.]: | 3.4 |
| CPY-3-O2 | 10.00% | $\epsilon_\perp$ [1 kHz, 20° C.]: | 6.1 |
| PYP-2-3 | 9.00% | $\gamma_1$ [mPa · s, 20° C.]: | 88 |
| CC-3-V | 45.00% | $K_1$ [pN, 20° C.]: | 13.4 |
| PY-1-O4 | 4.00% | $K_3$ [pN, 20° C.]: | 15.3 |
| PY-3-O2 | 2.00% | $V_0$ [20° C., V]: | 2.53 |
| Y-4O-O4 | 2.00% | | |

Example 97

| | | | |
|---|---|---|---|
| CCY-3-O1 | 7.50% | Clearing point [° C.]: | 81 |
| CCY-4-O2 | 5.00% | Δn [589 nm, 20° C.]: | 0.1054 |
| CLY-3-O2 | 7.00% | Δε [1 kHz, 20° C.]: | −2.6 |
| CPY-2-O2 | 10.00% | $\epsilon_\parallel$ [1 kHz, 20° C.]: | 3.4 |
| CPY-3-O2 | 8.50% | $\epsilon_\perp$ [1 kHz, 20° C.]: | 6.0 |
| PYP-2-3 | 9.00% | $\gamma_1$ [mPa · s, 20° C.]: | 86 |
| CC-3-V | 45.50% | $K_1$ [pN, 20° C.]: | 13.3 |
| PY-1-O4 | 5.00% | $K_3$ [pN, 20° C.]: | 15.1 |
| Y-4O-O4 | 2.50% | $V_0$ [20° C., V]: | 2.54 |

Example 98

| | | | |
|---|---|---|---|
| CC-3-2V1 | 4.00% | Clearing point [° C.]: | 100 |
| CC-3-V | 37.50% | Δn [589 nm, 20° C.]: | 0.1047 |
| CC-3-V1 | 5.00% | Δε [1 kHz, 20° C.]: | 3.9 |
| CCP-V-1 | 13.00% | $\epsilon_\parallel$ [1 kHz, 20° C.]: | 6.6 |
| CCP-V2-1 | 7.50% | $\epsilon_\perp$ [1 kHz, 20° C.]: | 2.7 |
| CCVC-3-V | 6.00% | $\gamma_1$ [mPa · s, 20° C.]: | 72 |
| CDUQU-3-F | 1.00% | $K_1$ [pN, 20° C.]: | 15.1 |
| CPGP-5-2 | 3.00% | $K_3$ [pN, 20° C.]: | 17.4 |
| DGUQU-4-F | 2.00% | $V_0$ [20° C., V]: | 2.07 |
| PGP-2-3 | 5.00% | | |
| PGP-2-4 | 3.00% | | |
| PGUQU-3-F | 4.00% | | |
| PGUQU-4-F | 3.50% | | |
| PPGU-3F | 0.50% | | |
| PUQU-3F | 5.00% | | |

Example 99

| | | | |
|---|---|---|---|
| APUQU-2-F | 1.50% | Clearing point [° C.]: | 100 |
| APUQU-3-F | 5.00% | Δn [589 nm, 20° C.]: | 0.1056 |
| CC-3-2V1 | 4.00% | Δε [1 kHz, 20° C.]: | 4.0 |
| CC-3-V | 36.00% | $\epsilon_\parallel$ [1 kHz, 20° C.]: | 6.8 |
| CC-3-V1 | 5.00% | $\epsilon_\perp$ [1 kHz, 20° C.]: | 2.8 |

147

-continued

| | | | |
|---|---|---|---|
| CCP-V-1 | 13.00% | $\gamma_1$ [mPa·s, 20° C.]: | 71 |
| CCP-V2-1 | 9.50% | $K_1$ [pN, 20° C.]: | 15.4 |
| CCVC-3-V | 4.00% | $K_3$ [pN, 20° C.]: | 17.7 |
| CDUQU-3-F | 3.00% | $V_0$ [20° C., V]: | 2.07 |
| DGUQU-4-F | 2.00% | | |
| PGP-1-2V | 5.50% | | |
| PGP-2-2V | 7.00% | | |
| PPGU-3-F | 0.50% | | |
| PUQU-3-F | 4.00% | | |

Example 100

| | | | |
|---|---|---|---|
| CC-3-V1 | 9.00% | Clearing point [° C.]: | 74.7 |
| CCH-23 | 18.00% | $\Delta n$ [589 nm, 20° C.]: | 0.0982 |
| CCH-34 | 3.00% | $\Delta\epsilon$ [1 kHz, 20° C.]: | -3.4 |
| CCH-35 | 7.00% | $\epsilon_{\parallel}$ [1 kHz, 20° C.]: | 3.5 |
| CCP-3-1 | 5.50% | $\epsilon_{\perp}$ [1 kHz, 20° C.]: | 6.9 |
| CCY-3-O2 | 11.50% | $\gamma_1$ [mPa·s, 20° C.]: | 108 |
| CPY-2-O2 | 8.00% | $K_1$ [pN, 20° C.]: | 14.9 |
| CPY-3-O2 | 11.00% | $K_3$ [pN, 20° C.]: | 15.9 |
| CY-3-O2 | 15.50% | $V_0$ [20° C., V]: | 2.28 |
| PY-3-O2 | 11.50% | | |

Example 100a

The mixture according to Example 100 additionally comprises 0.001% of Irganox® 1076 (octadecyl 3-(3,5-di-tert-butyl-4-hydroxyphenyl)propionate, BASF) and 0.45% of RM-1.

Example 101

| | | | |
|---|---|---|---|
| CC-3-V | 15.00% | Clearing point [° C.]: | 85 |
| CPGP-4-3 | 2.00% | $\Delta n$ [589 nm, 20° C.]: | 0.1981 |
| CPGP-5-2 | 2.00% | $\Delta\epsilon$ [1 kHz, 20° C.]: | 9.9 |
| CPTP-301 | 6.00% | $\epsilon_{\parallel}$ [1 kHz, 20° C.]: | 13.6 |
| DGUQU-4-F | 3.00% | $\epsilon_{\perp}$ [1 kHz, 20° C.]: | 3.7 |
| PCH-301 | 7.00% | $\gamma_1$ [mPa·s, 20° C.]: | 123 |
| PGP-2-2V | 14.50% | $K_1$ [pN, 20° C.]: | 15.1 |
| PGUQU-3-F | 7.50% | $K_3$ [pN, 20° C.]: | 15.1 |
| PGUQU-4-F | 7.00% | $V_0$ [20° C., V]: | 1.29 |
| PGUQU-5-F | 6.00% | | |
| PP-1-2V1 | 12.00% | | |
| PTP-102 | 6.00% | | |
| PTP-201 | 6.00% | | |
| PUQU-3-F | 6.00% | | |

Example 102

| | | | |
|---|---|---|---|
| CC-3-V | 28.00% | Clearing point [° C.]: | 84.8 |
| CC-3-V1 | 3.00% | $\Delta n$ [589 nm, 20° C.]: | 0.1078 |
| CCP-3-1 | 3.00% | $\Delta\epsilon$ [1 kHz, 20° C.]: | -4.1 |
| CCY-3-O2 | 9.00% | $\epsilon_{\parallel}$ [1 kHz, 20° C.]: | 3.7 |
| CCY-4-O2 | 9.00% | $\epsilon_{\perp}$ [1 kHz, 20° C.]: | 7.8 |
| CLY-3-O2 | 6.00% | $\gamma_1$ [mPa·s, 20° C.]: | 122 |
| CLY-3-O3 | 6.00% | $K_1$ [pN, 20° C.]: | 14.8 |
| CPY-2-O2 | 7.00% | | |
| CPY-3-O2 | 9.00% | | |
| PY-3-O2 | 8.00% | | |
| PY-4-O2 | 4.00% | | |
| PYP-2-4 | 2.50% | | |
| Y-4O-O4 | 5.50% | | |

Example 102a

The mixture according to Example 102 additionally comprises 0.04% of

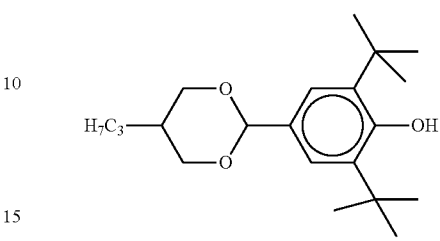

and 0.01% of

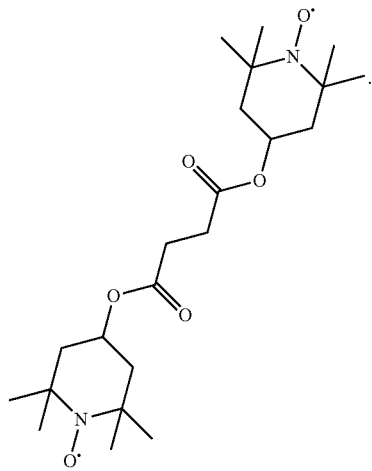

Example 103

| | | | |
|---|---|---|---|
| CC-3-V | 28.00% | Clearing point [° C.]: | 80 |
| CC-3-V1 | 5.00% | $\Delta n$ [589 nm, 20° C.]: | 0.1082 |
| CCP-3-1 | 2.50% | $\Delta\epsilon$ [1 kHz, 20° C.]: | -4.1 |
| CCY-3-O2 | 10.00% | $\epsilon_{\parallel}$ [1 kHz, 20° C.]: | 3.8 |
| CCY-4-O2 | 2.50% | $\epsilon_{\perp}$ [1 kHz, 20° C.]: | 7.9 |
| CLY-3-O2 | 6.50% | $\gamma_1$ [mPa·s, 20° C.]: | 113 |
| CLY-3-O3 | 6.50% | $K_1$ [pN, 20° C.]: | 14.5 |
| CPY-2-O2 | 9.00% | | |
| CPY-3-O2 | 10.00% | | |
| PY-3-O2 | 10.00% | | |
| PY-4-O2 | 5.00% | | |
| Y-4O-O4 | 5.00% | | |

Example 103a

The mixture according to Example 103 additionally comprises 0.04% of and
0.01% of

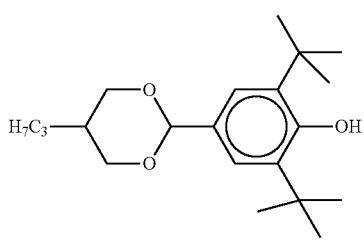

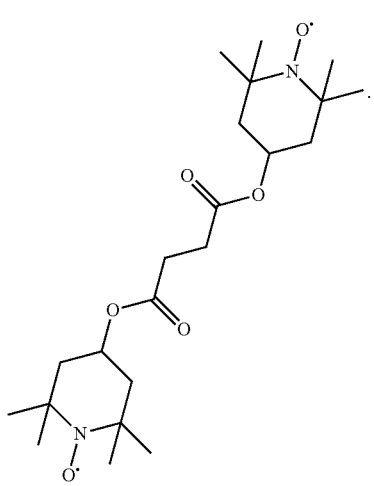

Example 104

| | | | |
|---|---|---|---|
| CC-3-V | 29.00% | Clearing point [° C.]: | 75.1 |
| CC-3-V1 | 5.00% | Δn [589 nm, 20° C.]: | 0.1075 |
| CCP-3-1 | 3.00% | Δε [1 kHz, 20° C.]: | −4.0 |
| CCY-3-O2 | 10.00% | $\varepsilon_{\|\|}$ [1 kHz, 20° C.]: | 3.8 |
| CLY-3-O2 | 6.00% | $\varepsilon_\perp$ [1 kHz, 20° C.]: | 7.7 |
| CLY-3-O3 | 6.00% | $\gamma_1$ [mPa · s, 20° C.]: | 103 |
| CPY-2-O2 | 9.00% | $K_1$ [pN, 20° C.]: | 14.3 |
| CPY-3-O2 | 10.00% | | |
| PY-3-O2 | 10.00% | | |
| PY-4-O2 | 7.00% | | |
| Y-4O-O4 | 5.00% | | |

Example 104a

The mixture from Example 104 additionally comprises 0.04% of

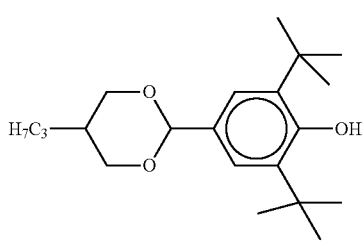

and
0.015% of

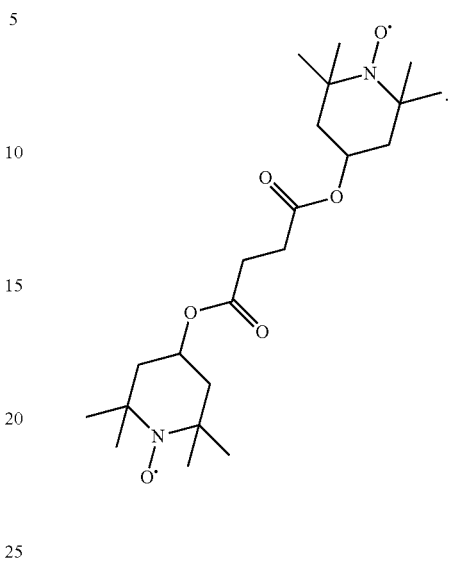

Example 105

| | | | |
|---|---|---|---|
| CC-3-V | 29.00% | Clearing point [° C.]: | 80.1 |
| CCY-3-O1 | 8.00% | Δn [589 nm, 20° C.]: | 0.1052 |
| CCY-3-O2 | 6.00% | Δε [1 kHz, 20° C.]: | −4.7 |
| CCY-4-O2 | 2.00% | $\varepsilon_{\|\|}$ [1 kHz, 20° C.]: | 3.9 |
| CLY-3-O2 | 8.50% | $\varepsilon_\perp$ [1 kHz, 20° C.]: | 8.7 |
| CLY-3-O3 | 7.50% | $\gamma_1$ [mPa · s, 20° C.]: | 125 |
| CPY-2-O2 | 10.00% | $K_1$ [pN, 20° C.]: | 14.0 |
| CPY-3-O2 | 7.50% | | |
| CY-3-O2 | 6.50% | | |
| PY-3-O2 | 10.00% | | |
| Y-4O-O4 | 5.00% | | |

Example 105a

The mixture according to Example 105 additionally comprises 0.04% of

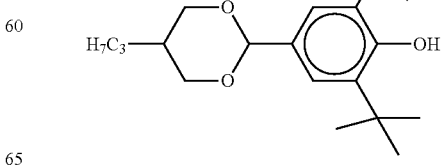

and 0.02% of

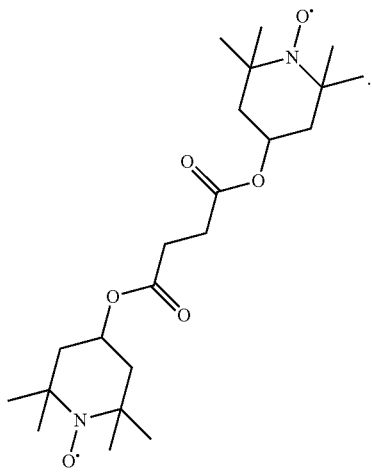

Example 106

| | | | |
|---|---|---|---|
| CC-3-V | 37.00% | Clearing point [° C.]: | 75.2 |
| CCY-3-O1 | 5.00% | Δn [589 nm, 20° C.]: | 0.1012 |
| CCY-3-O2 | 5.00% | Δε [1 kHz, 20° C.]: | −3.8 |
| CCY-4-O2 | 4.00% | $\varepsilon_{\parallel}$ [1 kHz, 20° C.]: | 3.6 |
| CLY-3-O2 | 7.00% | $\varepsilon_{\perp}$ [1 kHz, 20° C.]: | 7.5 |
| CPY-2-O2 | 9.00% | $\gamma_1$ [mPa · s, 20° C.]: | 97 |
| CPY-3-O2 | 10.00% | $K_1$ [pN, 20° C.]: | 13.3 |
| CY-3-O2 | 12.00% | $K_3$ [pN, 20° C.]: | 15.3 |
| PY-3-O2 | 11.00% | $V_0$ [20° C., V]: | 2.12 |

Example 106a

The mixture according to Example 106 additionally comprises 0.04% of

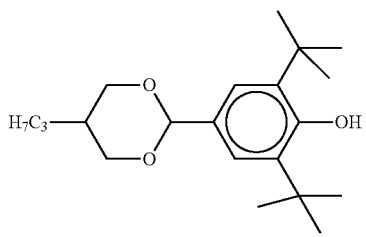

and 0.015% of

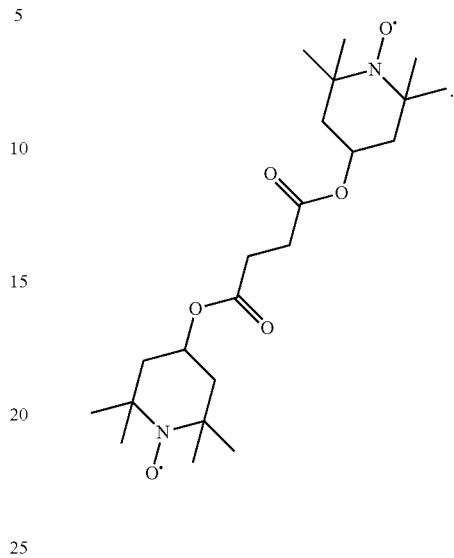

Example 107

| | | | |
|---|---|---|---|
| CY-3-O2 | 15.00% | Clearing point [° C.]: | 80.4 |
| CY-5-O2 | 12.50% | Δn [589 nm, 20° C.]: | 0.1038 |
| CCY-3-O1 | 2.50% | Δε [1 kHz, 20° C.]: | −3.3 |
| CCY-4-O2 | 5.00% | $\varepsilon_{\parallel}$ [1 kHz, 20° C.]: | 3.5 |
| CPY-2-O2 | 8.00% | $\varepsilon_{\perp}$ [1 kHz, 20° C.]: | 6.8 |
| CPY-3-O2 | 8.00% | $\gamma_1$ [mPa · s, 20° C.]: | 137 |
| CCY-2-1 | 6.00% | $K_1$ [pN, 20° C.]: | 14.2 |
| CCY-3-1 | 6.00% | $K_3$ [pN, 20° C.]: | 14.2 |
| CCH-23 | 15.00% | $V_0$ [20° C., V]: | 2.18 |
| CCH-34 | 5.00% | | |
| CCH-301 | 1.50% | | |
| BCH-32 | 15.50% | | |

Example 107a

The mixture according to Example 107 additionally comprises 0.01% of

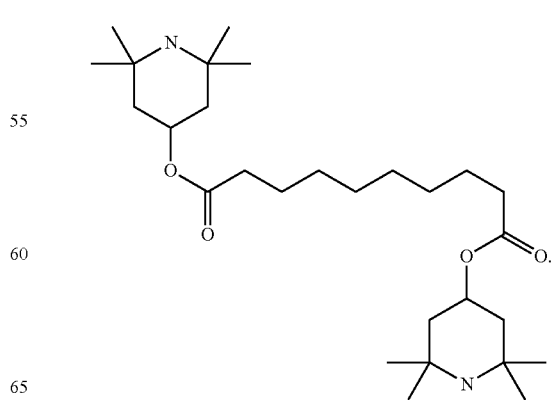

Example 108

| | | | |
|---|---|---|---|
| CY-3-O2 | 15.00% | Clearing point [° C.]: | 100 |
| CY-3-O4 | 20.00% | Δn [589 nm, 20° C.]: | 0.0968 |
| CY-5-O2 | 7.50% | Δε [1 kHz, 20° C.]: | −5.9 |
| CCY-3-O2 | 6.50% | $\varepsilon_{\parallel}$ [1 kHz, 20° C.]: | 4.0 |
| CCY-3-O3 | 6.50% | $\varepsilon_{\perp}$ [1 kHz, 20° C.]: | 9.9 |
| CCY-4-O2 | 6.50% | $\gamma_1$ [mPa · s, 20° C.]: | 324 |
| CCY-5-O2 | 6.50% | $K_1$ [pN, 20° C.]: | 15.1 |
| CPY-2-O2 | 5.50% | $K_3$ [pN, 20° C.]: | 17.2 |
| CPY-3-O2 | 5.00% | $V_0$ [20° C., V]: | 1.80 |
| CC-4-V | 3.00% | | |
| CH-33 | 3.00% | | |
| CH-35 | 2.00% | | |
| CH-43 | 3.00% | | |
| CH-45 | 2.00% | | |
| CCPC-33 | 4.00% | | |
| CCPC-34 | 4.00% | | |

Example 109

| | | | |
|---|---|---|---|
| CY-3-O2 | 11.00% | Clearing point [° C.]: | 101 |
| CY-3-O4 | 18.00% | Δn [589 nm, 20° C.]: | 0.1662 |
| CCY-3-O2 | 6.00% | Δε [1 kHz, 20° C.]: | −6.1 |
| CCY-3-O3 | 6.00% | $\varepsilon_{\parallel}$ [1 kHz, 20° C.]: | 4.2 |
| CCY-4-O2 | 6.00% | $\varepsilon_{\perp}$ [1 kHz, 20° C.]: | 10.3 |
| CCY-5-O2 | 6.00% | $\gamma_1$ [mPa · s, 20° C.]: | 363 |
| CPY-3-O2 | 6.00% | $K_1$ [pN, 20° C.]: | 16.5 |
| CC-4-V | 3.00% | $K_3$ [pN, 20° C.]: | 22.00 |
| CPTP-3-1 | 5.00% | $V_0$ [20° C., V]: | 2.00 |
| PTP-302FF | 10.00% | | |
| PTP-502FF | 10.00% | | |
| CPTP-302FF | 5.00% | | |
| CPTP-502FF | 5.00% | | |
| CCPC-33 | 3.00% | | |

Example 110

| | | | |
|---|---|---|---|
| CY-3-O2 | 8.00% | Clearing point [° C.]: | 101 |
| CY-3-O4 | 13.00% | Δn [589 nm, 20° C.]: | 0.0970 |
| CCY-3-O2 | 6.50% | Δε [1 kHz, 20° C.]: | −2.1 |
| CPY-2-O2 | 3.50% | $\varepsilon_{\parallel}$ [1 kHz, 20° C.]: | 3.2 |
| CPY-3-O2 | 8.00% | $\varepsilon_{\perp}$ [1 kHz, 20° C.]: | 5.3 |
| CCH-301 | 5.00% | $\gamma_1$ [mPa · s, 20° C.]: | 136 |
| CC-4-V | 12.00% | $K_1$ [pN, 20° C.]: | 14.8 |
| CC-5-V | 8.00% | $K_3$ [pN, 20° C.]: | 18.3 |
| CCP-V-1 | 13.00% | $V_0$ [20° C., V]: | 3.11 |
| CCP-V2-1 | 13.00% | | |
| BCH-32 | 5.00% | | |
| CCPC-33 | 5.00% | | |

Example 111

| | | | |
|---|---|---|---|
| CY-3-O4 | 12.00% | Clearing point [° C.]: | 101 |
| CC-4-V | 13.00% | Δn [589 nm, 20° C.]: | 0.1660 |
| CC-5-V | 9.50% | Δε [1 kHz, 20° C.]: | −2.1 |
| CCP-V-1 | 10.50% | $\varepsilon_{\parallel}$ [1 kHz, 20° C.]: | 3.4 |
| CCP-V2-1 | 10.00% | $\varepsilon_{\perp}$ [1 kHz, 20° C.]: | 5.5 |
| PTP-102 | 3.00% | $\gamma_1$ [mPa · s, 20° C.]: | 151 |
| CPTP-3-1 | 5.00% | $K_1$ [pN, 20° C.]: | 16.2 |
| CPTP-3-2 | 5.00% | $K_3$ [pN, 20° C.]: | 19.8 |
| PTP-302FF | 9.50% | $V_0$ [20° C., V]: | 3.25 |
| PTP-502FF | 9.50% | | |
| CPTP-302FF | 6.50% | | |
| CPTP-502FF | 6.50% | | |

Example 112

| | | | |
|---|---|---|---|
| CY-3-O2 | 15.00% | Clearing point [° C.]: | 71.9 |
| CCY-3-O1 | 6.00% | Δn [589 nm, 20° C.]: | 0.1203 |
| CCY-3-O2 | 8.00% | Δε [1 kHz, 20° C.]: | −8.1 |
| CCY-3-O3 | 5.50% | $\varepsilon_{\parallel}$ [1 kHz, 20° C.]: | 5.2 |
| CCY-4-O2 | 8.00% | $\varepsilon_{\perp}$ [1 kHz, 20° C.]: | 13.3 |
| CCY-5-O2 | 8.00% | $\gamma_1$ [mPa · s, 20° C.]: | 253 |
| CPY-2-O2 | 1.50% | $K_1$ [pN, 20° C.]: | 13.2 |
| CPY-3-O2 | 10.00% | $K_3$ [pN, 20° C.]: | 15.7 |
| CLY-3-O2 | 8.00% | $V_0$ [20° C., V]: | 1.46 |
| PY-3-O2 | 6.00% | | |
| PY-1-O4 | 8.00% | | |
| PY-4-O2 | 8.00% | | |
| Y-4O-O4 | 8.00% | | |

Example 113

| | | | |
|---|---|---|---|
| CC-3-V1 | 8.00% | Clearing point [° C.]: | 75.5 |
| CCH-23 | 18.00% | Δn [589 nm, 20° C.]: | 0.0978 |
| CCH-34 | 4.00% | Δε [1 kHz, 20° C.]: | −3.5 |
| CCH-35 | 7.00% | $\varepsilon_{\parallel}$ [1 kHz, 20° C.]: | 3.5 |
| CCP-3-1 | 5.00% | $\varepsilon_{\perp}$ [1 kHz, 20° C.]: | 6.9 |
| CCY-3-O2 | 12.50% | $\gamma_1$ [mPa · s, 20° C.]: | 111 |
| CPY-2-O2 | 8.00% | $K_1$ [pN, 20° C.]: | 14.9 |
| CPY-3-O2 | 11.00% | $K_3$ [pN, 20° C.]: | 15.8 |
| CY-3-O2 | 15.50% | $V_0$ [20° C., V]: | 2.26 |
| PY-3-O2 | 11.00% | | |

Example 113a

The mixture according to Example 113 additionally comprises 0.3% of RM-1.

Example 114

| | | | |
|---|---|---|---|
| BCH-32 | 1.50% | Clearing point [° C.]: | 74.8 |
| CC-3-V | 15.50% | Δn [589 nm, 20° C.]: | 0.1035 |
| CC-3-V1 | 11.00% | Δε [1 kHz, 20° C.]: | −3.1 |
| CCH-23 | 12.00% | $\varepsilon_{\parallel}$ [1 kHz, 20° C.]: | 3.4 |
| CCH-34 | 3.50% | $\varepsilon_{\perp}$ [1 kHz, 20° C.]: | 6.5 |
| CCY-3-O2 | 11.50% | $\gamma_1$ [mPa · s, 20° C.]: | 95 |
| CCY-5-O2 | 0.50% | $K_1$ [pN, 20° C.]: | 14.1 |
| CPY-2-O2 | 8.50% | $K_3$ [pN, 20° C.]: | 15.4 |
| CPY-3-O2 | 12.00% | $V_0$ [20° C., V]: | 2.36 |
| CY-3-O2 | 9.50% | | |
| PY-3-O2 | 11.50% | | |
| PYP-2-3 | 3.00% | | |

Example 115a

The mixture according to Example 115 additionally comprises 0.001% of Irganox® 1076 (octadecyl 3-(3,5-di-tert-butyl-4-hydroxyphenyl)propionate, BASF) and 0.3% of RM-1.

Example 116

| | | | |
|---|---|---|---|
| CC-3-V | 30.50% | Clearing point [° C.]: | 79.8 |
| CC-3-V1 | 4.50% | Δn [589 nm, 20° C.]: | 0.1022 |
| CCY-3-O1 | 5.00% | Δε [1 kHz, 20° C.]: | −4.0 |
| CCY-3-O2 | 6.00% | $\varepsilon_{\|\|}$ [1 kHz, 20° C.]: | 3.6 |
| CCY-3-O3 | 4.00% | $\varepsilon_{\perp}$ [1 kHz, 20° C.]: | 7.6 |
| CLY-3-O2 | 8.00% | $\gamma_1$ [mPa · s, 20° C.]: | 114 |
| CPY-2-O2 | 8.00% | $K_1$ [pN, 20° C.]: | 14.5 |
| CPY-3-O2 | 11.00% | $K_3$ [pN, 20° C.]: | 16.7 |
| CY-3-O2 | 15.00% | $V_0$ [20° C., V]: | 2.14 |
| PY-3-O2 | 8.00% | | |

Example 117

| | | | |
|---|---|---|---|
| CY-3-O2 | 15.00% | Clearing point [° C.]: | 80.4 |
| CY-5-O2 | 12.50% | Δn [589 nm, 20° C.]: | 0.1038 |
| CCY-3-O1 | 2.50% | Δε [1 kHz, 20° C.]: | −3.3 |
| CCY-4-O2 | 5.00% | $\varepsilon_{\|\|}$ [1 kHz, 20° C.]: | 3.5 |
| CPY-2-O2 | 8.00% | $\varepsilon_{\perp}$ [1 kHz, 20° C.]: | 6.8 |
| CPY-3-O2 | 8.00% | $\gamma_1$ [mPa · s, 20° C.]: | 137 |
| CCY-2-1 | 6.00% | $K_1$ [pN, 20° C.]: | 14.2 |
| CCY-3-1 | 6.00% | $K_3$ [pN, 20° C.]: | 14.2 |
| CCH-23 | 15.00% | $V_0$ [20° C., V]: | 2.18 |
| CCH-34 | 5.00% | | |
| CCH-301 | 1.50% | | |
| BCH-32 | 15.50% | | |

Example 118

| | | | |
|---|---|---|---|
| CY-3-O2 | 15.00% | Clearing point [° C.]: | 80.5 |
| CY-3-O4 | 4.00% | Δn [589 nm, 20° C.]: | 0.1025 |
| CY-5-O2 | 6.50% | Δε [1 kHz, 20° C.]: | −3.4 |
| CCY-3-O1 | 5.00% | $\varepsilon_{\|\|}$ [1 kHz, 20° C.]: | 3.5 |
| CCY-3-O3 | 2.00% | $\varepsilon_{\perp}$ [1 kHz, 20° C.]: | 6.9 |
| CCY-4-O2 | 6.00% | $\gamma_1$ [mPa · s, 20° C.]: | 141 |
| CPY-2-O2 | 7.00% | $K_1$ [pN, 20° C.]: | 14.0 |
| CPY-3-O2 | 7.00% | $K_3$ [pN, 20° C.]: | 14.1 |
| CCY-2-1 | 6.00% | $V_0$ [20° C., V]: | 2.16 |
| CCY-3-1 | 6.00% | | |
| CCH-23 | 15.50% | | |
| CCH-34 | 5.00% | | |
| BCH-32 | 13.00% | | |
| PP-1-4 | 2.00% | | |

Example 119

| | | | |
|---|---|---|---|
| PGUQU-3-F | 4.00% | Clearing point [° C.]: | 85.4 |
| CCQU-3-F | 7.50% | Δn [589 nm, 20° C.]: | 0.1028 |
| PUQU-3-F | 15.50% | Δε [1 kHz, 20° C.]: | 9.9 |
| APUQU-2-F | 4.00% | $\varepsilon_{\|\|}$ [1 kHz, 20° C.]: | 13.3 |
| APUQU-3-F | 7.50% | $\varepsilon_{\perp}$ [1 kHz, 20° C.]: | 3.4 |
| CC-3-V | 27.50% | $\gamma_1$ [mPa · s, 20° C.]: | 82 |
| CCP-3-V1 | 6.00% | $K_1$ [pN, 20° C.]: | 12.6 |
| CCP-V-1 | 13.00% | $K_3$ [pN, 20° C.]: | 15.3 |
| CCP-V2-1 | 10.00% | $V_0$ [20° C., V]: | 1.19 |
| PPGU-3-F | 0.50% | | |
| BCH-3F.F | 4.50% | | |

Example 119a

The mixture according to Example 119 additionally comprises 0.01% of

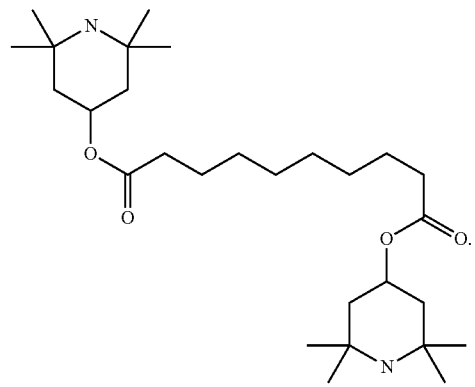

Example 120

| | | | |
|---|---|---|---|
| CC-3-V | 30.50% | Clearing point [° C.]: | 80.1 |
| CC-3-V1 | 4.50% | Δn [589 nm, 20° C.]: | 0.1033 |
| CCY-3-O1 | 6.00% | Δε [1 kHz, 20° C.]: | −4.0 |
| CCY-3-O2 | 8.00% | $\varepsilon_{\|\|}$ [1 kHz, 20° C.]: | 3.6 |
| CLY-3-O2 | 8.00% | $\varepsilon_{\perp}$ [1 kHz, 20° C.]: | 7.6 |
| CPY-2-O2 | 8.00% | $\gamma_1$ [mPa · s, 20° C.]: | 113 |
| CPY-3-O2 | 12.00% | $K_1$ [pN, 20° C.]: | 14.4 |
| CY-3-O2 | 15.00% | $K_3$ [pN, 20° C.]: | 17.0 |
| PY-3-O2 | 8.00% | $V_0$ [20° C., V]: | 2.16 |

Example 120a

The mixture from Example 120 additionally comprises 0.3% of

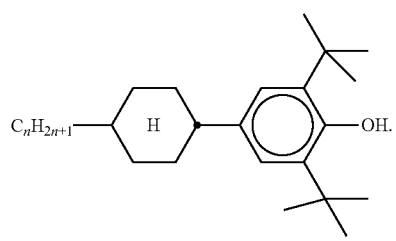

Example 121

| | | | |
|---|---|---|---|
| CC-3-V | 28.50% | Clearing point [° C.]: | 74.6 |
| CC-3-V1 | 7.00% | Δn [589 nm, 20° C.]: | 0.1040 |
| CCY-3-O2 | 12.50% | Δε [1 kHz, 20° C.]: | −3.0 |
| CCY-4-O2 | 5.25% | $\varepsilon_{\|\|}$ [1 kHz, 20° C.]: | 3.5 |
| CPY-3-O2 | 9.75% | $\varepsilon_{\perp}$ [1 kHz, 20° C.]: | 6.5 |
| CY-3-O2 | 15.00% | $\gamma_1$ [mPa · s, 20° C.]: | 98 |
| CY-3-O4 | 4.75% | $K_1$ [pN, 20° C.]: | 13.2 |
| CY-5-O2 | 1.00% | $K_3$ [pN, 20° C.]: | 15.5 |
| PCH-301 | 3.25% | $V_0$ [20° C., V]: | 2.4 |
| PPGU-3-F | 0.50% | | |
| PYP-2-3 | 12.50% | | |

Example 121a

The mixture from Example 121 additionally comprises 0.001% of Irganox® 1076 (octadecyl 3-(3,5-di-tert-butyl-4-hydroxyphenyl)propionate. BASF) and 0.45% of RM-1.

Example 122

| | | | |
|---|---|---|---|
| CC-3-V | 36.50% | Clearing point [° C.]: | 75 |
| CC-3-V1 | 2.00% | Δn [589 nm, 20° C.]: | 0.1015 |
| CCY-3-O1 | 8.00% | Δε [1 kHz, 20° C.]: | −3.7 |
| CCY-3-O2 | 6.00% | $\epsilon_\parallel$ [1 kHz, 20° C.]: | 3.7 |
| CCY-4-O2 | 2.50% | $\epsilon_\perp$ [1 kHz, 20° C.]: | 7.3 |
| CLY-3-O2 | 8.00% | $\gamma_1$ [mPa · s, 20° C.]: | 97 |
| CLY-3-O3 | 2.00% | $K_1$ [pN, 20° C.]: | 13.8 |
| CPY-2-O2 | 10.00% | $K_3$ [pN, 20° C.]: | 15 |
| CPY-3-O2 | 3.00% | $V_0$ [20° C., V]: | 2.14 |
| CY-3-O2 | 5.50% | | |
| PY-3-O2 | 13.00% | | |
| PY-1-O4 | 3.50% | | |

Example 123

| | | | |
|---|---|---|---|
| BCH-32 | 4.50% | Clearing point [° C.]: | 75.5 |
| CCH-23 | 14.00% | Δn [589 nm, 20° C.]: | 0.0938 |
| CCH-301 | 7.00% | Δε [1 kHz, 20° C.]: | −2.5 |
| CCH-34 | 9.00% | $\epsilon_\parallel$ [1 kHz, 20° C.]: | 3.3 |
| CCH-35 | 5.50% | $\epsilon_\perp$ [1 kHz, 20° C.]: | 5.8 |
| CCP-3-1 | 10.00% | $\gamma_1$ [mPa · s, 20° C.]: | 89 |
| CY-3-O2 | 5.00% | $K_1$ [pN, 20° C.]: | 13.5 |
| CY-V-O2 | 7.00% | $K_3$ [pN, 20° C.]: | 14.5 |
| CCY-3-O1 | 5.00% | $V_0$ [20° C., V]: | 2.54 |
| CCY-3-O2 | 9.00% | | |
| CPY-V-O2 | 10.00% | | |
| PCH-302 | 5.00% | | |
| PY-V2-O2 | 9.00% | | |

Example 124

| | | | |
|---|---|---|---|
| BCH-32 | 1.50% | Clearing point [° C.]: | 75 |
| CC-3-V | 37.00% | Δn [589 nm, 20° C.]: | 0.0960 |
| CCP-3-1 | 8.00% | Δε [1 kHz, 20° C.]: | −2.6 |
| CY-3-O2 | 15.00% | $\epsilon_\parallel$ [1 kHz, 20° C.]: | 3.4 |
| CCY-3-O1 | 7.00% | $\epsilon_\perp$ [1 kHz, 20° C.]: | 6.0 |
| CCY-3-O2 | 9.50% | $\gamma_1$ [mPa · s, 20° C.]: | 79 |
| CPY-3-O2 | 8.50% | $K_1$ [pN, 20° C.]: | 13.0 |
| PCH-302 | 5.50% | $K_3$ [pN, 20° C.]: | 16.0 |
| PY-V-O2 | 8.00% | $V_0$ [20° C., V]: | 2.6 |

Example 125

| | | | |
|---|---|---|---|
| BCH-32 | 1.00% | Clearing point [° C.]: | 75 |
| CC-3-V | 41.00% | Δn [589 nm, 20° C.]: | 0.0948 |
| CCP-3-1 | 8.50% | Δε [1 kHz, 20° C.]: | −2.3 |
| CY-3-O2 | 13.00% | $\epsilon_\parallel$ [1 kHz, 20° C.]: | 3.2 |
| CCY-3-O1 | 6.50% | $\epsilon_\perp$ [1 kHz, 20° C.]: | 5.5 |
| CCY-3-O2 | 8.50% | $\gamma_1$ [mPa · s, 20° C.]: | 70 |
| CPY-3-O2 | 6.00% | $K_1$ [pN, 20° C.]: | 13.4 |
| PCH-302 | 7.00% | $K_3$ [pN, 20° C.]: | 16.5 |
| PY-1V-O2 | 8.50% | $V_0$ [20° C., V]: | 2.84 |

Example 126

| | | | |
|---|---|---|---|
| PY-3-O2 | 7.50% | Clearing point [° C.]: | 74 |
| PY-1V-O2 | 4.00% | Δn [589 nm, 20° C.]: | 0.1094 |
| CY-3-O2 | 14.50% | Δε [1 kHz, 20° C.]: | −3.0 |
| CCY-3-O1 | 3.00% | $\epsilon_\parallel$ [1 kHz, 20° C.]: | 3.6 |
| CCY-3-O2 | 9.00% | $\epsilon_\perp$ [1 kHz, 20° C.]: | 6.6 |
| CPY-2-O2 | 7.50% | $\gamma_1$ [mPa · s, 20° C.]: | 85 |
| CPY-3-O2 | 9.00% | $K_1$ [pN, 20° C.]: | 12.9 |
| CC-3-V | 37.00% | $K_3$ [pN, 20° C.]: | 14.6 |
| BCH-32 | 8.00% | $V_0$ [20° C., V]: | 2.34 |
| PPGU-3-F | 0.50% | | |

Example 127

| | | | |
|---|---|---|---|
| PY-3-O2 | 8.00% | Clearing point [° C.]: | 74.5 |
| PY-3V-O2 | 5.00% | Δn [589 nm, 20° C.]: | 0.1086 |
| CY-3-O2 | 11.50% | Δε [1 kHz, 20° C.]: | −3.0 |
| CCY-3-O1 | 10.00% | $\epsilon_\parallel$ [1 kHz, 20° C.]: | 3.6 |
| CCY-3-O2 | 4.00% | $\epsilon_\perp$ [1 kHz, 20° C.]: | 6.6 |
| CPY-2-O2 | 10.00% | $\gamma_1$ [mPa · s, 20° C.]: | 87 |
| CPY-3-O2 | 7.00% | $K_1$ [pN, 20° C.]: | 12.9 |
| CC-3-V | 37.50% | $K_3$ [pN, 20° C.]: | 14.1 |
| BCH-32 | 6.50% | $V_0$ [20° C., V]: | 2.30 |
| PPGU-3-F | 0.50% | | |

Example 128

| | | | |
|---|---|---|---|
| PY-V2-O2 | 12.00% | Clearing point [° C.]: | 76 |
| CY-V-O2 | 9.00% | Δn [589 nm, 20° C.]: | 0.1087 |
| CCY-3-O1 | 9.00% | Δε [1 kHz, 20° C.]: | −3.1 |
| CCY-V2-O2 | 8.00% | $\epsilon_\parallel$ [1 kHz, 20° C.]: | 3.7 |
| CPY-2-O2 | 8.00% | $\epsilon_\perp$ [1 kHz, 20° C.]: | 6.9 |
| CPY-V-O2 | 10.50% | $\gamma_1$ [mPa · s, 20° C.]: | 83 |
| CC-3-V | 36.50% | $K_1$ [pN, 20° C.]: | 12.4 |
| BCH-32 | 6.50% | $K_3$ [pN, 20° C.]: | 14.7 |
| PPGU-3-F | 0.50% | $V_0$ [20° C., V]: | 2.28 |

Example 129

| | | | |
|---|---|---|---|
| PY-V2-O2 | 11.50% | Clearing point [° C.]: | 75.5 |
| CY-3-O2 | 11.00% | Δn [589 nm, 20° C.]: | 0.1074 |
| CCY-3-O1 | 9.00% | Δε [1 kHz, 20° C.]: | −3.1 |
| CCY-3-O2 | 4.00% | $\epsilon_\parallel$ [1 kHz, 20° C.]: | 3.7 |
| CPY-2-O2 | 12.00% | $\epsilon_\perp$ [1 kHz, 20° C.]: | 6.8 |
| CPY-3-O2 | 9.00% | $\gamma_1$ [mPa · s, 20° C.]: | 87 |
| CC-3-V | 37.00% | $K_1$ [pN, 20° C.]: | 13.0 |
| BCH-32 | 6.00% | $K_3$ [pN, 20° C.]: | 14.7 |
| PPGU-3-F | 0.50% | $V_0$ [20° C., V]: | 2.29 |

Example 130

| | | | |
|---|---|---|---|
| PY-1V-O2 | 10.50% | Clearing point [° C.]: | 72 |
| CY-3-O2 | 18.00% | Δn [589 nm, 20° C.]: | 0.1068 |
| CCY-3-O1 | 7.00% | Δε [1 kHz, 20° C.]: | −3.1 |
| CCY-3-O2 | 5.00% | $\epsilon_\parallel$ [1 kHz, 20° C.]: | 3.6 |
| CPY-2-O2 | 7.00% | $\epsilon_\perp$ [1 kHz, 20° C.]: | 6.7 |
| CPY-3-O2 | 8.00% | $\gamma_1$ [mPa · s, 20° C.]: | 78 |
| CC-3-V | 41.00% | $K_1$ [pN, 20° C.]: | 12.6 |
| BCH-32 | 3.00% | $K_3$ [pN, 20° C.]: | 14.6 |
| PPGU-3-F | 0.50% | $V_0$ [20° C., V]: | 2.30 |

Example 131

| | | | |
|---|---|---|---|
| PY-V2-O2 | 10.50% | Clearing point [° C.]: | 75 |
| CY-3-O2 | 10.00% | Δn [589 nm, 20° C.]: | 0.1070 |
| CCY-3-O1 | 6.00% | Δε [1 kHz, 20° C.]: | −3.3 |
| CCY-3-O2 | 9.00% | $\varepsilon_{\parallel}$ [1 kHz, 20° C.]: | 3.7 |
| CPY-2-O2 | 8.00% | $\varepsilon_{\perp}$ [1 kHz, 20° C.]: | 7.0 |
| CPY-3-O2 | 12.00% | $\gamma_1$ [mPa · s, 20° C.]: | 90 |
| CC-3-V | 35.00% | $K_1$ [pN, 20° C.]: | 12.7 |
| BCH-32 | 6.50% | $K_3$ [pN, 20° C.]: | 14.5 |
| PPGU-3-F | 0.50% | $V_0$ [20° C., V]: | 2.23 |
| Y-4O-O4 | 2.50% | LTS (bulk) [−20° C.]: | >1000 h |
| | | LTS (bulk) [−30° C.]: | >1000 h |

Example 132

| | | | |
|---|---|---|---|
| PY-1V-O2 | 10.00% | Clearing point [° C.]: | 73.5 |
| CY-3-O2 | 18.00% | Δn [589 nm, 20° C.]: | 0.1084 |
| CCY-3-O1 | 6.00% | Δε [1 kHz, 20° C.]: | −3.2 |
| CCY-3-O2 | 6.00% | $\varepsilon_{\parallel}$ [1 kHz, 20° C.]: | 3.6 |
| CPY-2-O2 | 7.00% | $\varepsilon_{\perp}$ [1 kHz, 20° C.]: | 6.8 |
| CPY-3-O2 | 9.00% | $\gamma_1$ [mPa · s, 20° C.]: | 82 |
| CC-3-V | 40.00% | $K_1$ [pN, 20° C.]: | 12.8 |
| BCH-32 | 3.50% | $K_3$ [pN, 20° C.]: | 14.9 |
| PPGU-3-F | 0.50% | $V_0$ [20° C., V]: | 2.3 |

Example 133

| | | | |
|---|---|---|---|
| PY-V2-O2 | 11.50% | Clearing point [° C.]: | 74.5 |
| CY-3-O2 | 10.00% | Δn [589 nm, 20° C.]: | 0.1071 |
| CCY-3-O1 | 4.50% | Δε [1 kHz, 20° C.]: | −3.4 |
| CCY-3-O2 | 11.00% | $\varepsilon_{\parallel}$ [1 kHz, 20° C.]: | 3.8 |
| CPY-2-O2 | 7.00% | $\varepsilon_{\perp}$ [1 kHz, 20° C.]: | 7.1 |
| CPY-3-O2 | 12.50% | $\gamma_1$ [mPa · s, 20° C.]: | 91 |
| CC-3-V | 34.50% | $K_1$ [pN, 20° C.]: | 12.7 |
| BCH-32 | 6.00% | $K_3$ [pN, 20° C.]: | 14.6 |
| PPGU-3-F | 0.50% | $V_0$ [20° C., V]: | 2.2 |
| Y-4O-O4 | 2.50% | | |

Example 134

| | | | |
|---|---|---|---|
| PY-V2-O2 | 14.00% | Clearing point [° C.]: | 74.5 |
| CY-3-O2 | 10.50% | Δn [589 nm, 20° C.]: | 0.1075 |
| CCY-3-O1 | 5.00% | Δε [1 kHz, 20° C.]: | −3.2 |
| CCY-3-O2 | 10.00% | $\varepsilon_{\parallel}$ [1 kHz, 20° C.]: | 3.6 |
| CPY-2-O2 | 9.00% | $\varepsilon_{\perp}$ [1 kHz, 20° C.]: | 6.8 |
| CPY-3-O2 | 12.00% | $\gamma_1$ [mPa · s, 20° C.]: | 90 |
| CC-3-V | 36.50% | $K_1$ [pN, 20° C.]: | 11.7 |
| BCH-32 | 2.50% | $K_3$ [pN, 20° C.]: | 14.1 |
| PPGU-3-F | 0.50% | $V_0$ [20° C., V]: | 2.21 |

Example 135

| | | | |
|---|---|---|---|
| PY-3V-O2 | 10.50% | Clearing point [° C.]: | 74.5 |
| CY-3-O2 | 15.00% | Δn [589 nm, 20° C.]: | 0.1073 |
| CCY-3-O1 | 7.50% | Δε [1 kHz, 20° C.]: | −3.0 |
| CCY-3-O2 | 4.00% | $\varepsilon_{\parallel}$ [1 kHz, 20° C.]: | 3.6 |
| CPY-2-O2 | 11.00% | $\varepsilon_{\perp}$ [1 kHz, 20° C.]: | 6.6 |
| CPY-3-O2 | 8.00% | $\gamma_1$ [mPa · s, 20° C.]: | 84 |
| CC-3-V | 40.50% | $K_1$ [pN, 20° C.]: | 12.8 |
| BCH-32 | 3.00% | $K_3$ [pN, 20° C.]: | 14.1 |
| PPGU-3-F | 0.50% | $V_0$ [20° C., V]: | 2.29 |

Example 136

| | | | |
|---|---|---|---|
| CC-3-V | 36.50% | Clearing point [° C.]: | 73 |
| CY-3-O2 | 10.00% | Δn [589 nm, 20° C.]: | 0.1081 |
| CCY-3-O1 | 6.50% | Δε [1 kHz, 20° C.]: | −3.3 |
| CCY-3-O2 | 11.00% | $\varepsilon_{\parallel}$ [1 kHz, 20° C.]: | 3.5 |
| CCY-4-O2 | 6.00% | $\varepsilon_{\perp}$ [1 kHz, 20° C.]: | 6.8 |
| CPY-3-O2 | 8.50% | $\gamma_1$ [mPa · s, 20° C.]: | 90 |
| PY-3-O2 | 4.00% | $K_1$ [pN, 20° C.]: | 13.2 |
| PY-3V-O2 | 6.50% | $K_3$ [pN, 20° C.]: | 15.0 |
| PY-1-O4 | 4.50% | $V_0$ [20° C., V]: | 2.25 |
| PYP-2-3 | 3.00% | | |
| PP-1-2V1 | 3.50% | | |

Example 137

| | | | |
|---|---|---|---|
| PY-V2-O2 | 7.00% | Clearing point [° C.]: | 75.5 |
| CY-3-O2 | 10.00% | Δn [589 nm, 20° C.]: | 0.1086 |
| CY-1V2-O2 | 6.00% | Δε [1 kHz, 20° C.]: | −2.7 |
| CCY-3-O1 | 5.00% | $\varepsilon_{\parallel}$ [1 kHz, 20° C.]: | 3.5 |
| CCY-3-O2 | 2.00% | $\varepsilon_{\perp}$ [1 kHz, 20° C.]: | 6.2 |
| CPY-2-O2 | 12.00% | $\gamma_1$ [mPa · s, 20° C.]: | 85 |
| CPY-3-O2 | 10.00% | $K_1$ [pN, 20° C.]: | 12.8 |
| CC-3-V | 37.00% | $K_3$ [pN, 20° C.]: | 14.5 |
| BCH-32 | 10.50% | $V_0$ [20° C., V]: | 2.45 |
| PPGU-3-F | 0.50% | LTS (bulk) [−20° C.]: | >1000 h |

Example 138

| | | | |
|---|---|---|---|
| PY-V-O2 | 5.00% | Clearing point [° C.]: | 75 |
| PY-V2-O2 | 5.00% | Δn [589 nm, 20° C.]: | 0.1087 |
| PY-3-O2 | 3.00% | Δε [1 kHz, 20° C.]: | −3.1 |
| CY-V-O2 | 4.00% | $\varepsilon_{\parallel}$ [1 kHz, 20° C.]: | 3.7 |
| CY-3-O2 | 3.00% | $\varepsilon_{\perp}$ [1 kHz, 20° C.]: | 6.8 |
| CCY-3-O1 | 3.50% | $\gamma_1$ [mPa · s, 20° C.]: | 83 |
| CCY-3-O2 | 7.00% | $K_1$ [pN, 20° C.]: | 12.6 |
| CCY-4-O2 | 5.00% | $K_3$ [pN, 20° C.]: | 14.2 |
| CPY-2-O2 | 8.00% | $V_0$ [20° C., V]: | 2.28 |
| CPY-3-O2 | 10.00% | LTS (bulk) [−20° C.]: | >1000 h |
| CC-3-V | 38.00% | | |
| BCH-32 | 6.00% | | |
| PPGU-3-F | 0.50% | | |
| Y-4O-O4 | 2.00% | | |

Example 139

| | | | |
|---|---|---|---|
| PY-V2-O2 | 5.50% | Clearing point [° C.]: | 75.5 |
| PY-3-O2 | 8.00% | Δn [589 nm, 20° C.]: | 0.1075 |
| CY-V-O2 | 6.00% | Δε [1 kHz, 20° C.]: | −3.1 |
| CCY-3-O1 | 5.50% | $\varepsilon_{\parallel}$ [1 kHz, 20° C.]: | 3.7 |
| CCY-3-O2 | 5.00% | $\varepsilon_{\perp}$ [1 kHz, 20° C.]: | 6.8 |
| CCY-4-O2 | 4.00% | $\gamma_1$ [mPa · s, 20° C.]: | 88 |
| CPY-2-O2 | 8.00% | $K_1$ [pN, 20° C.]: | 12.6 |
| CPY-3-O2 | 9.00% | $K_3$ [pN, 20° C.]: | 14.0 |
| CC-3-V | 35.00% | $V_0$ [20° C., V]: | 2.26 |
| BCH-32 | 8.00% | LTS (bulk) [−20° C.]: | >1000 h |

-continued

| | | | |
|---|---|---|---|
| PPGU-3-F | 0.50% | LTS (bulk) [−30° C.]: | >1000 h |
| Y-4O-O4 | 2.00% | | |

Example 140

| | | | |
|---|---|---|---|
| PY-V-O2 | 5.50% | Clearing point [° C.]: | 74.5 |
| PY-3-O2 | 4.50% | Δn [589 nm, 20° C.]: | 0.1098 |
| CY-3-O2 | 11.00% | Δε [1 kHz, 20° C.]: | −3.0 |
| CCY-3-O2 | 10.50% | ε$_{\parallel}$ [1 kHz, 20° C.]: | 3.7 |
| CPY-2-O2 | 10.00% | ε$_{\perp}$ [1 kHz, 20° C.]: | 6.7 |
| CPY-3-O2 | 11.00% | γ$_1$ [mPa · s, 20° C.]: | 85 |
| CC-3-V | 37.00% | K$_1$ [pN, 20° C.]: | 12.9 |
| BCH-32 | 8.00% | K$_3$ [pN, 20° C.]: | 14.5 |
| PPGU-3-F | 0.50% | V$_0$ [20° C., V]: | 2.31 |
| Y-4O-O4 | 2.00% | LTS (bulk) [−20° C.]: | >1000 h |
| | | LTS (bulk) [−30° C.]: | >1000 h |

Example 141

| | | | |
|---|---|---|---|
| PY-3-O2 | 6.00% | Clearing point [° C.]: | 75 |
| PY-V2-O2 | 6.00% | Δn [589 nm, 20° C.]: | 0.1079 |
| CY-3-O2 | 12.00% | Δε [1 kHz, 20° C.]: | −3.2 |
| CCY-3-O1 | 4.00% | ε$_{\parallel}$ [1 kHz, 20° C.]: | 3.7 |
| CCY-3-O2 | 9.50% | ε$_{\perp}$ [1 kHz, 20° C.]: | 6.9 |
| CPY-2-O2 | 9.50% | γ$_1$ [mPa · s, 20° C.]: | 91 |
| CPY-3-O2 | 10.00% | K$_1$ [pN, 20° C.]: | 13.1 |
| CC-3-V | 35.50% | K$_3$ [pN, 20° C.]: | 14.9 |
| BCH-32 | 7.00% | V$_0$ [20° C., V]: | 2.29 |
| PPGU-3-F | 0.50% | LTS (bulk) [−20° C.]: | >1000 h |
| | | LTS (bulk) [−30° C.]: | >1000 h |

Example 142

| | | | |
|---|---|---|---|
| PY-3-O2 | 6.00% | Clearing point [° C.]: | 75 |
| PY-1V2-O2 | 6.50% | Δn [589 nm, 20° C.]: | 0.1088 |
| CY-3-O2 | 13.00% | Δε [1 kHz, 20° C.]: | −3.3 |
| CCY-3-O2 | 12.00% | ε$_{\parallel}$ [1 kHz, 20° C.]: | 3.7 |
| CPY-2-O2 | 8.00% | ε$_{\perp}$ [1 kHz, 20° C.]: | 6.9 |
| CPY-3-O2 | 12.00% | γ$_1$ [mPa · s, 20° C.]: | 93 |
| CC-3-V | 36.00% | K$_1$ [pN, 20° C.]: | 13.5 |
| BCH-32 | 6.00% | K$_3$ [pN, 20° C.]: | 15.6 |
| PPGU-3-F | 0.50% | V$_0$ [20° C., V]: | 2.32 |

Example 143

| | | | |
|---|---|---|---|
| PY-3-O2 | 4.50% | Clearing point [° C.]: | 75 |
| PY-V2-O2 | 6.00% | Δn [589 nm, 20° C.]: | 0.1078 |
| CY-3-O2 | 10.00% | Δε [1 kHz, 20° C.]: | −3.1 |
| CCY-3-O1 | 2.00% | ε$_{\parallel}$ [1 kHz, 20° C.]: | 3.7 |
| CCY-3-O2 | 11.00% | ε$_{\perp}$ [1 kHz, 20° C.]: | 6.8 |
| CPY-2-O2 | 8.00% | γ$_1$ [mPa · s, 20° C.]: | 88 |
| CPY-3-O2 | 12.00% | K$_1$ [pN, 20° C.]: | 13.0 |
| CC-3-V | 36.00% | K$_3$ [pN, 20° C.]: | 14.8 |
| BCH-32 | 8.00% | V$_0$ [20° C., V]: | 2.31 |
| PPGU-3-F | 0.50% | LTS (bulk) [−30° C.]: | >1000 h |
| Y-4O-O4 | 2.00% | | |

Example 143a

The mixture according to Example 143 additionally comprises 0.01% of

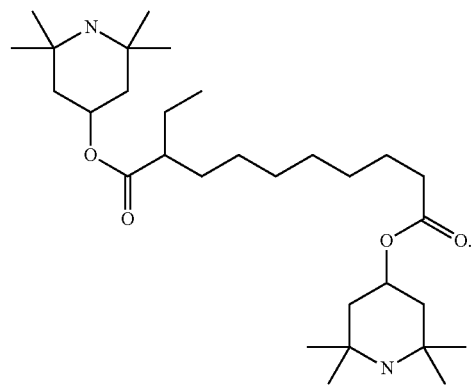

Example 144

| | | | |
|---|---|---|---|
| BCH-32 | 6.00% | Clearing point [° C.]: | 77 |
| CCH-23 | 16.00% | Δn [589 nm, 20° C.]: | 0.0953 |
| CCH-301 | 3.50% | Δε [1 kHz, 20° C.]: | −2.5 |
| CCH-34 | 6.00% | ε$_{\parallel}$ [1 kHz, 20° C.]: | 3.3 |
| CCH-35 | 6.00% | ε$_{\perp}$ [1 kHz, 20° C.]: | 5.8 |
| CCP-3-1 | 12.00% | γ$_1$ [mPa · s, 20° C.]: | 96 |
| CY-3-O2 | 15.00% | K$_1$ [pN, 20° C.]: | 14.6 |
| CCY-3-O1 | 5.00% | K$_3$ [pN, 20° C.]: | 15.6 |
| CCY-3-O2 | 7.00% | V$_0$ [20° C., V]: | 2.66 |
| CPY-3-O2 | 8.50% | LTS (bulk) [−20° C.] | >1000 h |
| PCH-302 | 6.00% | LTS (bulk) [−30° C.] | >1000 h |
| PY-V2-O2 | 9.00% | | |

Example 145

| | | | |
|---|---|---|---|
| BCH-32 | 4.00% | Clearing point [° C.]: | 76 |
| CC-3-V | 34.50% | Δn [589 nm, 20° C.]: | 0.0955 |
| CCP-3-1 | 10.00% | Δε [1 kHz, 20° C.]: | −2.5 |
| CY-3-O2 | 14.00% | ε$_{\parallel}$ [1 kHz, 20° C.]: | 3.4 |
| CCY-3-O1 | 6.00% | ε$_{\perp}$ [1 kHz, 20° C.]: | 5.9 |
| CCY-3-O2 | 9.00% | γ$_1$ [mPa · s, 20° C.]: | 82 |
| CPY-3-O2 | 9.00% | K$_1$ [pN, 20° C.]: | 13.4 |
| PCH-302 | 4.50% | K$_3$ [pN, 20° C.]: | 16.2 |
| PY-V2-O2 | 9.00% | V$_0$ [20° C., V]: | 2.66 |
| | | LTS (bulk) [−20° C.]: | >1000 h |
| | | LTS (bulk) [−30° C.]: | >1000 h |

Example 146

| | | | |
|---|---|---|---|
| BCH-32 | 6.50% | Clearing point [° C.]: | 76.5 |
| CCH-23 | 16.00% | Δn [589 nm, 20° C.]: | 0.0933 |
| CCH-301 | 4.50% | Δε [1 kHz, 20° C.]: | −2.5 |
| CCH-34 | 8.00% | ε$_{\parallel}$ [1 kHz, 20° C.]: | 3.3 |
| CCH-35 | 6.00% | ε$_{\perp}$ [1 kHz, 20° C.]: | 5.8 |
| CCP-3-1 | 8.50% | γ$_1$ [mPa · s, 20° C.]: | 96 |
| CY-3-O2 | 15.00% | K$_1$ [pN, 20° C.]: | 14.3 |
| CCY-3-O1 | 5.50% | K$_3$ [pN, 20° C.]: | 15.0 |
| CCY-3-O2 | 8.00% | V$_0$ [20° C., V]: | 2.57 |
| CPY-3-O2 | 9.00% | | |
| PCH-302 | 4.50% | | |
| PY-V2-O2 | 8.50% | | |

Example 147

| Component | % | Property | Value |
|---|---|---|---|
| Y-4O-O4 | 7.00% | Clearing point [° C.]: | 75.5 |
| PY-1-O4 | 2.00% | Δn [589 nm, 20° C.]: | 0.1062 |
| CCY-3-O1 | 2.50% | Δε [1 kHz, 20° C.]: | -2.2 |
| CCY-3-O2 | 8.00% | $\epsilon_{\parallel}$ [1 kHz, 20° C.]: | 3.4 |
| CPY-3-O2 | 10.00% | $\epsilon_{\perp}$ [1 kHz, 20° C.]: | 5.5 |
| PYP-2-3 | 8.50% | $\gamma_1$ [mPa·s, 20° C.]: | 90 |
| CCH-23 | 19.00% | $K_1$ [pN, 20° C.]: | 14.5 |
| CCH-34 | 6.00% | $K_3$ [pN, 20° C.]: | 14.2 |
| CCH-35 | 6.00% | $V_0$ [20° C., V]: | 2.70 |
| PCH-302 | 8.00% | | |
| BCH-32 | 7.00% | | |
| CCP-3-1 | 10.00% | | |
| PY-V2-O2 | 6.00% | | |

Example 148

| Component | % | Property | Value |
|---|---|---|---|
| BCH-32 | 7.00% | Clearing point [° C.]: | 75 |
| CCH-23 | 16.00% | Δn [589 nm, 20° C.]: | 0.0930 |
| CCH-301 | 3.50% | Δε [1 kHz, 20° C.]: | -2.5 |
| CCH-34 | 6.50% | $\epsilon_{\parallel}$ [1 kHz, 20° C.]: | 3.3 |
| CCH-35 | 6.50% | $\epsilon_{\perp}$ [1 kHz, 20° C.]: | 5.8 |
| CCP-3-1 | 9.50% | $\gamma_1$ [mPa·s, 20° C.]: | 93 |
| CY-3-O2 | 7.50% | $K_1$ [pN, 20° C.]: | 13.7 |
| CY-V1-O2 | 7.00% | $K_3$ [pN, 20° C.]: | 14.1 |
| CCY-3-O1 | 6.00% | $V_0$ [20° C., V]: | 2.52 |
| CCY-3-O2 | 9.00% | LTS (bulk) [-20° C.] | >1000 h |
| CPY-3-O2 | 7.00% | | |
| PCH-302 | 5.00% | | |
| PY-V2-O2 | 9.50% | | |

Example 149

| Component | % | Property | Value |
|---|---|---|---|
| BCH-32 | 7.00% | Clearing point [° C.]: | 74 |
| CCH-23 | 15.00% | Δn [589 nm, 20° C.]: | 0.0921 |
| CCH-301 | 4.00% | Δε [1 kHz, 20° C.]: | -2.5 |
| CCH-34 | 8.00% | $\epsilon_{\parallel}$ [1 kHz, 20° C.]: | 3.4 |
| CCH-35 | 7.00% | $\epsilon_{\perp}$ [1 kHz, 20° C.]: | 5.9 |
| CCP-3-1 | 8.00% | $\gamma_1$ [mPa·s, 20° C.]: | 95 |
| CY-3-O2 | 9.00% | $K_1$ [pN, 20° C.]: | 13.4 |
| CY-V1-O2 | 7.00% | $K_3$ [pN, 20° C.]: | 14.1 |
| CCY-3-O1 | 9.00% | $V_0$ [20° C., V]: | 2.49 |
| CCY-3-O2 | 7.00% | | |
| CPY-1V-O1 | 7.00% | | |
| PCH-302 | 4.00% | | |
| PY-V2-O2 | 8.00% | | |

Example 150

| Component | % | Property | Value |
|---|---|---|---|
| BCH-32 | 7.00% | Clearing point [° C.]: | 77 |
| CCH-23 | 13.00% | Δn [589 nm, 20° C.]: | 0.0935 |
| CCH-301 | 3.00% | Δε [1 kHz, 20° C.]: | -2.4 |
| CCH-34 | 10.00% | $\epsilon_{\parallel}$ [1 kHz, 20° C.]: | 3.3 |
| CCH-35 | 6.00% | $\epsilon_{\perp}$ [1 kHz, 20° C.]: | 5.7 |
| CCP-3-1 | 10.50% | $\gamma_1$ [mPa·s, 20° C.]: | 97 |
| CY-3-O2 | 8.50% | $K_1$ [pN, 20° C.]: | 14.1 |
| CY-V1-O2 | 5.50% | $K_3$ [pN, 20° C.]: | 14.6 |
| CCY-3-O1 | 10.00% | $V_0$ [20° C., V]: | 2.62 |
| CCY-3-O2 | 6.00% | | |
| CPY-1V-O1 | 5.50% | | |
| PCH-302 | 6.00% | | |
| PY-V2-O2 | 9.00% | | |

Example 151

| Component | % | Property | Value |
|---|---|---|---|
| CY-3-O2 | 9.50% | Clearing point [° C.]: | 75 |
| PY-V-O2 | 9.50% | Δn [589 nm, 20° C.]: | 0.1101 |
| CCY-3-O2 | 9.00% | Δε [1 kHz, 20° C.]: | -3.0 |
| CCY-4-O2 | 6.00% | $\epsilon_{\parallel}$ [1 kHz, 20° C.]: | 3.5 |
| CPY-2-O2 | 5.00% | $\epsilon_{\perp}$ [1 kHz, 20° C.]: | 6.5 |
| CPY-3-O2 | 9.50% | $\gamma_1$ [mPa·s, 20° C.]: | 100 |
| CCH-34 | 10.00% | $K_1$ [pN, 20° C.]: | 13.4 |
| CCH-23 | 21.00% | $K_3$ [pN, 20° C.]: | 14.3 |
| PYP-2-3 | 7.00% | $V_0$ [20° C., V]: | 2.31 |
| CCP-3-1 | 3.00% | | |
| PCH-301 | 10.50% | | |

Example 152

| Component | % | Property | Value |
|---|---|---|---|
| PY-3-O2 | 11.00% | Clearing point [° C.]: | 75 |
| PY-1V-O2 | 8.00% | Δn [589 nm, 20° C.]: | 0.1100 |
| CY-3-O2 | 5.00% | Δε [1 kHz, 20° C.]: | -3.4 |
| CCY-3-O2 | 9.00% | $\epsilon_{\parallel}$ [1 kHz, 20° C.]: | 3.5 |
| CCY-3-O1 | 6.00% | $\epsilon_{\perp}$ [1 kHz, 20° C.]: | 6.9 |
| CPY-2-O2 | 7.00% | $\gamma_1$ [mPa·s, 20° C.]: | 107 |
| CPY-3-O2 | 10.00% | $K_1$ [pN, 20° C.]: | 14.3 |
| CCH-34 | 10.00% | $K_3$ [pN, 20° C.]: | 15.2 |
| CCH-23 | 21.00% | $V_0$ [20° C., V]: | 2.24 |
| CCP-3-1 | 4.00% | | |
| PCH-301 | 9.00% | | |

Example 153

| Component | % | Property | Value |
|---|---|---|---|
| CY-3-O2 | 10.00% | Clearing point [° C.]: | 75 |
| PY-V-O2 | 9.00% | Δn [589 nm, 20° C.]: | 0.1099 |
| CCY-3-O2 | 9.00% | Δε [1 kHz, 20° C.]: | -3.2 |
| CCY-4-O2 | 7.00% | $\epsilon_{\parallel}$ [1 kHz, 20° C.]: | 3.5 |
| CPY-2-O2 | 7.00% | $\epsilon_{\perp}$ [1 kHz, 20° C.]: | 6.7 |
| CPY-3-O2 | 9.00% | $\gamma_1$ [mPa·s, 20° C.]: | 104 |
| CCH-34 | 11.00% | $K_1$ [pN, 20° C.]: | 13.2 |
| CCH-23 | 20.00% | $K_3$ [pN, 20° C.]: | 14.1 |
| PYP-2-3 | 7.00% | $V_0$ [20° C., V]: | 2.24 |
| CCP-3-1 | 1.00% | | |
| PCH-301 | 10.00% | | |

Example 154

| Component | % | Property | Value |
|---|---|---|---|
| CY-3-O2 | 12.50% | Clearing point [° C.]: | 74 |
| PY-3-O2 | 4.00% | Δn [589 nm, 20° C.]: | 0.1026 |
| PY-V-O2 | 5.00% | Δε [1 kHz, 20° C.]: | -3.2 |
| CCY-3-O2 | 9.00% | $\epsilon_{\parallel}$ [1 kHz, 20° C.]: | 3.5 |
| CCY-3-O1 | 6.00% | $\epsilon_{\perp}$ [1 kHz, 20° C.]: | 6.7 |
| CCY-4-O2 | 2.00% | $\gamma_1$ [mPa·s, 20° C.]: | 102 |
| CPY-2-O2 | 7.00% | $K_1$ [pN, 20° C.]: | 13.5 |
| CPY-3-O2 | 9.00% | $K_3$ [pN, 20° C.]: | 14.1 |
| CCH-34 | 10.00% | $V_0$ [20° C., V]: | 2.22 |
| CCH-23 | 21.00% | LTS (bulk) [-20° C.] | >1000 h |
| BCH-32 | 5.50% | | |
| PCH-301 | 8.00% | | |
| PYP-2-3 | 1.00% | | |

Example 155

| | | | |
|---|---|---|---|
| PY-3-O2 | 12.00% | Clearing point [° C.]: | 75 |
| PY-V-O2 | 5.00% | Δn [589 nm, 20° C.]: | 0.1112 |
| CCY-3-O2 | 10.00% | Δε [1 kHz, 20° C.]: | −3.1 |
| CCY-4-O2 | 9.50% | $\varepsilon_{\parallel}$ [1 kHz, 20° C.]: | 3.5 |
| CPY-2-O2 | 6.00% | $\varepsilon_{\perp}$ [1 kHz, 20° C.]: | 6.6 |
| CPY-3-O2 | 9.00% | $\gamma_1$ [mPa · s, 20° C.]: | 107 |
| CCH-34 | 5.50% | $K_1$ [pN, 20° C.]: | 13.7 |
| CCH-23 | 21.00% | $K_3$ [pN, 20° C.]: | 14.4 |
| PYP-2-3 | 4.50% | $V_0$ [20° C., V]: | 2.29 |
| CCH-35 | 4.00% | | |
| PCH-301 | 12.00% | | |
| BCH-32 | 1.50% | | |

Example 156

| | | | |
|---|---|---|---|
| PY-V-O2 | 8.00% | Clearing point [° C.]: | 74.8 |
| CY-3-O2 | 5.50% | Δn [589 nm, 20° C.]: | 0.1073 |
| CY-V-O2 | 11.00% | Δε [1 kHz, 20° C.]: | −3.1 |
| CCY-3-O1 | 4.00% | $\varepsilon_{\parallel}$ [1 kHz, 20° C.]: | 3.7 |
| CCY-3-O2 | 10.00% | $\varepsilon_{\perp}$ [1 kHz, 20° C.]: | 6.8 |
| CPY-3-O2 | 10.00% | $\gamma_1$ [mPa · s, 20° C.]: | 82 |
| CPY-V-O4 | 7.00% | $K_1$ [pN, 20° C.]: | 12.1 |
| CC-3-V | 37.00% | $K_3$ [pN, 20° C.]: | 14.6 |
| BCH-32 | 7.00% | $V_0$ [20° C., V]: | 2.30 |
| PPGU-3-F | 0.50% | | |

Example 157

| | | | |
|---|---|---|---|
| PY-3-O2 | 5.00% | Clearing point [° C.]: | 76 |
| PY-V2-O2 | 6.50% | Δn [589 nm, 20° C.]: | 0.1082 |
| CY-3-O2 | 12.00% | Δε [1 kHz, 20° C.]: | −3.2 |
| CCY-3-O1 | 5.00% | $\varepsilon_{\parallel}$ [1 kHz, 20° C.]: | 3.7 |
| CCY-3-O2 | 10.00% | $\varepsilon_{\perp}$ [1 kHz, 20° C.]: | 6.9 |
| CPY-V-O2 | 9.00% | $\gamma_1$ [mPa · s, 20° C.]: | 89 |
| CPY-V-O4 | 10.00% | $K_1$ [pN, 20° C.]: | 12.6 |
| CC-3-V | 35.00% | $K_3$ [pN, 20° C.]: | 14.6 |
| BCH-32 | 7.00% | $V_0$ [20° C., V]: | 2.26 |
| PPGU-3-F | 0.50% | | |

Example 157a

The mixture according to Example 157 additionally comprises 0.01% of

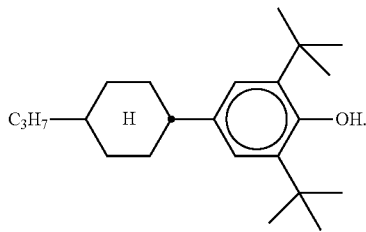

Example 157b

The mixture according to Example 157 additionally comprises 0.01% of

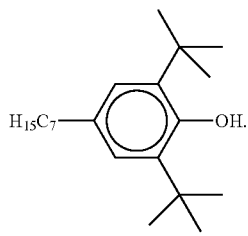

Example 158

| | | | |
|---|---|---|---|
| PY-V-O2 | 5.00% | Clearing point [° C.]: | 73.5 |
| PY-V2-O2 | 5.00% | Δn [589 nm, 20° C.]: | 0.1074 |
| PY-3-O2 | 3.00% | Δε [1 kHz, 20° C.]: | −2.9 |
| CY-V-O2 | 4.00% | $\varepsilon_{\parallel}$ [1 kHz, 20° C.]: | 3.7 |
| CY-3-O2 | 3.00% | $\varepsilon_{\perp}$ [1 kHz, 20° C.]: | 6.6 |
| CCY-3-O1 | 3.00% | $\gamma_1$ [mPa · s, 20° C.]: | 78 |
| CCY-3-O2 | 6.00% | $K_1$ [pN, 20° C.]: | 12.5 |
| CCY-4-O2 | 5.00% | $K_3$ [pN, 20° C.]: | 14.0 |
| CPY-2-O2 | 7.50% | $V_0$ [20° C., V]: | 2.33 |
| CPY-3-O2 | 10.00% | | |
| CC-3-V | 39.00% | | |
| BCH-32 | 7.00% | | |
| PPGU-3-F | 0.50% | | |
| Y-4O-O4 | 2.00% | | |

Example 159

| | | | |
|---|---|---|---|
| PY-V-O2 | 5.00% | Clearing point [° C.]: | 75 |
| CY-3-O2 | 8.00% | Δn [589 nm, 20° C.]: | 0.1078 |
| CY-V-O2 | 11.00% | Δε [1 kHz, 20° C.]: | −3.0 |
| CCY-3-O1 | 4.00% | $\varepsilon_{\parallel}$ [1 kHz, 20° C.]: | 3.7 |
| CCY-3-O2 | 7.00% | $\varepsilon_{\perp}$ [1 kHz, 20° C.]: | 6.7 |
| CPY-3-O2 | 8.00% | $\gamma_1$ [mPa · s, 20° C.]: | 84 |
| CPY-V-O4 | 5.00% | $K_1$ [pN, 20° C.]: | 11.9 |
| CPY-V-O2 | 7.00% | $K_3$ [pN, 20° C.]: | 14.4 |
| CC-3-V | 35.50% | $V_0$ [20° C., V]: | 2.30 |
| BCH-32 | 9.00% | | |
| PPGU-3-F | 0.50% | | |

Example 160

| | | | |
|---|---|---|---|
| APUQU-2-F | 9.00% | Clearing point [° C.]: | 77.5 |
| APUQU-3-F | 8.50% | Δn [589 nm, 20° C.]: | 0.1087 |
| CC-3-V | 43.50% | Δε [1 kHz, 20° C.]: | 9.9 |
| CCP-30CF$_3$ | 7.50% | $\varepsilon_{\parallel}$ [1 kHz, 20° C.]: | 13.7 |
| CCP-V-1 | 7.00% | $\varepsilon_{\perp}$ [1 kHz, 20° C.]: | 3.8 |
| DPGU-4-F | 3.50% | $\gamma_1$ [mPa · s, 20° C.]: | 68 |
| PGP-2-2V | 4.00% | $K_1$ [pN, 20° C.]: | 12.4 |
| PGUQU-4-F | 4.50% | $K_3$ [pN, 20° C.]: | 13.1 |
| PUQU-3-F | 8.50% | $V_0$ [20° C., V]: | 1.18 |
| PY-3V-O2 | 4.00% | LTS (bulk) [−20° C.]: | >1000 h |
| | | LTS (bulk) [−30° C.]: | >1000 h |

Example 161

| | | | |
|---|---|---|---|
| PY-1V-O2 | 4.50% | Clearing point [° C.]: | 73.5 |
| PY-V2-O2 | 5.00% | Δn [589 nm, 20° C.]: | 0.1074 |
| CY-3-O2 | 10.00% | Δε [1 kHz, 20° C.]: | −2.8 |

-continued

| | | | |
|---|---|---|---|
| CY-V-O2 | 4.50% | $\epsilon_\parallel$ [1 kHz, 20° C.]: | 3.6 |
| CCY-3-O1 | 6.00% | $\epsilon_\perp$ [1 kHz, 20° C.]: | 6.4 |
| CCY-3-O2 | 3.00% | $\gamma_1$ [mPa · s, 20° C.]: | 78 |
| CPY-2-O2 | 9.00% | $K_1$ [pN, 20° C.]: | 12.5 |
| CPY-3-O2 | 10.00% | $K_3$ [pN, 20° C.]: | 14.3 |
| CC-3-V | 39.50% | $V_0$ [20° C., V]: | 2.40 |
| BCH-32 | 8.00% | | |
| PPGU-3-F | 0.50% | | |

Example 162

| | | | |
|---|---|---|---|
| PY-V2-O2 | 5.50% | Clearing point [° C.]: | 74 |
| PY-3-O2 | 6.00% | $\Delta n$ [589 nm, 20° C.]: | 0.1074 |
| CY-V2-O2 | 5.00% | $\Delta\epsilon$ [1 kHz, 20° C.]: | −2.9 |
| CY-3-O2 | 4.00% | $\epsilon_\parallel$ [1 kHz, 20° C.]: | 3.7 |
| CCY-3-O1 | 3.00% | $\epsilon_\perp$ [1 kHz, 20° C.]: | 6.6 |
| CCY-3-O2 | 3.00% | $\gamma_1$ [mPa · s, 20° C.]: | 85 |
| CCY-4-O2 | 6.00% | $K_1$ [pN, 20° C.]: | 12.6 |
| CPY-2-O2 | 8.00% | $K_3$ [pN, 20° C.]: | 13.9 |
| CPY-3-O2 | 12.00% | $V_0$ [20° C., V]: | 2.30 |
| CC-3-V | 36.50% | | |
| BCH-32 | 8.50% | | |
| PPGU-3-F | 0.50% | | |
| Y-4O-O4 | 2.00% | | |

Example 163

| | | | |
|---|---|---|---|
| PY-V2-O2 | 6.00% | Clearing point [° C.]: | 74.5 |
| PY-3-O2 | 6.00% | $\Delta n$ [589 nm, 20° C.]: | 0.1086 |
| CY-1V2-O2 | 4.50% | $\Delta\epsilon$ [1 kHz, 20° C.]: | −2.9 |
| CY-3-O2 | 4.00% | $\epsilon_\parallel$ [1 kHz, 20° C.]: | 3.6 |
| CCY-3-O1 | 3.00% | $\epsilon_\perp$ [1 kHz, 20° C.]: | 6.5 |
| CCY-3-O2 | 3.00% | $\gamma_1$ [mPa · s, 20° C.]: | 86 |
| CCY-4-O2 | 6.00% | $K_1$ [pN, 20° C.]: | 12.8 |
| CPY-2-O2 | 8.00% | $K_3$ [pN, 20° C.]: | 14.2 |
| CPY-3-O2 | 12.00% | $V_0$ [20° C., V]: | 2.33 |
| CC-3-V | 37.00% | | |
| BCH-32 | 8.00% | | |
| PPGU-3-F | 0.50% | | |
| Y-4O-O4 | 2.00% | | |

Example 164

| | | | |
|---|---|---|---|
| PY-V2-O2 | 6.50% | Clearing point [° C.]: | 74 |
| CY-3-O2 | 11.00% | $\Delta n$ [589 nm, 20° C.]: | 0.1068 |
| CY-V2-O2 | 6.50% | $\Delta\epsilon$ [1 kHz, 20° C.]: | −2.8 |
| CCY-3-O1 | 6.00% | $\epsilon_\parallel$ [1 kHz, 20° C.]: | 3.6 |
| CCY-3-O2 | 2.00% | $\epsilon_\perp$ [1 kHz, 20° C.]: | 6.4 |
| CPY-2-O2 | 10.00% | $\gamma_1$ [mPa · s, 20° C.]: | 85 |
| CPY-3-O2 | 12.00% | $K_1$ [pN, 20° C.]: | 12.3 |
| CC-3-V | 36.00% | $K_3$ [pN, 20° C.]: | 14.1 |
| BCH-32 | 9.50% | $V_0$ [20° C., V]: | 2.35 |
| PPGU-3-F | 0.50% | | |

Example 165

| | | | |
|---|---|---|---|
| PCH-504FF | 10.00% | Clearing point [° C.]: | 72 |
| PCH-502FF | 8.00% | $\Delta n$ [589 nm, 20° C.]: | 0.1216 |
| PCH-304FF | 4.00% | $\Delta\epsilon$ [1 kHz, 20° C.]: | −4.0 |
| CCP-V2-1 | 6.00% | $\epsilon_\parallel$ [1 kHz, 20° C.]: | 3.9 |
| BCH-32 | 7.00% | $\epsilon_\perp$ [1 kHz, 20° C.]: | 7.9 |
| CCH-35 | 5.00% | $\gamma_1$ [mPa · s, 20° C.]: | 125 |
| CC-5-V | 7.00% | $K_1$ [pN, 20° C.]: | 14.6 |
| CC-3-V1 | 10.00% | $K_3$ [pN, 20° C.]: | 14.7 |
| CPY-2-O2 | 10.00% | $V_0$ [20° C., V]: | 2.03 |
| CPY-3-O2 | 13.00% | | |
| PY-V2-O2 | 20.00% | | |

Example 166

| | | | |
|---|---|---|---|
| CY-3-O2 | 24.00% | Clearing point [° C.]: | 81 |
| PY-1V2-O2 | 7.00% | $\Delta n$ [589 nm, 20° C.]: | 0.1019 |
| CCY-3-O3 | 4.00% | $\Delta\epsilon$ [1 kHz, 20° C.]: | −3.1 |
| CCY-3-O2 | 5.00% | $\epsilon_\parallel$ [1 kHz, 20° C.]: | 3.5 |
| CPY-2-O2 | 7.00% | $\epsilon_\perp$ [1 kHz, 20° C.]: | 6.6 |
| CPY-3-O2 | 5.00% | $\gamma_1$ [mPa · s, 20° C.]: | 126 |
| CCP-3-3 | 9.00% | $K_1$ [pN, 20° C.]: | 14.9 |
| CCP-3-1 | 9.00% | $K_3$ [pN, 20° C.]: | 16.0 |
| BCH-32 | 5.00% | $V_0$ [20° C., V]: | 2.39 |
| CCH-34 | 10.00% | LTS (bulk) [−20° C.]: | >1000 h |
| CCH-25 | 10.00% | | |
| PCH-301 | 5.00% | | |

Example 167

| | | | |
|---|---|---|---|
| CY-3-O2 | 18.00% | Clearing point [° C.]: | 80.5 |
| PY-1V2-O2 | 6.00% | $\Delta n$ [589 nm, 20° C.]: | 0.0949 |
| CCY-3-O2 | 8.00% | $\Delta\epsilon$ [1 kHz, 20° C.]: | −3.1 |
| CCY-4-O2 | 4.00% | $\epsilon_\parallel$ [1 kHz, 20° C.]: | 3.4 |
| CPY-2-O2 | 7.00% | $\epsilon_\perp$ [1 kHz, 20° C.]: | 6.4 |
| CPY-3-O2 | 10.00% | $\gamma_1$ [mPa · s, 20° C.]: | 113 |
| CCH-34 | 8.00% | $K_1$ [pN, 20° C.]: | 14.9 |
| CCH-23 | 22.00% | $K_3$ [pN, 20° C.]: | 16.0 |
| CCP-3-3 | 7.00% | $V_0$ [20° C., V]: | 2.41 |
| CCP-3-1 | 7.00% | LTS (bulk) [−20° C.]: | >1000 h |
| PCH-301 | 3.00% | | |

Example 168

| | | | |
|---|---|---|---|
| CY-1V-O1V | 20.00% | Clearing point [° C.]: | 82.5 |
| PY-1V2-O2 | 7.00% | $\Delta n$ [589 nm, 20° C.]: | 0.0987 |
| CY-3-O2 | 5.00% | $\Delta\epsilon$ [1 kHz, 20° C.]: | −3.0 |
| CCY-3-O2 | 5.00% | $\epsilon_\parallel$ [1 kHz, 20° C.]: | 3.4 |
| CCY-4-O2 | 5.00% | $\epsilon_\perp$ [1 kHz, 20° C.]: | 6.4 |
| CPY-3-O2 | 10.00% | $\gamma_1$ [mPa · s, 20° C.]: | 109 |
| CCH-34 | 10.00% | $K_1$ [pN, 20° C.]: | 14.9 |
| CC-3-V1 | 11.00% | $K_3$ [pN, 20° C.]: | 18.9 |
| CC-2-V1 | 11.00% | $V_0$ [20° C., V]: | 2.66 |
| CCP-3-1 | 8.00% | LTS (bulk) [−20° C.]: | >1000 h |
| PCH-301 | 2.00% | | |
| CCVC-3-V | 6.00% | | |

Example 169

| | | | |
|---|---|---|---|
| CY-1V-O1V | 20.00% | Clearing point [° C.]: | 81 |
| PY-1V2-O2 | 5.00% | $\Delta n$ [589 nm, 20° C.]: | 0.0953 |
| CY-3-O2 | 7.00% | $\Delta\epsilon$ [1 kHz, 20° C.]: | −3.0 |
| CCY-3-O2 | 6.00% | $\epsilon_\parallel$ [1 kHz, 20° C.]: | 3.4 |
| CCY-3-O1 | 6.00% | $\epsilon_\perp$ [1 kHz, 20° C.]: | 6.4 |
| CPY-3-O2 | 8.00% | $\gamma_1$ [mPa · s, 20° C.]: | 106 |

-continued

| | | | |
|---|---|---|---|
| CCH-34 | 10.00% | $K_1$ [pN, 20° C.]: | 14.5 |
| CC-3-V1 | 11.00% | $K_3$ [pN, 20° C.]: | 18.6 |
| CC-2-V1 | 11.00% | $V_0$ [20° C., V]: | 2.63 |
| CCP-3-1 | 8.00% | LTS (bulk) [−20° C.]: | >1000 h |
| PCH-301 | 2.00% | | |
| CCVC-3-V | 6.00% | | |

Example 170

| | | | |
|---|---|---|---|
| CY-1V-O1V | 20.00% | Clearing point [° C.]: | 81.5 |
| PY-1V2-O2 | 6.00% | Δn [589 nm, 20° C.]: | 0.0947 |
| CY-3-O2 | 6.00% | Δε [1 kHz, 20° C.]: | −3.0 |
| CCY-3-O2 | 7.00% | $\epsilon_{\parallel}$ [1 kHz, 20° C.]: | 3.4 |
| CCY-3-O1 | 7.00% | $\epsilon_{\perp}$ [1 kHz, 20° C.]: | 6.4 |
| CPY-3-O2 | 6.00% | $\gamma_1$ [mPa · s, 20° C.]: | 104 |
| CCH-34 | 10.00% | $K_1$ [pN, 20° C.]: | 14.6 |
| CC-3-V1 | 12.00% | $K_3$ [pN, 20° C.]: | 18.6 |
| CC-2-V1 | 12.00% | $V_0$ [20° C., V]: | 2.64 |
| CCP-V2-1 | 4.00% | | |
| CCP-V-1 | 4.00% | | |
| CCVC-3-V | 6.00% | | |

Example 171

| | | | |
|---|---|---|---|
| CY-1V-O1V | 20.00% | Clearing point [° C.]: | 80.5 |
| PY-1V2-O2 | 5.00% | Δn [589 nm, 20° C.]: | 0.0962 |
| CY-3-O2 | 12.00% | Δε [1 kHz, 20° C.]: | −3.4 |
| CCY-3-O2 | 6.00% | $\epsilon_{\parallel}$ [1 kHz, 20° C.]: | 3.5 |
| CCY-4-O2 | 6.00% | $\epsilon_{\perp}$ [1 kHz, 20° C.]: | 6.9 |
| CPY-3-O2 | 8.00% | $\gamma_1$ [mPa · s, 20° C.]: | 112 |
| CCH-34 | 7.00% | $K_1$ [pN, 20° C.]: | 14.3 |
| CC-3-V1 | 11.00% | $K_3$ [pN, 20° C.]: | 18.5 |
| CC-2-V1 | 11.00% | $V_0$ [20° C., V]: | 2.45 |
| CCP-3-1 | 6.00% | | |
| CCVC-3-V | 8.00% | | |

Example 172

| | | | |
|---|---|---|---|
| CY-1V-O1V | 20.00% | Clearing point [° C.]: | 81.5 |
| PY-1V2-O2 | 7.00% | Δn [589 nm, 20° C.]: | 0.0932 |
| CY-3-O2 | 7.50% | Δε [1 kHz, 20° C.]: | −3.3 |
| CCY-3-O2 | 10.50% | $\epsilon_{\parallel}$ [1 kHz, 20° C.]: | 3.4 |
| CCY-4-O2 | 10.00% | $\epsilon_{\perp}$ [1 kHz, 20° C.]: | 6.7 |
| CC-3-V2 | 11.00% | $\gamma_1$ [mPa · s, 20° C.]: | 104 |
| CC-3-V1 | 11.00% | $K_1$ [pN, 20° C.]: | 14.9 |
| CC-2-V1 | 11.00% | $K_3$ [pN, 20° C.]: | 19.0 |
| CCP-3-1 | 6.00% | $V_0$ [20° C., V]: | 2.55 |
| CCVC-3-V | 6.00% | LTS (bulk) [−20° C.]: | >1000 h |

Example 173

| | | | |
|---|---|---|---|
| CY-3-O2 | 12.00% | Clearing point [° C.]: | 80.0 |
| PY-1V2-O2 | 11.00% | Δn [589 nm, 20° C.]: | 0.0950 |
| CCY-3-O2 | 10.00% | Δε [1 kHz, 20° C.]: | −3.1 |
| CCY-4-O2 | 10.00% | $\epsilon_{\parallel}$ [1 kHz, 20° C.]: | 3.3 |
| CPY-3-O2 | 10.00% | $\epsilon_{\perp}$ [1 kHz, 20° C.]: | 6.4 |
| CCH-34 | 8.00% | $\gamma_1$ [mPa · s, 20° C.]: | 111 |
| CCH-23 | 22.00% | $K_1$ [pN, 20° C.]: | 15.1 |
| CCP-3-3 | 3.00% | $K_3$ [pN, 20° C.]: | 16.6 |

-continued

| | | | |
|---|---|---|---|
| CCP-3-1 | 7.00% | $V_0$ [20° C., V]: | 2.46 |
| PCH-301 | 7.00% | LTS (bulk) [−20° C.] | >1000 h |

Example 174

| | | | |
|---|---|---|---|
| CY-1V-O1V | 18.00% | Clearing point [° C.]: | 80.5 |
| PY-1V2-O2 | 4.00% | Δn [589 nm, 20° C.]: | 0.0943 |
| CY-3-O2 | 15.00% | Δε [1 kHz, 20° C.]: | −3.6 |
| CCY-3-O2 | 8.00% | $\epsilon_{\parallel}$ [1 kHz, 20° C.]: | 3.5 |
| CCY-4-O2 | 7.00% | $\epsilon_{\perp}$ [1 kHz, 20° C.]: | 7.2 |
| CPY-3-O2 | 7.00% | $\gamma_1$ [mPa · s, 20° C.]: | 112 |
| CCH-34 | 7.00% | $K_1$ [pN, 20° C.]: | 14.2 |
| CC-3-V1 | 11.00% | $K_3$ [pN, 20° C.]: | 18.2 |
| CC-2-V1 | 11.00% | $V_0$ [20° C., V]: | 2.37 |
| CCP-3-1 | 3.00% | | |
| CCVC-3-V | 9.00% | | |

Example 175

| | | | |
|---|---|---|---|
| CY-1V-O1V | 18.00% | Clearing point [° C.]: | 80.5 |
| PY-1V2-O2 | 3.00% | Δn [589 nm, 20° C.]: | 0.0946 |
| CY-3-O2 | 16.00% | Δε [1 kHz, 20° C.]: | −3.7 |
| CCY-3-O2 | 10.00% | $\epsilon_{\parallel}$ [1 kHz, 20° C.]: | 3.5 |
| CCY-4-O2 | 5.00% | $\epsilon_{\perp}$ [1 kHz, 20° C.]: | 7.2 |
| CPY-3-O2 | 7.00% | $\gamma_1$ [mPa · s, 20° C.]: | 113 |
| CC-3-V2 | 7.00% | $K_1$ [pN, 20° C.]: | 14.2 |
| CC-3-V1 | 11.00% | $K_3$ [pN, 20° C.]: | 18.7 |
| CC-2-V1 | 11.00% | $V_0$ [20° C., V]: | 2.39 |
| CCP-3-1 | 3.00% | | |
| CCVC-3-V | 9.00% | | |

Example 176

| | | | |
|---|---|---|---|
| PY-3-O2 | 11.00% | Clearing point [° C.]: | 75 |
| PY-V2-O2 | 6.50% | Δn [589 nm, 20° C.]: | 0.1105 |
| CCY-3-O2 | 9.00% | Δε [1 kHz, 20° C.]: | −3.1 |
| CCY-4-O2 | 3.00% | $\epsilon_{\parallel}$ [1 kHz, 20° C.]: | 3.5 |
| CCY-3-O1 | 5.00% | $\epsilon_{\perp}$ [1 kHz, 20° C.]: | 6.6 |
| CPY-2-O2 | 6.50% | $\gamma_1$ [mPa · s, 20° C.]: | 105 |
| CPY-3-O2 | 10.00% | $K_1$ [pN, 20° C.]: | 13.9 |
| CCH-34 | 10.00% | $K_3$ [pN, 20° C.]: | 14.3 |
| CCH-23 | 21.00% | $V_0$ [20° C., V]: | 2.28 |
| PYP-2-3 | 6.00% | LTS (bulk) [−20° C.] | >1000 h |
| CCP-3-1 | 3.00% | | |
| PCH-301 | 9.00% | | |

Example 177

| | | | |
|---|---|---|---|
| PY-3-O2 | 11.00% | Clearing point [° C.]: | 74 |
| PY-1V2-O2 | 7.50% | Δn [589 nm, 20° C.]: | 0.1107 |
| CCY-3-O2 | 9.00% | Δε [1 kHz, 20° C.]: | −3.0 |
| CCY-3-O1 | 5.50% | $\epsilon_{\parallel}$ [1 kHz, 20° C.]: | 3.4 |
| CPY-2-O2 | 6.50% | $\epsilon_{\perp}$ [1 kHz, 20° C.]: | 6.4 |
| CPY-3-O2 | 10.00% | $\gamma_1$ [mPa · s, 20° C.]: | 104 |
| CCH-34 | 10.00% | $K_1$ [pN, 20° C.]: | 14.0 |
| CCH-23 | 21.00% | $K_3$ [pN, 20° C.]: | 14.8 |
| PYP-2-3 | 5.50% | $V_0$ [20° C., V]: | 2.37 |
| CCP-3-1 | 4.00% | LTS (bulk) [−20° C.] | >1000 h |
| PCH-301 | 10.00% | | |

Example 178

| | | | |
|---|---|---|---|
| PY-3-O2 | 11.00% | Clearing point [° C.]: | 74 |
| PY-1V2-O2 | 8.00% | Δn [589 nm, 20° C.]: | 0.1119 |
| CY-3-O2 | 3.00% | Δε [1 kHz, 20° C.]: | −3.3 |
| CCY-3-O2 | 9.00% | $\varepsilon_{\parallel}$ [1 kHz, 20° C.]: | 3.5 |
| CCY-3-O1 | 6.00% | $\varepsilon_{\perp}$ [1 kHz, 20° C.]: | 6.8 |
| CPY-2-O2 | 6.50% | $\gamma_1$ [mPa·s, 20° C.]: | 108 |
| CPY-3-O2 | 10.00% | $K_1$ [pN, 20° C.]: | 14.3 |
| CCH-34 | 10.00% | $K_3$ [pN, 20° C.]: | 15.0 |
| CCH-23 | 21.00% | $V_0$ [20° C., V]: | 2.26 |
| PYP-2-3 | 5.00% | LTS (bulk) [−20° C.] | >1000 h |
| CCP-3-1 | 4.00% | | |
| PCH-301 | 6.50% | | |

Example 179

| | | | |
|---|---|---|---|
| CC-3-V | 39.00% | Clearing point [° C.]: | 74.5 |
| CC-3-V1 | 3.00% | Δn [589 nm, 20° C.]: | 0.1017 |
| CCP-V-1 | 8.00% | Δε [1 kHz, 20° C.]: | 3.2 |
| CCP-V2-1 | 12.00% | $\gamma_1$ [mPa·s, 20° C.]: | 64 |
| PGP-2-2V | 3.50% | $K_1$ [pN, 20° C.]: | 13 |
| PP-1-2V1 | 9.00% | $K_3$ [pN, 20° C.]: | 15.4 |
| PPGU-3-F | 1.00% | $V_0$ [20° C., V]: | 2.13 |
| PUQU-3-F | 15.50% | | |
| CCY-3-O2 | 9.00% | | |

Example 180

| | | | |
|---|---|---|---|
| BCH-32 | 5.00% | Clearing point [° C.]: | 75.3 |
| CC-3-V | 41.50% | Δn [589 nm, 20° C.]: | 0.0989 |
| CC-3-V1 | 8.50% | Δε [1 kHz, 20° C.]: | −1.9 |
| CCH-35 | 2.00% | $\varepsilon_{\parallel}$ [1 kHz, 20° C.]: | 3.2 |
| CCP-3-1 | 3.00% | $\varepsilon_{\perp}$ [1 kHz, 20° C.]: | 5.0 |
| CCY-3-O2 | 7.00% | $\gamma_1$ [mPa·s, 20° C.]: | 69 |
| CPY-2-O2 | 5.50% | $K_1$ [pN, 20° C.]: | 14.2 |
| CPY-3-O2 | 12.50% | $K_3$ [pN, 20° C.]: | 15.5 |
| PY-3-O2 | 15.00% | $V_0$ [20° C., V]: | 3.02 |

Example 180a

The mixture according to Example 180 additionally comprises 0.001% of Irganox® 1076 (octadecyl 3-(3,5-di-tert-butyl-4-hydroxyphenyl)propionate, BASF) and 0.3% of RM-1.

Example 181

| | | | |
|---|---|---|---|
| CCY-3-O1 | 8.00% | Clearing point [° C.]: | 74.9 |
| CCY-4-O2 | 7.50% | Δn [589 nm, 20° C.]: | 0.1123 |
| CPY-2-O2 | 10.00% | Δε [1 kHz, 20° C.]: | −3.7 |
| CPY-3-O2 | 10.00% | $\varepsilon_{\parallel}$ [1 kHz, 20° C.]: | 3.7 |
| CC-3-V | 15.00% | $\varepsilon_{\perp}$ [1 kHz, 20° C.]: | 7.5 |
| PY-1-O4 | 5.00% | $\gamma_1$ [mPa·s, 20° C.]: | 121 |
| PY-3-O2 | 9.00% | $K_1$ [pN, 20° C.]: | 13.2 |
| PY-4-O2 | 5.00% | $K_3$ [pN, 20° C.]: | 15.5 |
| CC-3-V1 | 9.00% | $V_0$ [20° C., V]: | 2.15 |
| CCY-3-O2 | 6.50% | | |
| PCH-301 | 15.00% | | |

Example 181a

The mixture according to Example 181 additionally comprises 0.01% of

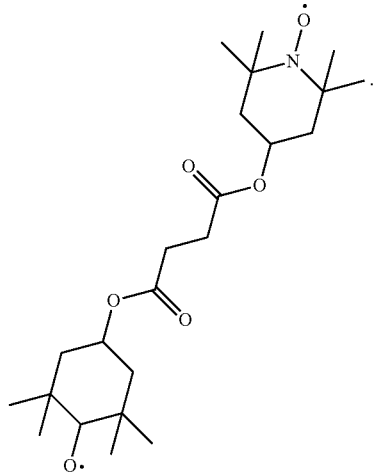

Example 182

| | | | |
|---|---|---|---|
| CY-3-O2 | 10.00% | Clearing point [° C.]: | 100 |
| CY-3-O4 | 20.00% | Δn [589 nm, 20° C.]: | 0.0865 |
| CY-5-O4 | 20.00% | Δε [1 kHz, 20° C.]: | −5.4 |
| CCY-3-O2 | 6.00% | $\varepsilon_{\parallel}$ [1 kHz, 20° C.]: | 3.9 |
| CCY-3-O3 | 6.00% | $\varepsilon_{\perp}$ [1 kHz, 20° C.]: | 9.3 |
| CCY-4-O2 | 6.00% | $\gamma_1$ [mPa·s, 20° C.]: | 347 |
| CCY-5-O2 | 6.00% | $K_1$ [pN, 20° C.]: | 15.6 |
| CH-33 | 3.00% | $K_3$ [pN, 20° C.]: | 16.6 |
| CH-35 | 3.50% | $V_0$ [20° C., V]: | 1.84 |
| CH-43 | 3.50% | | |
| CH-45 | 3.50% | | |
| CCPC-33 | 4.00% | | |
| CCPC-34 | 4.50% | | |
| CCPC-35 | 4.00% | | |

Example 183

| | | | |
|---|---|---|---|
| CY-3-O2 | 15.00% | Clearing point [° C.]: | 91 |
| CY-5-O2 | 12.00% | Δn [589 nm, 20° C.]: | 0.105 |
| CCY-3-O1 | 4.00% | Δε [1 kHz, 20° C.]: | −4.5 |
| CCY-3-O2 | 4.00% | $\gamma_1$ [mPa·s, 20° C.]: | 106 |
| CCY-3-O3 | 4.00% | $V_0$ [20° C., V]: | 1.32 |
| CCY-4-O2 | 4.00% | | |
| CLY-3-O2 | 10.00% | | |
| CLY-3-O3 | 2.00% | | |
| CPY-2-O2 | 8.00% | | |
| CC-3-V | 24.00% | | |
| PGP-2-5 | 5.00% | | |

Example 184

| | | | |
|---|---|---|---|
| CY-3-O2 | 14.00% | Clearing point [° C.]: | 84.7 |
| CY-3-O4 | 4.00% | Δn [589 nm, 20° C.]: | 0.1068 |
| CY-5-O2 | 7.00% | Δε [1 kHz, 20° C.]: | −4.0 |
| CCY-3-O1 | 4.00% | $\gamma_1$ [mPa·s, 20° C.]: | 138 |

-continued

| | | | |
|---|---|---|---|
| CCY-3-O2 | 5.00% | $K_1$ [pN, 20° C.]: | 14.1 |
| CCY-4-O2 | 8.00% | $K_3$ [pN, 20° C.]: | 16.2 |
| CCY-5-O2 | 3.00% | $V_0$ [20° C., V]: | 2.13 |
| CPY-2-O2 | 9.00% | | |
| CPY-3-O2 | 9.00% | | |
| PYP-2-3 | 6.00% | | |
| CC-3-V | 22.00% | | |
| CC-3-V1 | 3.50% | | |
| CCP-V-1 | 5.00% | | |
| PPGU-3-F | 0.50% | | |

Example 185

| | | | |
|---|---|---|---|
| CY-3-O2 | 15.00% | Clearing point [° C.]: | 80.4 |
| CY-5-O2 | 12.50% | Δn [589 nm, 20° C.]: | 0.1038 |
| CCY-3-O1 | 2.50% | Δε [1 kHz, 20° C.]: | −3.3 |
| CCY-4-O2 | 5.00% | $\epsilon_{\parallel}$ [1 kHz, 20° C.]: | 3.5 |
| CPY-2-O2 | 8.00% | $\epsilon_{\perp}$ [1 kHz, 20° C.]: | 6.8 |
| CPY-3-O2 | 8.00% | $\gamma_1$ [mPa · s, 20° C.]: | 137 |
| CCY-2-1 | 6.00% | $K_1$ [pN, 20° C.]: | 14.2 |
| CCY-3-1 | 6.00% | $K_3$ [pN, 20° C.]: | 14.2 |
| CCH-23 | 15.00% | $V_0$ [20° C., V]: | 2.18 |
| CCH-34 | 5.00% | | |
| CCH-301 | 1.50% | | |
| BCH-32 | 15.50% | | |

Example 185a

The mixture according to Example 185 additionally comprises 0.25% of RM-35

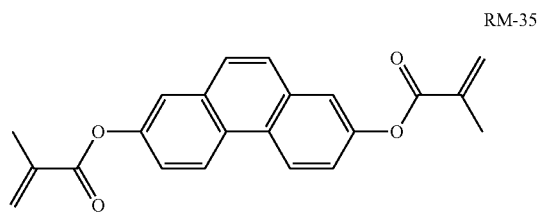 [SMILES: C=C(C)C(=O)Oc1ccc2c(ccc3cc(OC(=O)C(=C)C)ccc32)c1]

RM-35 and
0.025% of

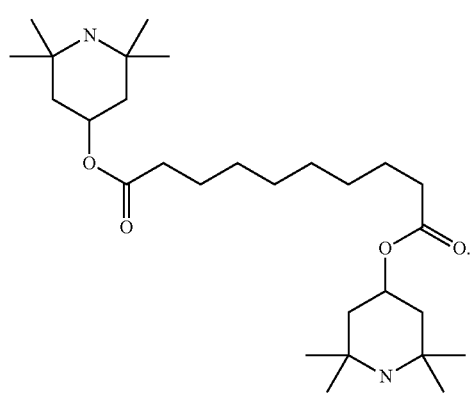

Example 186

| | | | |
|---|---|---|---|
| CC-3-V | 34.00% | Clearing point [° C.]: | 100 |
| CC-3-V1 | 2.50% | Δn [589 nm, 20° C.]: | 0.1003 |
| CCP-V-1 | 10.00% | Δε [1 kHz, 20° C.]: | 9.1 |
| PUQU-3-F | 7.00% | $\epsilon_{\parallel}$ [1 kHz, 20° C.]: | 12.3 |
| PGUQU-3-F | 4.00% | $\epsilon_{\perp}$ [1 kHz, 20° C.]: | 3.2 |
| CPGU-3-OT | 6.00% | $\gamma_1$ [mPa · s, 20° C.]: | 99 |
| CCGU-3-F | 4.00% | $K_1$ [pN, 20° C.]: | 14.2 |
| APUQU-3-F | 8.00% | $K_3$ [pN, 20° C.]: | 17.3 |
| CCP-3F.F.F | 4.50% | | |
| CCP-3OCF$_3$ | 4.00% | | |
| CCP-5OCF$_3$ | 3.00% | | |
| CCQU-3-F | 10.00% | | |
| CBC-33 | 3.00% | | |

Example 186a

The mixture according to Example 186 additionally comprises 0.03% of

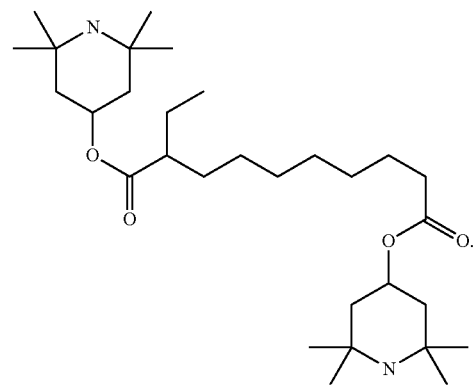

Example 186b

The mixture according to Example 186 additionally comprises 0.03% of

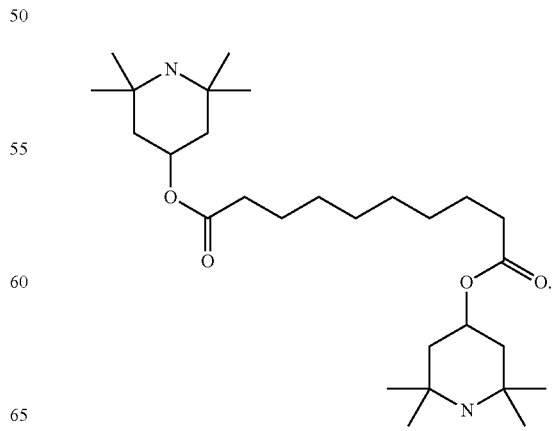

Example 187

| | | | |
|---|---|---|---|
| Y-4O-O4 | 4.50% | Clearing point [° C.]: | 100 |
| PYP-2-3 | 2.00% | $\Delta n$ [589 nm, 20° C.]: | 0.1716 |
| CC-3-V | 25.00% | $\Delta\epsilon$ [1 kHz, 20° C.]: | −1.5 |
| CC-4-V | 10.00% | $\epsilon_\parallel$ [1 kHz, 20° C.]: | 3.4 |
| CCP-V-1 | 14.00% | $\epsilon_\perp$ [1 kHz, 20° C.]: | 4.9 |
| PTP-302FF | 10.00% | $\gamma_1$ [mPa·s, 20° C.]: | 114 |
| CPTP-302FF | 10.00% | $K_1$ [pN, 20° C.]: | 15.2 |
| CPTP-302FF | 10.00% | $K_3$ [pN, 20° C.]: | 18.5 |
| PPTUI-3-2 | 14.50% | $V_0$ [20° C., V]: | 3.76 |

Example 188

| | | | |
|---|---|---|---|
| CCH-23 | 25.00% | Clearing point [° C.]: | 70.3 |
| CC-3-V | 4.50% | $\Delta n$ [589 nm, 20° C.]: | 0.0737 |
| PCH-53 | 25.00% | $\Delta\epsilon$ [1 kHz, 20° C.]: | −1.1 |
| CCY-2-1 | 12.00% | $\epsilon_\parallel$ [1 kHz, 20° C.]: | 2.8 |
| CCY-3-1 | 12.00% | $\epsilon_\perp$ [1 kHz, 20° C.]: | 3.9 |
| CCY-3-O2 | 12.00% | $K_1$ [pN, 20° C.]: | 11.7 |
| CCY-3-O3 | 5.00% | $K_3$ [pN, 20° C.]: | 13.1 |
| CBC-33F | 4.50% | | |

Example 189

| | | | |
|---|---|---|---|
| CC-3-V1 | 10.25% | Clearing point [° C.]: | 74.7 |
| CCH-23 | 18.50% | $\Delta n$ [589 nm, 20° C.]: | 0.1027 |
| CCH-35 | 6.75% | $\Delta\epsilon$ [1 kHz, 20° C.]: | −3.1 |
| CCP-3-1 | 6.00% | $\epsilon_\parallel$ [1 kHz, 20° C.]: | 3.4 |
| CCY-3-1 | 2.50% | $\epsilon_\perp$ [1 kHz, 20° C.]: | 6.5 |
| CCY-3-O2 | 12.00% | $\gamma_1$ [mPa·s, 20° C.]: | 104 |
| CPY-2-O2 | 6.00% | $K_1$ [pN, 20° C.]: | 15.4 |
| CPY-3-O2 | 9.75% | $K_3$ [pN, 20° C.]: | 16.8 |
| CY-3-O2 | 11.50% | $V_0$ [20° C., V]: | 2.46 |
| PP-1-2V1 | 3.75% | | |
| PY-3-O2 | 13.00% | | |

Example 189a

The mixture according to Example 189 additionally comprises 0.01% of Irganox® 1076 (octadecyl 3-(3,5-di-tert-butyl-4-hydroxyphenyl)propionate, BASF) and 0.3% of RM-1.

Example 190

| | | | |
|---|---|---|---|
| BCH-3F.F | 10.00% | Clearing point [° C.]: | 99.6 |
| BCH-3F.F.F | 12.00% | $\Delta n$ [589 nm, 20° C.]: | 0.1122 |
| CBC-33 | 3.00% | $\Delta\epsilon$ [1 kHz, 20° C.]: | 10.1 |
| CBC-33F | 3.00% | $\epsilon_\parallel$ [1 kHz, 20° C.]: | 13.8 |
| CCGU-3-F | 8.00% | $\epsilon_\perp$ [1 kHz, 20° C.]: | 3.6 |
| CCH-34 | 10.00% | $\gamma_1$ [mPa·s, 20° C.]: | 164 |
| CCH-35 | 6.50% | $K_1$ [pN, 20° C.]: | 11.8 |
| CCP-1F.F.F | 10.00% | $K_3$ [pN, 20° C.]: | 15.9 |
| CCP-2F.F.F | 10.00% | $V_0$ [20° C., V]: | 1.14 |
| CCP-3-1 | 2.50% | | |
| CCP-3F.F.F | 8.00% | | |
| CPGP-4-3 | 3.00% | | |
| CPGP-5-2 | 2.00% | | |
| CPGP-5-3 | 1.00% | | |
| PUQU-2-F | 1.00% | | |
| PUQU-3-F | 10.00% | | |

Example 191

| | | | |
|---|---|---|---|
| CBC-53F | 3.00% | Clearing point [° C.]: | 115.5 |
| CC-3-2V1 | 1.00% | $\Delta n$ [589 nm, 20° C.]: | 0.1106 |
| CC-3-V | 25.00% | $\Delta\epsilon$ [1 kHz, 20° C.]: | 7.0 |
| CC-3-V1 | 5.00% | $\epsilon_\parallel$ [1 kHz, 20° C.]: | 9.9 |
| CCGU-3-F | 5.50% | $\epsilon_\perp$ [1 kHz, 20° C.]: | 2.9 |
| CCP-30CF$_3$ | 4.00% | $\gamma_1$ [mPa·s, 20° C.]: | 118 |
| CCP-30CF$_3$.F | 8.00% | $K_1$ [pN, 20° C.]: | 17.4 |
| CCP-40CF$_3$ | 3.00% | $K_3$ [pN, 20° C.]: | 20.4 |
| CCP-50CF$_3$ | 3.00% | $V_0$ [20° C., V]: | 1.66 |
| CCP-V-1 | 8.00% | | |
| CCP-V2-1 | 12.00% | | |
| CPGU-3-OT | 5.00% | | |
| PGUQU-3-F | 4.00% | | |
| PGUQU-4-F | 4.00% | | |
| PGUQU-5-F | 2.00% | | |
| PP-1-2V1 | 3.00% | | |
| PPGU-3-F | 0.50% | | |
| PUQU-2-F | 1.00% | | |
| PUQU-3-F | 3.00% | | |

Example 192

| | | | |
|---|---|---|---|
| APUQU-2-F | 2.50% | Clearing point [° C.]: | 85.8 |
| APUQU-3-F | 5.00% | $\Delta n$ [589 nm, 20° C.]: | 0.1106 |
| PUQU-3-F | 10.00% | $\Delta\epsilon$ [1 kHz, 20° C.]: | 8.6 |
| PGUQU-3-F | 5.00% | $\epsilon_\parallel$ [1 kHz, 20° C.]: | 12.6 |
| PGUQU-4-F | 3.00% | $\epsilon_\perp$ [1 kHz, 20° C.]: | 4.0 |
| PGUQU-5-F | 2.00% | $\gamma_1$ [mPa·s, 20° C.]: | 92 |
| DPGU-4-F | 4.00% | $K_1$ [pN, 20° C.]: | 13.0 |
| PPGU-3-F | 0.50% | $K_3$ [pN, 20° C.]: | 15.3 |
| CDUQU-3-F | 0.05% | $V_0$ [20° C., V]: | 1.30 |
| CC-3-V | 39.95% | | |
| CCP-V-1 | 9.00% | | |
| CCP-V2-1 | 8.00% | | |
| CCP-3-1 | 2.00% | | |
| PGP-2-3 | 3.00% | | |
| CY-3-O2 | 5.00% | | |
| CCY-3-O2 | 5.00% | | |

Example 193

| | | | |
|---|---|---|---|
| APUQU-2-F | 2.50% | Clearing point [° C.]: | 85.8 |
| APUQU-3-F | 5.00% | $\Delta n$ [589 nm, 20° C.]: | 0.1105 |
| PUQU-3-F | 12.50% | $\Delta\epsilon$ [1 kHz, 20° C.]: | 10.6 |
| PGUQU-3-F | 5.00% | $\epsilon_\parallel$ [1 kHz, 20° C.]: | 14.8 |
| PGUQU-4-F | 4.00% | $\epsilon_\perp$ [1 kHz, 20° C.]: | 4.2 |
| PGUQU-5-F | 4.00% | $\gamma_1$ [mPa·s, 20° C.]: | 98 |
| DPGU-4-F | 4.00% | $K_1$ [pN, 20° C.]: | 12.7 |
| PPGU-3-F | 0.50% | $K_3$ [pN, 20° C.]: | 15.1 |
| CDUQU-3-F | 0.05% | | |
| CC-3-V | 34.95% | | |
| CCP-V-1 | 7.00% | | |
| CCP-V2-1 | 6.00% | | |
| CCP-3-1 | 2.50% | | |
| CCPC-33 | 2.00% | | |
| CY-3-O2 | 5.00% | | |
| CCY-3-O2 | 5.00% | | |

Example 194

| | | | |
|---|---|---|---|
| APUQU-2-F | 3.00% | Clearing point [° C.]: | 85.7 |
| APUQU-3-F | 5.00% | $\Delta n$ [589 nm, 20° C.]: | 0.1097 |
| PUQU-3-F | 12.00% | $\Delta\epsilon$ [1 kHz, 20° C.]: | 8.7 |

-continued

| | | | |
|---|---|---|---|
| PGUQU-3-F | 5.00% | $\epsilon_\|$ [1 kHz, 20° C.]: | 12.4 |
| PGUQU-4-F | 4.00% | $\epsilon_\perp$ [1 kHz, 20° C.]: | 3.7 |
| PGUQU-5-F | 3.00% | $\gamma_1$ [mPa · s, 20° C.]: | 82 |
| PPGU-3-F | 0.50% | $K_1$ [pN, 20° C.]: | 12.9 |
| CDUQU-3-F | 0.05% | $K_3$ [pN, 20° C.]: | 15.7 |
| CC-3-V | 38.95% | $V_0$ [20° C., V]: | 1.29 |
| CCP-V-1 | 10.50% | | |
| CCP-V2-1 | 9.00% | | |
| PGP-2-3 | 2.00% | | |
| CCY-3-O2 | 3.50% | | |
| CPY-3-O2 | 3.50% | | |

Example 195

| | | | |
|---|---|---|---|
| APUQU-2-F | 3.00% | Clearing point [° C.]: | 85.7 |
| APUQU-3-F | 5.00% | Δn [589 nm, 20° C.]: | 0.1097 |
| PUQU-3-F | 12.00% | Δε [1 kHz, 20° C.]: | 8.7 |
| PGUQU-3-F | 5.00% | $\epsilon_\|$ [1 kHz, 20° C.]: | 12.4 |
| PGUQU-4-F | 4.00% | $\epsilon_\perp$ [1 kHz, 20° C.]: | 3.7 |
| PGUQU-5-F | 3.00% | $\gamma_1$ [mPa · s, 20° C.]: | 82 |
| PPGU-3-F | 0.50% | $K_1$ [pN, 20° C.]: | 12.9 |
| CDUQU-3-F | 0.05% | $K_3$ [pN, 20° C.]: | 15.7 |
| CC-3-V | 38.95% | $V_0$ [20° C., V]: | 1.29 |
| CCP-V-1 | 10.50% | | |
| CCP-V2-1 | 9.00% | | |
| PGP-2-3 | 2.00% | | |
| CCY-3-O2 | 3.50% | | |
| CPY-3-O2 | 3.50% | | |

Example 196

| | | | |
|---|---|---|---|
| CC-3-V | 35.00% | Clearing point [° C.]: | 84.6 |
| CCY-3-O1 | 9.00% | Δn [589 nm, 20° C.]: | 0.1010 |
| CCY-3-O2 | 8.00% | Δε [1 kHz, 20° C.]: | -4.0 |
| CCY-4-O2 | 5.00% | $\epsilon_\|$ [1 kHz, 20° C.]: | 3.6 |
| CLY-3-O3 | 11.00% | $\epsilon_\perp$ [1 kHz, 20° C.]: | 7.6 |
| CPY-2-O2 | 9.50% | $\gamma_1$ [mPa · s, 20° C.]: | 114 |
| CPY-3-O2 | 4.00% | $K_1$ [pN, 20° C.]: | 14.5 |
| CY-3-O2 | 6.50% | | |
| PY-3-O2 | 12.00% | | |

Example 196a

The mixture according to Example 196 additionally comprises 0.04% of

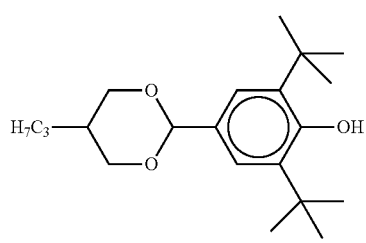

and 0.015% of

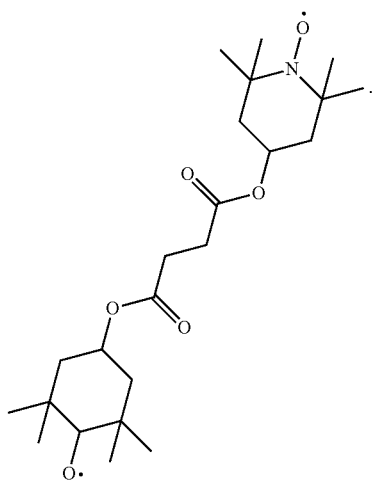

Example 197

| | | | |
|---|---|---|---|
| CC-3-V | 33.00% | Clearing point [° C.]: | 84 |
| CCY-3-O1 | 7.00% | Δn [589 nm, 20° C.]: | 0.1111 |
| CCY-3-O2 | 7.00% | Δε [1 kHz, 20° C.]: | -4.0 |
| CCY-4-O2 | 5.00% | $\epsilon_\|$ [1 kHz, 20° C.]: | 3.7 |
| CLY-3-O3 | 11.00% | $\epsilon_\perp$ [1 kHz, 20° C.]: | 7.6 |
| CPY-2-O2 | 9.00% | $\gamma_1$ [mPa · s, 20° C.]: | 119 |
| CPY-3-O2 | 8.00% | $K_1$ [pN, 20° C.]: | 14.8 |
| PP-1-2V1 | 1.50% | | |
| PY-1-O4 | 8.50% | | |
| PY-3-O2 | 10.00% | | |

Example 197a

The mixture according to Example 197 additionally comprises 0.04% of

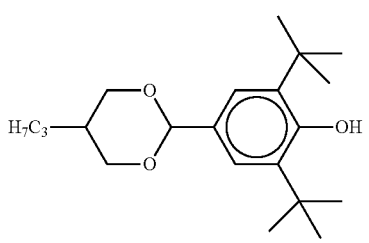

and 0.015% of

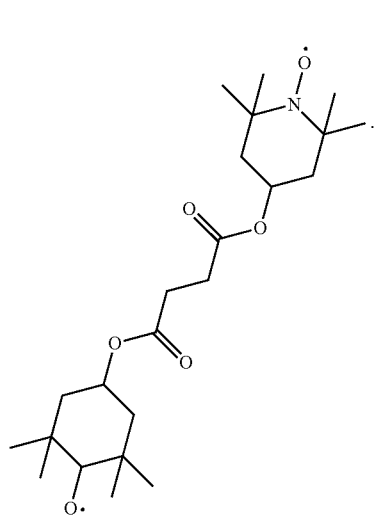

Example 198

| APUQU-2-F | 4.00% | Clearing point [° C.]: | 85.6 |
| --- | --- | --- | --- |
| APUQU-3-F | 7.00% | Δn [589 nm, 20° C.]: | 0.1021 |
| PUQU-3-F | 5.00% | Δε [1 kHz, 20° C.]: | 6.9 |
| PGUQU-3-F | 4.00% | ε∥ [1 kHz, 20° C.]: | 10.0 |
| PGUQU-4-F | 3.00% | ε⊥ [1 kHz, 20° C.]: | 3.1 |
| PGUQU-5-F | 3.00% | γ₁ [mPa·s, 20° C.]: | 71 |
| CCP-V-1 | 16.00% | K₁ [pN, 20° C.]: | 13.1 |
| CC-3-V | 40.00% | K₃ [pN, 20° C.]: | 15.3 |
| CC-3-V1 | 4.00% | V₀ [20° C., V]: | 1.45 |
| CC-4-V | 3.00% | | |
| PGP-2-3 | 4.00% | | |
| PGP-2-4 | 1.00% | | |
| PPGU-3-F | 1.00% | | |
| CCOC-4-3 | 5.00% | | |

Example 198a

The mixture according to Example 198 additionally comprises 0.25% of RM-41

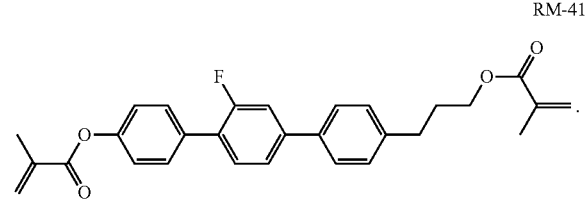 [SMILES: C=C(C)C(=O)OCCCc1ccc(-c2ccc(-c3ccc(OC(=O)C(=C)C)cc3)c(F)c2)cc1]

RM-41

Example 198b

The mixture according to Example 198 additionally comprises 0.3% of RM-17

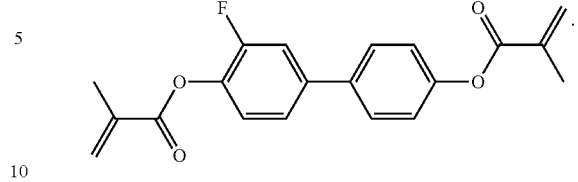

RM-17

Example 199

| Y-4O-O4 | 12.00% | Clearing point [° C.]: | 101 |
| --- | --- | --- | --- |
| CY-3-O2 | 14.00% | Δn [589 nm, 20° C.]: | 0.1504 |
| CCY-3-O1 | 5.00% | Δε [1 kHz, 20° C.]: | -6.2 |
| CCY-3-O2 | 6.00% | ε∥ [1 kHz, 20° C.]: | 4.5 |
| CCY-3-O3 | 6.00% | ε⊥ [1 kHz, 20° C.]: | 10.7 |
| CCY-4-O2 | 6.00% | γ₁ [mPa·s, 20° C.]: | 281 |
| CPY-2-O2 | 2.50% | K₁ [pN, 20° C.]: | 15.7 |
| PTP-302FF | 10.00% | K₃ [pN, 20° C.]: | 19.9 |
| CPTP-302FF | 10.00% | V₀ [20° C., V]: | 1.90 |
| CPTP-502FF | 10.00% | | |
| CC-4-V | 2.50% | | |
| CCP-V-1 | 11.50% | | |
| CCPC-33 | 4.50% | | |

Example 200

| Y-4O-O4 | 12.00% | Clearing point [° C.]: | 100 |
| --- | --- | --- | --- |
| CCY-3-O1 | 5.00% | Δn [589 nm, 20° C.]: | 0.1496 |
| CCY-3-O2 | 6.00% | Δε [1 kHz, 20° C.]: | -4.1 |
| CCY-3-O3 | 6.00% | ε∥ [1 kHz, 20° C.]: | 4.0 |
| CCY-4-O2 | 2.00% | ε⊥ [1 kHz, 20° C.]: | 8.1 |
| CC-4-V | 15.00% | γ₁ [mPa·s, 20° C.]: | 180 |
| CCP-V-1 | 11.00% | K₁ [pN, 20° C.]: | 16.1 |
| CCP-V2-1 | 5.00% | K₃ [pN, 20° C.]: | 18.5 |
| BCH-32 | 5.00% | V₀ [20° C., V]: | 2.25 |
| PTP-302FF | 10.00% | | |
| PTP-502FF | 3.00% | | |
| CPTP-302FF | 10.00% | | |
| CPTP-502FF | 10.00% | | |

Example 201

| Y-4O-O4 | 10.00% | Clearing point [° C.]: | 100 |
| --- | --- | --- | --- |
| CCY-3-O1 | 2.50% | Δn [589 nm, 20° C.]: | 0.1515 |
| PTP-302FF | 10.00% | Δε [1 kHz, 20° C.]: | -2.1 |
| PTP-502FF | 3.50% | ε∥ [1 kHz, 20° C.]: | 3.5 |
| CPTP-302FF | 10.00% | ε⊥ [1 kHz, 20° C.]: | 5.6 |
| CPTP-502FF | 3.50% | γ₁ [mPa·s, 20° C.]: | 125 |
| CC-4-V | 15.00% | K₁ [pN, 20° C.]: | 16.6 |
| CC-3-V1 | 8.00% | K₃ [pN, 20° C.]: | 18.7 |
| CCP-V-1 | 12.00% | V₀ [20° C., V]: | 3.13 |
| CCP-V2-1 | 12.00% | | |
| BCH-32 | 5.00% | | |
| CPTP-3-1 | 5.00% | | |
| CPTP-3-2 | 3.50% | | |

Example 202

| | | | |
|---|---|---|---|
| Y-4O-O4 | 12.00% | Clearing point [° C.]: | 101 |
| CY-3-O2 | 6.00% | Δn [589 nm, 20° C.]: | 0.1218 |
| CY-3-O4 | 15.00% | Δε [1 kHz, 20° C.]: | −6.2 |
| CCY-3-O2 | 6.00% | ε∥ [1 kHz, 20° C.]: | 4.5 |
| CCY-3-O3 | 6.00% | ε⊥ [1 kHz, 20° C.]: | 10.7 |
| CCY-4-O2 | 6.00% | γ₁ [mPa · s, 20° C.]: | 302 |
| CLY-3-O2 | 5.00% | K₁ [pN, 20° C.]: | 15.7 |
| CPY-2-O2 | 8.00% | K₃ [pN, 20° C.]: | 18.9 |
| CPY-3-O2 | 8.00% | V₀ [20° C., V]: | 1.83 |
| CPTP-302FF | 4.00% | | |
| CPTP-502FF | 4.00% | | |
| CCP-V-1 | 11.00% | | |
| CCPC-33 | 4.50% | | |
| CCPC-34 | 4.50% | | |

Example 203

| | | | |
|---|---|---|---|
| Y-4O-O4 | 15.00% | Clearing point [° C.]: | 101 |
| CCY-3-O2 | 5.00% | Δn [589 nm, 20° C.]: | 0.1216 |
| CCY-3-O3 | 5.00% | Δε [1 kHz, 20° C.]: | −4.0 |
| CCY-4-O2 | 5.00% | ε∥ [1 kHz, 20° C.]: | 4.0 |
| CLY-3-O2 | 4.00% | ε⊥ [1 kHz, 20° C.]: | 8.0 |
| CPY-2-O2 | 8.00% | γ₁ [mPa · s, 20° C.]: | 167 |
| CPY-3-02 | 8.00% | K₁ [pN, 20° C.]: | 16.1 |
| CPTP-302FF | 5.00% | K₃ [pN, 20° C.]: | 17.3 |
| CPTP-502FF | 5.00% | V₀ [20° C., V]: | 2.19 |
| CC-4-V | 13.50% | | |
| CCP-V-1 | 11.50% | | |
| CCP-V2-1 | 10.00% | | |
| BCH-32 | 5.00% | | |

Example 204

| | | | |
|---|---|---|---|
| Y-4O-O4 | 10.00% | Clearing point [° C.]: | 100 |
| CCY-3-O2 | 5.00% | Δn [589 nm, 20° C.]: | 0.1203 |
| CCY-3-O3 | 3.50% | Δε [1 kHz, 20° C.]: | −2.0 |
| CPY-3-O2 | 5.50% | ε∥ [1 kHz, 20° C.]: | 3.4 |
| PTP-302FF | 3.50% | ε⊥ [1 kHz, 20° C.]: | 5.4 |
| CPTP-302FF | 5.00% | γ₁ [mPa · s, 20° C.]: | 117 |
| CPTP-502FF | 5.00% | K₁ [pN, 20° C.]: | 15.6 |
| CCH-301 | 5.00% | K₃ [pN, 20° C.]: | 18.5 |
| CC-4-V | 15.00% | V₀ [20° C., V]: | 3.17 |
| CC-3-V1 | 8.00% | | |
| CCP-V-1 | 13.00% | | |
| CCP-V2-1 | 13.00% | | |
| BCH-32 | 5.00% | | |
| CPTP-3-1 | 3.50% | | |

Example 205

| | | | |
|---|---|---|---|
| BCH-32 | 16.00% | Clearing point [° C.]: | 105 |
| BCH-52 | 6.50% | Δn [589 nm, 20° C.]: | 0.1503 |
| CCY-3-O1 | 5.00% | Δε [1 kHz, 20° C.]: | −4.2 |
| CCY-3-O2 | 8.00% | ε∥ [1 kHz, 20° C.]: | 3.8 |
| CCY-3-O3 | 6.00% | ε⊥ [1 kHz, 20° C.]: | 8.0 |
| CCY-4-O2 | 8.00% | γ₁ [mPa · s, 20° C.]: | 297 |
| CCY-5-O2 | 7.00% | K₁ [pN, 20° C.]: | 18.3 |
| CY-3-O4 | 13.00% | K₃ [pN, 20° C.]: | 17.3 |
| PY-3-O2 | 5.50% | V₀ [20° C., V]: | 2.13 |
| PY-4-O2 | 9.00% | | |
| PYP-2-3 | 8.00% | | |
| PYP-2-4 | 8.00% | | |

Example 205a

The mixture according to Example 205 additionally comprises 0.015% of

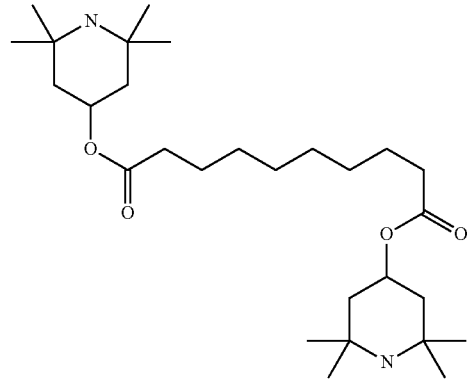

and 0.015% of

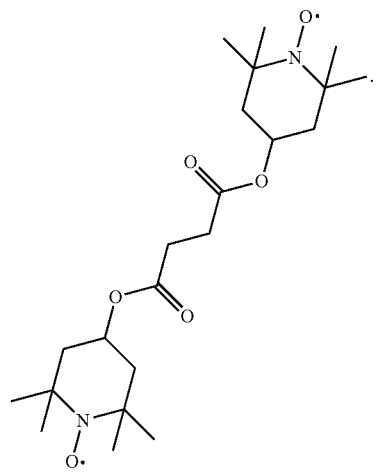

Example 206

| | | | |
|---|---|---|---|
| CC-3-V | 35.50% | Clearing point [° C.]: | 79.8 |
| CCY-3-O2 | 6.00% | Δn [589 nm, 20° C.]: | 0.0962 |
| CCY-3-O3 | 6.00% | Δε [1 kHz, 20° C.]: | −3.4 |
| CCY-4-O2 | 6.00% | ε∥ [1 kHz, 20° C.]: | 3.6 |
| CCY-5-O2 | 3.50% | ε⊥ [1 kHz, 20° C.]: | 7.0 |
| CPY-2-O2 | 10.00% | γ₁ [mPa · s, 20° C.]: | 111 |
| CPY-3-O2 | 9.00% | K₁ [pN, 20° C.]: | 13.3 |
| CY-3-O4 | 10.00% | K₃ [pN, 20° C.]: | 15.2 |
| CY-5-O2 | 9.00% | V₀ [20° C., V]: | 2.23 |
| PGIGI-3-F | 5.00% | | |

Example 207

| | | | |
|---|---|---|---|
| CC-3-V | 31.50% | Clearing point [° C.]: | 79.6 |
| CCP-V-1 | 5.00% | Δn [589 nm, 20° C.]: | 0.1044 |
| CCY-3-O2 | 6.00% | Δε [1 kHz, 20° C.]: | −3.4 |

-continued

| | | | |
|---|---|---|---|
| CCY-3-O3 | 6.00% | $\epsilon_{\|}$ [1 kHz, 20° C.]: | 3.6 |
| CCY-4-O2 | 5.50% | $\epsilon_{\perp}$ [1 kHz, 20° C.]: | 7.0 |
| CPY-2-O2 | 10.00% | $\gamma_1$ [mPa · s, 20° C.]: | 115 |
| CPY-3-O2 | 10.00% | $K_1$ [pN, 20° C.]: | 13.3 |
| CY-3-O4 | 7.00% | $K_3$ [pN, 20° C.]: | 15.2 |
| CY-5-O2 | 7.00% | $V_0$ [20° C., V]: | 2.24 |
| PGIGI-3-F | 5.00% | | |
| PY-3-O2 | 7.00% | | |

Example 208

| | | | |
|---|---|---|---|
| CC-3-V | 36.50% | Clearing point [° C.]: | 84.9 |
| CCP-V-1 | 3.00% | $\Delta n$ [589 nm, 20° C.]: | 0.1054 |
| CCY-3-O1 | 6.50% | $\Delta\epsilon$ [1 kHz, 20° C.]: | −3.5 |
| CCY-3-O2 | 3.50% | $\epsilon_{\|}$ [1 kHz, 20° C.]: | 3.5 |
| CCY-4-O2 | 5.00% | $\epsilon_{\perp}$ [1 kHz, 20° C.]: | 7.0 |
| CLY-3-O3 | 9.00% | $\gamma_1$ [mPa · s, 20° C.]: | 108 |
| CPY-2-O2 | 11.00% | $K_1$ [pN, 20° C.]: | 14.4 |
| CPY-3-O2 | 9.00% | $K_3$ [pN, 20° C.]: | 15.7 |
| CY-3-O2 | 3.00% | $V_0$ [20° C., V]: | 2.24 |
| PY-3-O2 | 13.50% | | |

Example 209

| | | | |
|---|---|---|---|
| CC-3-V | 39.00% | Clearing point [° C.]: | 75.2 |
| BCH-3F.F.F | 8.00% | $\Delta n$ [589 nm, 20° C.]: | 0.1298 |
| PGU-2-F | 6.00% | $\Delta\epsilon$ [1 kHz, 20° C.]: | 18.3 |
| PGU-3-F | 6.00% | $\epsilon_{\|}$ [1 kHz, 20° C.]: | 22.6 |
| APUQU-2-F | 6.00% | $\epsilon_{\perp}$ [1 kHz, 20° C.]: | 4.3 |
| APUQU-3-F | 8.00% | $\gamma_1$ [mPa · s, 20° C.]: | 99 |
| PGUQU-3-F | 6.00% | $K_1$ [pN, 20° C.]: | 10.9 |
| PGUQU-4-F | 6.00% | $K_3$ [pN, 20° C.]: | 11.1 |
| PGUQU-5-F | 6.00% | $V_0$ [20° C., V]: | 0.81 |
| DPGU-4-F | 9.00% | | |

Example 210

| | | | |
|---|---|---|---|
| CC-3-V | 38.50% | Clearing point [° C.]: | 74.9 |
| CCY-3-O1 | 4.50% | $\Delta n$ [589 nm, 20° C.]: | 0.1012 |
| CCY-3-O2 | 4.00% | $\Delta\epsilon$ [1 kHz, 20° C.]: | −3.7 |
| CCY-4-O2 | 8.00% | $\epsilon_{\|}$ [1 kHz, 20° C.]: | 3.7 |
| CLY-3-O2 | 8.00% | $\epsilon_{\perp}$ [1 kHz, 20° C.]: | 7.4 |
| CPY-2-O2 | 10.00% | $\gamma_1$ [mPa · s, 20° C.]: | 94 |
| CPY-3-O2 | 9.00% | $K_1$ [pN, 20° C.]: | 13.4 |
| PY-1-O4 | 7.50% | $K_3$ [pN, 20° C.]: | 14.4 |
| PY-3-O2 | 6.00% | $V_0$ [20° C., V]: | 2.08 |
| Y-4O-O4 | 4.50% | LTS (bulk) [−20° C.] | >1000 h |

Example 210a

The mixture according to Example 210 additionally comprises 0.25% of

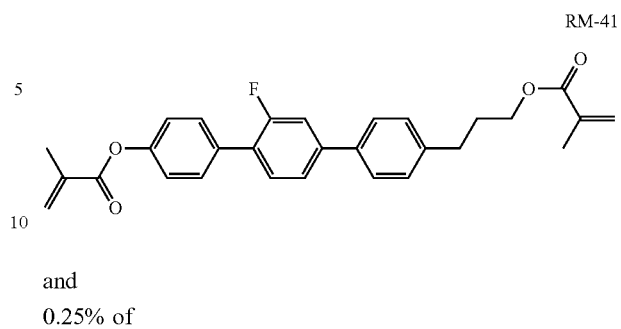

RM-41 and
0.25% of

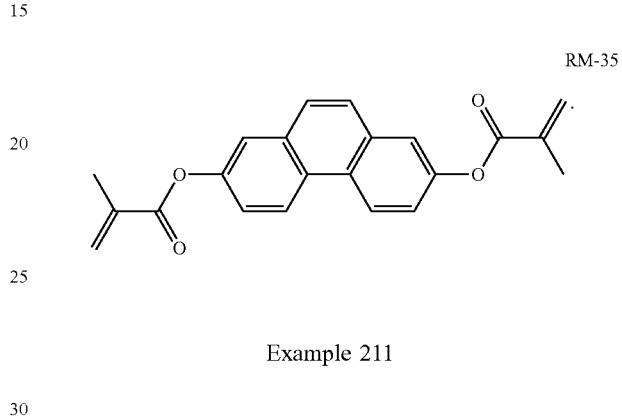

RM-35

Example 211

| | | | |
|---|---|---|---|
| CC-3-V | 40.50% | Clearing point [° C.]: | 74.8 |
| CC-3-V1 | 5.00% | $\Delta n$ [589 nm, 20° C.]: | 0.1073 |
| CCPC-33 | 3.00% | $\Delta\epsilon$ [1 kHz, 20° C.]: | −1.9 |
| CCY-3-O2 | 9.00% | $\epsilon_{\|}$ [1 kHz, 20° C.]: | 3.2 |
| CPY-2-O2 | 9.00% | $\epsilon_{\perp}$ [1 kHz, 20° C.]: | 5.2 |
| CPY-3-O2 | 9.50% | $\gamma_1$ [mPa · s, 20° C.]: | 63 |
| PP-1-2V1 | 6.00% | $K_1$ [pN, 20° C.]: | 12.6 |
| PY-3-O2 | 7.00% | $K_3$ [pN, 20° C.]: | 14.1 |
| PYP-2-3 | 8.00% | $V_0$ [20° C., V]: | 2.86 |
| Y-4O-O4 | 3.00% | | |

Example 211a

The mixture according to Example 211 additionally comprises 0.04% of

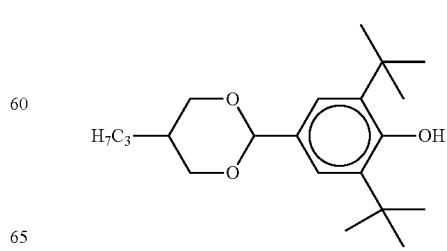

and 0.02% of

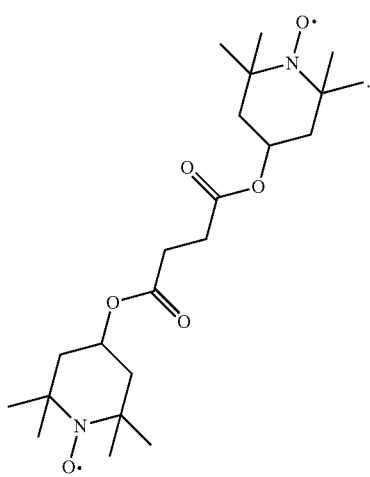

Example 212

| | | | |
|---|---|---|---|
| APUQU-2-F | 2.50% | Clearing point [° C.]: | 97.5 |
| APUQU-3-F | 7.00% | Δn [589 nm, 20° C.]: | 0.1000 |
| PGUQU-3-F | 4.00% | Δε [1 kHz, 20° C.]: | 8.0 |
| PGUQU-4-F | 4.00% | ε∥ [1 kHz, 20° C.]: | 11.1 |
| PUQU-3-F | 4.00% | ε⊥ [1 kHz, 20° C.]: | 3.1 |
| CCP-V-1 | 6.00% | γ₁ [mPa·s, 20° C.]: | 93 |
| CCP-V2-1 | 14.00% | K₁ [pN, 20° C.]: | 15.3 |
| CCGU-3-F | 3.50% | K₃ [pN, 20° C.]: | 17.6 |
| CCQU-3-F | 10.00% | V₀ [20° C., V]: | 1.45 |
| PCH-302 | 6.50% | | |
| CC-3-V | 25.00% | | |
| CC-3-V1 | 8.00% | | |
| CCP-30CF₃ | 5.00% | | |
| PPGU-3-F | 0.50% | | |

Example 212a

The mixture according to Example 212 additionally comprises 0.25% of

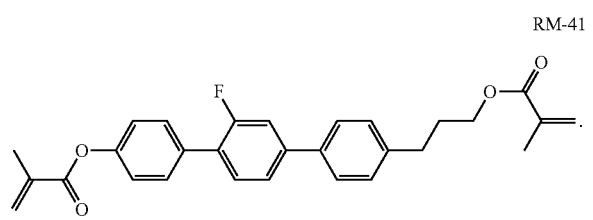 [SMILES: C=C(C)C(=O)OCCCc1ccc(-c2ccc(-c3ccc(OC(=O)C(=C)C)cc3)c(F)c2)cc1]

RM-41

Example 213

| | | | |
|---|---|---|---|
| CY-3-O2 | 18.50% | Clearing point [° C.]: | 80 |
| CCY-3-O2 | 11.00% | Δn [589 nm, 20° C.]: | 0.0896 |
| CCY-4-O2 | 9.00% | Δε [1 kHz, 20° C.]: | −3.4 |
| CPY-2-O2 | 7.50% | ε∥ [1 kHz, 20° C.]: | 3.5 |
| CPY-3-O2 | 9.00% | ε⊥ [1 kHz, 20° C.]: | 6.9 |
| CCH-34 | 9.00% | γ₁ [mPa·s, 20° C.]: | 117 |

-continued

| | | | |
|---|---|---|---|
| CCH-35 | 9.00% | K₁ [pN, 20° C.]: | 14.4 |
| CC-3-V | 10.00% | K₃ [pN, 20° C.]: | 15.1 |
| CCH-301 | 9.00% | V₀ [20° C., V]: | 2.23 |
| CCH-303 | 5.00% | | |
| PYP-2-3 | 3.00% | | |

Example 213a

The mixture according to Example 213 additionally comprises 0.2% of

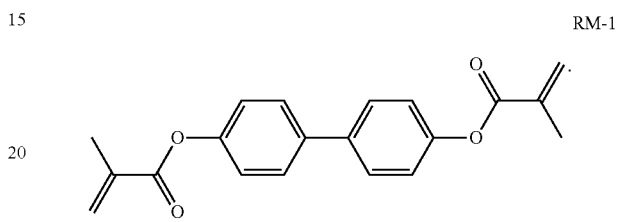

RM-1

Example 214

| | | | |
|---|---|---|---|
| CY-3-O2 | 10.50% | Clearing point [° C.]: | 79.7 |
| PY-1-O4 | 5.00% | Δn [589 nm, 20° C.]: | 0.1113 |
| PY-3-O2 | 7.50% | Δε [1 kHz, 20° C.]: | −4.4 |
| PY-4-O2 | 4.00% | K₁ [pN, 20° C.]: | 14.5 |
| CCY-3-O1 | 5.50% | K₃ [pN, 20° C.]: | 16.7 |
| CCY-3-O2 | 5.00% | V₀ [20° C., V]: | 2.05 |
| CCY-4-O2 | 4.00% | | |
| CLY-3-O2 | 9.00% | | |
| CPY-2-O2 | 9.00% | | |
| CPY-3-O2 | 9.00% | | |
| CC-3-V | 23.50% | | |
| CC-3-V1 | 7.00% | | |
| CBC-33F | 1.00% | | |

Example 215

| | | | |
|---|---|---|---|
| APUQU-3-F | 3.00% | Clearing point [° C.]: | 90.5 |
| CC-3-V1 | 7.75% | Δn [589 nm, 20° C.]: | 0.1057 |
| CC-4-V | 10.00% | Δε [1 kHz, 20° C.]: | 7.4 |
| CC-5-V | 9.25% | γ₁ [mPa·s, 20° C.]: | 91 |
| CCGU-3-F | 7.00% | K₁ [pN, 20° C.]: | 13.6 |
| CCH-34 | 3.00% | K₃ [pN, 20° C.]: | 15.5 |
| CCP-30CF₃ | 2.50% | V₀ [20° C., V]: | 1.43 |
| CCP-V-1 | 14.00% | | |
| CCP-V2-1 | 9.50% | | |
| PCH-301 | 11.00% | | |
| PGP-2-2V | 2.00% | | |
| PGUQU-3-F | 5.00% | | |
| PPGU-3-F | 0.50% | | |
| PUQU-3-F | 12.00% | | |
| APUQU-2-F | 3.50% | | |

Example 216

| | | | |
|---|---|---|---|
| CC-3-V | 27.00% | Clearing point [° C.]: | 74.9 |
| CCY-3-1 | 9.50% | Δn [589 nm, 20° C.]: | 0.1093 |
| CCP-3-1 | 8.00% | Δε [1 kHz, 20° C.]: | −3.8 |

Example 217

| | | | |
|---|---|---|---|
| CLY-3-O2 | 6.00% | $\varepsilon_\parallel$ [1 kHz, 20° C.]: | 3.7 |
| CPY-2-O2 | 10.50% | $\varepsilon_\perp$ [1 kHz, 20° C.]: | 7.5 |
| CPY-3-O2 | 10.50% | $\gamma_1$ [mPa · s, 20° C.]: | 108 |
| CY-3-O2 | 15.00% | $K_1$ [pN, 20° C.]: | 14.1 |
| PY-3-O2 | 13.50% | $K_3$ [pN, 20° C.]: | 15.8 |
| | | $V_0$ [20° C., V]: | 2.16 |

Example 217a

| | | | |
|---|---|---|---|
| CC-3-V | 16.00% | Clearing point [° C.]: | 85.4 |
| CC-3-V1 | 5.00% | $\Delta n$ [589 nm, 20° C.]: | 0.1060 |
| CCH-34 | 7.00% | $\Delta\varepsilon$ [1 kHz, 20° C.]: | −3.7 |
| CCP-3-1 | 1.00% | $\varepsilon_\parallel$ [1 kHz, 20° C.]: | 3.6 |
| CCY-3-O1 | 6.00% | $\varepsilon_\perp$ [1 kHz, 20° C.]: | 7.4 |
| CCY-3-O2 | 7.50% | $\gamma_1$ [mPa · s, 20° C.]: | 114 |
| CCY-3-O3 | 2.00% | $K_1$ [pN, 20° C.]: | 13.4 |
| CCY-4-O2 | 5.00% | $K_3$ [pN, 20° C.]: | 14.5 |
| CPY-2-O2 | 10.00% | $V_0$ [20° C., V]: | 2.09 |
| CPY-3-O2 | 9.00% | | |
| CY-3-O2 | 10.00% | | |
| CY-3-O4 | 6.50% | | |
| CY-5-O4 | 6.00% | | |
| PYP-2-3 | 5.50% | | |
| PYP-2-4 | 3.50% | | |

The mixture according to Example 217 additionally comprises 0.04% of

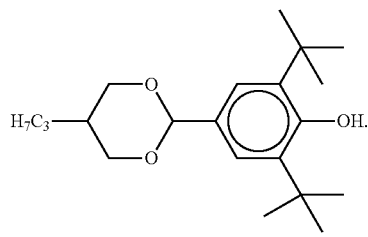

Example 218

| | | | |
|---|---|---|---|
| CCH-23 | 12.00% | Clearing point [° C.]: | 110.7 |
| CCH-34 | 10.00% | $\Delta n$ [589 nm, 20° C.]: | 0.1002 |
| CCP-3-1 | 7.00% | $\Delta\varepsilon$ [1 kHz, 20° C.]: | −2.9 |
| CCY-3-1 | 10.00% | $\varepsilon_\parallel$ [1 kHz, 20° C.]: | 3.2 |
| CCY-3-O1 | 1.50% | $\varepsilon_\perp$ [1 kHz, 20° C.]: | 6.1 |
| CCY-3-O2 | 9.00% | $\gamma_1$ [mPa · s, 20° C.]: | 147 |
| CCY-3-O3 | 7.50% | $K_1$ [pN, 20° C.]: | 17.3 |
| CCY-4-O2 | 9.00% | $K_3$ [pN, 20° C.]: | 18.3 |
| CPGP-4-3 | 2.00% | $V_0$ [20° C., V]: | 2.65 |
| CPY-2-O2 | 8.00% | | |
| CPY-3-O2 | 8.00% | | |
| CY-3-O2 | 1.50% | | |
| CY-3-O4 | 3.00% | | |
| PCH-301 | 10.00% | | |
| PYP-2-3 | 1.50% | | |

Example 218a

The mixture according to Example 218 additionally comprises 0.04% of

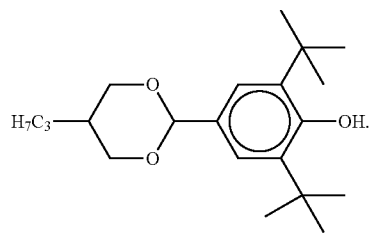

Example 219

| | | | |
|---|---|---|---|
| BCH-32 | 1.50% | Clearing point [° C.]: | 74.3 |
| CC-3-V | 19.50% | $\Delta n$ [589 nm, 20° C.]: | 0.1089 |
| CC-3-V1 | 5.50% | $\Delta\varepsilon$ [1 kHz, 20° C.]: | −3.8 |
| CCP-3-1 | 8.00% | $\varepsilon_\parallel$ [1 kHz, 20° C.]: | 3.7 |
| CCP-3-3 | 4.50% | $\varepsilon_\perp$ [1 kHz, 20° C.]: | 7.5 |
| CLY-3-O2 | 6.00% | $\gamma_1$ [mPa · s, 20° C.]: | 115 |
| CPY-2-O2 | 10.50% | $K_1$ [pN, 20° C.]: | 13.7 |
| CPY-3-O2 | 10.50% | $K_3$ [pN, 20° C.]: | 16.1 |
| CY-3-O2 | 15.00% | $V_0$ [20° C., V]: | 2.18 |
| CY-5-O2 | 9.00% | | |
| PY-3-O2 | 10.00% | | |

Example 220

| | | | |
|---|---|---|---|
| CY-3-O2 | 15.00% | Clearing point [° C.]: | 74.7 |
| CY-5-O2 | 6.50% | $\Delta n$ [589 nm, 20° C.]: | 0.1082 |
| CCY-3-O2 | 11.00% | $\Delta\varepsilon$ [1 kHz, 20° C.]: | −3.0 |
| CPY-2-O2 | 5.50% | $\varepsilon_\parallel$ [1 kHz, 20° C.]: | 3.6 |
| CPY-3-O2 | 10.50% | $\varepsilon_\perp$ [1 kHz, 20° C.]: | 6.6 |
| CC-3-V | 28.50% | $\gamma_1$ [mPa · s, 20° C.]: | 97 |
| CC-3-V1 | 10.00% | $K_1$ [pN, 20° C.]: | 12.9 |
| PYP-2-3 | 12.50% | $K_3$ [pN, 20° C.]: | 15.7 |
| PPGU-3-F | 0.50% | $V_0$ [20° C., V]: | 2.42 |

Example 221

| | | | |
|---|---|---|---|
| PGUQU-3-F | 5.00% | Clearing point [° C.]: | 84.8 |
| CCQU-3-F | 8.00% | $\Delta n$ [589 nm, 20° C.]: | 0.1035 |
| CCQU-5-F | 4.00% | $\Delta\varepsilon$ [1 kHz, 20° C.]: | 10.1 |
| PUQU-3-F | 13.50% | $\varepsilon_\parallel$ [1 kHz, 20° C.]: | 13.5 |
| APUQU-2-F | 3.00% | $\varepsilon_\perp$ [1 kHz, 20° C.]: | 3.4 |
| APUQU-3-F | 6.00% | $\gamma_1$ [mPa · s, 20° C.]: | 86 |
| CC-3-V | 25.50% | $K_1$ [pN, 20° C.]: | 12.3 |
| CC-3-V1 | 6.00% | $K_3$ [pN, 20° C.]: | 15.0 |
| CCP-V-1 | 13.00% | $V_0$ [20° C., V]: | 1.17 |
| CCP-V2-1 | 6.00% | | |
| PPGU-3-F | 0.50% | | |
| BCH-3F.F | 7.50% | | |
| BCH-2F.F | 2.00% | | |

Example 221a

The mixture according to Example 221 additionally comprises 0.25% of

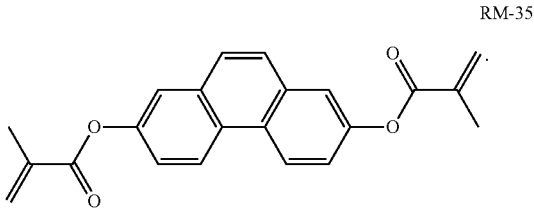 [SMILES: C=C(C)C(=O)Oc1ccc2c(ccc3cc(OC(=O)C(=C)C)ccc32)c1]

RM-35

Example 222

| | | | |
|---|---|---|---|
| CY-3-O2 | 12.00% | Clearing point [° C.]: | 85.4 |
| CY-5-O2 | 12.00% | Δn [589 nm, 20° C.]: | 0.1039 |
| CCY-3-O3 | 5.00% | | |
| CCY-4-O2 | 5.00% | | |
| CPY-2-O2 | 10.00% | | |
| CPY-3-O2 | 10.00% | | |
| CCY-2-1 | 4.00% | | |
| CC-3-V | 16.00% | | |
| CCH-23 | 10.00% | | |
| CCH-34 | 4.00% | | |
| CCP-V-1 | 4.00% | | |
| PGP-2-5 | 2.00% | | |
| CPGP-5-2 | 3.00% | | |
| CPGP-5-3 | 3.00% | | |

Example 223

| | | | |
|---|---|---|---|
| CC-3-V | 41.50% | Clearing point [° C.]: | 74.5 |
| CCY-3-O1 | 2.50% | Δn [589 nm, 20° C.]: | 0.0984 |
| CCY-3-O2 | 11.50% | Δε [1 kHz, 20° C.]: | -3.3 |
| CCY-3-O3 | 5.00% | $\epsilon_\parallel$ [1 kHz, 20° C.]: | 3.5 |
| CPY-2-O2 | 5.00% | $\epsilon_\perp$ [1 kHz, 20° C.]: | 6.7 |
| CPY-3-O2 | 12.00% | $\gamma_1$ [mPa · s, 20° C.]: | 89 |
| CY-3-O2 | 9.50% | $K_1$ [pN, 20° C.]: | 13.2 |
| PY-3-O2 | 7.00% | $K_3$ [pN, 20° C.]: | 15.2 |
| PY-4-O2 | 3.00% | $V_0$ [20° C., V]: | 2.29 |
| PYP-2-3 | 3.00% | | |

Example 223a

The mixture according to Example 223 additionally comprises 0.001% of Irganox® 1076 (octadecyl 3-(3,5-di-tert-butyl-4-hydroxyphenyl)propionate, BASF) and 0.4% of

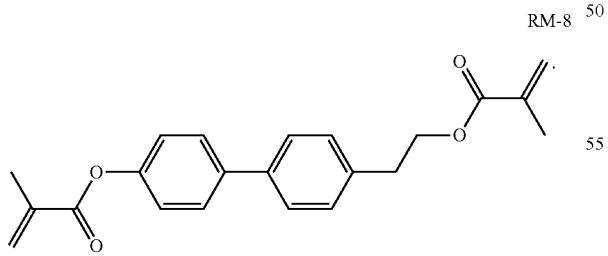

RM-8

Example 224

| | | | |
|---|---|---|---|
| CC-3-V | 30.50% | Clearing point [° C.]: | 80.1 |
| CC-3-V1 | 4.50% | Δn [589 nm, 20° C.]: | 0.1033 |
| CCY-3-O1 | 6.00% | Δε [1 kHz, 20° C.]: | -4.0 |
| CCY-3-O2 | 8.00% | $\epsilon_\parallel$ [1 kHz, 20° C.]: | 3.6 |
| CLY-3-O2 | 8.00% | $\epsilon_\perp$ [1 kHz, 20° C.]: | 7.6 |
| CPY-2-O2 | 8.00% | $\gamma_1$ [mPa · s, 20° C.]: | 113 |
| CPY-3-O2 | 12.00% | $K_1$ [pN, 20° C.]: | 14.4 |
| CY-3-O2 | 15.00% | $K_3$ [pN, 20° C.]: | 17.0 |
| PY-3-O2 | 8.00% | $V_0$ [20° C., V]: | 2.16 |

Example 225

| | | | |
|---|---|---|---|
| CC-3-V | 41.50% | Clearing point [° C.]: | 74.5 |
| CCY-3-O1 | 2.50% | Δε [1 kHz, 20° C.]: | -3.3 |
| CCY-3-O2 | 11.50% | $K_1$ [pN, 20° C.]: | 13.2 |
| CCY-3-O3 | 5.00% | $K_3$ [pN, 20° C.]: | 15.2 |
| CPY-2-O2 | 5.00% | $V_0$ [20° C., V]: | 2.29 |
| CPY-3-O2 | 12.00% | | |
| CY-3-O2 | 9.50% | | |
| PY-3-O2 | 7.00% | | |
| PY-4-O2 | 3.00% | | |
| PYP-2-3 | 3.00% | | |

Example 226

| | | | |
|---|---|---|---|
| CC-3-V | 26.00% | Clearing point [° C.]: | 80.5 |
| CCY-3-O2 | 6.00% | Δn [589 nm, 20° C.]: | 0.1040 |
| CCY-3-O3 | 6.00% | Δε [1 kHz, 20° C.]: | -4.0 |
| CCY-4-O2 | 6.00% | $\epsilon_\parallel$ [1 kHz, 20° C.]: | 3.7 |
| CCY-5-O2 | 6.00% | $\epsilon_\perp$ [1 kHz, 20° C.]: | 7.7 |
| CPY-2-O2 | 6.00% | $\gamma_1$ [mPa · s, 20° C.]: | 133 |
| CPY-3-O2 | 6.00% | $K_1$ [pN, 20° C.]: | 13.6 |
| PYP-2-3 | 7.00% | $K_3$ [pN, 20° C.]: | 15.4 |
| CY-3-O2 | 15.00% | $V_0$ [20° C., V]: | 2.07 |
| CY-5-O2 | 12.00% | LTS (bulk) [-20° C.] | >1000 h |
| BCH-32 | 4.00% | | |

Example 226a

The mixture according to Example 226 additionally comprises 0.3% of

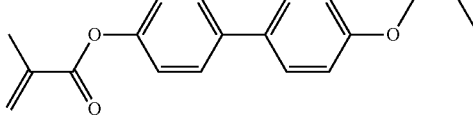

RM-1

Example 227

| | | | |
|---|---|---|---|
| CC-3-V | 26.50% | Clearing point [° C.]: | 84.6 |
| CC-3-V1 | 2.00% | Δn [589 nm, 20° C.]: | 0.1076 |
| CCH-34 | 2.00% | Δε [1 kHz, 20° C.]: | -4.0 |
| CCY-3-O2 | 10.00% | $\epsilon_\parallel$ [1 kHz, 20° C.]: | 3.7 |
| CCY-3-O3 | 5.00% | $\epsilon_\perp$ [1 kHz, 20° C.]: | 7.7 |
| CCY-4-O2 | 10.00% | $\gamma_1$ [mPa · s, 20° C.]: | 129 |
| CPY-2-O2 | 10.00% | $K_1$ [pN, 20° C.]: | 13.9 |

-continued

| | | | |
|---|---|---|---|
| CPY-3-O2 | 10.00% | $K_3$ [pN, 20° C.]: | 15.4 |
| CY-3-O2 | 10.50% | $V_0$ [20° C., V]: | 2.06 |
| PYP-2-3 | 9.00% | | |
| Y-4O-O4 | 5.00% | | |

Example 227a

The mixture according to Example 227 additionally comprises 0.04% of

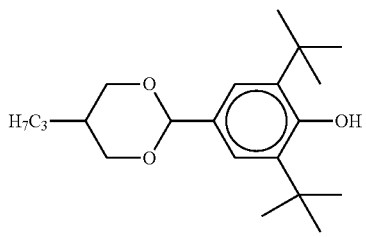

and
0.015% of

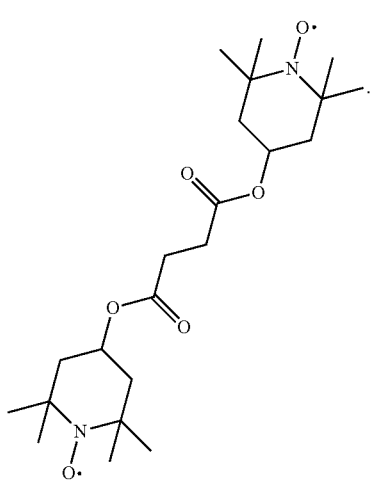

Example 228

| | | | |
|---|---|---|---|
| APUQU-3-F | 1.50% | Clearing point [° C.]: | 110.1 |
| CC-3-V | 34.00% | Δn [589 nm, 20° C.]: | 0.1208 |
| CC-3-V1 | 5.00% | Δε [1 kHz, 20° C.]: | 6.2 |
| CCP-3OCF$_3$ | 4.50% | $ε_{||}$ [1 kHz, 20° C.]: | 9.2 |
| CCP-V-1 | 10.50% | $ε_⊥$ [1 kHz, 20° C.]: | 3.0 |
| CCP-V2-1 | 6.00% | $γ_1$ [mPa · s, 20° C.]: | 104 |
| CCVC-3-V | 3.50% | $K_1$ [pN, 20° C.]: | 16.3 |
| CPGP-5-2 | 4.50% | $K_3$ [pN, 20° C.]: | 18.9 |
| CPGP-5-3 | 4.50% | $V_0$ [20° C., V]: | 1.70 |
| DGUQU-4-F | 3.00% | | |
| PGP-2-3 | 4.00% | | |
| PGP-2-4 | 2.00% | | |
| PGUQU-3-F | 5.00% | | |
| PGUQU-4-F | 3.50% | | |
| PGUQU-5-F | 3.00% | | |
| PPGU-3-F | 0.50% | | |
| PUQU-3-F | 5.00% | | |

Example 229

| | | | |
|---|---|---|---|
| APUQU-3-F | 1.50% | Clearing point [° C.]: | 110 |
| CC-3-V | 35.50% | Δn [589 nm, 20° C.]: | 0.1257 |
| CCP-3OCF$_3$ | 4.00% | Δε [1 kHz, 20° C.]: | 6.3 |
| CCP-V-1 | 12.00% | $ε_{||}$ [1 kHz, 20° C.]: | 9.3 |
| CCP-V2-1 | 4.50% | $ε_⊥$ [1 kHz, 20° C.]: | 3.0 |
| CCVC-3-V | 4.00% | $γ_1$ [mPa · s, 20° C.]: | 104 |
| CPGP-5-2 | 5.00% | $K_1$ [pN, 20° C.]: | 16.1 |
| CPGP-5-3 | 5.00% | $K_3$ [pN, 20° C.]: | 18.7 |
| DGUQU-4-F | 3.00% | $V_0$ [20° C., V]: | 1.69 |
| PGP-2-3 | 4.00% | | |
| PGP-2-4 | 2.00% | | |
| PGUQU-3-F | 5.00% | | |
| PGUQU-4-F | 3.50% | | |
| PGUQU-5-F | 3.00% | | |
| PPGU-3-F | 0.50% | | |
| PUQU-3-F | 5.00% | | |
| PP-1-2V1 | 2.50% | | |

Example 230

| | | | |
|---|---|---|---|
| CY-3-O2 | 5.00% | Clearing point [° C.]: | 102 |
| CY-3-O4 | 15.00% | Δn [589 nm, 20° C.]: | 0.2503 |
| CCY-3-O2 | 6.00% | Δε [1 kHz, 20° C.]: | -4.0 |
| CCY-3-O3 | 6.00% | $ε_{||}$ [1 kHz, 20° C.]: | 4.3 |
| CPY-2-O2 | 3.00% | $ε_⊥$ [1 kHz, 20° C.]: | 8.3 |
| PTP-102 | 5.00% | $γ_1$ [mPa · s, 20° C.]: | 392 |
| PPTUI-3-2 | 15.00% | $K_1$ [pN, 20° C.]: | 19.5 |
| PPTUI-3-4 | 11.00% | $K_3$ [pN, 20° C.]: | 24.0 |
| PTP-302FF | 12.00% | $V_0$ [20° C., V]: | 2.57 |
| PTP-502FF | 12.00% | | |
| CPTP-302FF | 5.00% | | |
| CPTP-502FF | 5.00% | | |

Example 231

| | | | |
|---|---|---|---|
| CC-3-V | 35.00% | Clearing point [° C.]: | 79.6 |
| CCP-3-1 | 7.50% | Δn [589 nm, 20° C.]: | 0.1095 |
| CCPC-33 | 2.00% | Δε [1 kHz, 20° C.]: | -2.6 |
| CCY-3-O2 | 7.00% | $ε_{||}$ [1 kHz, 20° C.]: | 3.5 |
| CCY-4-O2 | 7.50% | $ε_⊥$ [1 kHz, 20° C.]: | 6.1 |
| CPY-2-O2 | 8.50% | $γ_1$ [mPa · s, 20° C.]: | 92 |
| CPY-3-O2 | 9.00% | $K_1$ [pN, 20° C.]: | 14.5 |
| PP-1-2V1 | 5.50% | | |
| PY-3-O2 | 8.00% | | |
| PYP-2-3 | 5.00% | | |
| Y-4O-O4 | 5.00% | | |

Example 231a

The mixture according to Example 231 additionally comprises 0.04% of

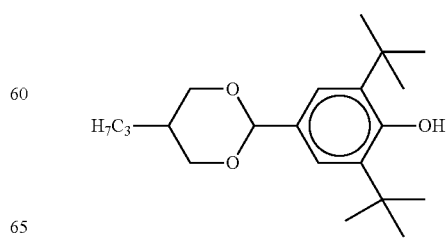

and
0.02% of

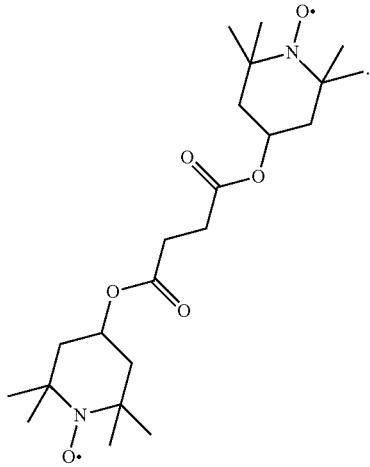

Example 232

| | | | |
|---|---|---|---|
| CY-3-O4 | 25.00% | Clearing point [° C.]: | 81.2 |
| CY-5-O2 | 9.00% | Δn [589 nm, 20° C.]: | 0.1531 |
| CCY-3-O2 | 7.00% | Δε [1 kHz, 20° C.]: | -5.0 |
| CCY-3-O3 | 4.50% | $\epsilon_\parallel$ [1 kHz, 20° C.]: | 4.1 |
| CPY-2-O2 | 10.00% | $\epsilon_\perp$ [1 kHz, 20° C.]: | 9.1 |
| CPY-3-O2 | 10.00% | $\gamma_1$ [mPa · s, 20° C.]: | 298 |
| PYP-2-3 | 14.00% | $K_1$ [pN, 20° C.]: | 13.1 |
| PYP-2-4 | 10.00% | $K_3$ [pN, 20° C.]: | 15.9 |
| CCP-V-1 | 3.00% | $V_0$ [20° C., V]: | 1.89 |
| BCH-32 | 2.00% | | |
| PP-1-2V1 | 3.50% | | |
| PGP-2-3 | 2.00% | | |

Example 232a

The mixture according to Example 232 additionally comprises 10% of

RM-82

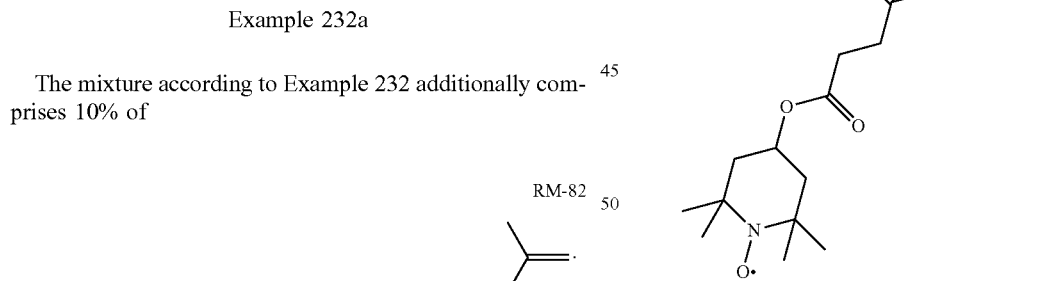

Example 233

| | | | |
|---|---|---|---|
| CC-3-V | 29.00% | Clearing point [° C.]: | 80.1 |
| CCY-3-O1 | 8.00% | Δn [589 nm, 20° C.]: | 0.1033 |
| CCY-3-O2 | 6.00% | Δε [1 kHz, 20° C.]: | -4.5 |
| CCY-4-O2 | 2.00% | $\epsilon_\parallel$ [1 kHz, 20° C.]: | 4.0 |
| CLY-3-O2 | 8.50% | $\epsilon_\perp$ [1 kHz, 20° C.]: | 8.4 |
| CLY-3-O3 | 7.50% | $\gamma_1$ [mPa · s, 20° C.]: | 98 |
| CPY-2-O2 | 10.00% | $K_1$ [pN, 20° C.]: | 13.2 |
| CPY-3-O2 | 7.50% | $K_3$ [pN, 20° C.]: | 14.6 |
| CY-3-O2 | 6.50% | $V_0$ [20° C., V]: | 1.91 |
| PY-3-O2 | 10.00% | | |
| Y-4O-O4 | 5.00% | | |

Example 233a

The mixture according to Example 233 additionally comprises 0.04% of

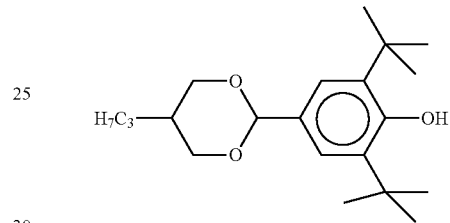

and
0.02% of

Example 234

| | | | |
|---|---|---|---|
| CC-3-V | 34.00% | Clearing point [° C.]: | 79.7 |
| CCPC-33 | 1.00% | Δn [589 nm, 20° C.]: | 0.1095 |
| CCY-3-1 | 4.00% | Δε [1 kHz, 20° C.]: | -3.5 |
| CCY-3-O2 | 10.00% | $\epsilon_\parallel$ [1 kHz, 20° C.]: | 3.7 |
| CCY-4-O2 | 9.50% | $\epsilon_\perp$ [1 kHz, 20° C.]: | 7.2 |
| CPY-2-O2 | 9.00% | $\gamma_1$ [mPa · s, 20° C.]: | 105 |
| CPY-3-O2 | 10.00% | $K_1$ [pN, 20° C.]: | 14.0 |
| PP-1-2V1 | 1.50% | | |
| PY-3-O2 | 10.00% | | |

| | |
|---|---|
| PYP-2-3 | 6.00% |
| Y-4O-O4 | 5.00% |

Example 234a

The mixture according to Example 234 additionally comprises 0.04% of

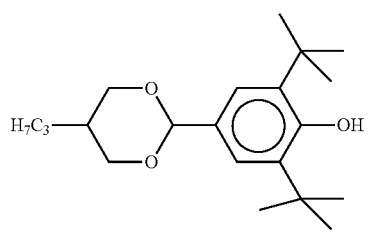

and
0.02% of

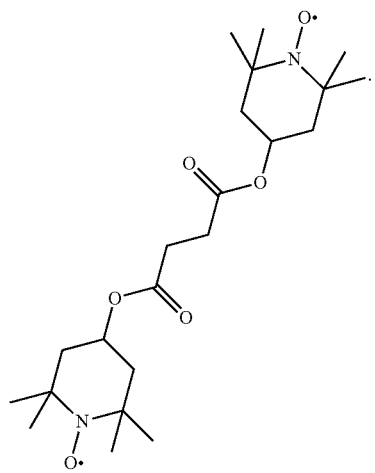

Example 235

| | | | |
|---|---|---|---|
| CC-3-V | 19.00% | Clearing point [° C.]: | 80.2 |
| CCY-3-O1 | 5.00% | Δn [589 nm, 20° C.]: | 0.1104 |
| CCY-3-O2 | 7.00% | Δε [1 kHz, 20° C.]: | −3.7 |
| CCY-3-O3 | 12.00% | $ε_{\parallel}$ [1 kHz, 20° C.]: | 3.6 |
| CCY-4-O2 | 8.00% | $ε_{\perp}$ [1 kHz, 20° C.]: | 7.3 |
| CPY-2-O2 | 9.50% | $γ_1$ [mPa·s, 20° C.]: | 143 |
| CPY-3-O2 | 10.00% | $K_1$ [pN, 20° C.]: | 12.9 |
| CY-3-O2 | 12.00% | $K_3$ [pN, 20° C.]: | 14.5 |
| CY-3-O4 | 3.50% | $V_0$ [20° C., V]: | 2.09 |
| PP-1-3 | 7.00% | | |
| PP-1-4 | 7.00% | | |

Example 236

| | | | |
|---|---|---|---|
| CY-3-O2 | 15.00% | Clearing point [° C.]: | 79.1 |
| CY-5-O2 | 9.50% | Δn [589 nm, 20° C.]: | 0.0944 |
| CCY-3-O1 | 4.00% | Δε [1 kHz, 20° C.]: | −4.0 |
| CCY-3-O2 | 6.00% | $ε_{\parallel}$ [1 kHz, 20° C.]: | 3.7 |
| CCY-3-O3 | 4.50% | $ε_{\perp}$ [1 kHz, 20° C.]: | 7.7 |
| CCY-4-O2 | 6.00% | $γ_1$ [mPa·s, 20° C.]: | 120 |
| CCY-5-O2 | 4.00% | $K_1$ [pN, 20° C.]: | 13.4 |
| CPY-2-O2 | 8.00% | $K_3$ [pN, 20° C.]: | 15.4 |
| CPY-3-O2 | 9.00% | $V_0$ [20° C., V]: | 2.06 |
| PYP-2-4 | 2.00% | | |
| CC-3-V | 32.00% | | |

Example 236a

The mixture according to Example 236 additionally comprises 0.015% of

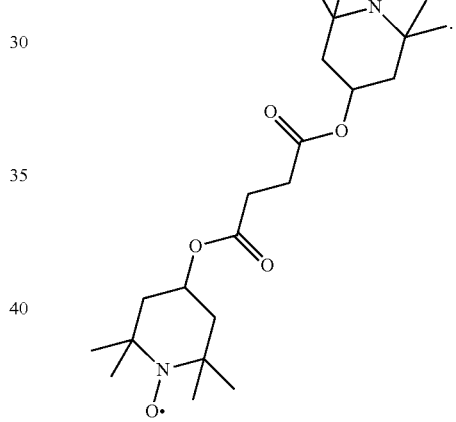

Example 237

| | | | |
|---|---|---|---|
| CY-3-O2 | 15.00% | Clearing point [° C.]: | 79.1 |
| CY-5-O2 | 9.50% | Δn [589 nm, 20° C.]: | 0.0944 |
| CCY-3-O1 | 4.00% | Δε [1 kHz, 20° C.]: | −4.0 |
| CCY-3-O2 | 6.00% | $ε_{\parallel}$ [1 kHz, 20° C.]: | 3.7 |
| CCY-3-O3 | 4.50% | $ε_{\perp}$ [1 kHz, 20° C.]: | 7.7 |
| CCY-4-O2 | 6.00% | $γ_1$ [mPa·s, 20° C.]: | 120 |
| CCY-5-O2 | 4.00% | $K_1$ [pN, 20° C.]: | 13.4 |
| CPY-2-O2 | 8.00% | $K_3$ [pN, 20° C.]: | 15.4 |
| CPY-3-O2 | 9.00% | $V_0$ [20° C., V]: | 2.06 |
| PYP-2-4 | 2.00% | | |
| CC-3-V | 32.00% | | |

Example 237a

The mixture according to Example 237 additionally comprises 0.015% of

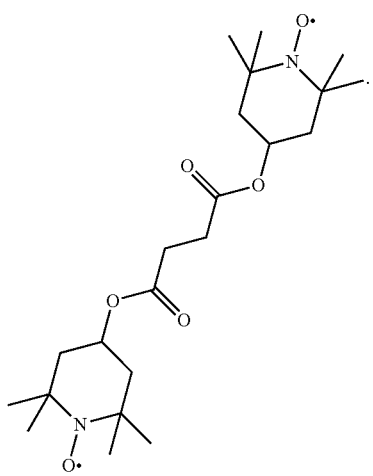

Example 238

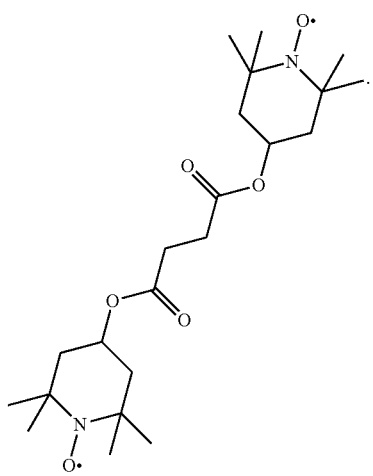

Example 241

| | | | |
|---|---|---|---|
| APUQU-3-F | 4.00% | Clearing point [° C.]: | 85.7 |
| CC-3-V | 41.00% | Δn [589 nm, 20° C.]: | 0.1004 |
| CC-3-V1 | 6.50% | Δε [1 kHz, 20° C.]: | 6.8 |
| CCP-V-1 | 12.00% | $\varepsilon_{\parallel}$ [1 kHz, 20° C.]: | 9.8 |
| CCP-V2-1 | 11.00% | $\varepsilon_{\perp}$ [1 kHz, 20° C.]: | 3.0 |
| CPGP-5-3 | 2.50% | $\gamma_1$ [mPa·s, 20° C.]: | 69 |
| PGUQU-3-F | 5.00% | $K_1$ [pN, 20° C.]: | 13.0 |
| PGUQU-4-F | 4.00% | $K_3$ [pN, 20° C.]: | 16.6 |
| PGUQU-5-F | 3.50% | $V_0$ [20° C., V]: | 1.47 |
| PUQU-3-F | 10.50% | | |

Example 239

| | | | |
|---|---|---|---|
| BCH-3F.F | 5.00% | Clearing point [° C.]: | 101 |
| BCH-3F.F.F | 8.50% | Δn [589 nm, 20° C.]: | 0.0925 |
| CC-3-V1 | 10.00% | Δε [1 kHz, 20° C.]: | 5.3 |
| CC-4-V | 12.50% | $\varepsilon_{\parallel}$ [1 kHz, 20° C.]: | 8.3 |
| CCG-V-F | 9.00% | $\gamma_1$ [mPa·s, 20° C.]: | 119 |
| CCP-2F.F.F | 3.50% | $K_1$ [pN, 20° C.]: | 14.2 |
| CCP-3-1 | 4.50% | $K_3$ [pN, 20° C.]: | 19.9 |
| CCP-3F.F.F | 10.00% | $V_0$ [20° C., V]: | 1.73 |
| CCP-V-1 | 12.00% | | |
| CCP-V2-1 | 7.00% | | |
| ECCP-5F.F | 13.00% | | |
| PUQU-3-F | 5.00% | | |

Example 242

| | | | |
|---|---|---|---|
| CC-3-V | 32.50% | Clearing point [° C.]: | 74.7 |
| CC-3-V1 | 1.50% | Δn [589 nm, 20° C.]: | 0.1090 |
| CCY-3-O1 | 8.50% | Δε [1 kHz, 20° C.]: | -3.8 |
| CCY-3-O2 | 5.50% | $\varepsilon_{\parallel}$ [1 kHz, 20° C.]: | 3.7 |
| CLY-3-O2 | 10.00% | $\varepsilon_{\perp}$ [1 kHz, 20° C.]: | 7.5 |
| CPY-3-O2 | 9.50% | $\gamma_1$ [mPa·s, 20° C.]: | 102 |
| PY-3-O2 | 10.50% | $K_1$ [pN, 20° C.]: | 13.8 |
| CY-3-O2 | 14.00% | $K_3$ [pN, 20° C.]: | 15.7 |
| PYP-2-3 | 8.00% | $V_0$ [20° C., V]: | 2.15 |

Example 240

| | | | |
|---|---|---|---|
| APUQU-2-F | 4.00% | Clearing point [° C.]: | 86.4 |
| APUQU-3-F | 6.00% | Δn [589 nm, 20° C.]: | 0.1030 |
| PUQU-3-F | 10.00% | Δε [1 kHz, 20° C.]: | 7.0 |
| CCQU-3-F | 2.00% | $\varepsilon_{\parallel}$ [1 kHz, 20° C.]: | 10.1 |
| CCP-V-1 | 13.00% | $\gamma_1$ [mPa·s, 20° C.]: | 71 |
| CCP-V2-1 | 7.00% | $K_1$ [pN, 20° C.]: | 13.2 |
| PGUQU-3-F | 6.00% | $K_3$ [pN, 20° C.]: | 15.8 |
| CC-3-V | 40.00% | $V_0$ [20° C., V]: | 1.45 |
| CC-3-V1 | 5.50% | | |
| PGP-2-3 | 3.00% | | |
| CPGP-5-2 | 3.00% | | |
| PPGU-3-F | 0.50% | | |

Example 242a

The mixture according to Example 242 additionally comprises 0.25% of RM-41

| | | | |
|---|---|---|---|
| CC-3-V | 33.00% | Clearing point [° C.]: | 80.2 |
| CCY-3-O1 | 6.00% | Δn [589 nm, 20° C.]: | 0.1116 |
| CCY-3-O2 | 8.00% | Δε [1 kHz, 20° C.]: | -4.1 |
| CCY-4-O2 | 2.50% | $\varepsilon_{\parallel}$ [1 kHz, 20° C.]: | 3.7 |
| CPY-2-O2 | 8.00% | $\varepsilon_{\perp}$ [1 kHz, 20° C.]: | 7.8 |
| CPY-3-O2 | 12.00% | $\gamma_1$ [mPa·s, 20° C.]: | 119 |
| CLY-3-O2 | 8.00% | $K_1$ [pN, 20° C.]: | 14.5 |
| PY-1-O4 | 1.50% | $K_3$ [pN, 20° C.]: | 16.1 |
| PY-3-O2 | 10.00% | $V_0$ [20° C., V]: | 2.09 |
| PY-4-O2 | 8.00% | | |
| CY-3-O2 | 3.00% | | |

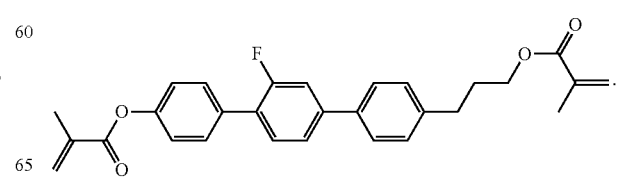

RM-41

Example 240a

The mixture according to Example 240 additionally comprises 0.008% of

Example 243

| | | | |
|---|---|---|---|
| Y-4O-O4 | 9.00% | Clearing point [° C.]: | 96 |
| CY-3-O4 | 12.00% | Δn [589 nm, 20° C.]: | 0.0796 |
| CCY-3-O1 | 5.00% | Δε [1 kHz, 20° C.]: | −2.3 |
| CCY-3-O2 | 5.50% | $\epsilon_{\parallel}$ [1 kHz, 20° C.]: | 3.4 |
| CCY-3-O3 | 5.50% | $\epsilon_{\perp}$ [1 kHz, 20° C.]: | 5.7 |
| CC-4-V | 15.00% | $K_1$ [pN, 20° C.]: | 14.8 |
| CC-5-V | 5.50% | $K_3$ [pN, 20° C.]: | 16.6 |
| CC-3-V1 | 6.50% | $V_0$ [20° C., V]: | 2.85 |
| CCP-V-1 | 11.00% | | |
| CCP-V2-1 | 10.00% | | |
| CH-33 | 3.00% | | |
| CH-35 | 3.00% | | |
| CCPC-33 | 4.50% | | |
| CCPC-34 | 4.50% | | |

Example 244

| | | | |
|---|---|---|---|
| Y-4O-O4 | 11.50% | Clearing point [° C.]: | 95 |
| CCY-3-O1 | 4.00% | Δn [589 nm, 20° C.]: | 0.1697 |
| CCY-3-O2 | 5.00% | Δε [1 kHz, 20° C.]: | −4.4 |
| CCY-3-O3 | 2.50% | $\epsilon_{\parallel}$ [1 kHz, 20° C.]: | 4.1 |
| CPY-3-O2 | 4.00% | $\epsilon_{\perp}$ [1 kHz, 20° C.]: | 8.5 |
| CC-4-V | 10.00% | $\gamma_1$ [mPa·s, 20° C.]: | 193 |
| CCP-V-1 | 6.00% | $K_1$ [pN, 20° C.]: | 16.8 |
| CCP-V2-1 | 12.00% | $K_3$ [pN, 20° C.]: | 19.5 |
| BCH-32 | 5.00% | $V_0$ [20° C., V]: | 2.23 |
| PTP-302FF | 12.00% | | |
| PTP-502FF | 12.00% | | |
| CPTP-302FF | 8.00% | | |
| CPTP-502FF | 8.00% | | |

Example 245

| | | | |
|---|---|---|---|
| CY-3-O2 | 10.00% | Clearing point [° C.]: | 80.7 |
| PY-1-O4 | 5.00% | Δn [589 nm, 20° C.]: | 0.1123 |
| PY-3-O2 | 6.50% | Δε [1 kHz, 20° C.]: | −4.2 |
| PY-4-O2 | 3.00% | $\epsilon_{\parallel}$ [1 kHz, 20° C.]: | 3.8 |
| CCY-3-O1 | 5.00% | $\epsilon_{\perp}$ [1 kHz, 20° C.]: | 8.0 |
| CCY-3-O2 | 5.00% | $\gamma_1$ [mPa·s, 20° C.]: | 150 |
| CCY-4-O2 | 3.00% | $K_1$ [pN, 20° C.]: | 14.6 |
| CLY-3-O2 | 8.00% | $K_3$ [pN, 20° C.]: | 15.2 |
| CPY-2-O2 | 10.00% | $V_0$ [20° C., V]: | 2.01 |
| CPY-3-O2 | 10.00% | | |
| CCH-301 | 8.50% | | |
| CCH-23 | 12.00% | | |
| CCH-34 | 4.50% | | |
| CCH-35 | 3.00% | | |
| BCH-32 | 6.50% | | |

Example 246

| | | | |
|---|---|---|---|
| PCH-3N.F.F | 7.00% | Clearing point [° C.]: | 91 |
| CP-1V-N | 18.00% | Δn [589 nm, 20° C.]: | 0.2003 |
| CP-V2-N | 16.00% | Δε [1 kHz, 20° C.]: | 10.3 |
| CC-4-V | 12.00% | $\epsilon_{\parallel}$ [1 kHz, 20° C.]: | 14.3 |
| CCP-V-1 | 9.00% | $\epsilon_{\perp}$ [1 kHz, 20° C.]: | 4.0 |
| PPTUI-3-2 | 18.00% | | |
| PPTUI-3-4 | 20.00% | | |

Example 247

| | | | |
|---|---|---|---|
| BCH-32 | 8.00% | Clearing point [° C.]: | 96 |
| CC-3-V | 24.50% | Δn [589 nm, 20° C.]: | 0.1195 |
| CCP-V-1 | 8.00% | Δε [1 kHz, 20° C.]: | −2.7 |
| CCY-2-1 | 2.00% | $\epsilon_{\parallel}$ [1 kHz, 20° C.]: | 3.3 |
| CCY-3-O1 | 6.00% | | |
| CCY-3-O3 | 2.00% | | |
| CLY-3-O2 | 5.00% | | |
| CLY-3-O3 | 5.00% | | |
| CPY-2-O2 | 6.50% | | |
| CPY-3-O2 | 6.00% | | |
| CY-3-O2 | 6.00% | | |
| CY-3-O4 | 3.00% | | |
| CY-5-O2 | 5.00% | | |
| PYP-2-3 | 6.50% | | |
| PYP-2-4 | 6.50% | | |

Example 247a

The mixture according to Example 247 additionally comprises 0.03% of

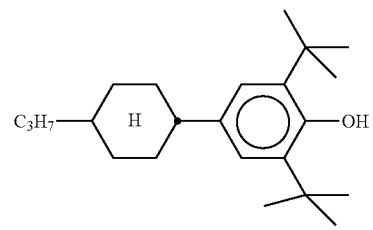

and
0.4% of

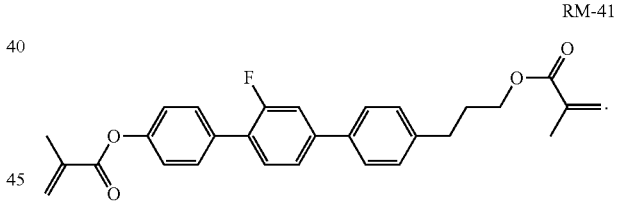

RM-41

Example 248

| | | | |
|---|---|---|---|
| BCH-32 | 2.00% | Clearing point [° C.]: | 80 |
| CC-3-V | 31.00% | Δn [589 nm, 20° C.]: | 0.1083 |
| CCY-3-O1 | 4.50% | Δε [1 kHz, 20° C.]: | −3.9 |
| CCY-3-O2 | 6.00% | $\epsilon_{\parallel}$ [1 kHz, 20° C.]: | 3.7 |
| CCY-4-O2 | 7.00% | $\gamma_1$ [mPa·s, 20° C.]: | 120 |
| CLY-3-O2 | 8.00% | $K_1$ [pN, 20° C.]: | 12.7 |
| CPY-2-O2 | 7.50% | $K_3$ [pN, 20° C.]: | 15.1 |
| CPY-3-O2 | 10.00% | $V_0$ [20° C., V]: | 2.07 |
| CY-3-O2 | 6.25% | | |
| PY-3-O2 | 5.75% | | |
| PY-1-O4 | 6.00% | | |
| PY-4-O2 | 6.00% | | |

Example 248a

The mixture according to Example 248 additionally comprises 0.005% of

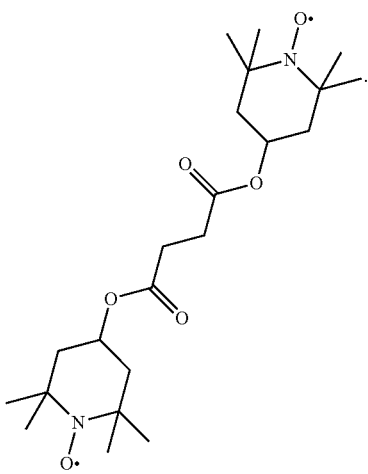

Example 249

| CC-3-V | 37.00% | Clearing point [° C.]: | 75.2 |
|---|---|---|---|
| CCY-3-O1 | 5.00% | Δn [589 nm, 20° C.]: | 0.1016 |
| CCY-3-O2 | 5.00% | Δε [1 kHz, 20° C.]: | -3.7 |
| CCY-4-O2 | 4.00% | $\epsilon_\parallel$ [1 kHz, 20° C.]: | 3.7 |
| CLY-3-O2 | 7.00% | $\gamma_1$ [mPa · s, 20° C.]: | 99 |
| CPY-2-O2 | 9.00% | $V_0$ [20° C., V]: | 2.13 |
| CPY-3-O2 | 10.00% | | |
| CY-3-O2 | 11.50% | | |
| PY-3-O2 | 11.50% | | |

Example 249a

The mixture according to Example 249 additionally comprises 0.015% of

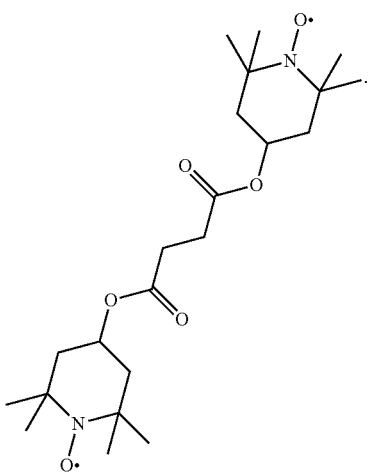

Example 249b

The mixture according to Example 249 additionally comprises 0.005% of

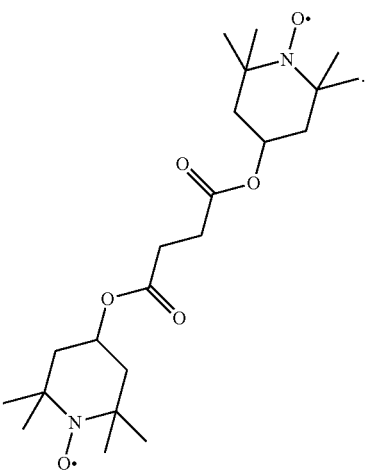

Example 250

| PUQU-3-F | 8.00% | Clearing point [° C.]: | 96.3 |
|---|---|---|---|
| APUQU-2-F | 6.00% | Δn [589 nm, 20° C.]: | 0.0994 |
| APUQU-3-F | 6.00% | Δε [1 kHz, 20° C.]: | 9.6 |
| CDUQU-3-F | 6.00% | $\gamma_1$ [mPa · s, 20° C.]: | 87 |
| DPGU-4-F | 6.00% | $K_1$ [pN, 20° C.]: | 14.5 |
| CCGU-3-F | 4.00% | $K_3$ [pN, 20° C.]: | 16.6 |
| CC-3-V | 36.00% | $V_0$ [20° C., V]: | 1.29 |
| CC-3-V1 | 8.00% | | |
| CCP-V-1 | 12.00% | | |
| CCP-V2-1 | 6.00% | | |
| CBC-33F | 1.50% | | |
| PPGU-3-F | 0.50% | | |

The invention claimed is:

1. Process for the purification of a liquid-crystal mixture (7), which comprises passing the liquid-crystal mixture (7) through a first electrodialysis cell (2), passing a concentrate solution (14) through a second electrodialysis cell (8) which is adjacent to the first electrodialysis cell (2) with the first and second electrodialysis cells separated by an ion-exchanger membrane (9), and, with the aid of an anode/cathode arrangement (15, 16) arranged outside the electrodialysis cells (2, 8), generating an electric field transverse to a direction of passage of the liquid-crystal mixture (7) through the first electrodialysis cell (2) so that ionised constituents of the liquid-crystal mixture (7) are discharged at the ion-exchanger membrane (9) and removed from the liquid-crystal mixture (7).

2. Process according to claim 1, which comprises passing the liquid-crystal mixture (7) through the first electrodialysis cell (2) multiple times.

3. Process according to claim 1, which comprises passing the liquid-crystal mixture (7) successively through a plurality of electrodialysis cells having an arrangement, comparable to the first electrodialysis cell (2), of an ion-exchanger membrane (9) and an adjacent second electrodialysis cell (8) and an electric field.

4. Process according to claim 1, which comprises passing the liquid-crystal mixture (7) through the first electrodialysis cell (2) over a period of more than one hour.

5. Process according to claim 1, wherein the concentrate solution (14) used is deionised water.

6. Process according to claim 1, wherein the ion-exchanger membrane (9) used is a membrane having a breakdown voltage of greater than 10 volts and an electric potential difference which effects the greatest possible drop in voltage at the ion-exchanger membrane (9), but which is below the breakdown voltage, is pre-specified with the aid of the anode/cathode arrangement (15, 16).

7. Process according to claim 6, wherein the ion-exchanger membrane (9) used is a membrane having a breakdown voltage of greater than 80 volts.

8. Process according to claim 6, wherein the ion-exchanger membrane (9) used is a membrane having a breakdown voltage of greater than 400 volts.

9. Process according to claim 1, wherein the anode (15) and the cathode (16) are flushed with transformer oil (19) while the process is being carried out.

10. Process according to claim 1, wherein low-pulsation pumps are used to convey the liquid-crystal mixture (7) and the concentrate solution (14).

11. Process according to claim 1, further comprising thoroughly mixing and homogenizing the liquid-crystal mixture (7) before introducing it into the first electrodialysis cell (2).

12. Process according to claim 1, which comprises passing the liquid-crystal mixture (7) through the first electrodialysis cell (2) over a period of more than four hours.

13. Process according to claim 1, wherein the ion-exchange membrane (9) is a cation-exchanger membrane and the anode and the cathode are separated from the first and second electrodialysis cells by anion-exchanger membranes.

* * * * *